(12) United States Patent
Rudow et al.

(10) Patent No.: US 9,456,067 B2
(45) Date of Patent: Sep. 27, 2016

(54) EXTERNAL ELECTRONIC DISTANCE MEASUREMENT ACCESSORY FOR A MOBILE DATA COLLECTION PLATFORM

(71) Applicant: Trimble Navigation Limited, Sunnyvale, CA (US)

(72) Inventors: Richard Rudow, Mesa, AZ (US); Venkateswaran Kasirajan, Tamil Nadu (IN); Robert Wold, Phoenix, AZ (US); Nicholas C. Talbot, Ashburton (AU); Peter Van Wyck Loomis, Sunnyvale, CA (US); Shawn D. Weisenburger, Denver, CO (US); James M. Janky, Los Altos, CA (US); Michael V. McCusker, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 14/516,157

(22) Filed: Oct. 16, 2014

(65) Prior Publication Data
US 2015/0043012 A1 Feb. 12, 2015

Related U.S. Application Data

(63) Continuation-in-part of application No. 14/035,884, filed on Sep. 24, 2013, which is a continuation-in-part of application No. 13/842,447, filed on Mar. 15, 2013, application No. 14/516,157, which is a
(Continued)

(51) Int. Cl.
*G01B 11/14* (2006.01)
*H04M 1/215* (2006.01)
(Continued)

(52) U.S. Cl.
CPC ............ *H04M 1/215* (2013.01); *G01S 7/4812* (2013.01); *G01S 7/4813* (2013.01); *G01S 17/023* (2013.01); *G01S 17/10* (2013.01); *G01S 19/09* (2013.01); *G01S 19/41* (2013.01); *G01S 19/43* (2013.01)

(58) Field of Classification Search
USPC ........ 356/614–624; 455/456.3, 422.1, 456.1, 455/404.2, 2.01, 427, 230
See application file for complete search history.

(56) References Cited

U.S. PATENT DOCUMENTS 5,225,842 A   7/1993  Brown et al.
5,345,244 A   9/1994  Gildea et al.
(Continued)

FOREIGN PATENT DOCUMENTS

EP    0508405         10/1992
EP    1729145 A1      12/2006
(Continued)

OTHER PUBLICATIONS

"DS00 Laser Range Finder—Product ManUal Revision 0", www.lightware.com, 2012, 45 Pages.
(Continued)

*Primary Examiner* — Tri T Ton
(74) *Attorney, Agent, or Firm* — Kilpatrick Townsend & Stockton LLP

(57) ABSTRACT

A known fixed relationship is maintained between an external electronic distance measurement accessory and a mobile data collection platform that are physically coupled together. A light beam axis of the external electronic distance measurement accessory is parallel with an optical axis of an entrance pupil of the mobile data collection platform. The external electronic distance measurement accessory integrates with the mobile data collection platform. The external electronic distance measurement accessory receives control instructions from the mobile data collection platform.

24 Claims, 70 Drawing Sheets

Related U.S. Application Data continuation-in-part of application No. 14/515,317, filed on Oct. 15, 2014.

(60) Provisional application No. 61/746,916, filed on Dec. 28, 2012.

(51) Int. Cl.
| | | |
|---|---|---|
| G01S 17/02 | (2006.01) | |
| G01S 17/10 | (2006.01) | |
| G01S 7/481 | (2006.01) | |
| G01S 19/09 | (2010.01) | |
| G01S 19/41 | (2010.01) | |
| G01S 19/43 | (2010.01) | |

(56) References Cited

U.S. PATENT DOCUMENTS

| | | |
|---|---|---|
| 5,379,224 A | 1/1995 | Brown et al. |
| 5,471,217 A | 11/1995 | Hatch et al. |
| 5,477,228 A | 12/1995 | Tiwari et al. |
| 5,523,761 A | 6/1996 | Gildea |
| 5,594,454 A | 1/1997 | Devereux et al. |
| 5,621,416 A | 4/1997 | Lennen |
| 5,740,048 A | 4/1998 | Abel et al. |
| 5,805,108 A | 9/1998 | Lennen |
| 5,862,501 A | 1/1999 | Talbot et al. |
| 5,899,957 A | 5/1999 | Loomis |
| 5,903,235 A | 5/1999 | Nichols |
| 5,913,170 A | 6/1999 | Wortham |
| 6,067,046 A | 5/2000 | Nichols |
| 6,072,431 A | 6/2000 | Froeberg |
| 6,249,245 B1 | 6/2001 | Watters et al. |
| 6,324,473 B1 | 11/2001 | Eschenbach |
| 6,408,178 B1 | 6/2002 | Wickstrom et al. |
| 6,429,808 B1 | 8/2002 | King et al. |
| 6,430,503 B1 | 8/2002 | McBurney et al. |
| 6,473,030 B1 | 10/2002 | McBurney et al. |
| 6,507,738 B1 | 1/2003 | Allison et al. |
| 6,510,387 B2 | 1/2003 | Fuchs et al. |
| 6,565,144 B1 | 5/2003 | Crean |
| 6,590,525 B2 | 7/2003 | Yule et al. |
| 6,711,293 B1 | 3/2004 | Lowe |
| 6,853,909 B2 | 2/2005 | Scherzinger |
| 7,003,112 B1 | 2/2006 | Froeberg |
| 7,043,364 B2 | 5/2006 | Scherzinger |
| 7,151,489 B2 | 12/2006 | Pande |
| 7,191,097 B1 | 3/2007 | Lee et al. |
| 7,336,814 B2 | 2/2008 | Boca et al. |
| 7,480,511 B2 | 1/2009 | O'Meagher |
| 7,541,974 B2 | 6/2009 | Scherzinger |
| 7,570,204 B1 | 8/2009 | McGraw et al. |
| 7,908,106 B2 | 3/2011 | Cho et al. |
| 7,961,141 B2 | 6/2011 | Dai et al. |
| 8,024,144 B2 | 9/2011 | Kludas et al. |
| 8,032,152 B2 | 10/2011 | Manson et al. |
| 8,044,852 B2 | 10/2011 | Green et al. |
| 8,068,848 B2 | 11/2011 | Manson et al. |
| 8,068,849 B2 | 11/2011 | Manson et al. |
| 8,078,192 B2 | 12/2011 | Wirola et al. |
| 8,081,987 B2 | 12/2011 | Manson et al. |
| 8,081,988 B2 | 12/2011 | Manson et al. |
| 8,081,989 B2 | 12/2011 | Manson et al. |
| 8,085,196 B2 | 12/2011 | Whitehead |
| 8,085,387 B2 | 12/2011 | Kludas et al. |
| 8,095,149 B2 | 1/2012 | Manson et al. |
| 8,134,497 B2 | 3/2012 | Janky et al. |
| 8,136,545 B2 | 3/2012 | Jablonski |
| 8,242,956 B2 | 8/2012 | LaMance et al. |
| 8,339,311 B2 | 12/2012 | Walley et al. |
| 8,368,875 B2 | 2/2013 | Kludas et al. |
| 8,447,519 B2 | 5/2013 | Basnayake et al. |
| 8,699,409 B2 | 4/2014 | Aryan et al. |
| 8,719,188 B2 | 5/2014 | Kuhn et al. |
| 9,037,527 B2 | 5/2015 | Kuhn et al. |
| 2001/0017599 A1 | 8/2001 | Yule et al. |
| 2002/0072854 A1 | 6/2002 | Fuchs et al. |
| 2002/0186180 A1 | 12/2002 | Duda |
| 2003/0083804 A1 | 5/2003 | Pilley et al. |
| 2003/0114984 A1 | 6/2003 | Scherzinger |
| 2005/0064878 A1 | 3/2005 | O'Meagher et al. |
| 2005/0104774 A1 | 5/2005 | Pande et al. |
| 2006/0146136 A1 | 7/2006 | Cho et al. |
| 2007/0139262 A1 | 6/2007 | Scherzinger |
| 2008/0263097 A1 | 10/2008 | Manson et al. |
| 2008/0319664 A1 | 12/2008 | Kremin et al. |
| 2009/0024325 A1 | 1/2009 | Scherzinger |
| 2009/0083430 A1 | 3/2009 | Edge et al. |
| 2009/0093959 A1 | 4/2009 | Scherzinger et al. |
| 2009/0189804 A1 | 7/2009 | Ashjaee et al. |
| 2009/0262016 A1 | 10/2009 | Wirola et al. |
| 2010/0057359 A1 | 3/2010 | Caballero et al. |
| 2010/0063733 A1 | 3/2010 | Yunck |
| 2010/0079333 A1 | 4/2010 | Janky et al. |
| 2010/0141510 A1 | 6/2010 | Dai et al. |
| 2010/0231443 A1 | 9/2010 | Whitehead |
| 2010/0260150 A1 | 10/2010 | Aryan et al. |
| 2011/0018761 A1 | 1/2011 | Walley et al. |
| 2011/0064312 A1 | 3/2011 | Janky et al. |
| 2011/0163914 A1 | 7/2011 | Seymour et al. |
| 2011/0187590 A1 | 8/2011 | Leandro |
| 2011/0195687 A1 | 8/2011 | Das et al. |
| 2011/0267230 A1 | 11/2011 | LaMance et al. |
| 2011/0285587 A1 | 11/2011 | Vollath et al. |
| 2012/0116676 A1 | 5/2012 | Basnayake et al. |
| 2012/0163656 A1 | 6/2012 | Wang et al. |
| 2012/0166137 A1 | 6/2012 | Grässer et al. |
| 2012/0330601 A1 | 12/2012 | Soubra et al. |
| 2013/0027246 A1 | 1/2013 | Hadef et al. |
| 2013/0243250 A1 | 9/2013 | France et al. |
| 2014/0081571 A1 | 3/2014 | Briggs et al. |
| 2014/0184442 A1 | 7/2014 | Large et al. |
| 2014/0187193 A1 | 7/2014 | Rudow et al. |
| 2014/0240170 A1 | 8/2014 | Rudow et al. |
| 2014/0253375 A1 | 9/2014 | Rudow et al. |
| 2014/0292569 A1 | 10/2014 | Wallace et al. |
| 2014/0292570 A1 | 10/2014 | Wallace et al. |
| 2014/0375493 A1 | 12/2014 | Weisenburger et al. |
| 2014/0378170 A1 | 12/2014 | Rudow et al. |
| 2014/0378171 A1 | 12/2014 | Rudow et al. |
| 2015/0009067 A1 | 1/2015 | Rudow et al. |
| 2015/0043012 A1 | 2/2015 | Rudow et al. |
| 2015/0045058 A1 | 2/2015 | Rudow et al. |
| 2015/0045059 A1 | 2/2015 | Rudow et al. |
| 2015/0050907 A1 | 2/2015 | Rudow et al. |
| 2015/0057028 A1 | 2/2015 | Rudow et al. |
| 2015/0289097 A1 | 10/2015 | Rudow et al. |

FOREIGN PATENT DOCUMENTS

| | | |
|---|---|---|
| EP | 2275778 A1 | 1/2011 |
| EP | 2 722 647 A1 | 4/2014 |
| KR | 20110085744 | 7/2011 |
| KR | 101241171 B1 | 3/2013 |
| WO | 2005/045458 | 5/2005 |
| WO | 2008089792 A1 | 7/2008 |
| WO | 2009074654 A1 | 6/2009 |
| WO | 2011120141 A1 | 10/2011 |

OTHER PUBLICATIONS

"Spirit Level with bubble", https://play.google.com/store/apps/details?id=com.zabaanapps.android.level, Mar. 25, 2014, 2 Pages.

"Theodolite", Hunter Research & Technology, Mar. 24, 2014, 1 Page.

"Trimble S8 Total Station Datasheet", Trimble Navigation Limited, 2013, 4 Pages.

Ike, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.

"Comparison of Photogrammetry Software", http://en.wikipedia.org/wiki/Comparison_of_photogrammetry_software, Jul. 8, 2015, 4 pages.

(56) References Cited

OTHER PUBLICATIONS

"PCT/US2013/078125 International Search Report and Written Opinion", Apr. 23, 2014, 25 pages.
"Photogrammetry", http://en.wikipedia.org/wiki/Photogrammetry, Jun. 25, 2015, 5 pages.
"Pi Pelican Imaging: Life in 3D", http://www.pelicanimaging.com, 2015, 3 pages.
"RTK Bridge-E", Intuicom, Inc. www.intuicom.com, 2 pages.
"Technical Tips from Inland GPS", Trimble TSC2—RTK over internet—establishing IP Connection, Jun. 14, 2011, 8 pages.
"Wireless RTK Bridge—Cellular User Guide", Revision 1.4, 2009, 47 pages.
Afzal, "Design Methodology for Dual Frequency Configurable GPD Receiver", ION GNSS 2010, Session E5, Portland, OR, Sep. 21-24, 2010, 9 Pages.
Brown, "TIDGET Mayday System for Motorists", Presented at IEEE Position Location and Navigation Symposium (PLANS) '94 Las Vegas, NV, Apr. 1994, 7 pages.
Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.
Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.
Rho, "Dual-Frequency GPS Precise Point Positioning with WADGPS Corrections", Department of Geodesy and Geomatics Engineering, University of new Brunswick, Fredericton, N.B. Canada, Sep. 13-16, 2005, 1470-1482.
"PCT/US2015/035328 International Search Report", Oct. 15, 2015, pp. 1-13.
"PCT/US2015/035346 International Search Report", Oct. 13, 2015, pp. 1-12.
Afzal, "Design Methodology for a Dual Frequency Configurable GPS Receiver", Proceedings of the 23rd International Technical Meeting of the Satellite Division of the Institute of Navigation (ION GNSS 2010), Sep. 24, 2010, pp. 2892-2900.
Guixens, et al., "System Aspects and Practical Results for Precise Car Navigation with Modern Civil Signals Using a Software Receiver", Proceedings of the 21st International Technical Meeting of the Satellite Division of the Institute of Navigation (ION GNSS 2008), Sep. 19, 2008, pp. 2280-2292.
Haak, "A Multi-Purpose Software GNSS Receiver for Automotive Applications", Proceedings of the 23rd International Technical Meeting of the Satellite Division of the Institute of Navigation (ION GNSS 2010), Sep. 24, 2010, pp. 1869-1874.
Ruegamer, et al., "A Flexible and Portable Multiband GNSS Front-end System", Proceedings of the 25th International Technical Meeting of the Satellite Division of the Institute of Navigation (ION GNSS 2012), Sep. 21, 2012, pp. 2378-2389.
International Search Report of the International Searching Authority for PCT Application No. PCT/US2015/028622 mailed Sep. 28, 2015, 6 pages.
International Written Opinion of the International Searching Authority for PCT Application No. PCT/US2015/028622 mailed Sep. 28, 2015, 13 pages.
International Search Report of the International Searching Authority for PCT Application No. PCT/US2015/052370 mailed Jan. 8, 2016, 6 pages.
International Written Opinion of the International Searching Authority for PCT Application No. PCT/US2015/052370 mailed Jan. 8, 2016, 7 pages.
Hatch, "The Synergism of GPS Code and Carrier Measurements", Proceedings of the Third International Geodetic Symposium on Satellite Doppler Positioning, 1982, 1213-1232.
Landau, et al., "Virtual Reference Stations Versus Broadcast Solutions in Network RTK", GNSS 2003, Graz, Austria, Apr. 2003, 15 pages.
Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.

EXTERNAL ELECTRONIC DISTANCE MEASUREMENT ACCESSORY FOR A MOBILE DATA COLLECTION PLATFORM

CROSS-REFERENCE TO RELATED APPLICATIONS (CONTINUATION-IN-PART)

This application claims priority to and is a continuation-in-part application of co-pending U.S. patent application Ser. No. 14/035,884, filed on Sep. 24, 2013 entitled, "EXTRACTING PSEUDORANGE INFORMATION USING A CELLULAR DEVICE," by Rudow et al.

U.S. patent application Ser. No. 14/035,884 claimed priority to and benefit of then U.S. Provisional Patent Application No. 61/746,916, filed on Dec. 28, 2012 entitled, "IMPROVED GPS/GNSS ACCURACY FOR A CELL PHONE," by Rudow et al., and assigned to the assignee of the present application; the contents of U.S. Provisional Patent Application No. 61/746,916 were incorporated by reference into U.S. patent application Ser. No. 14/035,884.

Application Ser. No. 14/035,884, also claimed priority to and is a continuation-in-part to the co-pending patent application Ser. No. 13/842,447, entitled "OBTAINING PSEUDORANGE INFORMATION USING A CELLULAR DEVICE," by Richard Rudow, with filing date Mar. 15, 2013, and assigned to the assignee of the present application, the disclosure of which was incorporated by reference into application Ser. No. 14/035,884.

This application claims priority to and is a continuation-in-part application of co-pending U.S. patent application Ser. No. 14/515,317, filed on Oct. 15, 2014 entitled, "PERFORMING DATA COLLECTION BASED ON INTERNAL RAW OBSERVABLES USING A MOBILE DATA COLLECTION PLATFORM," by Rudow et al.

BACKGROUND

The Global Positioning System (GPS) and its extensions in the Global Navigation Satellite Systems (GNSS) have become thoroughly pervasive in all parts of human society, worldwide. GPS and GNSS receivers in the form of chipsets have become widely incorporated into cell phones and other types of cellular devices with cellular-based communications equipment.

Typically, cellular devices include highly integrated GNSS chipsets that are designed to work with the E-911 service primarily, and are not designed to provide anywhere near a full range of features and outputs. They do provide a position fix, but are not designed to make available very many other parameters of interest. All GNSS receivers must acquire, track and decode a data message that conveys information about the location of the satellites in space, and time information. The principal additional parameter obtained is the "pseudorange." However, conventionally, this set of data is not available as an output from the cellular device's GNSS chipsets for use by the cellular device itself. Conventionally, in circumstances where it is available, it is under access control by the vendor.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Figure 1A:
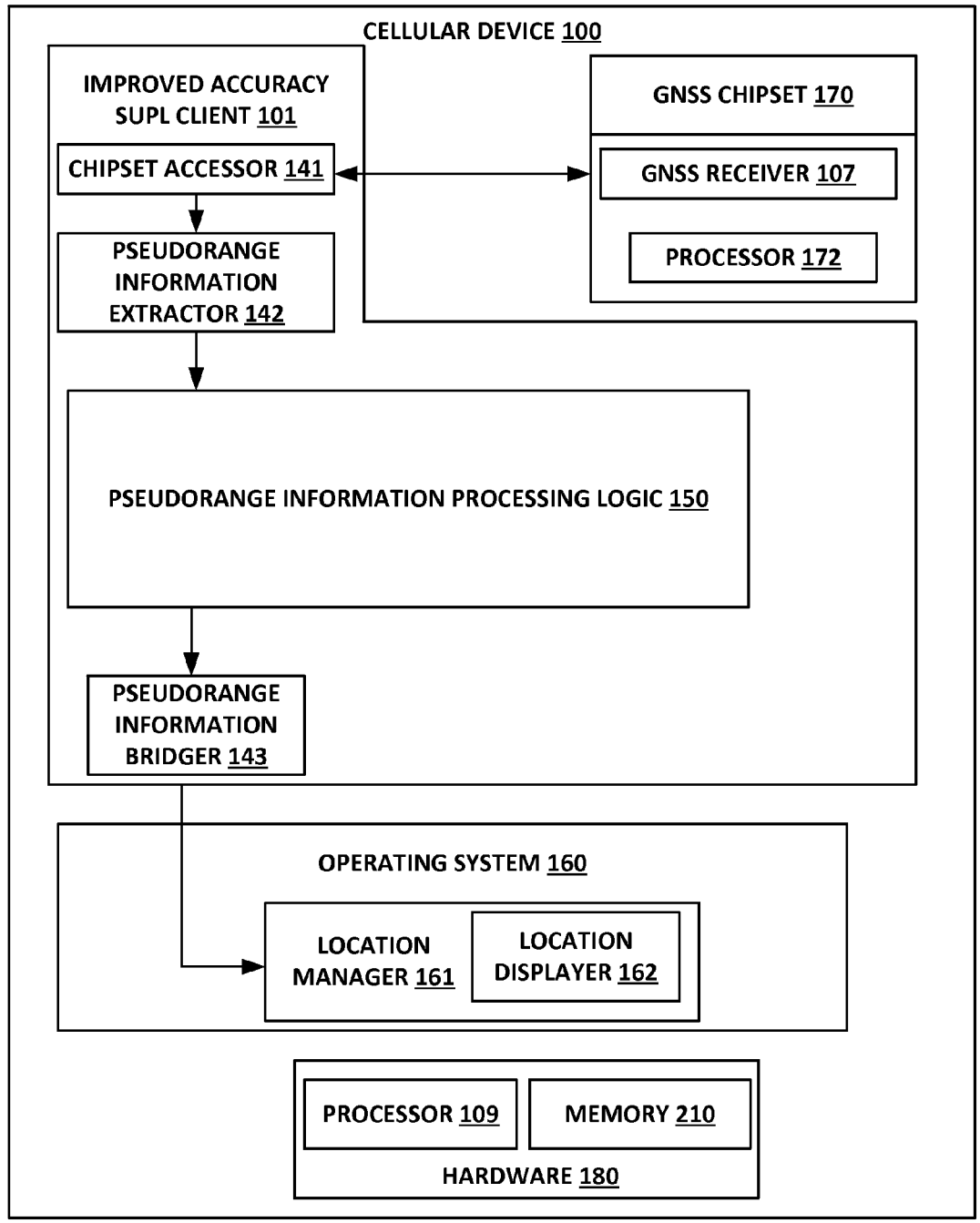
FIG. 1A depicts a block diagram of a cellular device for extracting pseudorange information, according to one embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "accessing," "calculating," "extracting," "using," "providing," "applying," "correcting," "smoothing," "reconstructing," "modeling," "improving," "adjusting," "filtering," "discarding," "removing," "processing," "determining," "selecting," "locating," "positioning," "increasing," "differentiating," "integrating," "bridging," "displaying," "performing," "obtaining," "receiving," "storing," "notifying," "matching," "creating," "generating," "communicating," "transmitting," "requesting," "activating, "deactivating," "initiating," "terminating," "interpolating," "changing," "replacing," "causing," "transforming data," "modifying data to transform the state of a computer system," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

I. Extracting Pseudorange Information Using a Cellular Device

Overview

Cellular devices, such as cell phones and non-voice enabled cellular devices, possesses pseudorange information that can be used in surveying and other positioning operations. Conventionally, however, the pseudorange information from cellular device chipsets are only available under a limited set of conditions, usually only when performing a E-911 service call, and then only for use by the Assisted GPS service located in conjunction with the E-911 service facility. Therefore, according to one embodiment, an embedded GNSS chipset is employed with in a cellular device, which: a) calculates pseudorange information for use by the GNSS chipset; and b) permits extraction of this pseudorange information by the cellular device in which it is embedded. As will be discussed, the pseudorange information from the GNSS chipset is extracted for use elsewhere in the cellular device outside of the GNSS chipset.

Examples of Systems for Extracting Pseudorange Information

FIG. 1A depicts a block diagram of a cellular device 100 for extracting pseudorange information, according to one embodiment. Examples of a cellular device 100 include a cell phone, a non-voice enabled cellular device, and a mobile hand-held GNSS receiver. The cellular device may be mobile or stationary. The cellular device may be hand-holdable or incorporated as a portion of a system which is not hand-holdable. In some embodiments, a cellular device, such as cellular device 100, may be utilized as a portion of a navigation system, security system, safety system, telematics device/box, or the like. In some embodiments, cellular device 100 may be utilized as sub-system of the vehicle mounted portion of a vehicle safety system, security system, and/or navigation system. The vehicle mounted portion of the OnStar® vehicle safety, vehicle security, and vehicle navigation system that is utilized in many vehicles is one non-limiting example of a system which may include cellular device 100.

As depicted in FIG. 1A, the cellular device 100 includes a GNSS chipset 170, a GNSS receiver 107, a processor 172 that is part of the GNSS receiver 107, a chipset accessor logic 141, a pseudorange information extractor logic 142, an improved accuracy Secure User Platform Location (SUPL) client 101, a pseudorange information bridger logic 143, a pseudorange information processing logic 150, an operating system 160, a location manager logic 161, a location displayer logic 162, hardware 180 that is outside of the GNSS receiver 107. According to one embodiment, the chipset accessor logic 141, the pseudorange information extractor logic 142, the pseudorange information processing logic 150, and the pseudorange information bridger logic 143 are a part of the improved accuracy SUPL client 101.

According to one embodiment, the hardware 180 includes a hardware processor 109 and memory 210. An example of a hardware processor 109 is a central processing unit. An example of hardware memory 210 is computer readable storage, such as, but not limited to, a disk, a compact disk (CD), a digital versatile device (DVD), random access memory (RAM) or read only memory (ROM). The hardware memory 210 is physical and, therefore, tangible, according to one embodiment. The hardware memory 210, according to another embodiment, is non-transitory.

According to one embodiment, the processor 172 and the GNSS receiver 107 are a part of the GNSS chipset 170. According to one embodiment, the chipset accessor logic 141, pseudorange information extractor logic 142, the pseudorange information bridger logic 143, the improved accuracy SUPL client 101, the operating system 160, and the processor 109 are located in a portion of the cellular device 100 that is outside of the GNSS chipset 170. The location manager logic 161 can be a part of the operating system 160 and external to the GNSS chipset 170. According to one embodiment, the location displayer logic 162 is a part of the location manager logic 161. According to one embodiment, the chipset accessor logic 141, pseudorange information extractor logic 142, the pseudorange information processing logic 150, pseudorange information bridger logic 143, and improved accuracy SUPL client 101 are application programming interfaces (API) function applications that reside in memory of the cellular device 100 and are executed by a processor 109 of the cellular device 100.

According to one embodiment, the GNSS receiver 107 is capable of receiving signals from GPS satellites, GLONASS satellites, or from a combination of satellites from different constellations. The GNSS receiver 107 can perform GPS measurements to derive raw measurement data for a position of the cellular device 100. The raw measurement data can provide an instant location of the cellular device 100. According to one embodiment, the raw measurement data is the pseudorange information that is extracted (also referred to as "extracted pseudorange information"). Examples of the extracted pseudorange information are uncorrected pseudorange information, observed pseudorange information, or unsmoothed pseudorange information, or a combination thereof. Conventionally, the raw measurement data is only for use by the GNSS chipset 170 and the GNSS chipset 170 calculates pseudorange information that is only for use by the GNSS chipset 170. Examples of pseudorange information are uncorrected pseudorange information, smoothed pseudoranges, and corrected pseudoranges. Examples of corrections used to improve accuracy of a position fix include differential GNSS corrections (DGPS), high precision GNSS satellite orbital data, GNSS satellite broadcast ephemeris data, and ionospheric and tropospheric error corrections and error projections based on location.

The GNSS chipset 170 has a processor 172 and, therefore, is capable of processing information, such as pseudorange information, itself. However, according to various embodiments, information that the GNSS chipset 170 has can be extracted from the GNSS chipset 170 and processed outside of the GNSS chipset 170 instead of by the GNSS chipset 170 using its own processor 172, in order to provide an improved accuracy position fix.

The chipset accessor logic 141 is configured for accessing the GNSS chipset 170. The pseudorange information extractor logic 142 is configured for extracting the pseudorange information from the accessed GNSS chipset 170. The extracted pseudorange information can be received and stored continuously. The pseudorange information bridger logic 143 is configured for bridging the pseudorange information from the GNSS chipset 170 to the location manager logic 161 that resides in the operating system 160 of the cellular device 100.

According to one embodiment, the chipset accessor logic 141, the pseudorange information extractor logic 142, the pseudorange information processing logic 150 and pseudorange information bridger logic 143 are a part of an improved accuracy SUPL client 101. For example, The SUPL client 101 can interface between the GNSS chipset 170 and the location manager logic 161, which resides in the operating system 160.

The pseudorange information can be obtained from the processor 172 of the GNSS receiver 107. The GNSS chipset 170 may be designed, for example, by the manufacturer of the GNSS chipset 170, to provide requested information, such as pseudorange information, in response to receiving the command. The pseudorange information may be extracted from the GNSS chipset 170 using the command that the manufacturer has designed the GNSS chipset 170 with. For example, according to one embodiment, the GNSS chipset 170 is accessed using an operation that is a session started with a message that is an improved accuracy Secure User Platform Location (SUPL) start message or a high precision SUPL INIT message. According to one embodiment, the message is a custom command that is specific to the GNSS chipset 170 (also referred to as "a GNSS chipset custom command") and by which the improved accuracy SUPL client 101 can gain access to the raw measurements of the GNSS chipset 170. Access may be controlled by the chipset manufacturer and a suitable key made available for use in the SUPL for obtaining access to the pseudoranges. A suitable key is an example of a "custom command."

A worker thread associated with the SUPL client 101 can monitor the raw measurements delivered by the GNSS chipset 170 into the GNSS chipset 170's memory buffers, cache the raw measurements and use the raw measurements to determine a position fix. The pseudorange information extractor logic 142 and the pseudorange information processing logic 150 can be associated with the worker thread. For example, the pseudorange information extractor logic 142 can cache the raw measurements and the pseudorange information processing logic 150 can determine the location.

According to one embodiment, a worker thread is a light weight process that executes a specific sequence of tasks in the background. The tasks can be of long term and/or at times periodic in nature. The worker thread can assist in helping the main thread, which may also be referred to as the main program or main task, with specific functions. Worker threads can be started when these functions of the sequence of tasks are to be executed. A worker thread can remain in the active state as long as its respective functions are being executed. A worker thread may terminate itself, when it completes its functions or when it reaches a point where it can no longer continue to function, for example, due to an irrecoverable error. A worker thread can post its status to the main thread when it ends. Examples of posted status are completion or termination. A worker thread may also post to the main thread the level of progress of its functions periodically. At a given point in time, there may be many such worker threads in progress at the same time. Worker threads may maintain some sort of synchronization amongst themselves depending upon the tasks they are intended for. The main thread may terminate a worker thread, for example, when the functions of that worker thread are no longer needed or due to other execution changes in the system.

According to one embodiment, the cellular device 100 can improve the accuracy of the extracted pseudorange information. For example, the pseudorange information processing logic 150 can improve the accuracy of the extracted pseudorange information, as will become more evident.

The output of the pseudorange information processing logic 150 can be used for determining the location of the cellular device 100. For example, a latitude, longitude and altitude can be determined based on the output of the pseudorange information processing logic 150, which can be displayed by the location displayer logic 162.

According to one embodiment, the pseudorange information bridger logic 143 communicates the output from the pseudorange information processing logic 150 to the location manager logic 161 in the operating system 160. According to one embodiment, the output of the pseudorange information processing logic 150 is a location that is defined in terms of latitude, longitude, and altitude. The methods are well-known in the GPS arts. The pseudoranges are used to first determine a location the WGS-84 coordinate system of the Global Positioning System, and then converted into latitude, longitude, and elevation.

The location displayer logic 162 can display the location with respect to a digital representation of a map available, for example, from third parties via download to the cellular device.

Figure 1B:
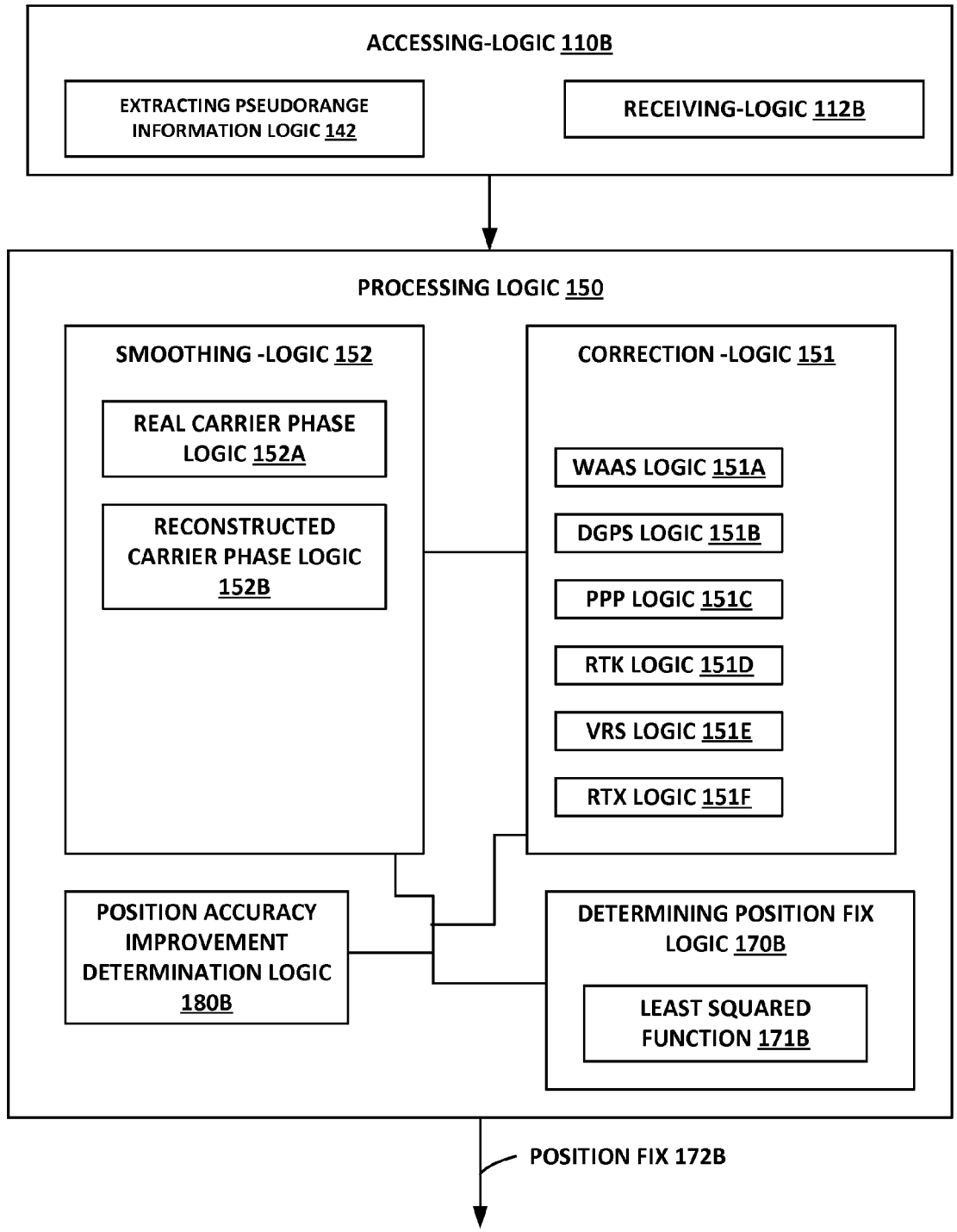
FIG. 1B depicts a block diagram of a cellular device for extracting and processing pseudorange information, according to one embodiment.

FIG. 1B depicts a block diagram of a portion of a cellular device 100, 100D for extracting pseudorange information, according to one embodiment. The cellular device 100, 100D includes accessing-logic 110B and processing logic 150. The accessing logic 110B includes extracting logic 112B and receiving logic 114B. The extracting logic 112B includes pseudorange information extracting logic 142, satellite-based augmentation system (SBAS), extracting logic 112B-5, WAAS extracting logic 112B-2, Doppler shift extracting logic 112B-3, and carrier phase measurement extracting logic 112B-4. According to one embodiment, WAAS is an example of SBAS. According to one embodiment, SBAS extracting logic 112B-5 includes WAAS extracting logic 112B-2.

Examples of satellite-based augmentation system (SBAS) are Indian GPS aided Geo Augmented Navigation System (GAGAN), European Geostationary Navigation Overlay Service (EGNOS), Japanese Multi-functional Satellite Augmentation System (MSAS), John Deere's StarFire, WAAS, and Trimble's OmniStar.

As depicted in FIG. 1B, the pseudorange information processing logic 150 includes pseudorange-correction-logic 151, pseudorange-carrier-phase-smoothing-logic 152, position accuracy improvement determination logic 180B and determining position fix logic 170B. Examples of "improving" are "smoothing" or "correcting," or a combination thereof. The pseudorange-correction-logic 151 includes WAAS logic 151A, DGPS logic 151B, Precise Point Positioning (PPP) logic 151C, RTK logic 151D, VRS (Virtual Reference Station) logic 151E, and RTX logic 151F. The pseudorange-carrier-phase-smoothing-logic 152 includes real carrier phase logic 152A and reconstructed carrier phase logic 152B. According to one embodiment, the accessing-logic 110B and the processing logic 150 reside in the improved accuracy SUPL client 101.

Examples of pseudorange information are extracted pseudoranges, corrected pseudoranges, smoothed pseudoranges, or a combination thereof, among other things. Examples of pseudorange corrections include Wide Area Augmentation System (WAAS) corrections, Differential Global Positioning System (DGPS) corrections, Precise Point Positioning (PPP) corrections, Real Time Kinematic (RTK) corrections, and Virtual Reference Station (VRS) corrections. Examples of carrier phase information include real carrier phase and reconstructed carrier phase information.

The extracting logic 112B can extract various types of information from the GNSS chipset 170, as discussed herein. For example, the extracting logic 112B includes pseudorange information extracting logic 142, WAAS extracting logic 112B-2, Doppler extracting logic 112B-3, and carrier phase measurement extracting logic 112B-4. According to one embodiment, the extracting logic 112B can be used to extract these various types of information from the GNSS chipset 170 in a similar manner that the pseudorange information extractor logic 142 extracts pseudorange information from the GNSS chipset 170, for example, using an SUPL Client 101 that employs a command designed or provided by the manufacturer of the GNSS chipset 170, as described herein. More specifically, the WAAS extracting logic 112B-2, the Doppler extracting logic 112B-3, and carrier phase measurement extracting logic 112B-4 can employ commands designed or provided by the manufacturer of the GNSS chipset 170 to extract respectively WAAS, Doppler information, and carrier phase measurements for real carrier phase information.

The receiving logic 114B receives other types of information that are not extracted from the GNSS chipset 170. The receiving logic 114B can receive the information in response to a request (also commonly known as "pulling") or receive the information without the information being requested (also commonly known as "pushing"). "Obtaining" and "accessing" can be used interchangeably, according to various embodiments.

Table 1 depicts the types of information that are extracted from the GNSS chipset or received without extraction, as discussed herein, according to various embodiments.

TABLE 1

Types of Information that are Extracted from the GNSS Chipset or Received without Extraction

| Extracted | Received |
|---|---|
| Pseudorange Information | WAAS/SBAS |
| Doppler Shift Information | DGPS |
| Carrier Phase Measurements for real carrier phase information | RTK |
| WAAS/SBAS | Not Applicable |

The information depicted in the extracted column can be extracted from the GNSS chipset 170 using the SUPL client 101 in a manner similar to extracting pseudorange information, as discussed herein. WAAS may be extracted or received, for example, over the Internet. When this Doppler shift information is available but real carrier phase information is not, the extracted Doppler shift information can be integrated by processor 109, for example, to reconstruct carrier phase information. Techniques for reconstructing carrier phase information from Doppler shift information are well known in the art. Any one or more of the information depicted in Table 1 can be processed by the cellular device 100, for example, using the processor 109 that is outside of the GNSS chipset 170.

The pseudorange-carrier-phase-smoothing-logic 152 can smooth pseudorange information by applying carrier phase information to the pseudorange information.

The pseudorange-carrier-phase-smoothing-logic 152 receives raw pseudorange information from the accessing logic 110B. The carrier phase information may be reconstructed carrier phase information or real carrier phase information.

The pseudorange-correction-logic 151 can correct pseudorange information. For example, the pseudorange-correction-logic 151 can receive pseudorange information and apply pseudorange corrections to the pseudorange information. Examples of the pseudorange information received by the pseudorange-correction-logic 151 include extracted pseudorange information, DGPS corrected pseudoranges, and smoothed pseudoranges that were smoothed, for example, using either real carrier phase information or reconstructed carrier phase information. Examples of pseudorange corrections that can be applied to the received pseudorange information are WAAS corrections, DGPS corrections, PPP corrections, RTK corrections and VRS corrections. The PPP logic 151C performs Precise Point Positioning (PPP) processing on pseudorange information. According to one embodiment, RTX™ is proprietary form of PPP developed by Trimble Navigation Limited. It should be appreciated that there are other forms of Precise Point Positioning which may operate using similar principles.

The pseudorange information processing logic 150 may also include a determining position fix logic 170B that performs, for example, a least squares solution 171B can be performed after the extracted pseudorange information is improved by the pseudorange-correction-logic 151 or the pseudorange-carrier-phase-smoothing-logic 152, or a combination thereof and prior to transmitting the output to the pseudorange information bridger logic 143. According to one embodiment, the determining position fix logic 170B resides in the processing logic 150. Least-squares solution methods are well-known in the position determination arts.

According to one embodiment, extracted pseudorange information is passed from the extracting pseudorange information logic 142 to the smoothing logic 152 where it is smoothed at either real carrier phase logic 152A or reconstructed carrier phase logic 152B. According to one embodiment, the smoothed pseudorange information is communicated from the smoothing logic 152 to the correcting logic 151 for further correction, where one or more corrections may be performed. If a plurality of corrections is performed, they can be performed in various combinations. If carrier phase smoothing is not possible, the extracted pseudorange information can be communicated from extracting pseudorange information logic 142 to correction logic 151. One or more of the logics 152A, 152B, 151A, 151E, 151F in the processing logic 150 can communicate with any one or more of the logics 152A, 152B, 151A, 151E 151F in various orders and combinations. Various embodiments are not limited to just the combinations and orders that are described herein. According to one embodiment, extracted pseudorange information may not be smoothed or corrected. In this case, unsmoothed uncorrected pseudorange information can be communicated from logic 142 to logic 170B.

The cellular device 100 may also include a position-accuracy-improvement-determination-logic 180B for determining whether to apply any improvements and if so, the one or more position accuracy improvements to apply to the extracted pseudorange information. For example, the cellular device 100 may be preconfigured based on the signals that are available to the cellular device 100 or a user of the cellular device 100 may manually configure the cellular device 100. For example, the cellular device 100 can display the signals that are available to the user and the user can select which signals they desire from the displayed list of signals. The configuration information, whether preconfigured or manually configured by the user, can be stored for example, in a look up table in the cellular device 100. Examples of position improvements that can be determined by the position accuracy improvement determination logic 180B are real carrier phase information, reconstructed carrier phase information, WAAS, DGPS, PPP, RTX™, RTK and VRS. The position accuracy improvement determination logic 180B can be used to determine to reconstruct carrier phase information based on Doppler shift if real carrier phase information is not available, for example. The position-accuracy-improvement-determination-logic 180B, according to one embodiment, is a part of the SUPL client 101.

Extracted pseudorange information without any additional improvements provides 4-5 meters of accuracy. Various combinations of position accuracy improvements can be applied to extracted pseudorange information (EPI) according to various embodiments, where examples of position accuracy improvements include, but are not limited to, Wide Area Augmentation System (WAAS) pseudorange corrections, Differential GPS (DGPS) pseudorange corrections, Precise Point Positioning (PPP) processing, RTX™, Real Time Kinematic (RTK), Virtual Reference Station (VRS) corrections, real carrier phase information (real CPI) smoothing, and reconstructed carrier phase information (reconstructed CPI) smoothing.

One or more of the logics 110B, 112B, 114B, 142, 112B-2, 112B-3, 180B, 152, 152A, 152B, 151, 151Aj-151F, 170B, 171B can be executed, for example, by the processor 109 of the cellular device 100 that is located outside of the GNSS chipset 170.

Table 2 depicts combinations of information that result in a position fix 172B, according to various embodiments. However, various embodiments are not limited to the combinations depicted in Table 2.

TABLE 2

Combinations of Information that Result in a Position Fix

| Combination Identifier | Combinations of Information that Result in a Position Fix |
|---|---|
| 1 | Extracted pseudorange information (EPI) |
| 2 | EPI + Real or Reconstructed Carrier Phase Information (CPI) |
| 3 | EPI + CPI + WAAS |
| 4 | EPI + CPI + WAAS + DGPS |
| 5 | EPI + CPI + DGPS |
| 6 | EPI + CPI + DGPS + PPP |
| 7 | EPI + DGPS |
| 8 | EPI + DGPS + WAAS |
| 9 | EPI + DGPS + PPP |
| 10 | EPI + RTK |
| 11 | EPI + VRS |

Figure 1C:
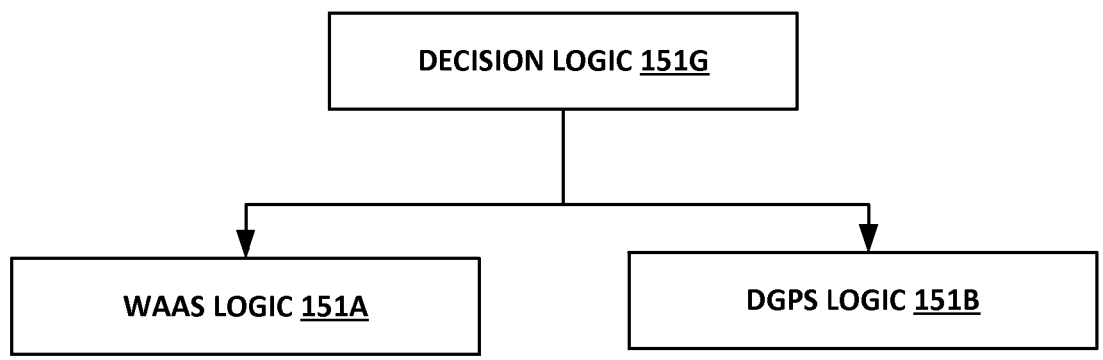
FIG. 1C depicts decision logic for determining whether to apply WAAS (Wide Area Augmentation System) corrections or DGPS (Differential Global Positioning System) corrections, according to one embodiment.

FIG. 1C depicts decision logic 151H for determining whether to apply SBAS corrections 151G, WAAS corrections 151A, PPP corrections 151C, RTX™ corrections 151F or DGPS corrections 151B, according to one embodiment. According to one embodiment, the SBAS corrections that are applied are WAAS corrections. According to one embodiment, the decision logic 151H is located in the position accuracy improvement determination logic 180B or the correction logic 151.

According to one embodiment, a first position is determined by an available means. For example, the first position may be based on uncorrected unsmoothed extracted pseudorange information, cellular tower triangulation, WiFi triangulation or other means. A level of precision may be selected, for example, by a user or preconfigured into the cellular device, where DGPS or one or more of SBAS, WAAS, RTX™, PPP would be used to achieve that level of precision. The decision logic 151H can access the level of precision and receive two or more reference station locations by sending a message to a database enquiring about nearby reference stations for DGPS. The decision logic 151H can determine the distance between the cellular device 100 and the nearest reference station. If the distance is greater than some selected distance threshold, the decision logic 151H can use PPP, RTX™, SBAS or WAAS, instead of DGPS. If the distance is less than the selected distance threshold, the decision logic 151H can use DGPS instead of PPP, RTX™, SBAS or WAAS. According to one embodiment, a range for a distance threshold is approximately 20 to 60 miles. According to one embodiment, the distance threshold is approximately 60 miles.

If the decision logic 151H determines to apply DGPS corrections at DGPS logic 151B resulting in DGPS corrected smoothed pseudoranges, further corrections can be made using the orbit-clock information contained in the PPP corrections. For example, a position fix can be determined based on the DGPS corrected smoothed pseudoranges and the PPP corrections. The position fix can be determined external to the GNSS chipset, for example, at the processing logic 150.

The cellular device 100 may be configured with the distance threshold, for example, by the manufacturer of the cellular device 100 or by a user of the cellular device 100. The cellular device 100 may be configured with the distance threshold through service that is remote with respect to the cellular device 100 or may be configured locally. The distance threshold can be selected based on a degree of position accuracy that is desired.

Figure 1D:
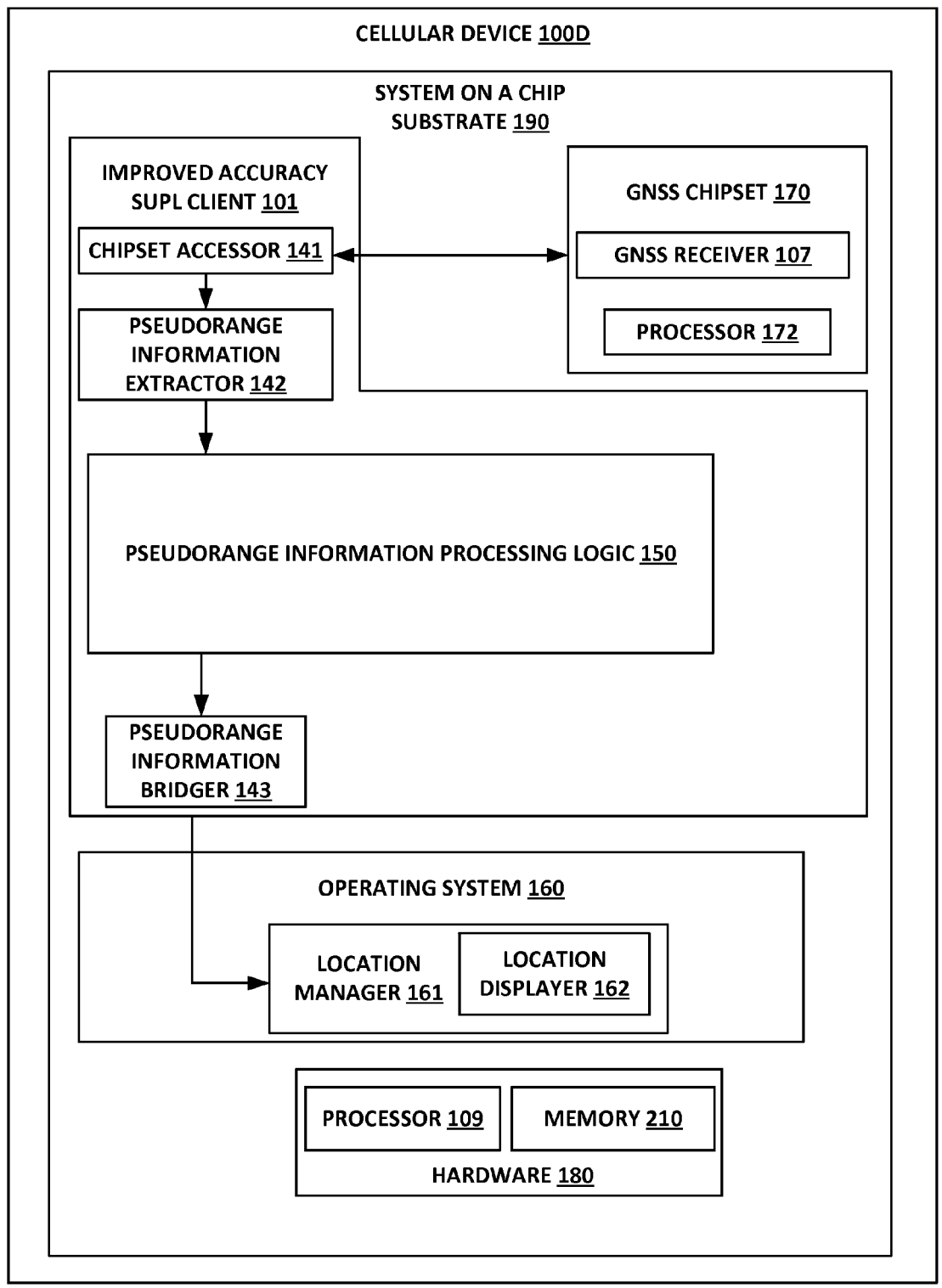
FIG. 1D depicts a block diagram of a cellular device for extracting pseudorange information, according to one embodiment.

FIG. 1D depicts a block diagram of a cellular device 100D for extracting pseudorange information, according to one embodiment.

As depicted in FIG. 1D, the GNSS chipset 170 is located on a system on a chip (SOC) substrate (SOCS) 190.

As described herein, various information can be extracted from the GNSS receiver 1130, such as pseudorange information, Doppler Shift Information, Real Carrier Phase Measurement, WAAS and SBAS. Other types of processing information output by the GNSS receiver 1130 can be ignored.

A Cell device 100D's hardware architecture includes discreet physical layout and interconnection of multiple chipsets for processing and for special purposes such as a GNSS chipset 170. In addition, newer architectures involve further integration of chipsets in the "system on a chip" (SoC) configuration. In this configuration, the GNSS chipset 170 can still be a complete element capable of delivering a PVT (position velocity and time) solution. However in an embodiment, the pseudorange information, carrier phase, and/or Doppler measurements, along with WAAS corrections if available, are extracted prior to further signal processing in the GNSS chipset 170 and are processed using different algorithms and corrections data for developing an improved accuracy PVT solution. In so doing the deleterious effects of multipath and other error sources may be minimized. Further the GNSS chipset 170 outputs are ignored and not displayed when the external processing is employed and the higher-accuracy PVT data is available.

Figure 2:
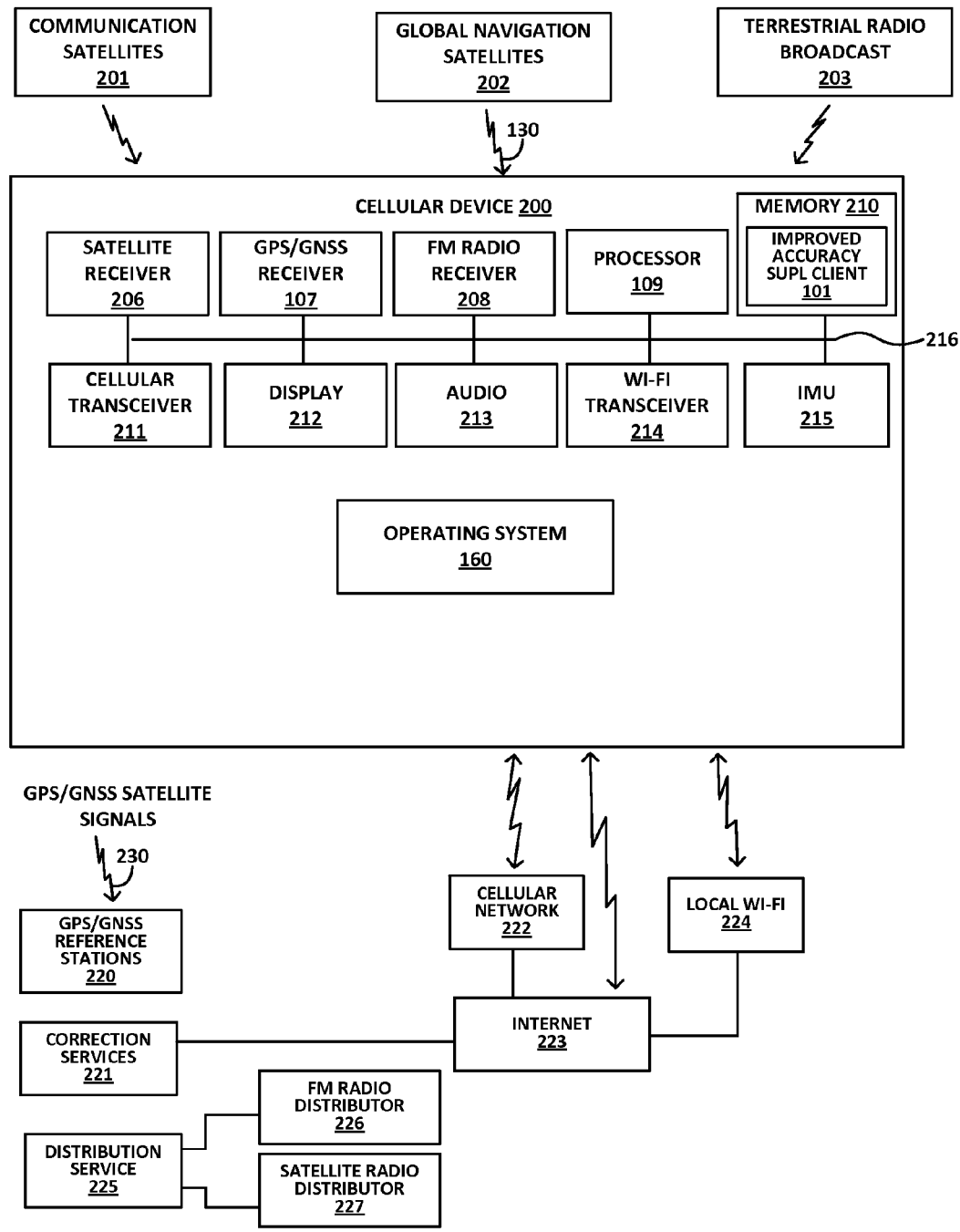
FIG. 2 depicts a block diagram of multiple sources for providing positioning correction information to a cellular device for processing pseudorange information, according to one embodiment.

FIG. 2 depicts a block diagram of a set of correction delivery options for providing positioning information to a cellular device for extracting pseudorange information, according to one embodiment. Examples of a cellular device 200 include a cell phone, a non-voice enabled cellular device, and a mobile hand-held GNSS receiver. The cellular device may be mobile or stationary.

The cellular device 200 includes a bus 216, a satellite receiver 206, a GNSS receiver 107, an FM radio receiver 208, a processor 109, memory 210, a cellular transceiver 211, a display 212, audio 213, Wi-Fi transceiver 214, IMU 215, image capturing device 240, and operating system 160. Components 206, 107, 208, 109, 210, 211, 212, 213, 214, 215, and 240 are all connected with the bus 216.

In FIG. 2, a plurality of broadcast sources is used to convey data and media to a cellular device 200. As an example, cellular device 200 can receive broadcast signals from communication satellites 201 (e.g., two-way radio, satellite-based cellular such as the Inmarsat or Iridium communication networks, etc.), global navigation satellites 202 which provide radio navigation signals (e.g., the GPS, GNSS, GLONASS, GALILEO, BeiDou, Compass, etc.), and terrestrial radio broadcast (e.g., FM radio, AM radio, shortwave radio, etc.)

A cellular device 200 can be configured with a satellite radio receiver 206 coupled with a communication bus 216 for receiving signals from communication satellites 201, a GNSS receiver 107 coupled with bus 216 for receiving radio navigation signals from global navigation satellites 202 and for deriving a position of cellular device 200 based thereon. Cellular device 200 further comprises an FM radio receiver 208 coupled with bus 216 for receiving broadcast signals from terrestrial radio broadcast 203. Other components of cellular device 200 comprise a processor 109 coupled with bus 216 for processing information and instructions, a memory 210 coupled with bus 216 for storing information and instructions for processor 109. It is noted that memory 210 can comprise volatile memory and non-volatile memory, as well as removable data storage media in accordance with various embodiments. Cellular device 200 further comprises a cellular transceiver 211 coupled with bus 216 for communicating via cellular network 222. Examples of cellular networks used by cellular device 200 include, but are not limited to GSM: cellular networks, GPRS cellular networks, GDMA cellular networks, and EDGE cellular networks. Cellular device 200 further comprises a display 212 coupled with bus 216. Examples of devices which can be used as display 212 include, but are not limited to, liquid crystal displays, LED-based displays, and the like. It is noted that display 212 can be configured as a touch screen device (e.g., a capacitive touch screen display) for receiving inputs from a user as well as displaying data. Cellular device 200 further comprises an audio output 213 coupled with bus 216 for conveying audio information to a user. Cellular device 200 further comprises a Wi-Fi transceiver 214 and an inertial measurement unit (IMU) 215 coupled with bus 216. Wi-Fi transceiver 114 may be configured to operate on any suitable wireless communication protocol including, but not limited to WiFi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard).

Improvements in GNSS/GPS positioning may be obtained by using reference stations with a fixed receiver system to calculate corrections to the measured pseudoranges in a given geographical region. Since the reference station is located in a fixed environment and its location can be determined very precisely via ordinary survey methods, a processor associated with the Reference Station GNSS/GPS receivers can determine more precisely what the true pseudoranges should be to each satellite in view, based on geometrical considerations. Knowing the orbital positions via the GPS almanac as a function of time enables this process, first proposed in 1983, and widely adopted ever since. The difference between the observed pseudorange and the calculated pseudorange for a given Reference station is called the pseudorange correction. A set of corrections for all the global navigation satellites 202 in view is created second by second, and stored, and made available as a service, utilizing GPS/GNSS reference stations 220 and correction services 221. The pseudoranges at both the cellular device 200 GPS receiver 107 and those at the reference stations 220 are time-tagged, so the corrections for each and every pseudorange measurement can be matched to the local cell phone pseudoranges. The overall service is often referred to as Differential GPS, or DGPS. Without any corrections, GNSS/GPS receivers produce position fixes with absolute errors in position on the order of 4.5 to 5.5 m per the GPS SPS Performance Standard, $4^{th}$ Ed. 2008. In FIG. 2, one or more correction services 221 convey these corrections via a cellular network 222, or the Internet 223. Internet 223 is in turn coupled with a local Wi-Fi network 224 which can convey the corrections to cellular device 200 via Wi-Fi transceiver 214. Alternatively, cellular network 222 can convey the corrections to cellular device 200 via cellular transceiver 211. In some embodiments, correction services 221 are also coupled with a distribution service 225 which conveys the corrections to an FM radio distributor 226. FM radio distributor 226 can broadcast corrections as a terrestrial radio broadcast 103. It should be appreciated that an FM signal is being described as a subset of possible terrestrial radio broadcasts which may be in a variety of bands and modulated in a variety of manners. In some embodiments, cellular device 200 includes one or more integral terrestrial radio antennas associated with integrated terrestrial receivers; FM radio receiver 208 is one example of such a terrestrial receiver which would employ an integrated antenna designed to operate in the correct frequency band for receiving a terrestrial radio broadcast 103. In this manner, in some embodiments, cellular device 200 can receive the corrections via FM radio receiver 208 (or other applicable type of integrated terrestrial radio receiver). In some embodiments, correction services 221 are also coupled with a distribution service 225 which conveys the corrections to a satellite radio distributor 227. Satellite radio distributor 227 can broadcast corrections as a broadcast from one or more communications satellites 201. In some embodiments, cellular device 200 includes one or more integral satellite radio antennas associated with integrated satellite radio receivers 206. Satellite radio receiver 206 is one example of such a satellite receiver which would employ an integrated antenna designed to operate in the correct frequency band for receiving a corrections or other information broadcast from communication satellites 201. In this manner, in some embodiments, cellular device 200 can receive the corrections via satellite radio receiver 206.

Examples of a correction source that provides pseudorange corrections are at least correction service 221, FM radio distribution 226, or satellite radio distributor 227, or a combination thereof. According to one embodiment, a correction source is located outside of the cellular device 200.

Examples of image capturing device 240 are a camera, a video camera, a digital camera, a digital video camera, a digital camcorder, a stereo digital camera, a stereo video camera, a motion picture camera, and a television camera. The image capturing device 240 may use a lens or be a pinhole type device.

The blocks that represent features in FIGS. 1A-2 can be arranged differently than as illustrated, and can implement additional or fewer features than what are described herein. Further, the features represented by the blocks in FIGS. 1A-2 can be combined in various ways. A cellular device 100, 200 (FIGS. 1A-3) can be implemented using software, hardware, hardware and software, hardware and firmware, or a combination thereof. Further, unless specified otherwise, various embodiments that are described as being a part of the cellular device 100, 200, whether depicted as a part of the cellular device 100, 200 or not, can be implemented using software, hardware, hardware and software, hardware and firmware, software and firmware, or a combination thereof. Various blocks in FIGS. 1A-2 refer to features that are logic, such as but not limited to, 150, 180B, 152, 152A, 152B, 151, 151A-151G, 170B, which can be; implemented using software, hardware, hardware and software, hardware and firmware, software and firmware, or a combination thereof.

The cellular device 100, 200, according to one embodiment, includes hardware, such as the processor 109, memory 210, and the GNSS chipset 170. An example of hardware memory 210 is a physically tangible computer readable storage medium, such as, but not limited to a disk, a compact disk (CD), a digital versatile device (DVD), random access memory (RAM) or read only memory (ROM) for storing instructions. An example of a hardware processor 109 for executing instructions is a central processing unit. Examples of instructions are computer readable instructions for implementing at least the SUPL Client 101 that can be stored on a hardware memory 210 and that can be executed, for example, by the hardware processor 109. The SUPL client 101 may be implemented as computer readable instructions, firmware or hardware, such as circuitry, or a combination thereof.

Pseudorange Information

A GNSS receiver 107 (also referred to as a "receiver"), according to various embodiments, makes a basic measurement that is the apparent transit time of the signal from a satellite to the receiver, which can be defined as the difference between signal reception time, as determined by the receiver's clock, and the transmission time at the satellite, as marked in the signal. This basic measurement can be measured as the amount of time shift required to align the C/A-code replica generated at the receiver with the signal received from the satellite. This measurement may be biased due to a lack of synchronization between the satellite and receiver clock because each keeps time independently. Each satellite generates a respective signal in accordance using a clock on board. The receiver generates a replica of each signal using its own clock. The corresponding biased range, also known as a pseudorange, can be defined as the transit time so measured multiplied by the speed of light in a vacuum.

There are three time scales, according to one embodiment. Two of the time scales are the times kept by the satellite and receiver clocks. A third time scale is a common time reference, GPS Time (GPST), also known as a composite time scale that can be derived from the times kept by clocks at GPS monitor stations and aboard the satellites.

Let $\tau$ be the transit time associated with a specific code transition of the signal from a satellite received at time t per GPST. The measured apparent range r, called pseudorange, can be determined from the apparent transmit time using equation 1 as follows:

measured pseudorange at $(t)=c$[arrival time at $(t)$-emission time at $(t-\tau)$]. (Eq. 1)

Both t and $\tau$ are unknown, and can be estimated. In this discussion of pseudoranges, measurements from a GPS satellite are dealt with in a generic way to make the notation simple, making no reference to the satellite ID or carrier frequency (L1 or L2).

Figure 3:
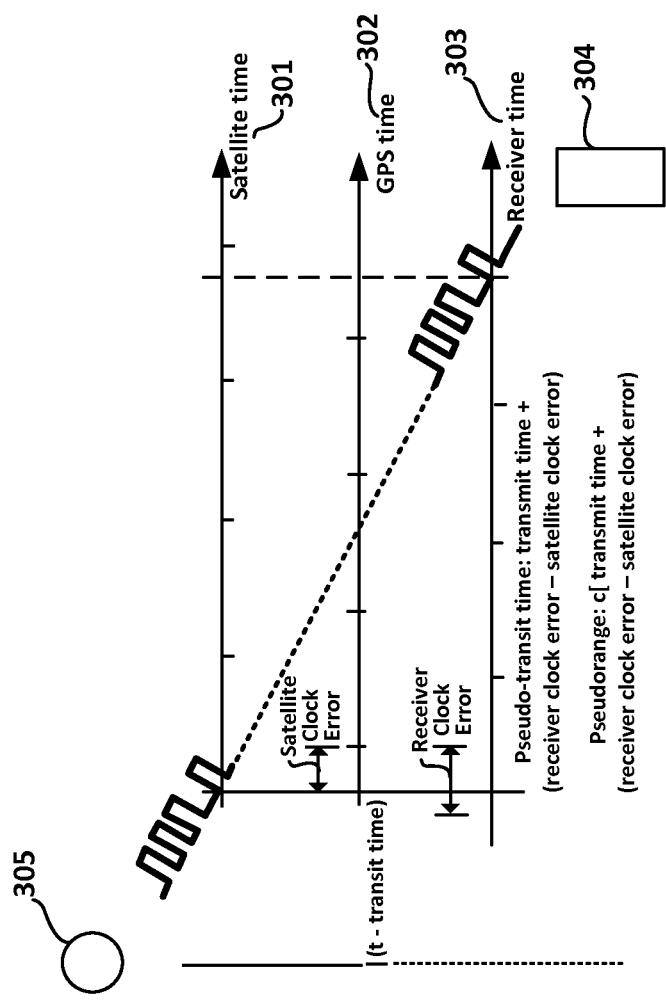
FIG. 3 depicts a conceptual view of pseudorange measurements, according to various embodiments.

Equations 2 and 3 depict how to relate the time scales of the receiver and the satellite clocks with GPST:

arrival time at $(t)=t$+receiver clock at $(t)$ (Eq. 2)

arrival time at $(t-\tau)=(t-\tau)$+satellite clock error at $(t-\tau)$ (Eq. 3)

where receiver clock error represents the receiver 304's clock bias 303 and satellite clock error represents the bias 301 in the satellite 305's clock, and both the receiver clock and the satellite clock are measured relative to GPST 302, as shown in FIG. 3. Receiver clock error and satellite clock error represent the amounts by which the satellite 305 and receiver 304 clocks are advanced in relation to GPST. The satellite clock error 301 is estimated by the Control Segment and specified in terms of the coefficients of a quadratic polynomial in time. The values of these coefficients can be broadcast in the navigation message.

Accounting for the clock biases, the measured pseudorange (Eq. 1) can be written as indicated in equation 4:

$PR(t)=c[t$+receiver clock error at $(t)-(t-\tau$+satellite clock error at $(t-\tau))$]+miscellaneous errors at $(t)=c\tau+c$[receiver clock errors at $(t)$-satellite clock error at $(t-\tau)$]+miscellaneous errors at $(t)$ (Eq. 4)

where miscellaneous errors represent unmodeled effects, modeling error, and measurement error. The transmit time multiplied by the speed of light in a vacuum can be modeled as satellite position at $(t-\tau)$. Ionosphere error and troposphere error reflect the delays associated with the transmission of the signal respectively through the ionosphere and the troposphere. Both ionosphere error and troposphere error are positive.

For simplicity, explicitly reference to the measurement epoch t has been dropped, and the model has been rewritten for the measured pseudorange as indicated in equation 5.

$PR=r$+[receiver clock error-satellite clock error]+ionosphere error+troposphere error+miscellaneous errors (Eq. 5)

where PR is the measured pseudorange, r is the true range from the receiver to the satellite, receiver clock error is the difference between the receiver clock and the GPSTIME, satellite clock error is the difference between the satellite clock and GPSTIME, GPSTIME is ultimately determined at the receiver as part of the least squared solution determined by the least squares solution 171B so that all clock errors can be resolved to some level of accuracy as part of the position determination process, and miscellaneous errors include receiver noise, multipath and the like.

At least one source of error is associated with satellite positions in space. The navigation message in the GPS signal contains Keplerian parameters which define orbital mechanics mathematics and, thus, the positions of the satellites as a function of time. One component of WAAS and RTX™ contains adjustments to these parameters, which form part of the constants used in solving for the position fix at a given time. Taking account of the corrections is well-known in the GPS position determining arts.

Ideally, the true range r to the satellite is measured. Instead, what is available is PR, the pseudorange, which is a biased and noisy measurement of r. The accuracy of an estimated position, velocity, or time, which is obtained from these measurements, depends upon the ability to compensate for, or eliminate, the biases and errors.

The range to a satellite is approximately 20,000 kilometers (km) when the satellite is overhead, and approximately 26,000 km when the satellite is rising or setting. The signal transit time varies between about 70 millisecond (ms) and 90 ms. The C/A-code repeats each millisecond, and the code correlation process essentially provides a measurement of pseudo-transmit time modulo 1 ms. The measurement can be ambiguous in whole milliseconds. This ambiguity, however, is easily resolved if the user has a rough idea of his location within hundreds of kilometers. The week-long P(Y)-code provides unambiguous pseudoranges.

The receiver clocks are generally basic quartz crystal oscillators and tend to drift. The receiver manufacturers attempt to limit the deviation of the receiver clock from GPST, and schedule the typical once-per-second measurements at epochs that are within plus or minus 1 millisecond (ms) of the GPST seconds. One approach to maintaining the receiver clock within a certain range of GPST is to steer the receiver clock 'continuously.' The steering can be implemented with software. The second approach is to let the clock drift until it reaches a certain threshold (typically 1 ms), and then reset it with a jump to return the bias to zero.

An example of pseudorange measurements with a receiver using the second approach shall now be described in more detail. Assume that there are pseudorange measurements from three satellites which rose about the same time but were in different orbits. Assume that one comes overhead and stays in view for almost seven hours. Assume that the other two stay lower in the sky and could be seen for shorter periods. There are discontinuities common to all three sets of measurements due to the resetting of the receiver clock. A determination can be made as to whether the receiver clock is running fast or slow, and its frequency offset from the nominal value of 10.23 megahertz (MHz) can be estimated.

For more information on pseudorange information, refer to "Global Positioning Systems," by Pratap Misra and Per Eng, Ganga-Jamuna Press, 2001; ISBN 0-9709544-0-9.

Position Accuracy Improvements

The pseudorange information processing logic 150 can include various types of logic for improving the position accuracy of the extracted pseudorange information, as described herein. Table 2, as described herein, depicts various combinations of position accuracy improvements for improving extracted pseudorange information, according to various embodiments. Table 3 also depicts various combinations of position accuracy improvements for improving extracted pseudorange information, according to various embodiments.

TABLE 3

Various Combinations of Position Accuracy Improvements for Improving Extracted Pseudorange Information

Figure 6:
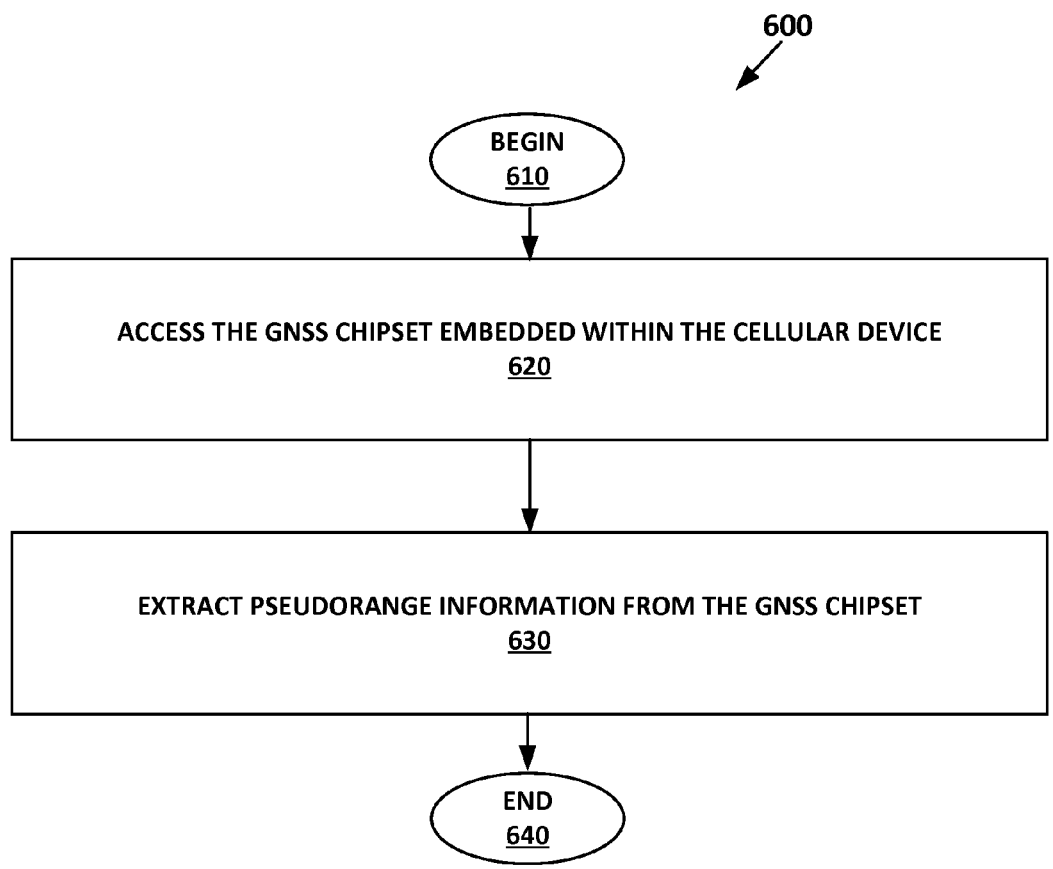
FIG. 6 depicts a flowchart of a method of extracting pseudorange information using a cellular device, according to one embodiment.
Figure 7A:
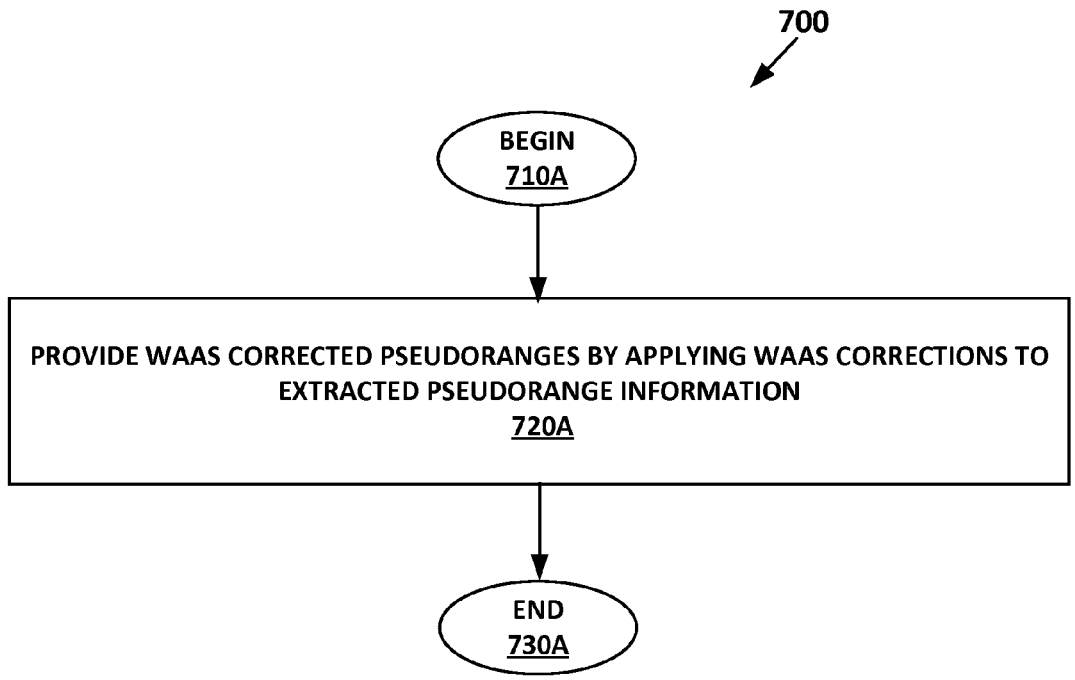
FIGS. 7A-10 depict flowcharts of methods of improving the position accuracy using one or more position accuracy improvements, according to various embodiments.
Figure 7B:
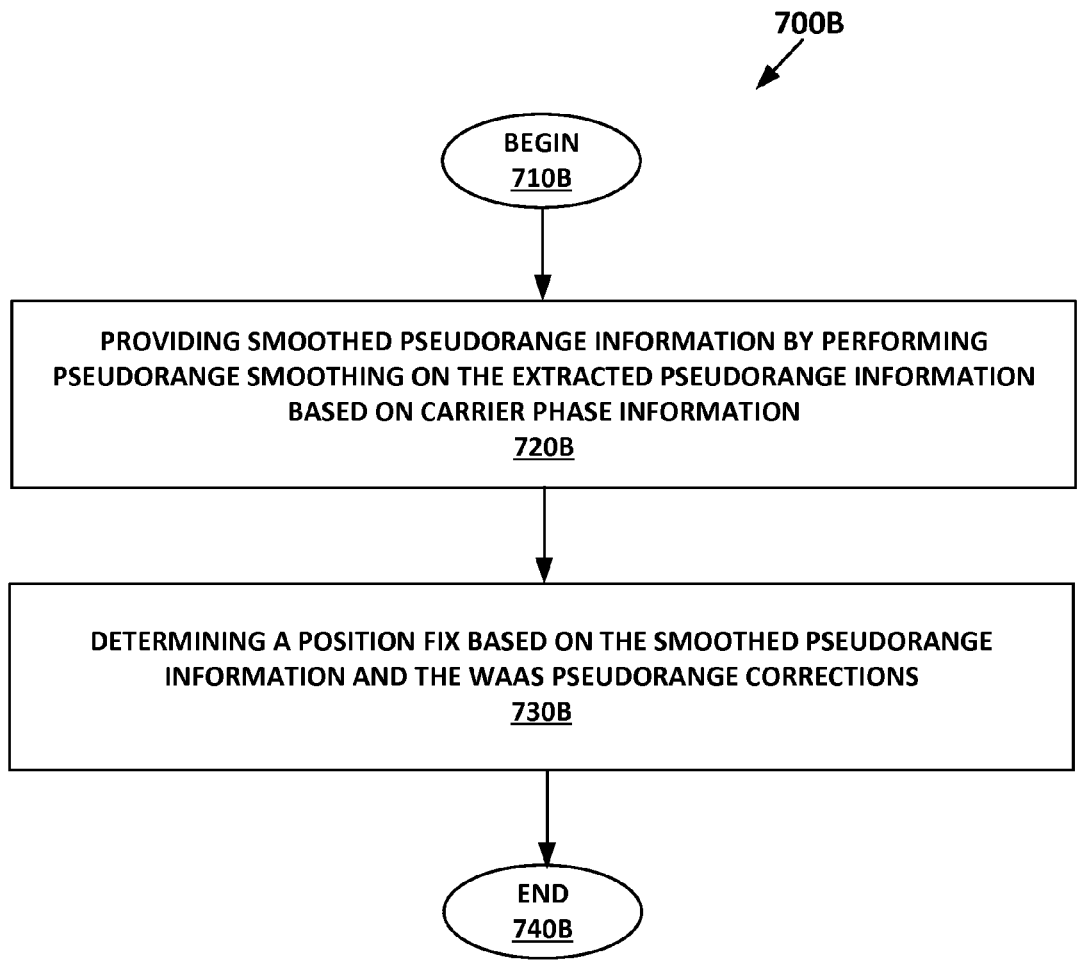
Figure 8A:
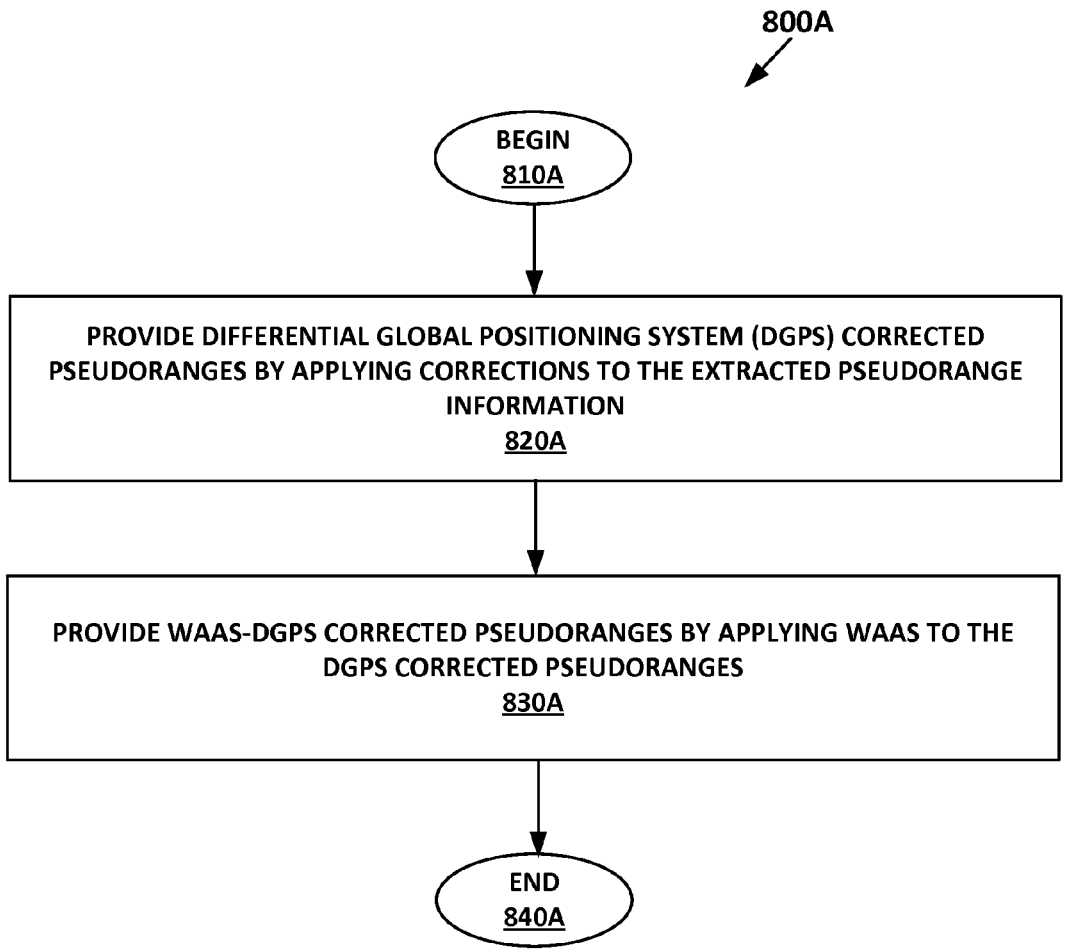
Figure 8B:
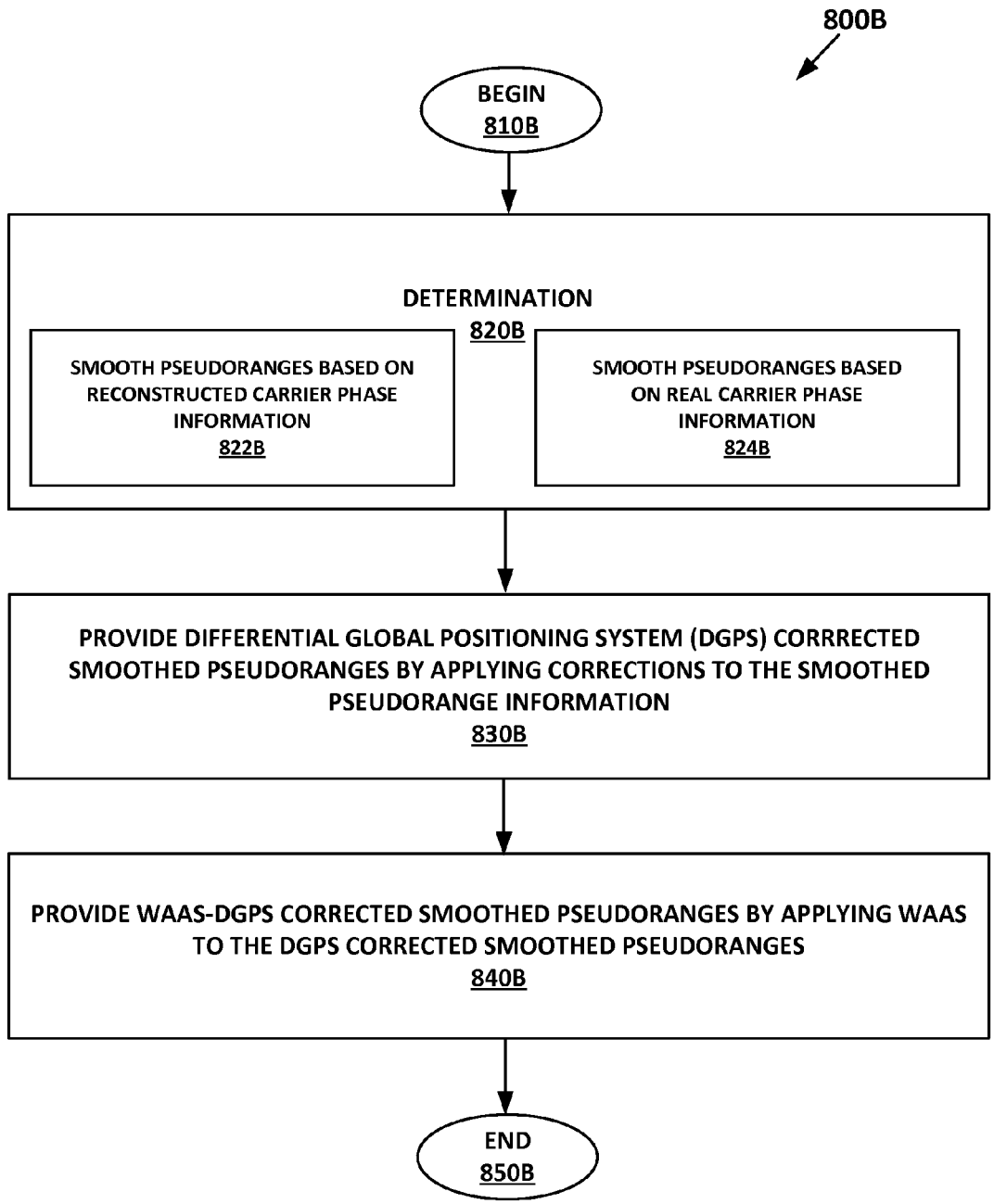
Figure 9A:
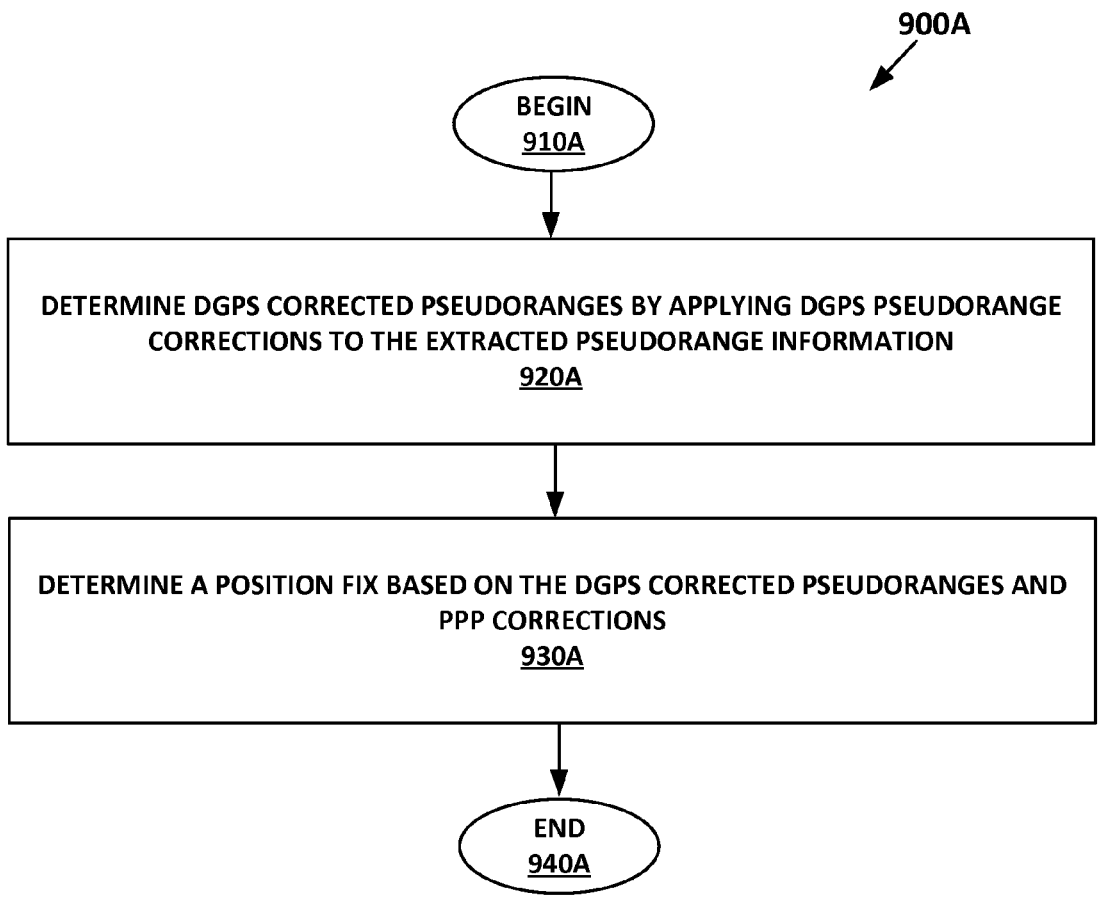
Figure 9B:
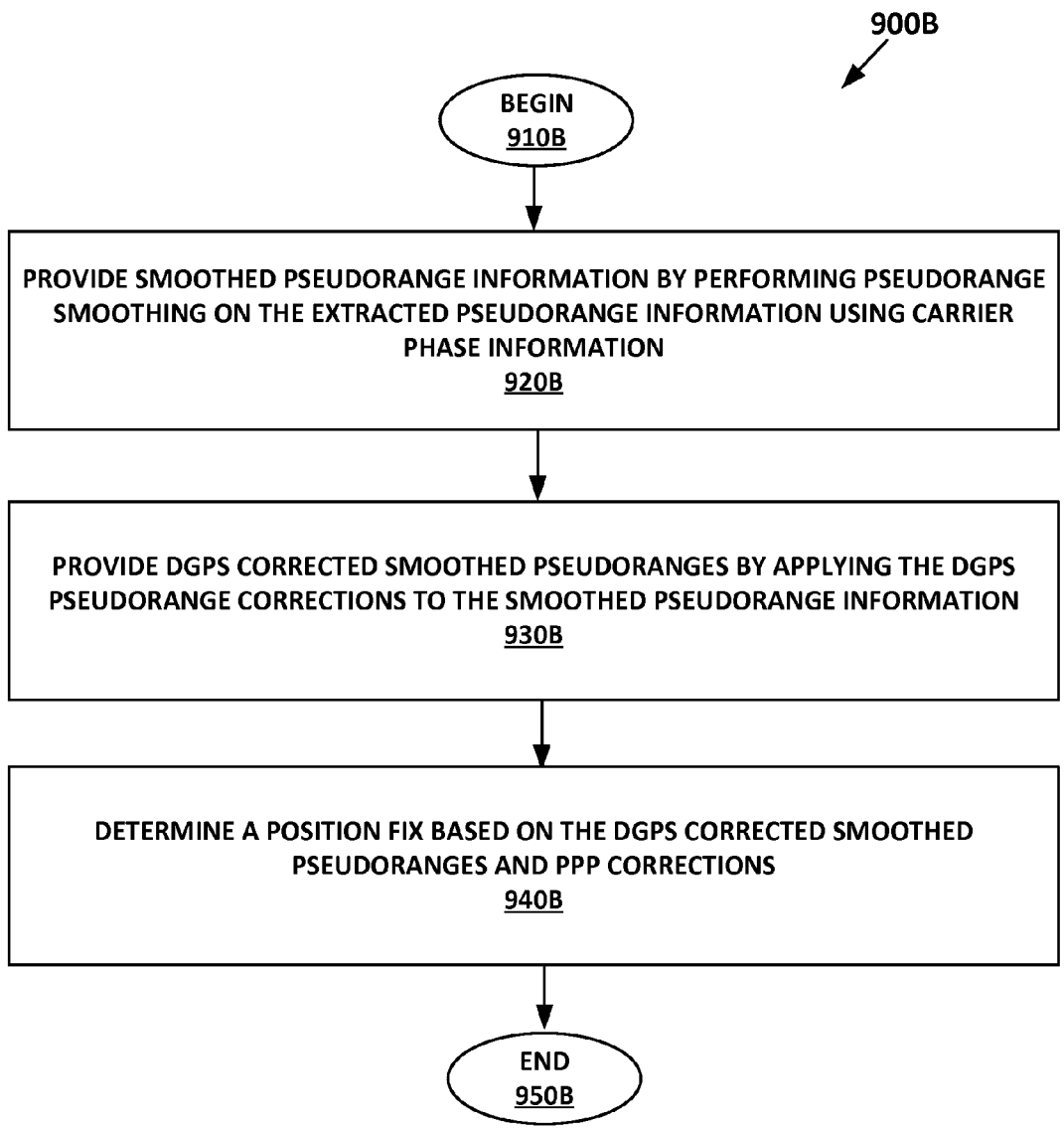

| Combination Identifier | Operation | Description | Accuracy |
| --- | --- | --- | --- |
| 1 | 620 (Figure 6) | Extracted Pseudorange Information (EPI) | 4-5 meters (m) |
| 2 | 720A (Figure 7A) | EPI + WAAS | approx. 1.7 m |
| 3 | Figure 7B | EPI + reconstructed CPI + WAAS | <1 m |
| 4 | 820A (Figure 8A) | EPI + DGPS | ~1 m |
| 5 | 830A (Figure 8A) | EPI + DGPS + WAAS | <1 m |
| 6 | 820B, 822B, 830B, 840B Figure 8B | EPI + reconstructed CPI + DGPS + WAAS | <1 m |
| 7 | 820B, 824B, 830B, 840B (Figure 8B) | EPI + real CPI + DGPS + WAAS | <1 m |
| 8 | 920A (Figure 9A) | EPI + PPP | <1 m |
| 9 | 930A (Figure 9A) | EPI + PPP + DGPS | <1 m |
| 10 | Figure 9B | EPI + reconstructed CPI + PPP + DGPS | <1 m |
| 11 | 1020 and 1030 (Figure 10) | EPI + CPI + PPP | <<1 m |
| 12 | 1040 (Figure 10) | EPI + CPI + PPP + DGPS | approx. 10 cm |
| 13 | | EPI + RTK | approx. 2-10 cm |

Table 3 includes columns for combination identifier, operation, description, and accuracy. The combination identifier column indicates an identifier for each combination of improvements. The operation column specifies operations of various flowcharts in FIGS. 6-10 for the corresponding combination. The description column specifies various combinations of position accuracy improvements that can be applied to extracted pseudorange information (EPI) according to various embodiments, where examples of position accuracy improvements include, but are not limited to, Wide Area Augmentation System (WAAS) pseudorange corrections, real carrier phase smoothing (real CPI) information, reconstructed carrier phase smoothing information (reconstructed CPI), Differential GPS (DGPS) pseudorange corrections, and Precise Point Positioning (PPP) processing. The accuracy column specifies levels of accuracy provided by the corresponding combination.

Combination 1 is extracted pseudorange information without any additional improvements, which provides 4-5 meters of accuracy. Combination 1 is described in Table 3 to provide a comparison with the other combinations 2-13.

According to one embodiment, the SUPL client 101 can also include a position-accuracy-improvement-determination-logic 180B for determining the one or more position accuracy improvements to apply to the extracted pseudorange information based on one or more factors such as cost, quality of service, and one or more characteristics of the cellular device. For example, different costs are associated with different position accuracy improvements. More specifically, extracted pseudorange information, WAAS and Doppler information are typically free. There is a low cost typically associated with DGPS and real carrier phase information. There is typically a higher cost associated with PPP. Therefore, referring to Table 3, according to one embodiment, combinations 1, 2, and 3 are typically free, combinations 4-7 typically are low cost, and combinations 8-12 are typically higher cost.

Various cellular devices have different characteristics that make them capable of providing different types of position accuracy improvements. For example, one type of cellular device may be capable of providing WAAS but not be capable of providing Doppler information. In another example, some types of cellular devices may be capable of providing DGPS but not capable of providing PPP. In yet another example, different activities may require different levels of improvement. For example, some activities and/or people may be satisfied with 4-5 meters, others may be satisfied with 1.7 meters. Yet others may be satisfied with less than 1 meter, and still others may only be satisfied with 2 centimeters. Therefore, different users may request different levels of accuracy.

Table 4 depicts sources of the various position accuracy improvements, according to various embodiments.

TABLE 4

Sources of the Various Position Accuracy Improvements

| Position Accuracy Improvement Name | Source |
| --- | --- |
| Pseudorange Information | extracted from GNSS chipset |
| WAAS | extracted from GNSS chipset or satellite broadcast via Internet or radio delivery |
| Real Carrier Phase Information | extracted from GNSS chipset |
| Doppler for reconstructing carrier phase information | extracted from GNSS chipset |
| Differential Global Positioning System (DGPS) | from a reference station delivered by dialing up, wired/wireless internet/intranet connection, or by receiving a broadcast subcarrier modulation concatenated to an FM carrier frequency. DGPS can be obtained at least from Trimble ® |
| Real Time Kinematic (RTK) | from a reference station |

The first column of Table 4 provides the name of the position accuracy improvement. The second column of Table 4 specifies the source for the corresponding position accuracy improvement.

According to various embodiments, a cellular device 100, 200 can initially provide a position that is within 4-5 meters using, for example, unimproved extracted pseudorange information and the position can continually be improved, using various position accuracy improvements as described herein, as long as the antennae of the cellular device 100, 200 is clear of obstructions to receive various position accuracy improvements.

The following describes various position accuracy improvements and related topics in more detail.

Global Navigation Satellite Systems

A Global Navigation Satellite System (GNSS) is a navigation system that makes use of a constellation of satellites orbiting the earth to provide signals to a receiver, such as GNSS receiver 107, which estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequencies, a pseudo-random number (PRN) code, and satellite navigation data.

Two different PRN codes are transmitted by each satellite: A coarse acquisition (C/A) code and a precision (P/Y) code which is encrypted for use by authorized users. A receiver, such as GNSS receiver 107, designed for precision positioning contains multiple channels, each of which can track the signals on both L1 and L2 frequencies from a GPS satellite in view above the horizon at the receiver antenna, and from these computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

Each GLONASS satellite transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz. The code and carrier signal structure is similar to that of NAVSTAR. A GNSS receiver designed for precision positioning contains multiple channels each of which can track the signals from both GPS and GLONASS satellites on their respective L1 and L2 frequencies, and generate pseudorange and carrier phase observables from these. Future generations of GNSS receivers will include the ability to track signals from all deployed GNSSs.

Differential Global Positioning System (DGPS)

Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemerides). The reference station receives essentially the same GPS signals as cellular devices 100, 200 which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference in timing can be expressed in terms of pseudorange lengths, in meters. The difference between the received GPS signals and what they optimally should be is used as an error correction factor for other GPS receivers in the area. Typically, the reference station broadcasts the error correction to, for example, a cellular device 100, 200 which uses this data to determine its position more precisely. Alternatively, the error corrections may be stored for later retrieval and correction via post-processing techniques.

DGPS corrections cover errors caused by satellite clocks, ephemeris, and the atmosphere in the form of ionosphere errors and troposphere errors. The nearer a DGPS reference station is to the receiver 107 the more useful the DGPS corrections from that reference station will be.

The system is called DGPS when GPS is the only constellation used for Differential GNSS. DGPS provides an accuracy on the order of 1 meter or 1 sigma for users in a range that is approximately in a few tens of kilometers (kms) from the reference station and growing at the rate of 1 m per 150 km of separation. DGPS is one type of Differential GNSS (DGNSS) technique. There are other types of DGNSS techniques, such as RTK and Wide Area RTK (WARTK), that can be used by high-precision applications for navigation or surveying that can be based on using carrier phase measurements. It should be appreciated that other DGNSS which may utilize signals from other constellations besides the GPS constellation or from combinations of constellations. Embodiments described herein may be employed with other DGNSS techniques besides DGPS.

A variety of different techniques may be used to deliver differential corrections that are used for DGNSS techniques. In one example, DGNSS corrections are broadcast over an FM subcarrier. U.S. Pat. No. 5,477,228 by Tiwari et al. describes a system for delivering differential corrections via FM subcarrier broadcast method.

Real-Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the cellular device 100, 200 in the area. Measurements of GPS signal errors taken at the reference station (e.g., dual-frequency code and carrier phase signal errors) and broadcast to one or more cellular devices 100, 200 working in the area. The one or more cellular devices 100, 200 combine the reference station data with locally collected position measurements to estimate local carrier-phase ambiguities, thus allowing a more precise determination of the cellular device 100, 200's position. The RTK method is different from DGPS methods in that the vector from a reference station to a cellular device 100, 200 is determined (e.g., using the double differences method). In DGPS methods, reference stations are used to calculate the changes needed in each pseudorange for a given satellite in view of the reference station, and the cellular device 100, 200, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to a receiver of the cellular device 100, 200, or pseudo range) changes significantly for separation distances beyond 70 km. This is because the ionosphere is typically not homogeneous in its density of electrons, and because the electron density may change based on, for example, the sun's position and therefore time of day.

Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GPS receiver altogether. This enhancement is referred to as the "Network RTK" or "Virtual Reference Station" (VRS) system and method.

Figure 4:
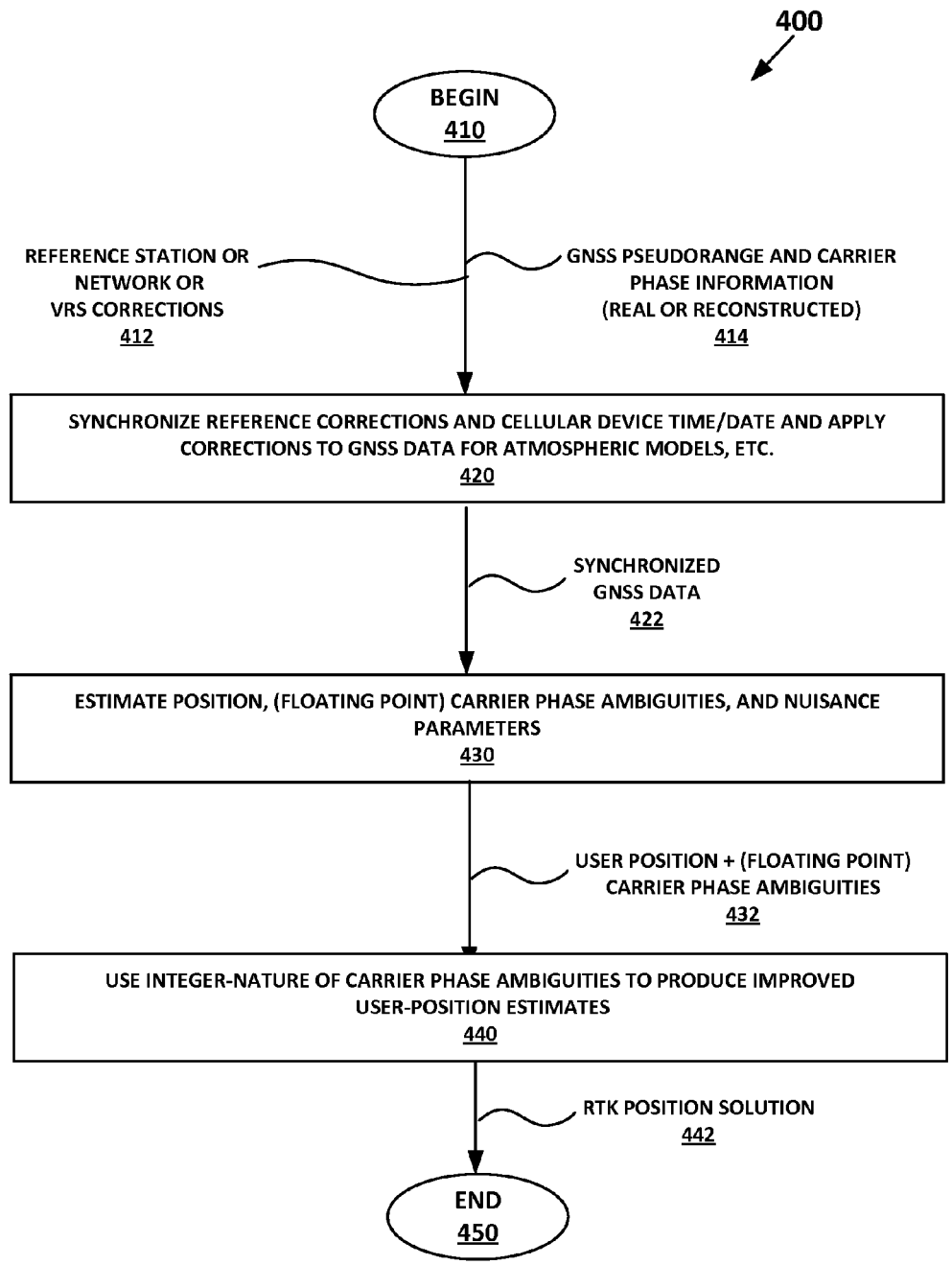
FIG. 4 depicts a flowchart for determining an RTK (Real Time Kinematic) position solution, according to one embodiment.

FIG. 4 depicts a flowchart 400 for determining an RTK position solution, according to one embodiment. At 410, the method begins. The inputs to the method are reference station network or VRS corrections 412 and GNSS pseudorange plus carrier phase information from the cellular device 414. At 420, reference corrections and cellular device data are synchronized and corrections are applied to the GNSS data for atmospheric models and so on. The output of 420 is synchronized GNSS data 422, which is received by operation 430. At 430, position, carrier phase ambiguities in floating point, and nuisance parameters are estimated. The output 432 of 430 is user position plus carrier phase ambiguities in floating point. Operation 440 receives the output 432 and produces improved user-position estimates using the integer-nature of carrier phase ambiguities. The output 442 of 440 is an RTK position solution, which can be used according to various embodiments. The method ends at 450.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the cellular device 100, 200 with the means to estimate the ionospheric path delay from each satellite in view from the cellular device 100, 200, and to take account other error contributions for those same satellites at the current instant in time for the cellular device 100, 200's location.

The cellular device 100, 200 is configured to couple a data-capable cellular telephone to its internal signal processing system. The user operating the cellular device 100, 200 determines that he needs to activate the VRS process and initiates a call to the control center to make a connection with the processing computer.

The cellular device 100, 200 sends its approximate position, based on raw GPS data from the satellites in view without any corrections, to the control center. Typically, this approximate position is accurate to approximately 4-7 meters. The user then requests a set of "modeled observables" for the specific location of the cellular device 100, 200. The control center performs a series of calculations and creates a set of correction models that provide the cellular device 100, 200 with the means to estimate the ionospheric path delay from each satellite in view from the cellular device 100, 200, and to take into account other error contributions for those same satellites at the current instant in time for the cellular device 100, 200's location. In other words, the corrections for a specific cellular device 100, 200 at a specific location are determined on command by the central processor at the control center and a corrected data stream is sent from the control center to the cellular device 100, 200. Alternatively, the control center may instead send atmospheric and ephemeris corrections to the cellular device 100, 200 which then uses that information to determine its position more precisely.

These corrections are now sufficiently precise that the high performance position accuracy standard of 2-3 cm may be determined, in real time, for any arbitrary cellular device 100, 200's position. Thus a GPS enabled cellular device 100, 200's raw GPS data fix can be corrected to a degree that makes it behave as if it were a surveyed reference location; hence the terminology "virtual reference station."

An example of a network RTK system in accordance with embodiments of the present invention is described in U.S. Pat. No. 5,899,957, entitled "Carrier Phase Differential GPS Corrections Network," by Peter Loomis, assigned to the assignee of the present invention.

The Virtual Reference Station method extends the allowable distance from any reference station to the cellular devices 100, 200. Reference stations may now be located hundreds of miles apart, and corrections can be generated for any point within an area surrounded by reference stations. However, there are many construction projects where cellular coverage is not available over the entire physical area under construction and survey.

Virtual Reference Stations

To achieve very accurate positioning (to several centimeters or less) of a terrestrial mobile platform of a cellular device 100, 200, relative or differential positioning methods are commonly employed. These methods use a GNSS reference receiver located at a known position, in addition to the data from a GNSS receiver 107 on the mobile platform, to compute the estimated position of the mobile platform relative to the reference receiver.

The most accurate known method uses relative GNSS carrier phase interferometry between the GNSS cellular device 100, 200's receiver and GNSS reference receiver antennas plus resolution of integer wavelength ambiguities in the differential phases to achieve centimeter-level positioning accuracies. These differential GNSS methods are predicated on the near exact correlation of several common errors in the cellular device 100, 200 and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the cellular device 100, 200 and reference receivers are almost exactly the same. These atmospheric delay errors therefore cancel in the cellular device 100, 200's reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the cellular device 100, 200 and reference receiver antennas become increasingly different, so that their presence in the cellular device 100, 200's-reference differential GNSS observables and their influence on the ambiguity resolution process increases. Ambiguity resolution on single cellular device 100, 200's reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of a cellular device 100, 200's receiver using reference observables from three or more reference receivers that approximately surround the cellular device 100, 200's receiver trajectory. This implies that the cellular device 100, 200's receiver trajectory is mostly contained by a closed polygon whose vertices are the reference receiver antennas. The cellular device 100, 200's receiver 107 can move a few kilometers outside this polygon without significant loss of positioning accuracy. A network GNSS algorithm calibrates the ionosphere and troposphere signal delays at each reference receiver position and then interpolates and possibly extrapolates these to the cellular device 100, 200's position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the cellular device 100, 200 and reference receivers so as to establish a relative phase interferometry position of the cellular device 100, 200's antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the cellular device 100, 200 and reference receivers result in the cancellation of all common mode range errors except the integer ambiguities. An ambiguity resolution algorithm uses redundant carrier phase observables from the cellular device 100, 200 and reference receivers, and the known reference antenna position, to estimate and thereby resolve these ambiguities.

Once the integer cycle ambiguities are known, the cellular device 100, 200's receiver 107 can compute its antenna position with accuracies generally on the order of a few centimeters, provided that the cellular device 100, 200 and reference antennas are not separated by more than 10 kilometers. This method of precise positioning performed in real-time is commonly referred to as real-time kinematic (RTK) positioning. The separation between a cellular device 100, 200 and reference antennas shall be referred to as "cellular device reference separation."

The reason for the cellular device-reference separation constraint is that KAR positioning relies on near exact correlation of atmospheric signal delay errors between the cellular device 100, 200 and reference receiver observables, so that they cancel in the cellular device 100, 200's reference observables combinations (for example, differences between cellular device 100, 200 and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

When the cellular device 100, 200 reference separation exceeds 10 kilometers, as maybe the case when the cellular device 100, 200 has a GNSS receiver 107 that is a LEO satellite receiver, the atmospheric delay errors become de-correlated and do not cancel exactly. The residual errors can now interfere with the ambiguity resolution process and thereby make correct ambiguity resolution and precise positioning less reliable.

The cellular device 100, 200's reference separation constraint has made KAR positioning with a single reference receiver unsuitable for certain mobile positioning applications where the mission of the mobile platform of the cellular device 100, 200 will typically exceed this constraint. One solution is to set up multiple reference receivers along the mobile platform's path so that at least one reference receiver falls within a 10 km radius of the mobile platform's estimated position.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the cellular device 100, 200's receiver, so that the cellular device 100, 200's receiver 107 can perform reliable ambiguity resolution on combinations of carrier phase observables from the cellular device 100, 200 and some or all reference receivers. The number of reference receivers required to instrument a large project area is significantly less than what would be required to compute reliable single baseline KAR solutions at any point in the project area. See, for example, U.S. Pat. No. 5,477, 458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 1003-1004) for a comparison of different network GNSS implementations and comparisons of their respective performances.

A virtual reference station (VRS) network method is a particular implementation of a network GNSS method that is characterized by the method by which it computes corrective data for the purpose of cellular device 100, 200's position accuracy improvement. A VRS network method comprises a VRS corrections generator and a single-baseline differential GNSS position generator such as a GNSS receiver 107 with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 1001 (hereinafter "Hofmann-Wellenhof [1001]"), gives comprehensive descriptions of different methods of differential GNSS position computation, ranging in accuracies from one meter to a few centimeters. The single-baseline differential GNSS position algorithm typically computes differences between the cellular device 100, 200 and reference receiver observables to cancel atmospheric delay errors and other common mode errors such as orbital and satellite clock errors. The VRS position is usually specified to be close to or the same as the roving receiver's estimated position so that the actual atmospheric errors in the cellular device 100, 200 receiver 107's observables approximately cancel the estimated atmospheric errors in the VRS observables in the cellular device 100, 200's reference observables differences.

The VRS corrections generator computes the synthetic observables at each sampling epoch (typically once per second) from the geometric ranges between the VRS position and the M satellite positions as computed using well-known algorithms such as those given in IS-GPS-200G interface specification tilted "Naystar GPS Space Segment/Navigation User Interfaces," and dated 5 Sep. 2012. It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the GNSS cellular device 100, 200's receiver 107. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-cellular-device-bi-directional data communication channels. Each server-cellular device bi-directional communication channel serves one cellular device 100, 200. The reference stations provide their observables to the VRS server via the server-reference receiver bi-directional communication channels. These channels can be implemented by a public network such as the Internet. The bi-directional server-cellular-device communication channels can be radio modems or cellular telephone links, depending on the location of the server with respect to the cellular device 100, 200.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va. 22209. The synthetic observables are the observables that a reference receiver located at the VRS position would measure. The VRS position is selected to be close to the cellular device 100, 200's estimated position so that the cellular device 100, 200's VRS separation is less than a maximum separation considered acceptable for the application. Consequently, the cellular device 100, 200 receiver 107 must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., Virtual Reference Stations versus Broadcast Solutions in Network RTK, GNSS 2003 Proceedings, Graz, Austria (2003).

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Precise Positioning Point (PPP)

Descriptions of a Precise Point Positioning (PPP) technique are provided in U.S. Patent application publication 20110187590, of Leandro, which is assigned to Trimble Navigation Limited. Trimble Navigation Limited has commercialized a version of PPP corrections which it calls RTX™. PPP corrections can be any collection of data that provides corrections from a satellite in space, clock errors, ionosphere or troposphere, or a combination thereof. According to one embodiment, PPP corrections can be used in instead of WAAS or RTX™.

The term Precise Point Positioning (PPP), as used henceforth in this document, is used as shorthand to refer to any system or technique which has the characteristics and functionality of PPP described or referenced herein and is not necessarily limited to a system from Trimble Navigation Ltd. Hence, the term "PPP" is used in this document merely to facilitate description and is used without derogation to any trademark rights of Trimble Navigation Ltd. or any subsidiary thereof or other related entity. Techniques for generating PPP corrections are well known in the art. In general, a PPP system utilizes a network (which may be global) of GNSS reference receivers tracking navigation satellites such as GPS and GLONASS satellites and feeding data back to a centralized location for processing. At the centralized location, the precise orbits and precise clocks of all of the tracked navigation satellites are generated and updated in real time. A correction stream is produced by the central location; the correction stream contains the orbit and clock information. This correction stream is broadcast or otherwise provided to GNSS receivers, such as a GNSS receiver 107, in the field (conventionally by satellite service or cellular link) Corrections processors in the GNSS receivers utilize the corrections to produce centimeter level positions after a short convergence time (e.g., less than 30 minutes). A main difference between PPP and VRS is that PPP networks of reference receivers are typically global while VRS networks may be regional or localized with shorter spacing between the reference stations in a VRS network.

Wide Area Augmentation System (WAAS)

Wide Area Augmentation System (WAAS) corrections are corrections of satellite position and their behavior. WAAS was developed by the Federal Aviation Administration (FAA). WAAS includes a network of reference stations that are on the ground located in North America and Hawaii. The reference stations transmit their respective measurements to master stations which queue their respective received measurements. The master stations transmit WAAS corrections to geostationary WAAS satellites, which in turn broadcast the WAAS corrections back to earth where cellular devices 100, 200 that include WAAS-enabled GPS receivers can receive the broadcasted WAAS corrections. According to one embodiment, the GNSS receiver 107 is a WAAS-enabled GPS receiver. The WAAS corrections can be used to improve the accuracy of the respective cellular devices 100, 200' positions, for example, by applying the WAAS corrections to extracted pseudoranges. WAAS operation and implementation is well known in the art.

Real Carrier Phase Information

According to one embodiment, a GNSS chipset 170 provides real carrier phase information (also referred to as "actual carrier phase information"). The cellular device 100, 200 can extract real carrier phase information from the GNSS chipset 170 in a manner similar to extracting pseudorange information from the GNSS chipset 170, where the extracted carrier phase information is for use elsewhere in the cellular device 100, 200 outside of the GNSS chipset 170 as described herein, for example, with flowchart 600 of FIG. 6.

Figure 5A:
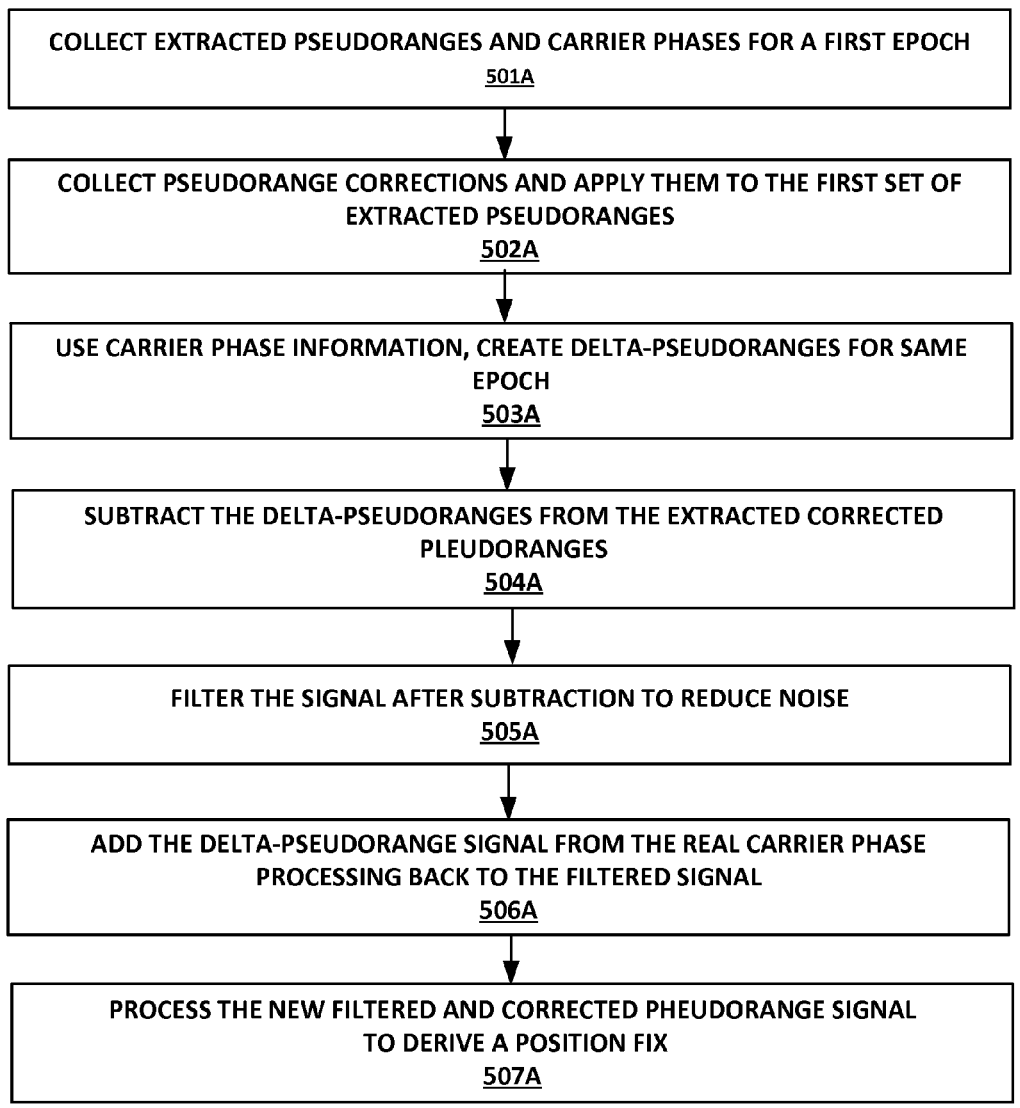
FIG. 5A is a flowchart of a method for performing a carrier phase smoothing operation using real carrier phase information, according to one embodiment.

FIG. 5A is a flowchart 500A of a method for performing a carrier phase smoothing operation using real carrier phase information, according to one embodiment. In various embodiments, carrier phase smoothing logic 152 may be implemented by either a range domain hatch filter, or a position domain hatch filter, or by any of other implementations known in the literature. The range domain hatch filter method is described in U.S. Pat. No. 5,471,217 by Hatch et al., entitled "Method and Apparatus for Smoothing Coded Measurements in a Global Positioning System Receiver," filed Feb. 1, 1993, and the Hatch paper entitled "The synergism of GPS code and carrier measurements," published in the Proceedings of the Third International Geodetic symposium on satellite Doppler Positioning, New Mexico, 1982: 1213-1232. See also p 45 of the Master's Thesis by Sudha Neelima Thipparthi entitled "Improving Positional Accuracy using Carrier Smoothing Techniques in Inexpensive GPS Receivers," MSEE thesis, New Mexico State University, Las Cruces, N. Mex., February 2004.

The filtering/processing described herein lies in the family of errors in pseudorange processing that affect code and carrier measurements in the same way. In various embodiments, the code phase pseudorange measurements are "disciplined" by subtracting out a more constant equivalent pseudorange-like distance measurement derived from the carrier phase. Next, a filtering on the net subtracted signal is performed which allows various embodiments to eliminate multipath induced errors in the raw, and corrected, pseudorange data. This method does not deal with ionospheric effects, according to one embodiment.

In operation 501A of FIG. 5A, extracted pseudorange information and carrier phases for a first epoch are collected. In one embodiment, these extracted pseudorange information and carrier phases are received at carrier phase smoothing logic 152 from the GNSS receiver 107.

In operation 502A of FIG. 5A, pseudorange corrections are collected and applied to the first set of extracted pseudoranges collected in operation 501A. In one embodiment, these corrections themselves may be smoothed at the reference receiver (e.g., at GPS/GNSS reference stations 220) so that the delivered pseudorange corrections themselves are less noisy. Smoothing the pseudorange corrections derived at the GPS/GNSS reference stations 220 using the same carrier phase method of flowchart 500A can vastly improve the quality of the delivered pseudorange corrections delivered to cellular device 100, 200 for use by a position determination processor (e.g., GNSS receiver 107 or pseudorange information processing logic 150). Such corrected pseudoranges that are also smoothed may be used by the cellular device 100, 200 and fetched if available.

In operation 503A of FIG. 5A, delta carrier phase measurements for the same epoch are created using real carrier phase information. In accordance with various embodiments, this replicates creating a second distance measurement, similar to the reconstructed carrier phase information, based on integrated Doppler Shift.

In operation 504A of FIG. 5A, the delta carrier phase measurements are subtracted from the corrected extracted pseudoranges. In accordance with various embodiments, this provides a fairly constant signal for that epoch and is equivalent to the corrected extracted pseudorange at the start of the integration interval. In accordance with various embodiments, this is referred to as a "disciplining" step that smoothes out the corrected extracted pseudorange signal and therefore reduces the instant errors in the later-computed position fixes.

In operation 505A of FIG. 5A, the signal is filtered after the subtraction of operation 504A to reduce noise. In accordance with one embodiment, this is performed by averaging the carrier phase "yardsticks" over a series of epochs.

In operation 506A of FIG. 5A, the delta carrier phase measurements from the real carrier phase processing operation is added back into the filtered signal of operation 505A.

In operation 507A of FIG. 5A, the new filtered and corrected extracted pseudorange signal is processed, for example, at the pseudorange information processing logic 150, to derive a position fix 172B.

Reconstructing Carrier Phase Information Based on Doppler Shift

Carrier Phase Information can be reconstructed (referred to herein as "reconstructed carrier phase") based on Doppler Shift. Doppler Shift is the change in frequency of a periodic event (also known as a "wave") perceived by an observer that is moving relative to a source of the periodic event. For example, Doppler shift refers to the change in apparent received satellite signal frequency caused by the relative motion of the satellites as they either approach the cellular device 100, 200 or recede from it. Thus any measurement of Doppler frequency change is similar to differentiating carrier phase. It is therefore possible to reconstruct the carrier phase by integrating the Doppler shift data. In an embodiment, the GNSS chipset 170 of GNSS receiver 107 may provide Doppler information it determines through other means. This Doppler frequency shift information or "Doppler" may be collected at each GPS timing epoch (e.g., one second) and integrated over a sequence of the one-second epochs, to produce a model of carrier phase. This Doppler-derived carrier phase model may be substituted for the real carrier phase data, and used in the same manner as shown in the flow chart for carrier phase smoothing of FIG. 5A. Doppler Shift signal processing is well known in the art.

Figure 5B:
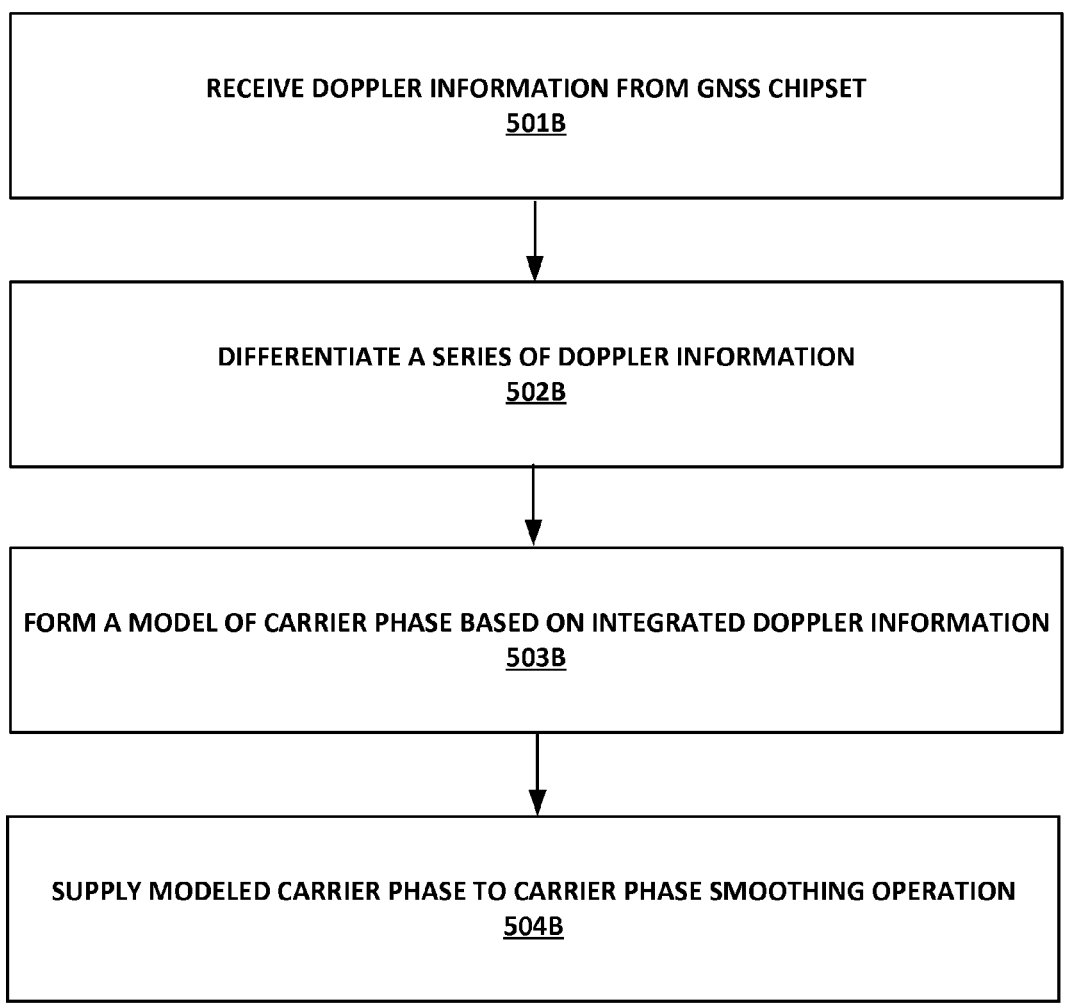
FIG. 5B is a flowchart of a method for generating reconstructed carrier phase information based on Doppler shift, according to one embodiment.

FIG. 5B is a flowchart 500B of a method for generating reconstructed carrier phase information (also referred to as a "Doppler-derived carrier phase model") based on Doppler Shift, according to one embodiment. In accordance with one embodiment, method of flowchart 500B is implemented at GPS/GNSS reference stations and the modeled carrier phase is provided to cellular device 100, 200 via one of the communication networks described above.

In operation 501B of FIG. 5B, Doppler information from a GNSS receiver 107 of a GNSS chipset 170 is received by pseudorange-carrier-phase-smoothing-logic 152.

In operation 502B of FIG. 5B, a series of Doppler information is integrated. As described above, Doppler frequency shift information may be collected at each GPS timing epoch (e.g., one second) and stored for use in producing a model of carrier phase.

In operation 503B of FIG. 5B, a model of carrier phase is created based on integrated Doppler information. As discussed above with reference to operation 502B, a series of Doppler information for a plurality of timing epochs is integrated. In one embodiment, this Doppler information is integrated over a sequence of the one-second epochs, to produce a model of carrier phase. The sequence may include 10-100 epochs, or seconds. The model of carrier phase smoothing is used as the reconstructed carrier phase information.

In operation 504B of FIG. 5B, the modeled carrier phase, which is also referred to as "reconstructed carrier phase information", is supplied to pseudorange-carrier-phase-smoothing-logic 152. As described above, method of flowchart 500B can be implemented at GPS/GNSS reference stations 220 and the reconstructed carrier phase information can then be broadcast to cellular device 100, 200.

Method of Extracting Pseudorange Information

FIG. 6 depicts a flowchart 600 of a method of extracting pseudorange information using a cellular device, according to one embodiment.

At 610, the method begins.

At 620, the cellular device 100, 200 accesses the GNSS chipset 170 embedded within the cellular device 100, 200 where the GNSS chipset 170 calculates pseudorange information for use by the GNSS chipset 170. For example, the GNSS receiver 107 can perform GPS measurements to derive raw measurement data for a position of the cellular device 100. The raw measurement data provides an instant location of the cellular device 100. The GNSS chipset 170 calculates pseudorange information that is for use by the GNSS chipset 170. According to one embodiment, the raw measurement data is the pseudorange information that will be extracted. Examples of pseudorange information are uncorrected pseudorange information, differential GNSS corrections, high precision GNSS satellite orbital data, GNSS satellite broadcast ephemeris data, and ionospheric projections.

A chipset accessor logic 141, according to one embodiment, is configured for accessing the GNSS chipset 170. According to one embodiment, the chipset accessor logic 141 is a part of an SUPL client 101.

The pseudorange information can be obtained from the processor 172 of the GNSS receiver 107 using a command. The GNSS chipset 170 may be designed, for example, by the manufacturer of the GNSS chipset 170, to provide requested information, such as pseudorange information, in response to receiving the command. The pseudorange information may be extracted from the GNSS chipset 170 using the command that the manufacturer has designed the GNSS chipset 170 with. For example, according to one embodiment, the GNSS chipset 170 is accessed using an operation that is a session started with a message that is an improved accuracy Secure User Platform Location (SUPL) start message or a high precision SUPL INIT message. According to one embodiment, the message is a custom command that is specific to the GNSS chipset 170 (also referred to as "a GNSS chipset custom command") and the improved accuracy SUPL client 101 can access to the raw measurements of the GNSS chipset 170.

Examples of chipset manufacturers include Qualcomm, Texas Instruments, FastraX, Marvel, SIRF, Trimble, SONY, Furuno, Nemerix, Phillips, and XEMICS, to name a few.

At 630, the cellular device 100, 200 extracts the pseudorange information from the GNSS chipset 170 for use elsewhere in the cellular device 100, 200 outside of the GNSS chipset 170. For example, pseudorange information extractor logic 142 may be associated with a worker thread of the SUPL client 101. The worker thread associated with the SUPL client 101 can monitor the raw measurements delivered by the GNSS chipset 170 into the GNSS chipset 170's memory buffers, cache the raw measurements and use the raw measurements to determine a position fix. The pseudorange information extractor logic 142 and the pseudorange information processing logic 150 can be associated with the worker thread. For example, the pseudorange information extractor logic 142 can cache the raw measurements and the pseudorange information processing logic 150 can determine the location.

According to one embodiment, the raw measurement data is the pseudorange information that is extracted. According to one embodiment, the raw measurement data is pseudorange information that is calculated by the GNSS chipset 170 and is only for use by the GNSS chipset 170.

According to one embodiment, a determining position fix logic 170B may perform a least squares solution 171B on the extracted pseudorange information prior to transmitting the output to the pseudorange information bridger logic 143. According to another embodiment, the extracted pseudorange information is improved using various embodiments described in FIGS. 7A-10 prior to performing a least squares solution 171B, as will be described herein.

Methods of Improving Position Accuracy of Extracted Pseudorange Information

The extracted pseudorange information without further improvements can be used to provide an instant location, as described herein. The extracted pseudorange information can be improved by applying position accuracy improvements that include, but are not limited to, those depicted in Tables 2 and 3. The instant location or the improved location can be communicated to location manager logic 161, as discussed herein, that displays the instant location or the improved location with respect to a map.

FIG. 7A depicts a flowchart 700A of a method of improving the position accuracy using one or more position accuracy improvements, according to one embodiment.

At 710A, the method begins.

At 720A, the pseudorange-correction-logic 151 provides Wide Area Augmentation System (WAAS) corrected pseudoranges by applying WAAS corrections to the extracted pseudorange information. For example, the pseudorange-correction-logic 151 receives the extracted pseudorange information that was extracted from the GNSS chipset 170 at 630 of FIG. 6. The cellular device 100, 200 receives the WAAS corrections, as described herein, and provides the WAAS corrections to the pseudorange-correction-logic 151. The pseudorange-correction-logic 151 provides Wide Area Augmentation System (WAAS) corrected pseudoranges by applying the received WAAS corrections to the extracted pseudorange information.

At 730A the method ends.

FIG. 7B depicts a flowchart 700B of a method of improving the position accuracy using one or more position accuracy improvements, according to one embodiment.

At 710B, the method begins.

At 720B, the pseudorange-carrier-phase-smoothing-logic 152 provides smoothed pseudorange information by performing pseudorange smoothing on the extracted pseudorange information based on carrier phase information. For example, if real carrier phase information is available, the cellular device 100, 200 can extract it as discussed herein. Otherwise, the cellular device 100, 200 can derive reconstructed carrier phase information as described herein and provide the reconstructed carrier phase information to the pseudorange-carrier-phase-smoothing-logic 152. The pseudorange-carrier-phase-smoothing-logic 152 can receive the extracted pseudorange information that was extracted from the GNSS chipset 170 at 630 of FIG. 6. The pseudorange-carrier-phase-smoothing-logic 152 can apply either the real carrier phase information or the real carrier phase information to the extracted pseudorange information to provide smoothed pseudorange information.

At 730B, a position fix is determined based on the smoothed pseudorange information and WAAS pseudorange corrections. For example, the pseudorange-correction-logic 151 receives the smoothed pseudorange information and receives WAAS pseudorange corrections and determines a position fix based on the smoothed pseudorange information and the WAAS pseudorange corrections.

At 740B, the method ends.

According to one embodiment, a determining position fix logic 170B may perform a least squares solution 171B on the output of flowchart 700A and 700B prior to transmitting the output to the pseudorange information bridger logic 143.

FIG. 8A depicts a flowchart 800A of a method of improving the position accuracy using one or more position accuracy improvements, according to one embodiment.

At 810A, the method begins.

At 820A, the pseudorange-correction-logic 151 provides Differential Global Positioning System (DGPS) corrected pseudoranges by applying DGPS corrections to the extracted pseudorange information.

For example, the pseudorange-correction-logic 151 receives the extracted pseudorange information that was extracted from the GNSS chipset 170 at 630 of FIG. 6. The cellular device 100, 200 receives the DGPS corrections as described herein and provides the DGPS corrections to the pseudorange-correction-logic 151. The pseudorange-correction-logic 151 provides Differential Global Positioning System (DGPS) corrected pseudoranges by applying the received DGPS corrections to the extracted pseudorange information.

At 830A, the pseudorange-correction-logic 151 provides WAAS-DGPS corrected pseudoranges by applying Wide Area Augmentation System (WAAS) to the DGPS corrected pseudoranges.

For example, the pseudorange-correction-logic 151 accesses the DGPS corrected pseudoranges determined at 820A of FIG. 8A. The cellular device 100, 200 receives the WAAS corrections as described herein and provides the WAAS corrections to the pseudorange-correction-logic 151. The pseudorange-correction-logic 151 provides WAAS-DGPS corrected pseudoranges by applying Wide Area Augmentation System (WAAS) to the DGPS corrected pseudoranges.

At 840A, the method ends.

FIG. 8B depicts a flowchart 800B of a method of improving the position accuracy using one or more position accuracy improvements, according to one embodiment.

At 810B, the method begins.

At 820B, a position determination decision is made as to whether to proceed to 822B or 824B. For example, at operation 820B, the position accuracy improvement determination logic 180B can determine whether to proceed to 822B or 824B as discussed herein.

At 830B, DGPS corrected smoothed pseudoranges are provided by applying corrections to the smoothed pseudorange information. For example, the pseudorange-correction-logic 151 can provide DGPS corrected smoothed pseudoranges by applying DGPS corrections to the smoothed pseudoranges determined at either 822B or 824B.

At 840B, WAAS-DGPS corrected smoothed pseudoranges are provided by applying WAAS to the DGPS corrected smoothed pseudoranges. For example, the pseudorange-correction-logic 151 can provide WAAS-DGPS corrected smoothed pseudoranges by applying WAAS corrections to the DGPS corrected smoothed pseudoranges.

At 850B, the method ends.

According to one embodiment, a determining position fix logic 170B may perform a least squares solution 171B on the output of flowcharts 800A or 800B prior to transmitting the output to the pseudorange information bridger logic 143.

FIG. 9A depicts a flowchart 900A of a method of improving the position accuracy using one or more position accuracy improvements, according to one embodiment.

At 910A, the method begins.

At 920A, DGPS corrected pseudoranges are determined by applying DGPS pseudorange corrections to extracted pseudorange information. For example, the pseudorange-correction-logic 151 receives extracted pseudorange information from the pseudorange information extractor logic 142 and applies the DGPS pseudorange corrections to the extracted pseudorange information.

At 930A, the pseudorange-correction-logic 151 can determine a position fix based on the DGPS corrected pseudoranges and PPP corrections.

At 940A, the method ends.

FIG. 9B depicts a flowchart 900B of a method of improving the position accuracy using one or more position accuracy improvements, according to one embodiment.

At 910B, the method begins.

At 920B, smoothed pseudorange information is provided by performing pseudorange smoothing on the extracted pseudorange information using carrier phase information. For example, the pseudorange-carrier-phase-smoothing-logic 152 provides smoothed pseudorange information by performing pseudorange smoothing on the extracted pseudorange information, which can be obtained as discussed herein, based on carrier phase information. If real carrier phase information is available, the cellular device 100, 200 can extract the real carrier phase information, as discussed herein. Otherwise, the cellular device 100, 200 can derive reconstructed carrier phase information, as described herein, and provide the reconstructed carrier phase information to the pseudorange-carrier-phase-smoothing-logic 152.

At 930B, DGPS corrected smoothed pseudoranges are provided by applying DGPS pseudorange corrections to the smoothed pseudorange information. For example, the pseudorange-correction-logic 151 can receive the smoothed pseudorange information from the pseudorange-carrier-phase-smoothing-logic 152. The pseudorange-correction-logic 151 can determine the corrected smoothed pseudoranges by applying DGPS pseudorange corrections to the smoothed pseudorange information.

At 940B, a position fix can be determined based on the DGPS corrected smoothed pseudoranges and PPP corrections. For example, the pseudorange-correction-logic 151 can determine a position fix based on the DGPS corrected smoothed pseudoranges and PPP corrections.

At 950B, the method ends.

According to one embodiment, a determining position fix logic 170B may perform a least squares solution 171B on the output of flowcharts 900A and 900B prior to transmitting the output to the pseudorange information bridger logic 143.

Figure 10:
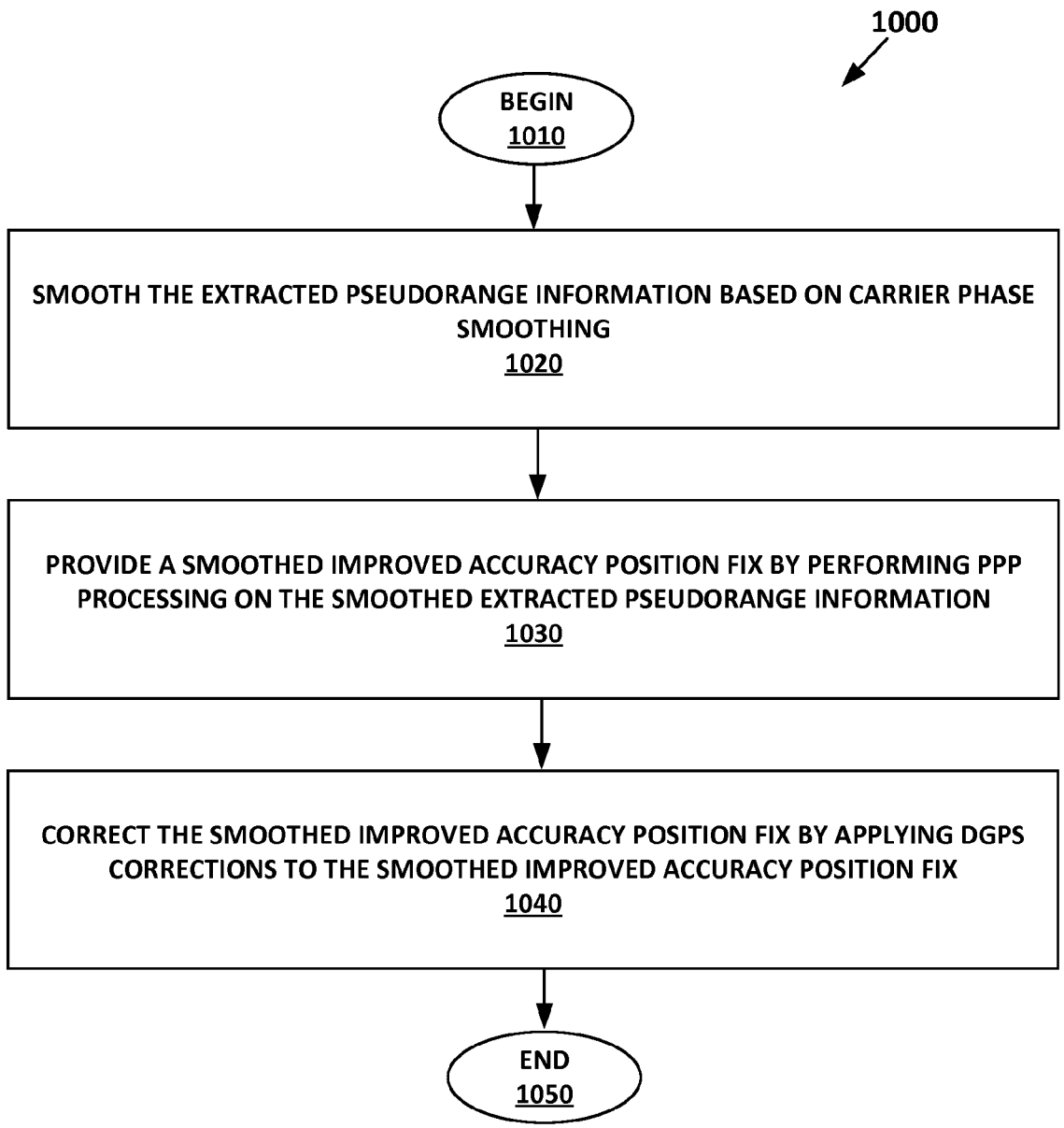

FIG. 10 depicts a flowchart 1000 of a method of improving the position accuracy using one or more position accuracy improvements, according to one embodiment.

At 1010, the method begins.

At 1020, the pseudorange-carrier-phase-smoothing-logic 152 smoothes the extracted pseudorange information based on carrier phase smoothing. For example, the pseudorange-carrier-phase-smoothing-logic 152 receives extracted pseudorange information from the pseudorange information extractor logic 142 and receives carrier phase information, which may be either real carrier phase information or reconstructed carrier phase information, as described herein. The pseudorange-carrier-phase-smoothing-logic 152 smoothes the extracted pseudorange information based on carrier phase smoothing.

At 1030, the PPP logic 151C provides a smoothed improved accuracy position fix by performing Precise Point Positioning (PPP) processing on the smoothed extracted pseudorange information. For example, the PPP logic 151C receives the smoothed extracted pseudorange information provided by the pseudorange-carrier-phase-smoothing-logic 152 at 1020. The PPP logic 151C provides a smoothed improved accuracy position fix by performing Precise Point Positioning (PPP) processing on the smoothed extracted pseudorange information At 1040, the pseudorange-correction-logic 151 can optionally correct the smoothed improved accuracy position fix by applying Differential Global Positioning System (DGPS) corrections to the smoothed improved accuracy position fix. For example, pseudorange-correction-logic 151 receives the smoothed improved accuracy position fix provided by the PPP logic 151C at 1030. The pseudorange-correction-logic 151 receives DGPS corrections as described herein. The pseudorange-correction-logic 151 corrects the smoothed improved accuracy position fix by applying Differential Global Positioning System (DGPS) corrections to the smoothed improved accuracy position fix, thus, providing a corrected smoothed improved accuracy position fix. Operation 1040 is optional, according to one embodiment.

At 1050, the method ends.

According to one embodiment, a determining position fix logic 170B may perform a least squares solution 171B on the output of flowchart 1000 prior to transmitting the output to the pseudorange information bridger logic 143.

Figure 11:
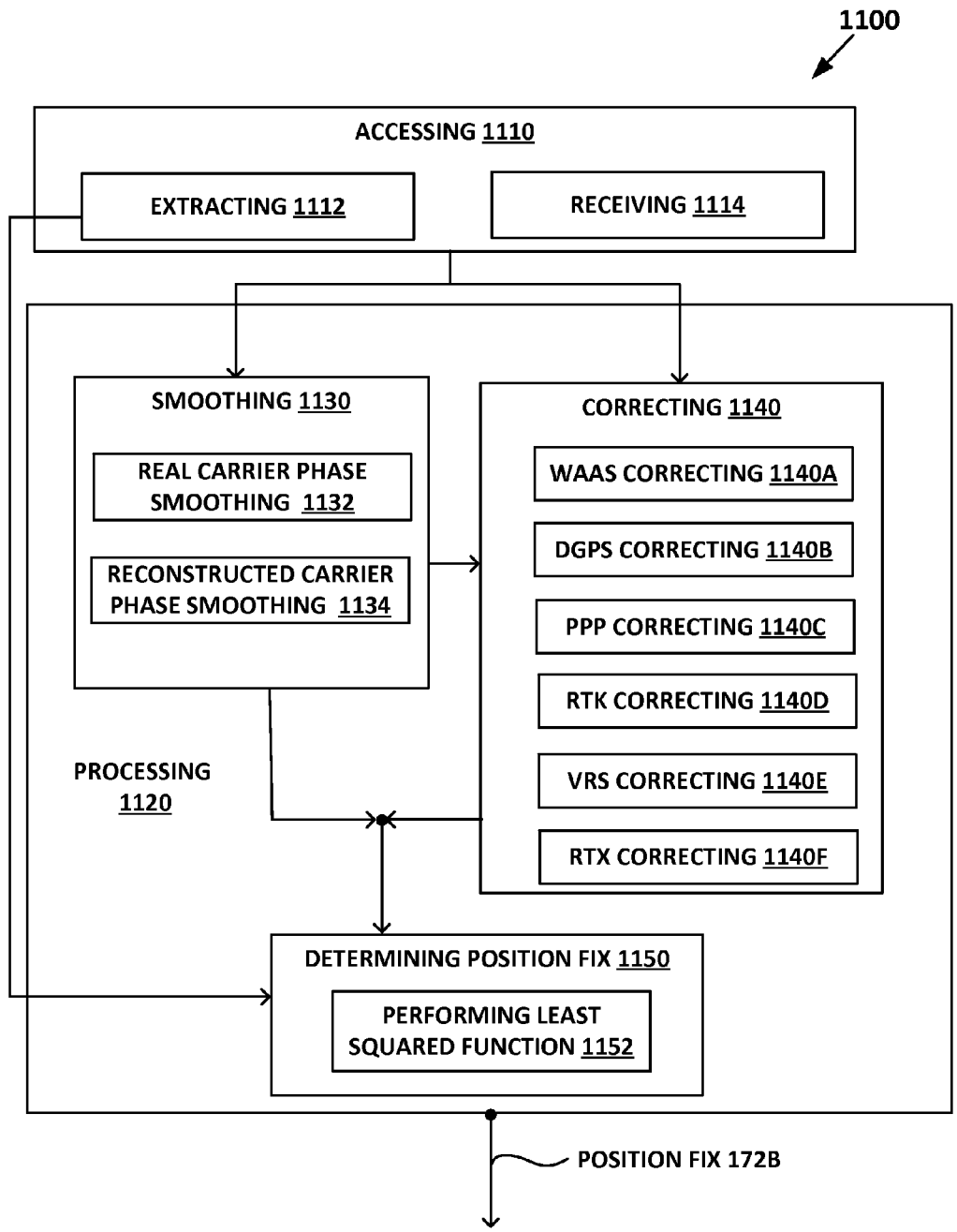
FIG. 11 depicts a flowchart a method of accessing and processing extracted pseudorange information, according to one embodiment.

FIG. 11 depicts a flowchart 1100 of a method of accessing and processing extracted pseudorange information, according to one embodiment.

At 1110, various types of information can be accessed. Examples of accessing are extracting 1112 information and receiving 1114 information. Unsmoothed uncorrected pseudorange information can be extracted at 1112A, WAAS corrections can be extracted at 1112B, SBAS corrections can be extracted at 1112E, Doppler shift can be extracted at 1112C, and carrier phase measurements can be extracted at 1112D. "Accessing" and "obtaining" can be used interchangeably. Table 1 depicts types of information that can be extracted at operation 1112 from the GNSS chipset 170 and types of information that are received at operation 1114 instead of being extracted. However, various embodiments are not limited to the types of information that can be extracted or received depicted in Table 1.

The received or extracted information or a combination thereof, can be processed at 1120.

What or whether to apply position accuracy improvements can be determined at 1160, for example, by the position accuracy improvement determination logic 180B. Examples of position accuracy improvements are real carrier phase information, reconstructed carrier phase information, WAAS, SBAS, DGPS, PPP, RTK, VRS and RTX™ corrections. The determination logic 180B can determine whether one or more and in what order logics 152A, 152B, 151A-151F are performed, according to one embodiment. Tables 2 and 3 are examples of carrier phase information or corrections or a combination thereof, that the position accuracy improvement determination logic 180B may determine, as discussed herein.

The information can be smoothed at 1130. Examples of smoothing 1130 are real carrier phase smoothing 1132 and reconstructed carrier phase smoothing 1134.

Either unsmoothed information or smoothed information can be corrected at 1140. For example, unsmoothed information from 1110 or smoothed information from 1130 can be corrected at 1140. Examples of correcting are SBAS correcting 1140G, WAAS correcting 1140A, DGPS correcting 1140B, PPP correcting 1140C, RTK correcting 1140D, VRS correcting 1140E, and RTX correcting 1140F. The smoothed information or unsmoothed information can be corrected using one or more of operations 1140A-1140G. According to one embodiment, WAAS correcting 1140A is an example of SBAS correcting 1140G.

Unsmoothed information from 1110, smoothed information from 1112, corrected unsmoothed information from 1140 or corrected smoothed information from 1140 can be used to determine a position fix 172B at 1150, for example, by performing a least squares solution 171B at 1152. The output of flowchart 1100 is a position fix 172B. Table 2 and Table 3 depict combinations of information that result in a position fix 172B, according to various embodiments.

According to one embodiment, accessing 1110, extracting 1112, extracting pseudorange information 1112A, extracting SBAS 1112E, extracting WAAS 1112B, extracting Doppler 1112C, extracting carrier phase measurement 1112D, receiving 1114, smoothing 1130, correcting 1140, determining a position fix 1150, and performing a least squares solution 1152 can be performed respectively by logic 110B, 142, 112B-5, 112B-2, 112B-3, 112B-4, 114B, 150, 152, 151, and 170B. Real carrier phase smoothing 1132, reconstructed carrier phase smoothing 1134, correcting 1140A-1140G can be performed respectively by logic 152A, 152B, 151A-151E, 151F, 151G.

Any one or more of 1112, 1112A-1112E, 1132, 1134, 1140A-1140G can be performed. Further, any one or more of 1112, 1112A-1112E, 1112B, 1112C, 1112E, 1132, 1134, 1140A-1140G can be performed in various orders. Various embodiments are not limited to just the combinations that are described herein.

According to one embodiment, a Global Navigation Satellite System (GNSS) chipset embedded within the cellular device is accessed at 620 (FIG. 6) where the GNSS chipset calculates pseudorange information for use by the GNSS chipset. The pseudorange information is extracted at 640 (FIG. 6), 112 (FIG. 11) from the GNSS chipset for use elsewhere in the cellular device outside of the GNSS chipset. The accessing 620 and the extracting 640, 1112A can be performed by the cellular device 100, 200 that includes hardware 180.

The extracted pseudorange information can be smoothed at 1130. The smoothing 1130 can be based on reconstructed carrier phase information or real carrier phase information. The smoothed pseudorange information can be corrected at 1140. Examples of the types of corrected pseudoranges are Wide Area Augmentation System (WAAS), Differential Global Positioning System (DGPS), Precise Point Positioning (PPP), and Real Time Kinematic (RTK). Pseudorange corrections can be accessed 1110. The corrected pseudorange information can be derived, for example at 1140, by applying the pseudorange corrections to the extracted pseudorange information.

FIGS. 4-11 depict flowcharts 400-1100, according to one embodiment. Although specific operations are disclosed in flowcharts 400-1100, such operations are exemplary. That is, embodiments of the present invention are well suited to performing various other operations or variations of the operations recited in flowcharts 400-1100. It is appreciated that the operations in flowcharts 400-1100 may be performed in an order different than presented, and that not all of the operations in flowcharts 400-1100 may be performed.

The operations depicted in FIGS. 4-11 transform data or modify data to transform the state of a cellular device 100, 200. For example, by extracting pseudorange information from a GNSS chipset 170 for use elsewhere, the state of the cellular device 100, 200 is transformed from a cellular device that is not capable of determining a position fix itself into a cellular device that is capable of determining a position fix itself. In another example, operations depicted in flowcharts 400-1100 transform the state of a cellular device 100, 200 from not being capable of providing an improved accuracy position fix to be capable of providing an improved accuracy position fix.

The above illustration is only provided by way of example and not by way of limitation. There are other ways of performing the method described by flowcharts 400-1100.

The operations depicted in FIGS. 4-11 can be implemented as computer readable instructions, hardware or firmware. According to one embodiment, hardware associated with a cellular device 100, 200 can perform one or more of the operations depicted in FIGS. 4-11.

Example GNSS Receiver

Figure 12:
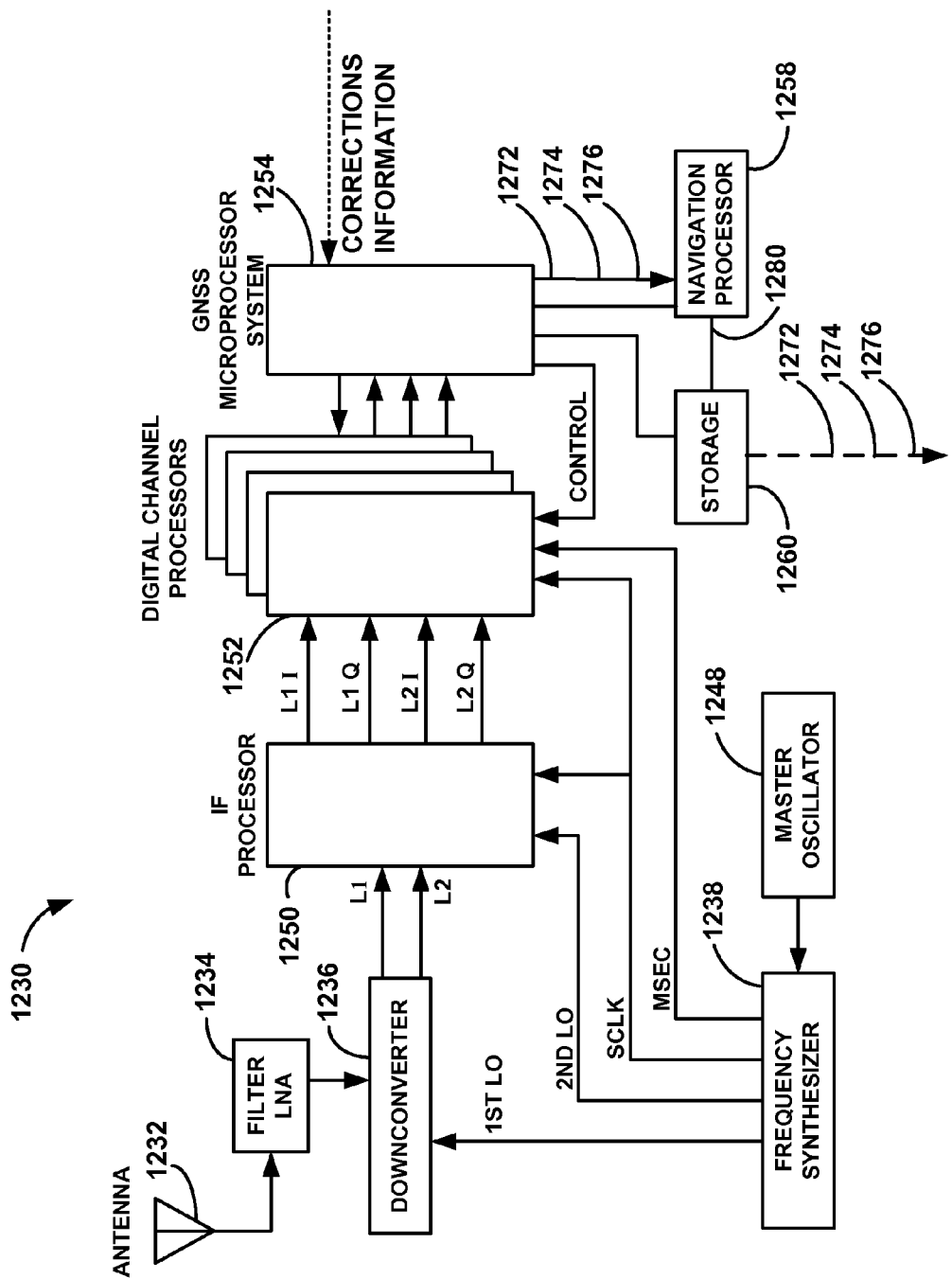
FIG. 12 depicts a block diagram of a GNSS receiver, according to one embodiment.

With reference now to FIG. 12, a block diagram is shown of an embodiment of an example GNSS receiver which may be used in accordance with various embodiments described herein. In particular, FIG. 12 illustrates a block diagram of a GNSS receiver in the form of a general purpose GPS receiver 1230 capable of demodulation of the L1 and/or L2 signal(s) received from one or more GPS satellites. A more detailed discussion of the function of a receiver such as GPS receiver 1230 can be found in U.S. Pat. No. 5,621,416, by Gary R. Lennen, is titled "Optimized processing of signals for enhanced cross-correlation in a satellite positioning system receiver," and includes a GPS receiver very similar to GPS receiver 1230 of FIG. 12.

In FIG. 12, received L1 and L2 signals are generated by at least one GPS satellite. Each GPS satellite generates different signal L1 and L2 signals and they are processed by different digital channel processors 1252 which operate in the same way as one another. FIG. 12 shows GPS signals (L1=1575.42 MHz, L2=1227.60 MHz) entering GPS receiver 1230 through a dual frequency antenna 1232. Antenna 1232 may be a magnetically mountable model commercially available from Trimble Navigation of Sunnyvale, Calif. Master oscillator 1248 provides the reference oscillator which drives all other clocks in the system. Frequency synthesizer 1238 takes the output of master oscillator 1248 and generates important clock and local oscillator frequencies used throughout the system. For example, in one embodiment frequency synthesizer 1238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1234 performs filtering and low noise amplification of both L1 and L2 signals. The noise figure of GPS receiver 1230 is dictated by the performance of the filter/LNA combination. The down convertor 1236 mixes both L1 and L2 signals in frequency down to approximately 175 MHz and outputs the analogue L1 and L2 signals into an IF (intermediate frequency) processor 1250. IF processor 1250 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1252 inputs the digitally sampled L1 and L2 inphase and quadrature signals. All digital channel processors 1252 are typically are identical by design and typically operate on identical input samples. Each digital channel processor 1252 is designed to digitally track the L1 and L2 signals produced by one satellite by tracking code and carrier signals and to from code and carrier phase measurements in conjunction with the GNSS microprocessor system 1254. One digital channel processor 1252 is capable of tracking one satellite in both L1 and L2 channels. Microprocessor system 1254 is a general purpose computing device (such as computer system 1000 of FIG. 10) which facilitates tracking and measurements processes, providing pseudorange and carrier phase measurements for a determining position fix logic 1258. In one embodiment, microprocessor system 1254 provides signals to control the operation of one or more digital channel processors 1252. According to one embodiment, the GNSS microprocessor system 1254 provides one or more of pseudorange information 1272, Doppler Shift information 1274, and real Carrier Phase Information 1276 to the determining position fix logic 1258. One or more of pseudorange information 1272, Doppler Shift information 1274, and real Carrier Phase Information 1276 can also be obtained from storage 1260. One or more of the signals 1272, 1274, 1276 can be conveyed to the cellular device's processor, such as processor 109 (FIG. 1A) that is external to the GNSS chipset 170 (FIG. 1A). Determining position fix logic 1258 performs the higher level function of combining measurements in such a way as to produce position, velocity and time information for the differential and surveying functions, for example, in the form of a position fix 1280. Storage 1260 is coupled with determining position fix logic 1258 and microprocessor system 1254. It is appreciated that storage 1260 may comprise a volatile or non-volatile storage such as a RAM or ROM, or some other computer readable memory device or media. In some embodiments, determining position fix logic 1258 performs one or more of the methods of position correction described herein.

In some embodiments, microprocessor 1254 and/or determining position fix logic 1258 receive additional inputs for use in receiving corrections information. According to one embodiment, an example of the corrections information is WAAS corrections. According to one embodiment, examples of corrections information are differential GPS corrections, RTK corrections, signals used by the previously referenced Enge-Talbot method, and wide area augmentation system (WAAS) corrections among others.

Although FIG. 12 depicts a GNSS receiver 1130 with navigation signals L1I, L1Q, L2I, L2Q, various embodiments are well suited different combinations of navigational signals. For example, according to one embodiment, the GNSS receiver 1130 may only have an L1I navigational signal. According to one embodiment, the GNSS receiver 1130 may only have L1I, L1Q and L2I.

Various embodiments are also well suited for future navigational signals. For example, various embodiments are well suited for the navigational signal L2C that is not currently generally available. However, there are plans to make it available for non-military receivers.

According to one embodiment, either or both of the accessing logic 110B and the processing logic 150 reside at either or both of the storage 1260 and GNSS microprocessor system 1254.

According to one embodiment, the GNSS receiver 1230 is an example of a GNSS receiver 107 (see e.g., FIG. 1A and FIG. 1D). According to one embodiment, the determining position fix logic 1258 is an example of determining position fix logic 170B (FIG. 1B). According to one embodiment, position fix 1280 is an example of a position fix 172B (FIG. 1B).

Kalman Filtering

Figure 13:
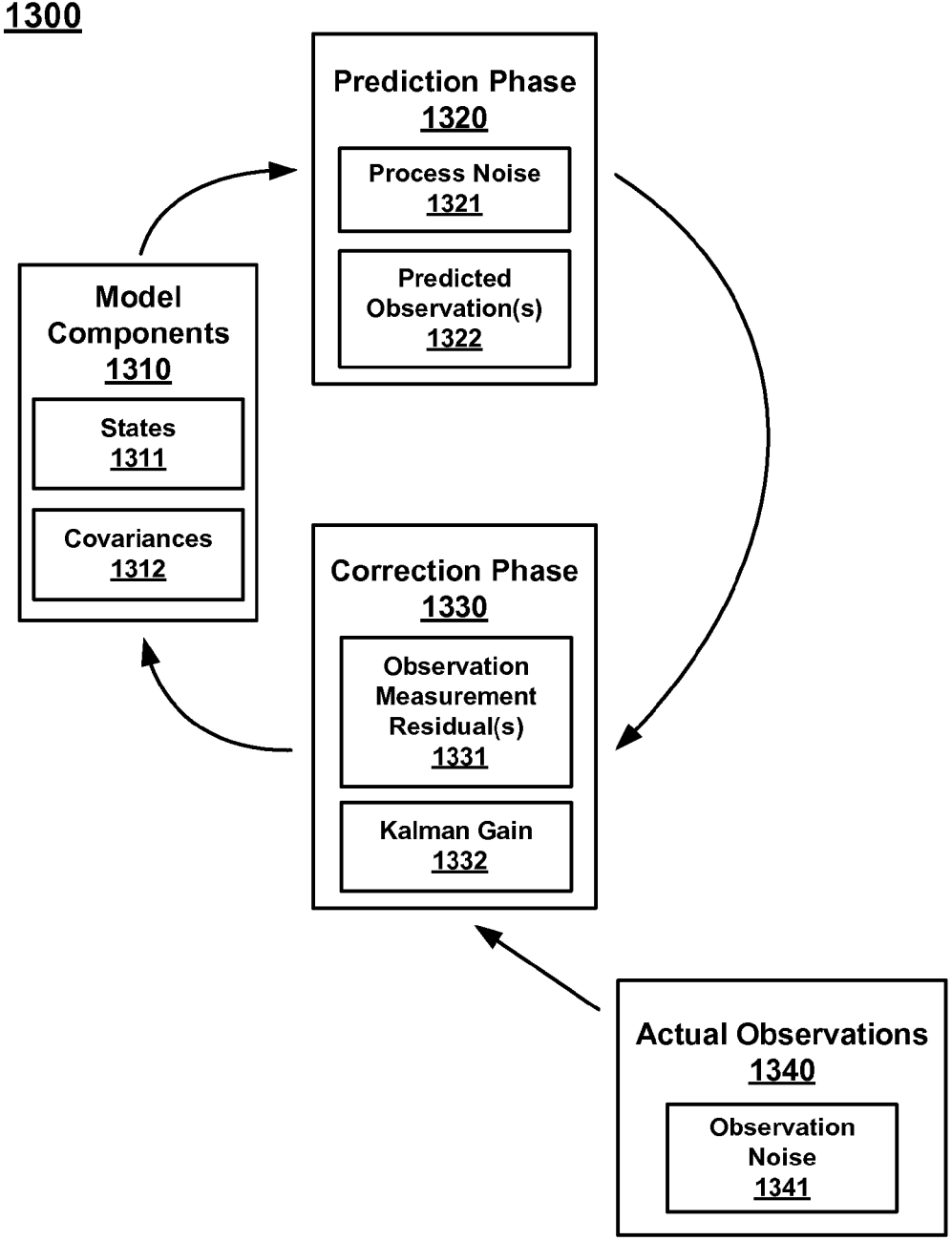
FIG. 13 depicts an example Kalman filtering process, according to some embodiments.

FIG. 13 depicts an example Kalman filtering process 1300, according to some embodiments. It should be appreciated that Kalman filtering is well known. As such, FIG. 13 and the associated discussion are utilized only to provide a high-level general description. Variations in the described procedures will occur during specific implementations of Kalman filtering. The extended Kalman filter and the unscented Kalman filter represent some of the variations to the basic method. Such variations are normal and expected. Generally speaking, Kalman filtering is a basic two-step predictor/corrector modeling process that is commonly used model dynamic systems. A dynamic system will often be described with a series of mathematical models. Models describing satellites in a Global Navigation Satellite System (GNSS) are one example of a dynamic system. Because the position of any satellite and/or the positions of all the satellites in a system constantly and dynamically change and the satellites output a signal that can be measured by a GNSS receiver, Kalman filtering can be used in determining positions of the satellites.

A basic Kalman filter implemented using Kalman filtering process 1300 typically has at least two major components 1310: states 1311 and covariances 1312. States 1311 represent variables that are used to describe a system being modeled, at a particular moment in time. Covariances 1312 are represented in a covariance matrix that describes uncertainty, or lack of confidence, of states 1311 with respect to each other at that same moment in time. Kalman filtering process 1300 also handles noise, or unpredictable variability, in the model. There are two principle types of noise, observation noise 1341 and process noise 1321. A Kalman filter may handle additional noise types, in some embodiments. Process noise 1321 describes noise of the states 1311 as a function of time. Observation noise 1341 is noise that relates to the actual observation(s) 1340 (e.g., observed measurements) that are used as an input/update to Kalman filtering process 1300.

A prediction phase 1320 is the first phase of Kalman filtering process 1300. Prediction phase 1320 uses predictive models to propagate states 1311 to the time of an actual observation(s) 1340. Prediction phase 1320 also uses process noise 1321 and predictive models to propagate the covariances 1312 to time of the actual observation(s) 1340 as well. The propagated states 1311 are used to make predicted observation(s) 1322 for the time of actual observation(s) 1340.

A correction phase 1330 is the second phase in the Kalman filtering process 1300. During correction phase 1330, Kalman filtering process 1300 uses the difference between the predicted observation(s) 1322 and the actual observation(s) 1340 to create an observation measurement residual 1331, which may commonly be called the "measurement residual." Observation noise 1341 can be noise in actual observation(s) 1340 and/or noise that occurs in the process of taking the actual observation(s) 1340. A Kalman gain 1332 is calculated using both the covariances 1312 and the observation noise 1341. The states 1311 are then updated using the Kalman Gain 1332 multiplied by the observation measurement residual 1331. The covariances 1312 are also updated using a function related to the Kalman gain 1332; for example, in one embodiment where Kalman gain is limited to a value between 0 and 1, this function may be 1 minus the Kalman gain. This updating is sometimes referred to as the "covariance update." In some embodiments, if no actual observation 1340 is available, Kalman filtering process 1300 can simply skip correction phase 1330 and update the states 1311 and covariances 1312 using only the information from prediction phase 1320, and then begin again. Using the new definitions of the states 1311 and covariances 1312, Kalman filtering process 1300 is ready to begin again and/or to be iteratively accomplished.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a cellular device 100, 200 (FIGS. 1A-2) and are executed by a hardware processor of the cellular device 100, 200. When executed, the instructions cause a computer system to implement the functionality of various embodiments of the present invention. For example, the instructions can be executed by a central processing unit associated with the cellular device 100, 200. According to one embodiment, the non-transitory computer readable storage medium is tangible.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause the cellular device 100, 200 to implement the functionality of various embodiments. For example, according to one embodiment, the SUPL client 101 and the operations of the flowcharts 400-1100 depicted in FIGS. 4-11 are implemented with computer readable instructions that are stored on computer readable storage medium, which can be tangible or non-transitory or a combination thereof, and can be executed by a hardware processor 109 of a cellular device 100, 200.

II. Performing Data Collection Using a Mobile Data Collection Platform

Notation and Nomenclature

Reference will now be made in detail to various embodiments of the subject matter, examples of which are illustrated in the accompanying drawings. While various embodiments are discussed herein, it will be understood that they are not intended to be limited to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "collecting," "capturing," "obtaining," "determining," "storing," "calculating," "calibrating," "receiving," "designating," "performing," "displaying," "positioning,"

"accessing," "transforming data," "modifying data to transform the state of a computer system," or the like, refer to the actions and processes of a computer system, data storage system, storage system controller, microcontroller, hardware processor, such as a central processing unit (CPU), or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview of Discussion

According to one embodiment, a mobile data collection platform captures an image that depicts at least one point of interest. The location and orientation of the mobile data collection platform may be captured at the time the image is captured. The orientation of the mobile data collection platform is with respect to a local gravity vector that is local to the mobile data collection platform. The orientation, according to one embodiment, is given by a three axis tilt angle sensor and the direction of the tilt angle may be determined from the tilt angles for the x-axis sensor and the y axis sensor, as determined by aiming the measurement platform towards the point of interest. The tilt sensor measures degree of departure from local gravity vertical in 2 or 3 axes. The location and orientation can be associated with the image, for example, by the user holding the mobile data collection platform still during the period of time that the image is captured and the location and orientation of the mobile data collection platform are determined. In another example, when a user of the mobile data collection platform presses a button, the image, the location and the orientation can all be obtained and stored in response to the user pressing the button. Therefore location and orientation can be associated with the image by determining the location and orientation and capturing the image in a time period that is short enough to avoid any significant user movement of the mobile data collection platform during the capture process.

Scale Information may be used as a part of determining a distance between the mobile data collection platform and the point of interest. The scale information may be the depiction of an object, which has a known dimension, in the captured image. A single measurement can be made if the plane of scale object is parallel to the plane of the image capture device. This is hard to achieve, so two images are usually required. In another example, a second image that depicts the point of interest captured with the image capturing device that is at a second location and orientation where the first location and the second location are separated by a known distance. Since the mobile data collection platform has a position determination system, the distance between the first location and the second location can be easily determined, as will become more evident. In this case, scale information can include one or more of the first and second images, the first and second locations and orientations that were used when the respective first and second images were captured, and the known distance between the first and second locations.

Mobile Data Collection Platform

A First Embodiment

Figure 14:
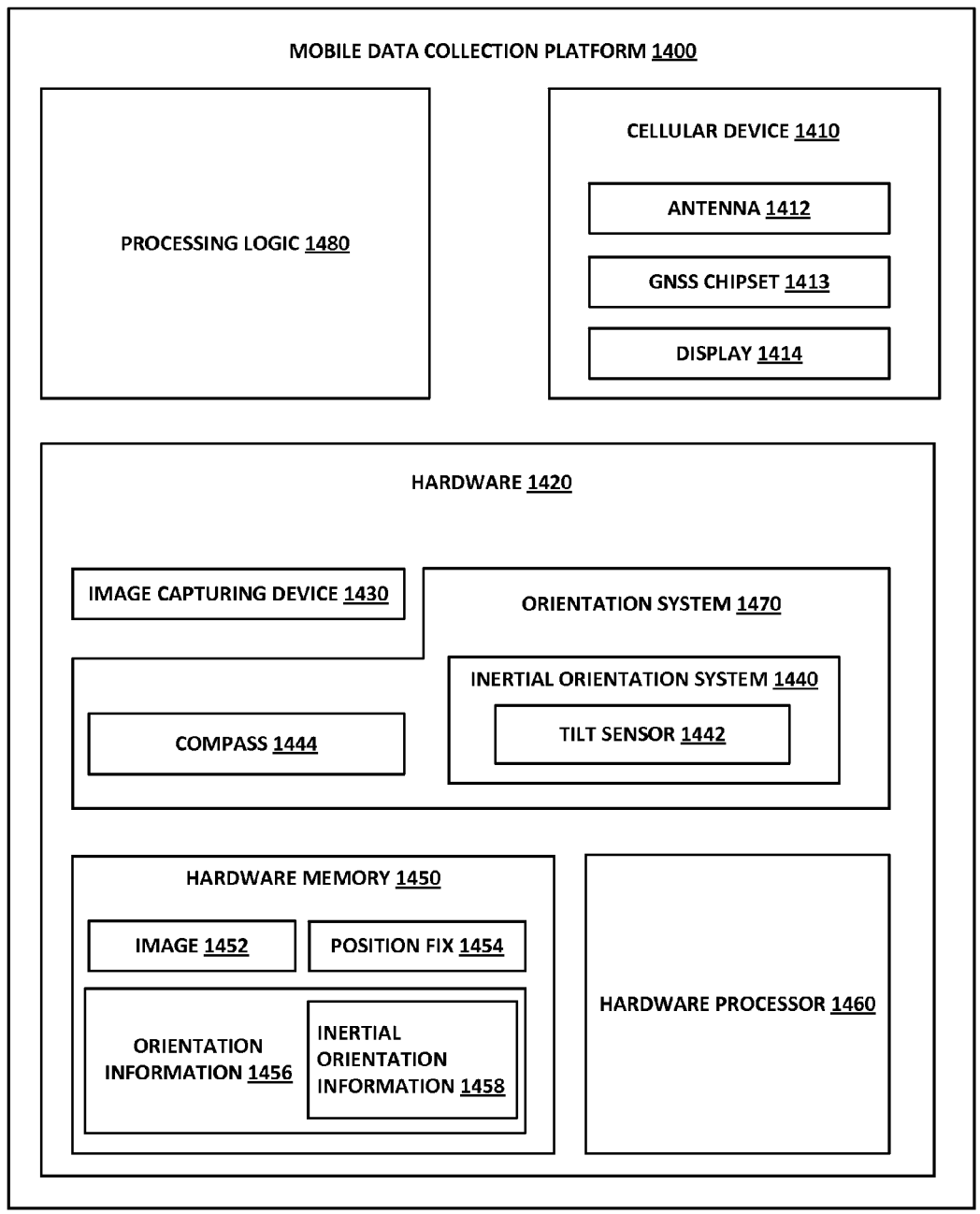
FIG. 14 depicts a block diagram of a mobile data collection platform, according to one embodiment.

FIG. 14 depicts a block diagram of a mobile data collection platform 1400, according to one embodiment. Examples of a mobile data collection platform 1400 are a cell phone, a non-voice enabled cellular device, a tablet computer, a phablet, and a mobile hand-held GNSS receiver. The mobile data collection platform 1400 may be used while moving or stationary, since it may be operated in a hand-held position or secured, for example, on a monopod or tripod or a mobile platform attached to a vehicle. Examples of a tablet computer are the Microsoft Surface, Apple iPads, Apple iPad mini, iPad tablet, Nexus 7, Samsung Galaxy Tab families, and the Samsung Galaxy Note. According to one embodiment, a mobile data collection platform 1400 is a mobile communications device (MCD) with cellular communications capabilities (also referred to as a "cellular communication enabled mobile communications device").

The mobile data collection platform 1400 includes a cellular device 1410, processing logic 1480, an image capturing device 1430, an orientation system 1470, an inertial orientation system 1440, tilt sensor 1442, compass 1444, and hardware 1420. The cellular device 1410 includes a display 1414, GNSS chipset 1413 and an antenna 1412. The hardware 1420 includes the image capturing device 1430, the orientation system 1470, the inertial orientation system 1440, hardware memory 1450 and hardware processor 1460. The antenna 1412, the display 1414, the processing logic 1480, the hardware 1420 are part of the mobile data collection platform 1400 and outside of the GNSS chipset 1413.

According to one embodiment, the orientation system 1470 includes a compass 1444 and an inertial orientation system 1440. According to one embodiment, the inertial orientation system 1440 includes a three-axis tilt sensor 1442. According to one embodiment, the tilt sensor 1442 is a three-axis inertial measurement unit (IMU). According to one embodiment, the tilt sensor 1442 is a three-axis accelerometer. According to one embodiment, the tilt sensor 1442 is a two-axis accelerometer where the axes are for the x and y directions in the platform coordinate system.

The orientation system 1470, according to one embodiment, determines orientation information 1456 that represents an orientation of the mobile data collection platform 1400. The orientation information 1456 includes, according to one embodiment, inertial orientation information 1458 and azimuth angle. According to one embodiment, the inertial orientation information 1458 includes a tilt angle from the tilt sensor 1442.

Angles, such as the azimuth angle, are measured in 360 degrees, as is well known in the art. However, other metrics used by surveyors for describing angular displacement, including what is known as "grad" that uses 400 degrees in a full circle can also be used.

The tilt sensor 1442 may be used to determine the tilt angle. The tilt angle indicates the mobile data collection platform 1400's orientation with respect to a local gravity vector, as measured from a vertical or zenith point. The overall tilt angle is composed of two angles, tilt in the direction of the x axis and tilt in the direction of the y axis. The vector magnitude gives a tilt angle in the direction of the vector sum of the x-axis and y-axis components. It may be reported as a tilt angle in polar coordinates as well. Polar coordinates the tilt angle as measured from a vertical gravity reference direction along a compass angle, as determined by the vector sum of the x and y components. Tilt sensors 1442 determine the tilt angle based on Euler angles. The inertial orientation information 1458 may include the Euler angles from the tilt sensor 1442 in addition to the tilt angle or instead of the tilt angle.

The compass 1444 may be used to determine the azimuth angle. The azimuth angle indicates the orientation, for example, with respect to a reference direction, such as true north, magnetic north or a reference target at a known location, from which the direction vector can be determined.

The hardware memory 1450 stores the image 1452 that depicts the point of interest, the position fix 1454 and the orientation information 1456. The antenna 1412 has a three dimensional GNSS position fix Xpf, Ypf, Zpf that is stored in memory as position fix 1454.

The hardware processor 1460 is for executing the capturing of the image 1452 with the image capturing device 1430, where the image 1452 includes at least one point of interest, the determining of the position fix 1454 of the mobile data collection platform 1400 based on the raw observables, where the position fix 1454 provides a location of the mobile data collection platform 1400 in a GNSS coordinate system, the accessing of the orientation information 1456 from the inertial orientation system 1440, and the storing of the image 1452, the position fix 1454 and the orientation information 1456 in the hardware memory 1450 of the mobile data collection platform 1400.

The mobile data collection platform 1400 is not required to be leveled as a part of capturing the image 1452, determining the position fix 1454, and determining the orientation information 1456. The orientation information 1456 is associated directly and automatically with a three dimensional location, such as the position fix Xpf, Ypf, Zpf (stored as position fix 1454) or the three dimensional location X0, Y0, Z0 of an entrance pupil center, of the mobile data collection platform 1400 when the image 1452 was captured. The mobile data collection platform 1400 is not required to be leveled at the time that the position fix Xpf, Zpf, Ypf and the orientation information 1456 are determined as is common with other optical measurement devices such as theodolites or total stations.

Any one or more of the entities, such as hardware 1420, image capturing device 1430, inertial orientation system 1440, compass 1444, hardware memory 1450, hardware processor 1460, that are part of the mobile data collection platform 1400, 1500 and outside of the cellular device 1410 can instead be inside of the cellular device 1410. According to one embodiment, the mobile data collection platform 1400, 1500 is a cellular device. For example, a tablet computer may contain all the recited hardware, plus a separate cellphone module, which itself can contain some of the hardware items, including a GNSS chipset. Conversely, the tablet may contain a GNSS chipset whose raw observables may be made available to any of the processors associated with the tablet.

Various types of information can be stored, for example, in an EXIF file associated with the image 1452. Examples of information that can be written into the EXIF file are the GPS position fix 1454, orientation information 1456, the tilt angle, the direction of an azimuth angle (also referred to as an "azimuth direction" or "tilt direction"), scale information, and antenna-to-entrance-pupil-center-geometric-information. Any type of information that can be used for determining one or more of a three dimensional position of the entrance pupil center of the image capturing device, a distance from the entrance pupil center to a point of interest and a location of a point of interest, as will become more evident, can be stored in the EXIF file. Alternatively, any or more of the same information can be stored as reference information in a suitable reference file associated with the particular mobile data collection platform.

Mobile Data Collection Platform

A Second Embodiment

Figure 15:
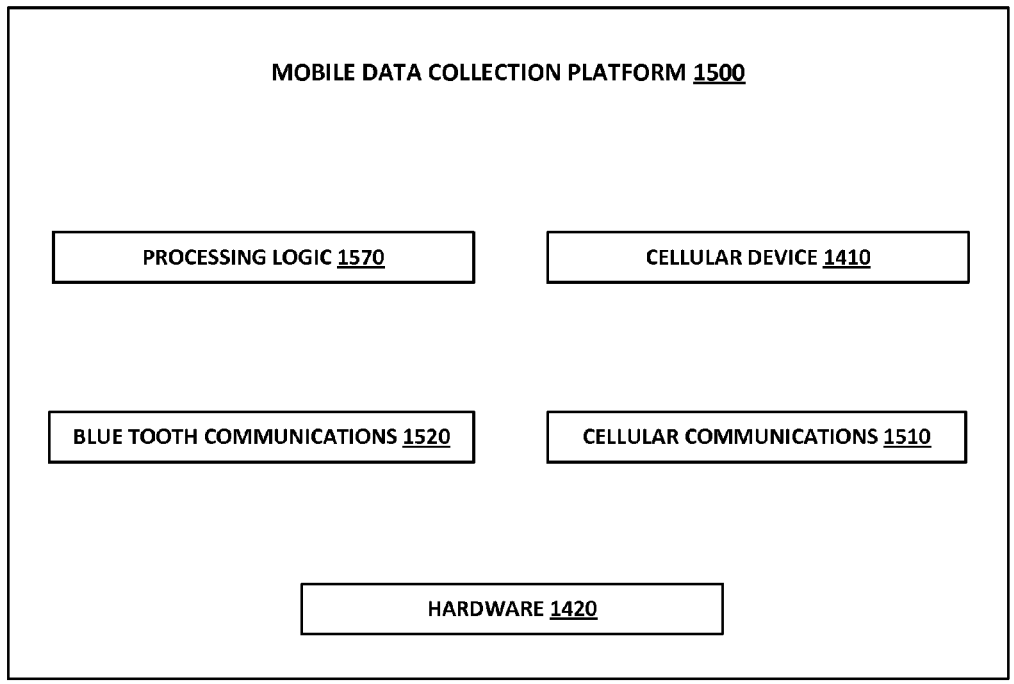
FIG. 15 depicts another block diagram of a mobile data collection platform, according to one embodiment.

FIG. 15 depicts another block diagram of a mobile data collection platform 1500, according to one embodiment. According to one embodiment, the mobile data collection platform 1500 includes the blocks that are in mobile data collection platform 1400. In addition, mobile data collection platform 1500 includes processing logic 1570, cellular communications 1510 and Bluetooth communications 1520. According to one embodiment, the processing logic 1800, blue tooth communications 1520, cellular communications 1510 and hardware 1420 are a part of the mobile data collection platform 1500 and outside of the GNSS chipset 1413.

Relationships Between Entities of FIG. 14 and FIG. 15 and Entities in Previous Figures The mobile data collection platforms 1400 and 1500 depicted in FIG. 14 and FIG. 15 include a cellular device 1410. According to one embodiment, the cellular device 1410 can include cellular devices, such as cellular device 100, 200, or any other cellular device described herein or any communications system capable of connecting with a cellular telephone system, private or public, for the purpose of transmitting and receiving voice, data, and messaging information.

An example of an image capturing device 1430 is a digital camera or portion thereof, which includes an electronic image sensor (e.g., a charge coupled device (CCD) image sensor, an Active Pixel Sensor (APS) image sensor, or other form of electronic image sensor). An example of hardware memory 1450 is memory 210. An example of hardware processor 1460 is hardware processor 109. An example of a GNSS chipset 1413 is GNSS chipset 170. According to one embodiment, the mobile data collection platform 1400 includes a SUPL client, as described herein. The SUPL client can be inside of the cellular device 1410 or can be in the mobile data collection platform 1400 and outside of the cellular device 1410.

According to various embodiments, the mobile data collection platform 1400, 1500 can include any one or more of features described herein. For example, the mobile data collection platform 1400, 1500 can include at least any one or more features depicted in FIGS. 1A-2, 12, and 13, and can perform at least any one or more operations as depicted in FIGS. 3-11, 20-33.

Processing Logic

Both mobile data collection platforms 1400 and 1500 include processing logic.

Figure 16:
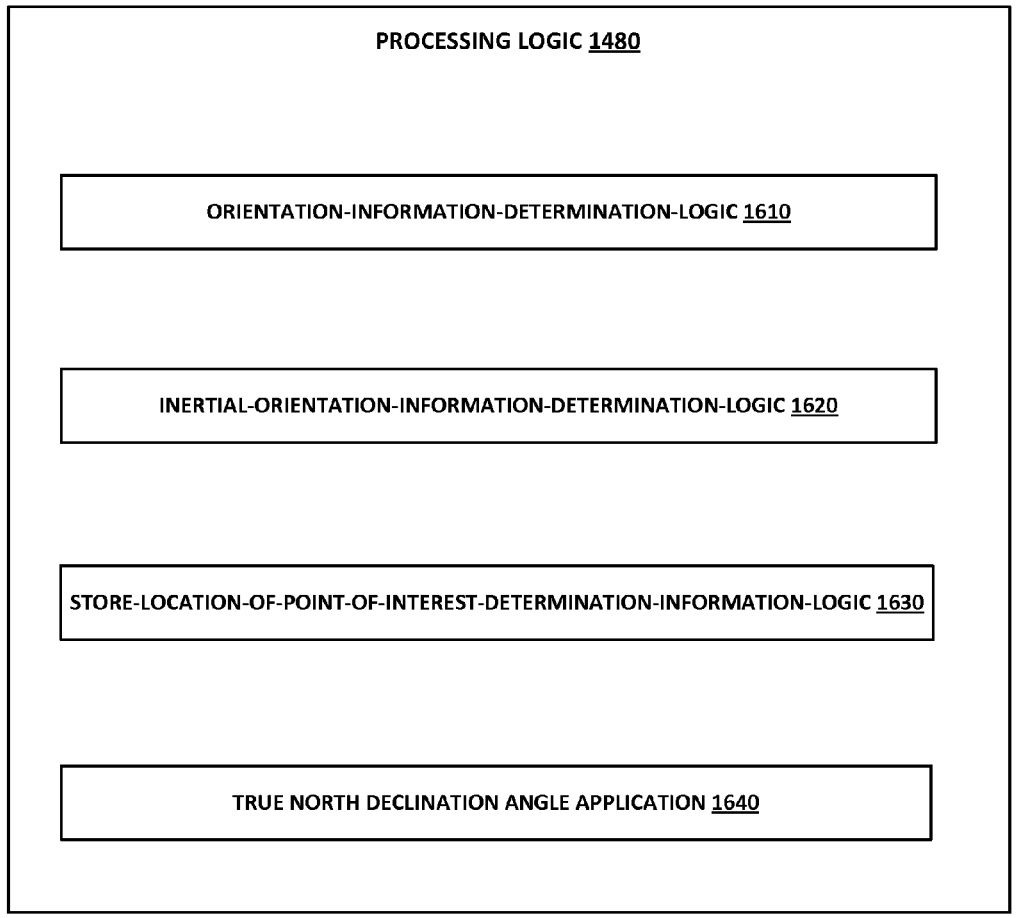
FIG. 16 depicts a block diagram of processing logic for mobile data collection platform, according to one embodiment.

FIG. 16 depicts a block diagram of processing logic 1480 for mobile data collection platform 1400, according to one embodiment.

For example, the processing logic 1480 includes orientation-information-determination-logic 1610, inertial-orientation-information-determination-logic 1620, store-location-of-point-of-interest-determination-information-logic 1630, and a true north declination angle application 1640.

Orientation information can include one or more of tilt angle and azimuth angle. Orientation-information-determination-logic 1610 includes the inertial-orientation-information-determination-logic 1620, according to one embodiment. However, 1610 and 1620 can be separate. For example, instructions for 1610 and 1620 may be part of the same procedure or function or may be part of separate procedures or functions.

The inertial-orientation-information-determination-logic 1620 that receives Euler angles from the inertial orientation system 1440 and processes the Euler angles to provide the tilt angle of the mobile data collection platform. The Euler angles may be stored in hardware memory 1450.

The orientation-information-determination-logic 1610 receives information from the compass 1444 and determines the tilt direction, according to one embodiment.

The orientation information 1456, according to one embodiment, includes information that provides a three dimensional position of the mobile data collection platform 1400. The orientation information 1456 and the position fix 1454 can be used for determining the three dimensional position X0, Y0, Z0 (FIG. 24) of and/or associated with the mobile data collection platform 1400 in a local three dimensional coordinate system.

Since the inertial orientation system 1440 provides information pertaining to the tilt angle of the mobile data collection platform 1400, the mobile data collection platform 1400 is not required to be leveled as a part of obtaining the location-of-point-of-interest-determination-information.

The store-location-of-point-of-interest-determination-information-logic 1630, according to one embodiment, can store location-of-point-of-interest-determination-information, such as the position fix 1454, the image 1452 and the orientation information 1456, into the hardware memory 1450 of the mobile data collection platform.

For example, in an embodiment, a mobile data collection platform 1400, 1500 captures an image 1452 that depicts a point of interest for the purpose of determining a distance between a three dimensional position of the mobile data collection platform 1400, 1500, such as the three dimensional position of the entrance pupil center, and the point of interest. The mobile data collection platform 1400, 1500 collects various types of information that can be used for calculating the distance between the point of interest and the three dimensional position of the data collection platform 1400, 1500. The collected information that can be used for determining the distance shall be referred to as "location-of-point-of-interest-determination-information."

According to one embodiment, the location-of-point-of-interest-determination-information includes more than one image 1452. The location-of-point-of-interest-determination-information can include any type of information that can be used for determining the location of the point of interest, according to one embodiment. The location-of-point-of-interest-determination-information may include any type of information that can be used for determining the location of the point of interest in a three dimensional coordinate system, according to one embodiment. According to one embodiment, the three dimensional coordinate system that the point of interest can be located in is the well-known latitude, longitude and altitude, or height, system used in mapping. The GNSS receiver first locates itself in the WGS-84 World Geodetic System standard coordinate system widely accepted for use in cartography, geodesy, and navigation and used to describe the shape and coordinates of the earth. The WGS-84 datum includes the definition of a reference ellipsoid, which approximates the earth's geoid.

The WGS-84 datum is used for referencing GNSS-derived positions to the earth. Models are available for relating WGS-84 derived heights to mean-sea level (geoid) heights, such as the Earth Gravitational Model 1996. According to one embodiment, WGS-84 coordinate system includes WGS-84 datum. A conversion system within the GNSS receiver converts the GNSS-determined WGS-84 data into latitude, longitude and altitude information which are then used in the local coordinate system. Data on points of interest will be measured and transformed into the same local coordinate system. According to one embodiment, the information includes any type of information that can be used for determining the location of the point of interest in a three dimensional coordinate system so that the mobile data collection platform 1400 is not required to be leveled as a part of determining the location of the point of interest.

According to one embodiment, a true north declination angle application 1640 provides a declination angle for true north from the latitude and longitude associated with a position fix, such as the position fix Xpf, Ypf, Zpf of an antenna 1412. For example, according to one embodiment, the orientation of the mobile data collection platform 1400, 1500 at the time the image depicting the point of interest includes a tilt direction that is determined with respect to a reference direction. According to one embodiment, the reference direction is true north.

Compasses provide the direction to magnetic north. True north can be determined by applying compensations to the direction of magnetic north provided by a compass.

One of the functions of the true north declination angle application 1640 that is used according to various embodiments, is obtaining compensations that can be applied to the direction of magnetic north provided by a compass to obtain true north. For example, the true north declination angle application 1640 can communicate with a database provided by the U.S. government that provides the declination angle for true north from the latitude and longitude associated with a position fix, such as the position fix Xpf, Ypf, Zpf of an antenna 1412. Therefore, according to various embodiments, the true north declination angle application 1640 can provide the position fix Xpf, Ypf, Zpf of the current location of the antenna 1412 to the U.S. governments database. The U.S. government's database can use the position fix Xpf, Ypf, Zpf to locate compensations, such as declination angle for true north, from the latitude and longitude associated with a position fix Xpf, Ypf, Zpf and return the compensations to the true north declination angle application 1640. Magnetic north, while the platform 1400 is at the same position Xpf, Ypf, Zpf, can be obtained from the compass 1444. True north can be derived, for example, by applying the compensations to the magnetic north.

The processing logic 1480, according to one embodiment, provides instructions for communicating the position fix Xpf, Ypf, Zpf to the true north declination angle application 1640 and requesting compensations that correlate with the position fix Xpf, Ypf, Zpf, receiving the compensations, receiving magnetic north from the compass 1444, and determining true north by applying the compensations to magnetic north.

Figure 17:
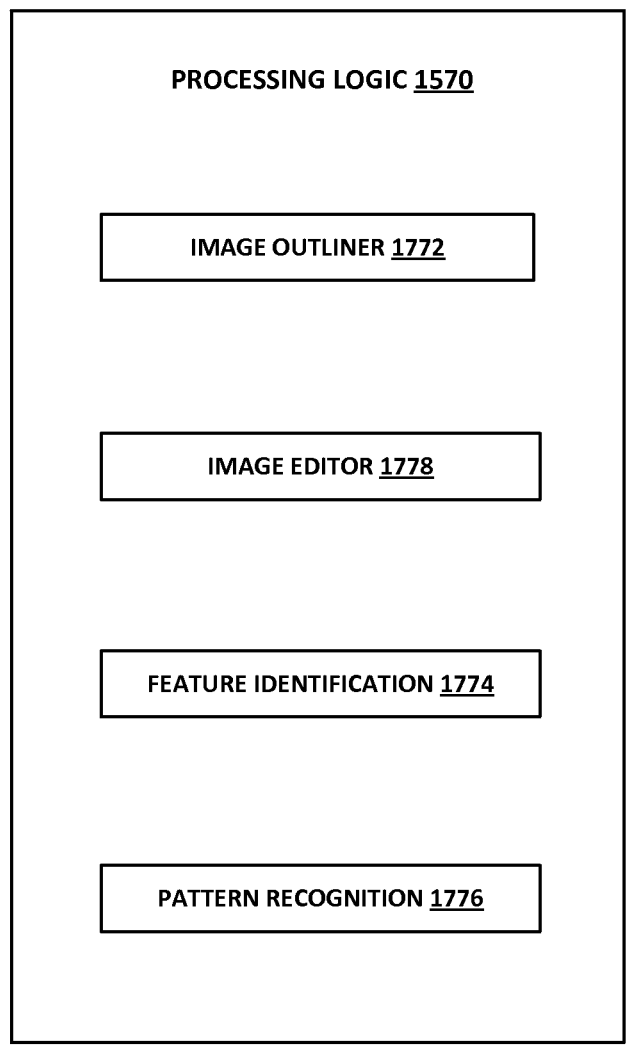
FIG. 17 depicts processing logic for mobile data collection platform, according to one embodiment.

FIG. 17 depicts processing logic 1570 for mobile data collection platform 1500, according to one embodiment. According to one embodiment, the processing logic 1570 is a part of the mobile data collection platform 1400, 1500 and outside of the GNSS chipset 1413.

Data Collection Utilities Processing Logic 1570, according to one embodiment, includes image outliner 1772, feature identification 1774, pattern recognition 1776, and image editor 1778. The processing logic 1570 may include processing logic 1480.

According to one embodiment, a captured image 1452 can be displayed on the display 1414. The user of the mobile data collection platform 1400 can outline a point of interest that is represented in image 1452 depicted on display 1414. The user can specify that a point or feature is a point of interest, for example, by outlining it. The image outliner 1772 can receive information indicating the outline that the user drew around the point of interest. Therefore, a point of interest that has been outlined is an example of a "user specified point of interest." As will become more evident, a user can also specify a point of interest using crosshairs shown in the display, and aligned with the major axis of the image capturing device 1430's lens (also known as an "entrance pupil"). Feature identification can be performed, for example, by feature identification 1774 on a user specified point of interest. Pattern recognition 1776 can be performed on a user specified point of interest.

The user can use the image editor 1778 to annotate the image 1452 for example with audio or text or a combination thereof. The annotation can be a description of a point of interest. For example, the user can indicate in the annotation that the point of interest is a standard survey target device consisting of concentric circles with alternating black and white sections, or the upper right corner of a door or other point of interest or pseudo point of interest, as described herein. These are just a couple of examples of annotations. Therefore, a point of interest that a user specifies using an annotation is another example of a user specified point of interest. The annotation can include other information such as a description of the area or a job site where the image 1452 was taken.

For more information on cellular communications 1510, Bluetooth communications 1520, image outliner 1772, feature identification 1774, pattern recognition 1776 and image editor 1778 refer to U.S. 2012/0163656 filed on Jun. 28, 2012 entitled "Method/Apparatus for image-based positioning" by Soubra et al, having Attorney Docket No. TRMB-A2194, and assigned to the assignee of the present application. Refer also to the contents of U.S. 2012/0330601 filed on Feb. 15, 2012 entitled "Determining Tilt Angle and Tilt Direction Using Image Processing" by Soubra et al, and assigned to the assignee of the present application.

Figure 18:
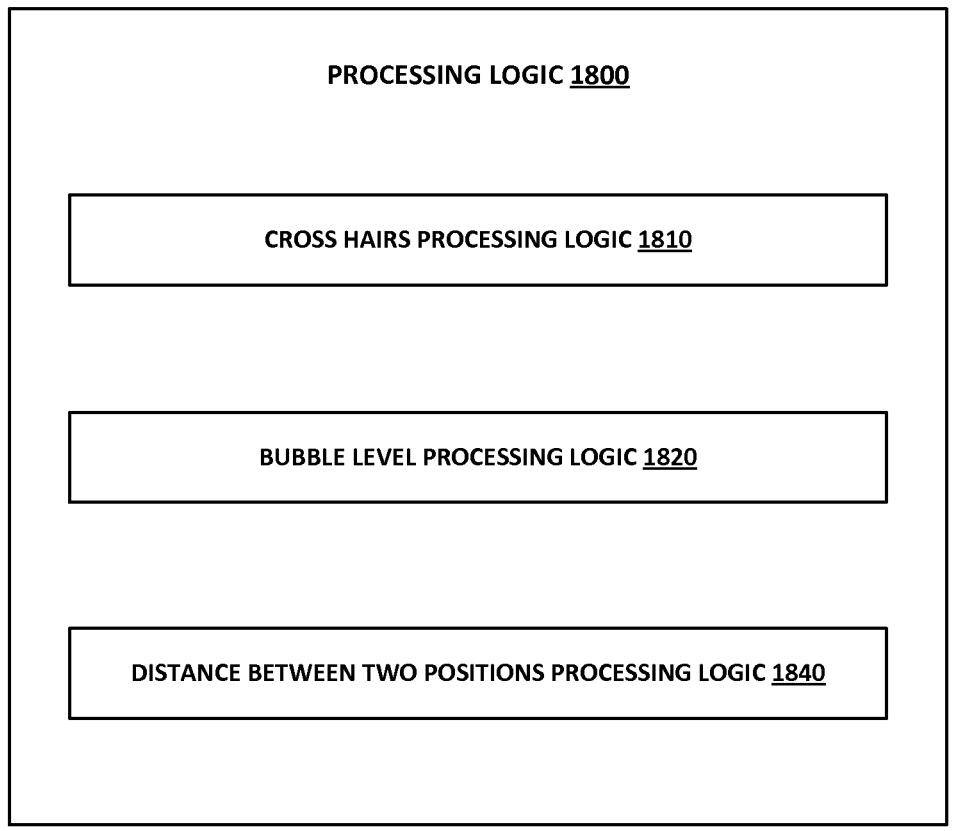
FIG. 18 depicts processing logic, according to one embodiment.

FIG. 18 depicts processing logic, according to one embodiment. The processing logic 1800 can be included in either processing logic 1480 or 1570 of a mobile data collection platform 1400, 1500. According to one embodiment, the processing logic 1800 is part of the mobile data collection platform 1400, 1500 and outside of the GNSS chipset 1413.

Referring to FIG. 18, the processing logic 1800 includes crosshairs processing logic 1810, bubble level processing logic 1820, and distance between two positions logic 1840. The processing logic 1800 may include processing logic 1480 or processing logic 1570 or a combination thereof.

The crosshairs processing logic 1810 receives and processes information with respect to a crosshair display overlay, as will become more evident.

The bubble level processing logic 1820 can receive information from the tilt sensor 1442 and use the received information to display a graphical visual representation of a bubble inside of the electronic bubble level overlay, as will become more evident.

According to one embodiment, the distance between two positions processing logic 1840 obtains the position fixes associated with two locations that a mobile data collection platform took images of a point of interest and determines a distance between the two locations based on the position fixes.

According to one embodiment, one or more of the processing logics 1480, 1570, 1800 are executed by one or more hardware processors 1460 that are part of the mobile data collection platform 1400 and outside of the GNSS chipset 1413.

Figure 19:
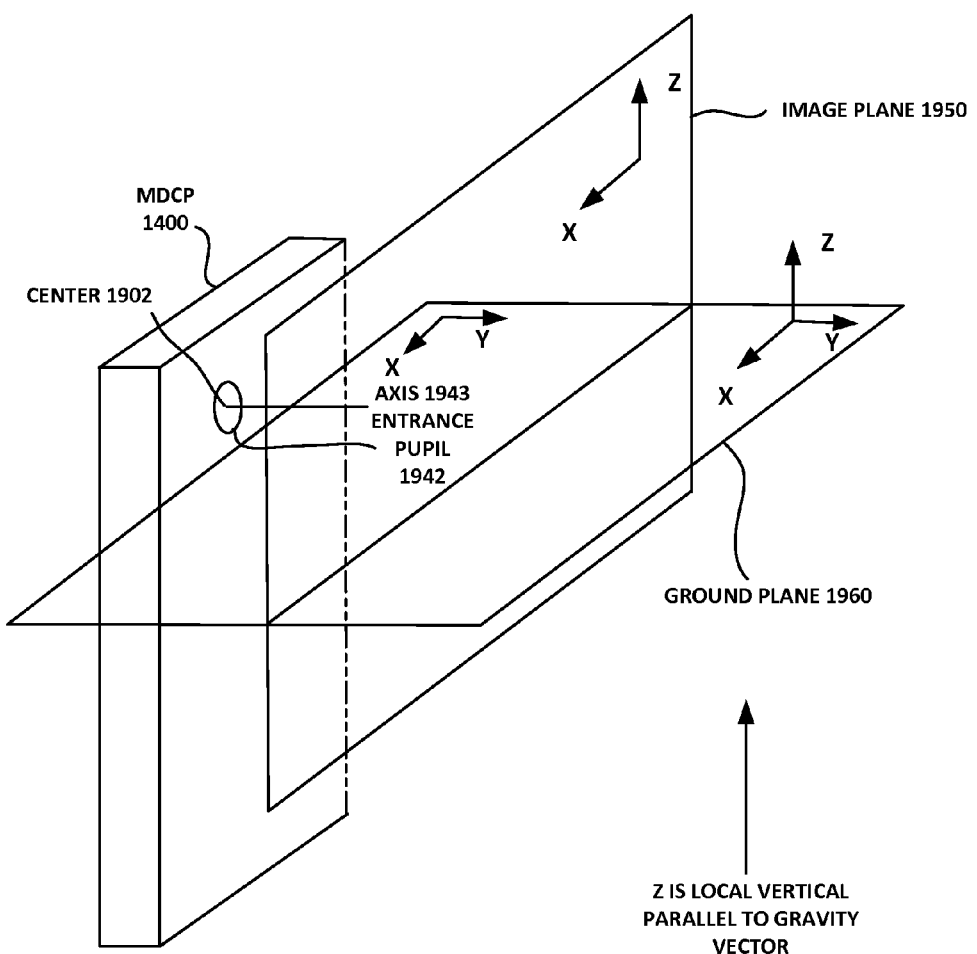
FIG. 19 depicts an image plane relative to an image capture device, according to one embodiment.

FIG. 19 depicts a mobile data collection platform 1400 oriented according to one embodiment. The mobile data collection platform 1400 includes an entrance pupil 1942 (of its image capture device 1430) and an axis 1943 that is at the center 1902 of the entrance pupil 1942. Three axes x, y and z are depicted in FIG. 19. The x axis runs approximately parallel to the ground and parallel to the longer side of mobile data collection platform 1400. The y axis runs approximately parallel to the ground and parallel to the shorter side of mobile data collection platform 1400. The z axis is vertical to the ground and parallel to the gravity vector, which represents the pull of gravity toward the earth's surface and is widely used in coordinate measurement systems to provide at least one degree of orientation for devices.

Due to the orientation of mobile data collection platform 1400, the image plane 1950 that defines the orientation of an image captured with the image capturing device 1430 of mobile data collection platform 1400 would be defined by the x axis and z axis and the ground plane 1960 that is approximately parallel to the ground would be defined by the x axis and the y axis.

The body of mobile data collection platform 1400 is often tipped so that it is no longer in a vertical orientation. In this case, the image capture device 1430 may view the nearby ground as well as objects in the foreground. No loss of functionality of position shift motion detection occurs for the LMM system.

Photogrammetry is the practice of determining the geometric properties of objects from photographic images. In the simplest example, the distance between two points that lie on a plane parallel to the photographic image plane can be determined by measuring their distance on the image, if the scale s of the image is known. This is done by multiplying the measured distance by a scale factor 1/S.

One way of finding points uses features to identify the desired object, or point on a desired object. An example of an object is a door and an example of points on the object are the corners of the door. The points may be described by a "feature description" of the object. For example, the door's corners may be represented by a small collection of closely associated details, or image 'bits' which form a distinct and recognizable image pattern. Modern image processing methods are available for identifying such grouping of image bits as "feature points."

Calibrating the Mobile Data Collection Platform

According to one embodiment, there are two types of calibration that enable satisfactory operation of an image capturing device 1430 with photogrammetric analyses. The first type of calibration is a determination of the angular displacement associated with each pixel, or charge coupled device capture element. This may be done mathematically, for example, by determining the entire field of view of the image capturing device using external means, and then dividing this angular field of view by the number of pixel elements in each dimension, horizontally and vertically. This external mathematical means is well known in the art and includes measuring a distance from a reference plane, such as a wall, to the entrance pupil of the image capturing device, and then marking the edges of the field of view, horizontally and vertically, for example, on the image plane (also known as a "reference plane"). The distance from each edge, horizontally and vertically, plus the distance from the entrance pupil to the image plane, enable creation of a triangle whose angles for horizontal and vertical, can be determined, thus, defining the field of view in horizontal and vertical planes relative to the image plane. An example of an image plane is illustrated in FIG. 19.

The second type of calibration deals with lens aberrations. Image capturing devices that are a part of cellular devices (also referred to as "internal image capturing devices") typically have poor quality lenses where the image is distorted by a variety of lens aberrations, so that what is a uniform distance metric in an image, such as a checkerboard square pattern, becomes less uniform, particular near the edges of the field of view. Therefore, according to one embodiment, the image capturing device, namely the camera and its lens, must be calibrated.

Calibration can be done for a family of lenses associated with a particular image capturing device, or may be done on an individual basis for each mobile data collection platform. The purpose of calibration is to 1) limit the useful area of the captured image data to only those pixels on the charge-coupled device (CCD) that have a satisfactorily uniform image transform from the real world to the image capturing device's collection of CCD pixels, or 2) to define the variation of transform information for the entire field of view in order to create a correction map for segments of pixels where distortion is greatest, namely at the periphery of the field of view.

Figure 20:
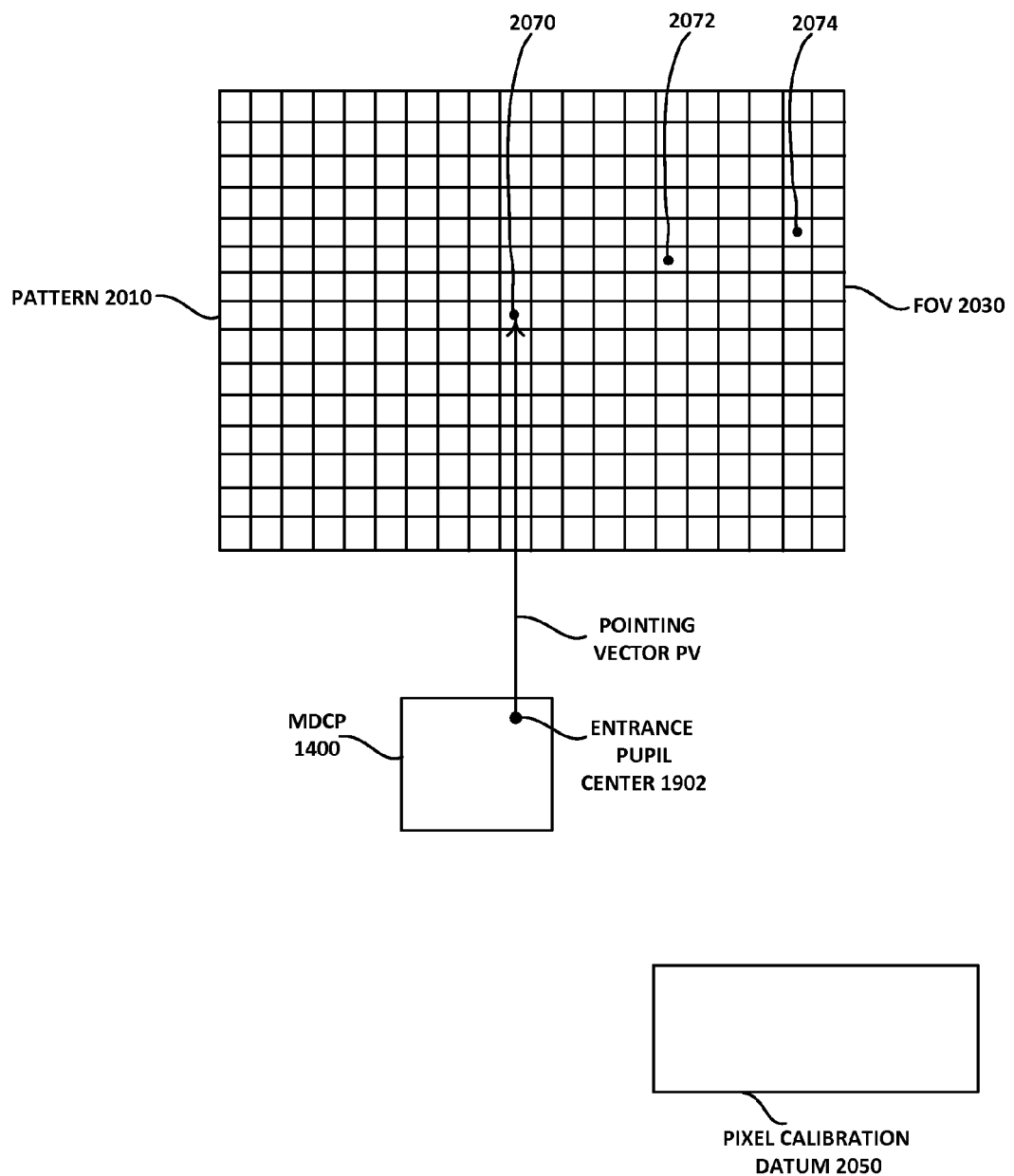
FIG. 20 depicts a pattern that can be used for calibrating a mobile data collection platform, according to one embodiment.

FIG. 20 depicts a pattern 2010 that can be used for calibrating a mobile data collection platform, according to one embodiment. According to one embodiment, the pattern 2010 is a pattern of features. The features may each have the same shape or size, or a combination thereof. As depicted in FIG. 20, the pattern 2010 is formed by a checker board square where each checker is a square. As depicted in FIG. 20, there are enough features (e.g., checkerboard squares) to fill the image capturing device's entire field of view (FOV) 2030.

As stated, poor quality lenses cause aberrations and/or distortions. For example, if an image of the pattern 2010 is captured using a poor quality lens, the features, such as the checkers in FIG. 20, depicted in the image will not have the same proportions as the pattern 2010. The distortion tends to increase toward the peripheries of the lens (also known as "stretch distortion"). The kind and range of distortions in lenses are well-known in the image processing arts. For example, toward the center of the captured image, the dimensions of the checkers will tend to be 1.00 by 1.00. However, the dimensions of the checkers will increasingly be distorted the further the checkers are from the center. For example, the checker 2070 at the center may have a height of 1.00 and a width of 1.00 and then as moved out the checker 2072 may have a height of 1.00 and a width of 1.05 and then as move still further toward the periphery the checker 2074 may have a height of 1.00 by width of 1.06. The pixel correction datum 2050 is a correction map for segments of pixels where distortion is greatest, namely at the periphery of the field of view 2030, according to one embodiment. The pixel correction datum 2050 can be stored in the hardware memory 1450.

There are other types of distortion effects besides a linear stretching, such as pin cushion and barrel distortions, for which alternate specifications for a distortion limit are available, as is well known in the art.

Figure 21:
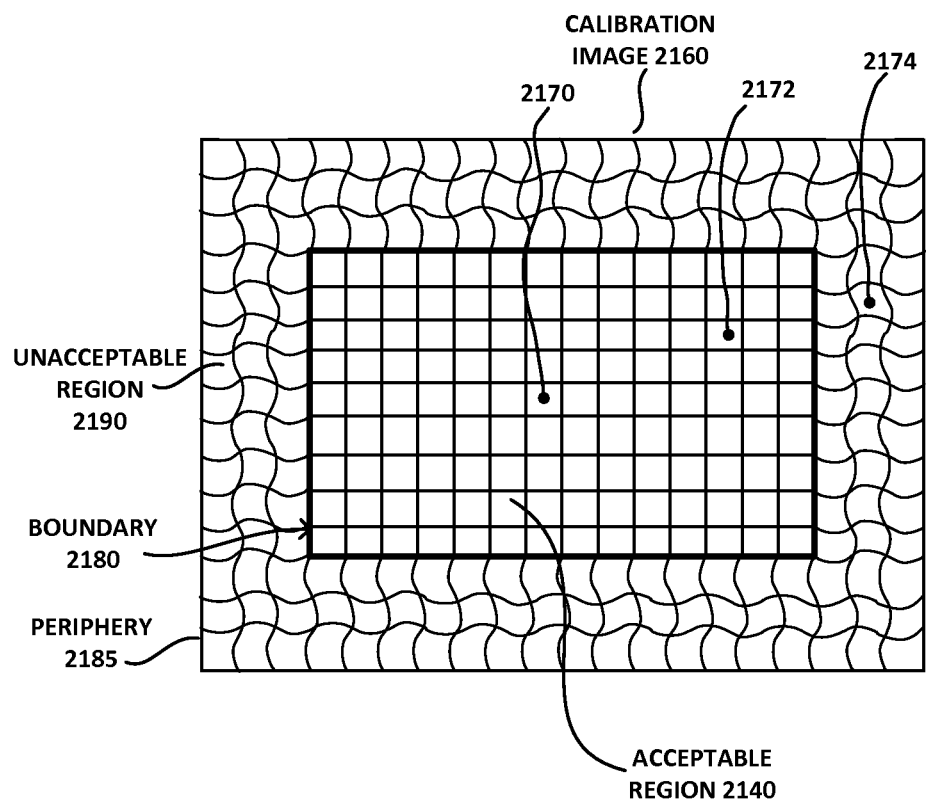
FIG. 21 depicts a calibration image that is an image that the image capturing device took of the pattern depicted in FIG. 20, according to one embodiment.

FIG. 21 depicts a calibration image 2160 that is an image that the image capturing device 1430 took of the pattern 2010 depicted in FIG. 20, according to one embodiment. The calibration image 2160 has an unacceptable level of distortion between the boundary 2180 of the acceptable region 2140 and the periphery 2185.

According to one embodiment, a quality threshold metric is used to determine the acceptable region 2140, within the boundary 2180, where the distortion is within an acceptable level. For example, if the calibration image 2160 displaying the width of the squares as move toward the periphery do not differ by more than 5 percent from the width of a square closest to the pointing vector PV, then the pixels for that square are included in the acceptable region 2140. According to another embodiment, if the width of the squares nearing the periphery 2185 do not differ by more than 2 percent from the width of the square 2070 closet to the pointing vector PV (FIG. 20), then the pixels for that square 2070 are included in the acceptable region 2140. Thus, a boundary 2180 can be determined for the CCD image capturing device such that image data in the acceptable region 2140 inside the boundary 2180 is used for photogrammetry analysis purposes, and unacceptable region 2190 between the boundary 2180 and the periphery 2185 is ignored.

According to one embodiment, calibrations are not performed for every single mobile data collection platform that is manufactured. According to one embodiment, calibrations are performed for each type of mobile data collection platform. For example, if there are two types of mobile data collection platforms that are manufactured and there are 1000 mobile data collection platforms for each of the two types, two calibrations are performed instead of 2000. According to one embodiment, calibrations are performed for each type of lens or are performed for each type of image capturing device.

A mobile data collection platform can be calibrated, for example, before it is purchased or after it is purchased. The mobile data collection platform can be calibrated, for example, at the manufacturing facility or by a user who bought the mobile data collection platform.

GNSS Raw Observables

A mobile data collection platform 1400, 1500 accesses an internal GNSS chipset 1413, extracts raw observables from the internal GNSS chipset 1413 and determines a position fix Xpf, Ypf, Zpf based on the extracted raw observables, according to various embodiments described herein. The extracted raw observables can include raw pseudoranges. Although various embodiments are described in the context of a "GPS position fix," since various position fixes are determined based on GNSS raw observables, the term "GNSS" shall be understood as including "GPS."

"Raw observables" shall be used to refer to the specific data comprising raw observables that are extracted from the internal GNSS chipset. The raw observables can include real carrier phase information or Doppler Shift Information. The raw pseudoranges may be smoothed based on real carrier phase information or reconstructed carrier phase information, according to various embodiments described herein. The pseudoranges may be corrected, for example, based on external corrections obtained from correction sources that are external to a mobile data collection platform, as described herein. A position fix may be smoothed based on locally measured movement information, as described herein. The pseudoranges that are used for determining a position fix of the mobile data collection platform may be uncorrected unsmoothed pseudoranges, corrected unsmoothed pseudoranges, uncorrected smoothed pseudoranges, or corrected smoothed pseudoranges, as described herein. The position fixes may or may not be smoothed based on locally measured movement information, as described herein.

Point of Interest—Real or Pseudo

A data collection platform 1400, 1500 captures an image 1452 that depicts a point of interest for the purpose of determining a distance between a three dimensional position of the data collection platform 1400, 1500, such as the three dimensional position of the entrance pupil center, and the point of interest, by photogrammetric methods. Other dimensions between other points in the image may also be determined.

According to one embodiment, a point of interest is stationary. According to one embodiment, a point of interest has a three dimensional coordinate. Examples of a point of interest are corners, in an outdoor setting or indoor setting, wall-mounted fixture of various kinds, such as lights, switches, window ledges, window corners, in an indoor setting, a property boundary point, a point of significance to a current or proposed construction project, and/or the like. A point of interest is also commonly referred to as "target point," or "object point." A point of interest may be any point on an object that is of interest. It may be a topographic feature, a manmade structure, or component thereof, such as a corner of a building, the edge of a wall, the point at which either of these contacts the ground. A single pixel or a group of pixels in an image 1452 can represent or be a point of interest.

Points of interest on moving objects may also be captured by the mobile data collection platform. With the mobile data collection platform, time of data capture, location of the platform, and an image of the moving object can be obtained. Such mobile points of interest may include features on a vehicle including but not limited to door handles, wheels, logos, emblems, windows, edges, or corners.

According to one embodiment, the pointing vector represents a line that points from the entrance pupil center to the point of interest. However, embodiments are also well suited for using a point of interest that the pointing vector was not pointing directly at as long as the point of interest is in the image 1452. For example, if the pointing vector is not pointing at the real point of interest, then the point that the pointing vector is pointing at can be used as a "pseudo point of interest." The real point of interest that is also depicted in the image can be identified, for example, in relation to the pseudo point of interest. The pseudo point of interest can be represented by a single pixel or a group of pixels in an image 1452 where the single pixel or the group of pixels represents anything in the field of view captured with the image 1452. For example, a pseudo point of interest can be any type of point or feature that a point of interest can be. Further, the pseudo point of interest may represent something that is not a real point of interest. For example, the pseudo point of interest may be anywhere on a wall where there are no corners, windows or doors, or other features.

Photogrammetric techniques that are well known in the art can be used to determine the three dimensional location of the real point of interest, for example, based on the three dimensional relationship between the real point of interest and the pseudo point of interest, and angles and scale factors determined during a data capture event.

A real point of interest and/or a pseudo point of interest can be selected after or before the image 1452 has been captured.

Orientation Information

A mobile data collection platform 1400, 1500 has an orientation when an image capturing device 1430 captures an image 1452 that depicts a point of interest. The orientation of the mobile data collection platform 1400, 1500 when the image 1452 is captured is stored as orientation information 1456. Examples of orientation information 1456 includes one or more of tilt angle and tilt direction, as determined by the azimuth angle given by the internal compass 1444. Inertial orientation information 1458 includes tilt angle.

The tilt angle refers to an angle between a real world vertical axis (e.g., local gravity vector) and a vertical axis of the mobile data collection platform. The tilt direction refers to orientation, typically relative to the local vertical axis, in the x and y directions, or may be represented in a polar coordinate system Azimuth angle (or referred to as just "azimuth") refers to an angle between a reference direction and a line from the user of the mobile data collection platform to the point of interest, as projected on the same plane as the reference direction, typically a horizontal plane. Examples of a reference direction are true north, magnetic north or a reference target at a known location, from which the direction vector can be determined, for example.

Figure 22:
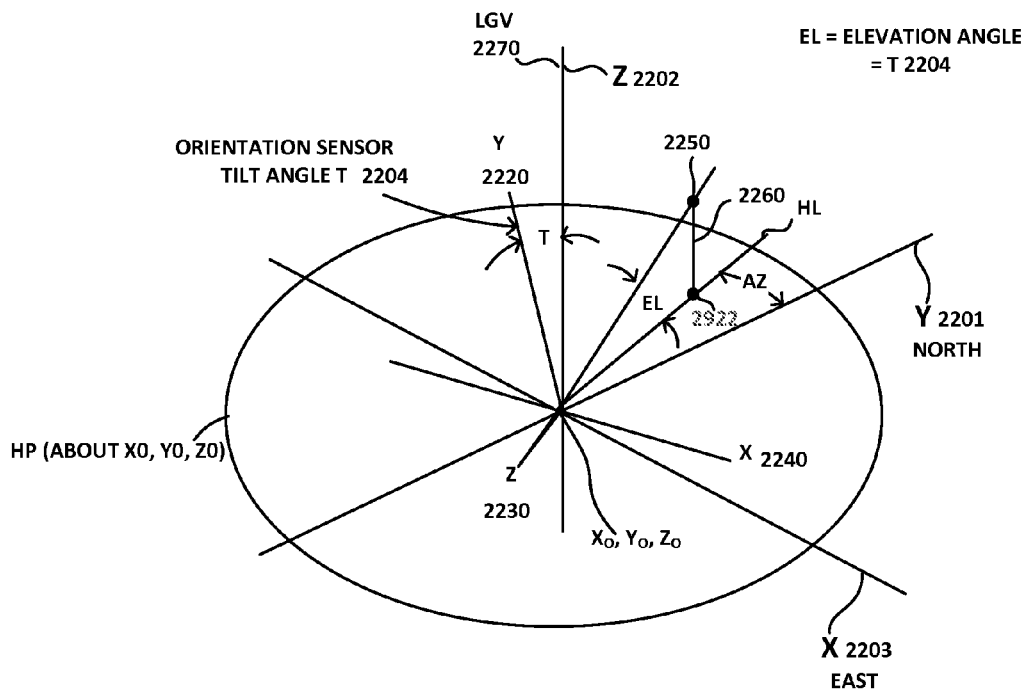
FIG. 22 depicts a three dimensional view of relationships between the local coordinate system (also known as the "earth coordinate system"), the platform coordinate system of a mobile data capturing device, and a pointing vector of an image capturing device, according to one embodiment.
Figure 22:
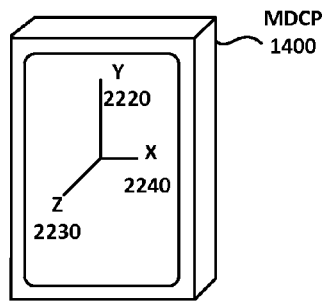
Figure 22:
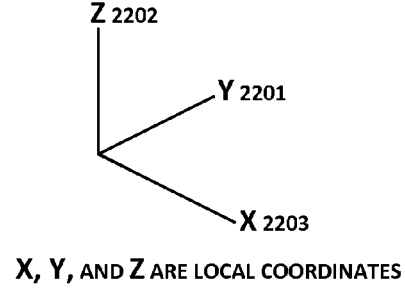

FIG. 22 depicts a three dimensional view of relationships between the local coordinate system, the platform coordinate system of a mobile data capturing device, and a pointing vector of an image capturing device 1430, according to one embodiment.

FIG. 22 depicts the local coordinate system that is represented by X local axis 2203, Y local axis 2201 and Z local axis 2202, the platform coordinate system that is represented by x platform axis 2240, y platform axis 2220, z platform axis 2230, the three dimensional coordinates X0, Y0, Z0 of the entrance pupil center, a point of interest 2250, a horizontal plane HP, the pointing vector PV, the horizontal line HL, an azimuth angle AZ, an elevation angle EL, and a tilt angle T 2204.

The local coordinate system includes the X local axis 2203, which represents east, the Y local axis 2201, which represents north, and the Z local axis 2202, which represents the local gravity vector 2270.

The platform coordinate system of the mobile data collection platform 1400 includes the x platform axis 2240, the y platform axis 2220, and the z platform axis 2230. According to one embodiment, the y platform axis 2220 is parallel with the MDCP 1400's length, the z platform axis 2230 is parallel with the MDCP 1400's depth and the x platform axis 2240 is parallel with the MDCP 1400's width.

One end of the pointing vector PV is located at the entrance pupil center X0, Y0, Z0 of the image capturing device 1430 and the other end of the pointing vector PV is located at the point of interest 2250 or a pseudo point of interest. The pointing vector PV lies along the center line of the axis of the lens and its pupil.

The horizontal plane HP is about the three dimensional coordinates X0, Y0, Z0 of the entrance pupil's center. The horizontal line HL is in the horizontal plane HP. One end of the horizontal line HL is located at the entrance pupil center's coordinates X0, Y0, Z0. The horizontal line HL is directly below the pointing vector PV so that the horizontal line HL and the pointing vector PV are in the same vertical plane.

The tilt angle T 2204 is between the Z local axis 2202 and the y platform axis 2220. The azimuth angle AZ is between the Y local axis 2201 (north) and the horizontal line HL. The elevation angle EL is between the horizontal line HL and the pointing vector PV. According to one embodiment, the tilt angle T 2204 and the elevation angle EL measure have the same measurement, by congruent triangles. Therefore, the measurement of the tilt angle T 2204 can be used as the measurement of the elevation angle EL.

Point 2922 is located in the horizontal line HL and is directly below the point of interest 2250. There is a distance 2260 between the point of interest 2250 and the point 2922. The line that represents the distance 2260 is parallel with the local gravity vector 2270.

The pointing vector PV is in the negative direction of the z platform axis 2230. The x platform axis 2240 and the y platform axis 2220 are horizontal and vertical measurements of the image view. For example, the y platform axis 2220 is the vertical dimension of an image 1452 and the x platform axis 2240 is the horizontal dimension of the image 1452.

Figure 23:
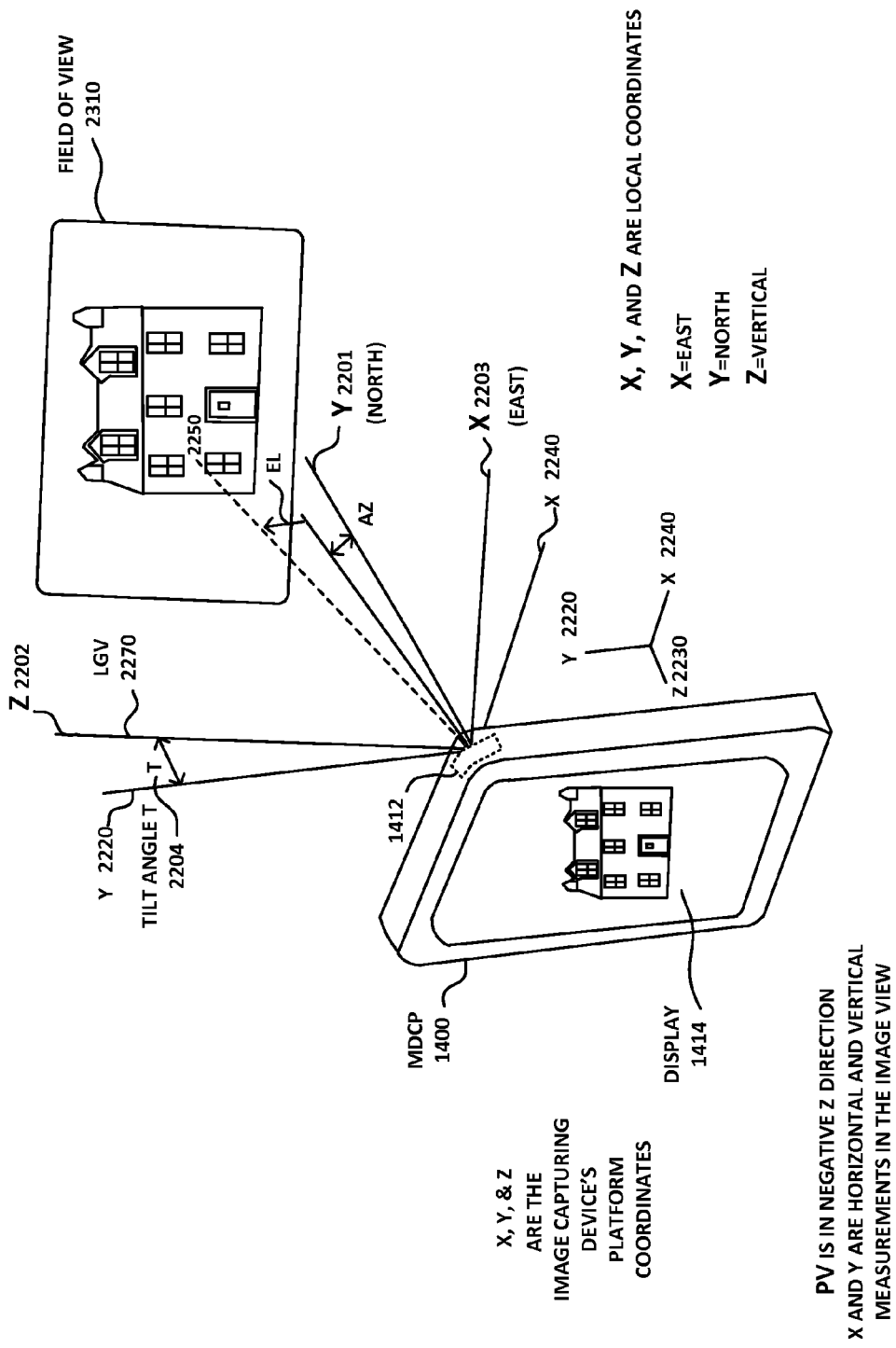
FIG. 23 depicts a three dimensional view of a mobile data collection platform (MDCP) that is being used to perform data collection, according to one embodiment.

FIG. 23 depicts a three dimensional view of a mobile data collection platform (MDCP) that is being used to perform data collection, according to one embodiment.

FIG. 23 depicts a mobile data collection platform 1400 taking a picture of a house in a field of view 2310. The house appears on the MDCP 1400's display 1414. The antenna 1412, according to one embodiment, is inside the MDCP 1400's casing (also referred to as "an internal antenna"). A casing may also be referred to as a housing. An antenna 1412 may be a bent wire that is inside the MDCP 1400's casing and is a proprietary element of the vendor of the mobile data collection platform 1400.

According to one embodiment, the mobile data collection platform 1400 is or includes a tilt sensor that is 2 or 3-axis accelerometer. Typically modern smart phones and tablets include a 2 or 3-axis accelerometer. Therefore, the mobile data collection platform is sensing the earth's gravity vector, and as a result can automatically perform the same function that is manually performed for a typical optical total station that is known as "leveling." Therefore, a mobile data collection platform can determine the tilt angle T 2204 as measured from a local gravity vector 2270, which is vertical, for any orientation of the mobile data collection platform 1400.

The body of a mobile data collection platform 1400 and its principal axes 2220, 2230, 2240 are not the same axes that are represented in the local coordinates. As discussed herein, the local gravity vector 2270 is used as the Z local axis 2202, true north is used as the Y local axis 2201, and east is used as the X local axis 2203, as depicted in FIG. 23. The axes of the platform coordinate system are the x platform axis 2240, the z platform axis 2230 and the y platform axis 2220, as depicted in FIG. 23, and are the principal axes of the body of the mobile data collection platform 1400.

According to one embodiment, when a user points their mobile data collection platform 1400 at a point of interest 2250, the mobile data collection platform 1400 has a vector direction along the optical axis of the image capturing device 1430, which may be referred to as one of the principal axes of the mobile data collection platform 1400. Herein it is referred to as the pointing vector PV, but may also be referred to as a "negative z platform axis 2230." In this case, the image displayed on the display 1414 represents an x and y pair of platform axes 2220, 2240. According to the right hand rule, x platform axis 2240 may represent the horizontal directions, y platform axis 2220 may represent vertical directions, which are parallel to the local gravity vector 2270 or the Z vector 2202 of the local coordinate system. Therefore, z platform axis 2230 may represent negative direction towards the point of interest 2250 and the positive z platform axis 2230 direction in the platform coordinate system is toward the user of the mobile data collection platform 1400, not toward the point of interest 2250.

Because of the capability of a tilt sensor that is 2 or 3-axis accelerometer, the orientation of the mobile data collection platform 1400 relative to the local gravity vector 2270 in the local coordinate system is always available. The tilt angle T 2204 as measured from the local gravity vector 2270 to the z platform axis 2230 (also known as the vector direction along the optical axis) is independent of the orientation of the mobile data collection platform 1400 about the optical axis depicted as pointing vector PV in FIG. 23. Therefore, any rotation of the mobile data collection platform 1400 about the optical axis PV does not affect the tilt angle 2204. The tilt angle T 2204 may be displayed on the display 1414. The tilt angle 2204 may be extracted from the tilt sensor 1442, for example, using an API from a suite of API's that the tilt sensor 1442 provides.

Figure 27:
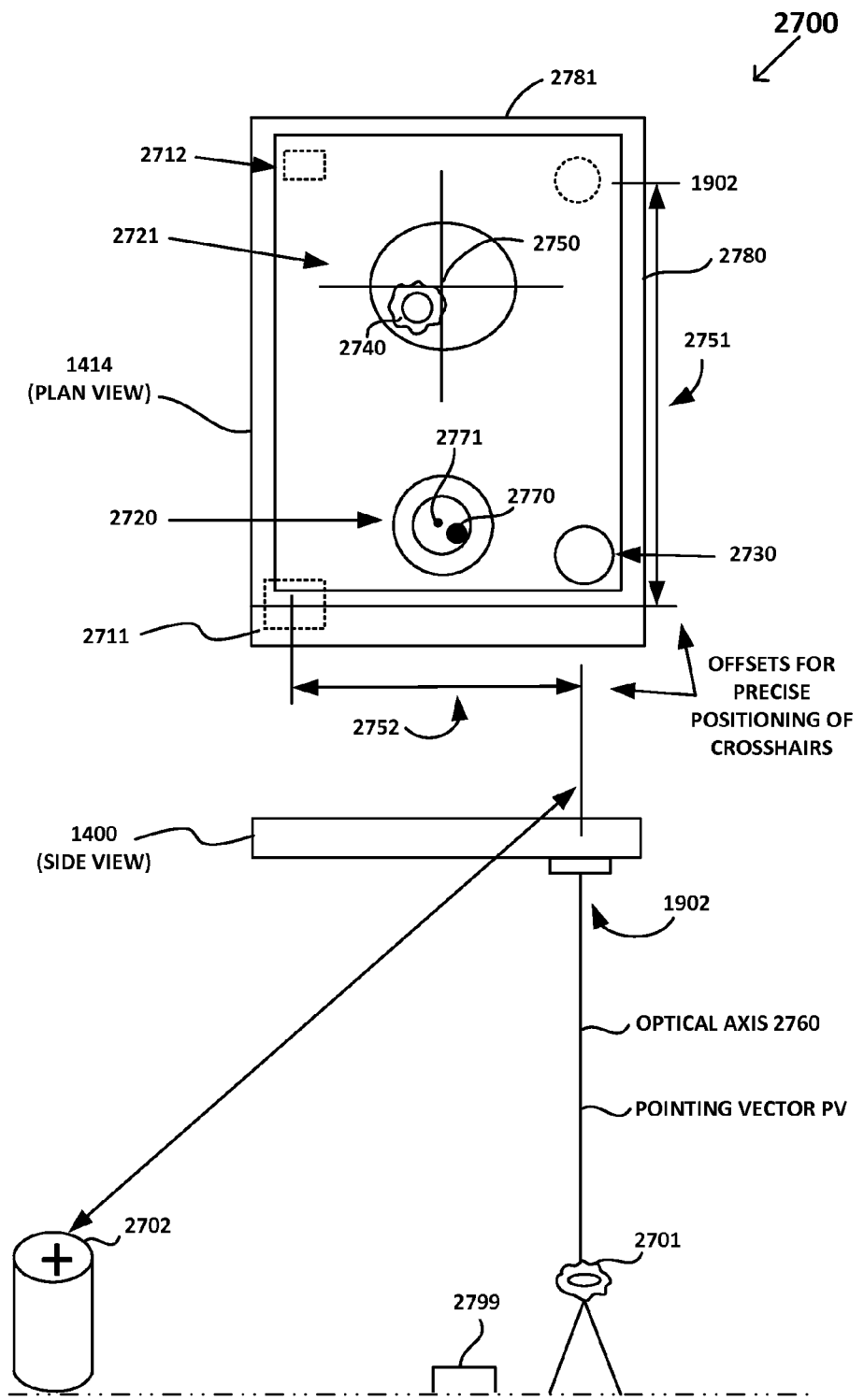
FIG. 27 depicts a graphical user interface that can be displayed on the mobile data collection platform's display, according to one embodiment.

Due to the independence between the tilt angle T 2204 and the orientation of the mobile data collection platform 1400 about the optical axis PV, the handheld operation of the mobile data collection platform 1400 is foolproof with respect to measuring a vertical tilt angle T 2204 towards a point of interest, as centered by appropriate manipulation of the mobile data collection platform 1400 towards the point of interest 2250. The mobile data collection platform 1400 may be rotated about the optical axis PV and the determination of the tilt angle T 2204 determination and resulting determination of the elevation angle EL will always be the same, for example, as long as the photographic image 2740 of the point of interest 2250 is visible within the crosshair display overlay 2721, as depicted in FIG. 27. Therefore, handheld operation of the mobile data collection platform 1400 is greatly simplified and no tripod or monopod is required.

According to one embodiment, there are no intermediate operations required to determine the tilt angle 2204. If the point of interest 2250 is in the center 2750 of the crosshairs display overlay 2721, then the tilt angle 2204 with respect to the point of interest 2250 is defined. If the point of interest 2250 is not in the center 2750 of the crosshairs display overlay 2721 (also referred to as "misalignment of the point of interest with respect to the crosshairs center"), the misalignment can be compensated for based on the number of pixels in the image from a pixel in the image that is represented by the center 2750 to a location of a pixel that represents the point of interest 2250 in the image and applying the angular correction appropriate for each pixels angular displacement.

Because the tilt angle T 2204 that is obtained from the tilt sensor 1442 is measured with respect to the local gravity vector 2270, by congruent triangles, this tilt angle T 2204 is exactly the same as the elevation angle EL that is used for polar coordinate operations to convert the mobile data collection platform's data into the local coordinates.

Spatial Relationships with Respect to a Mobile Data Collection Platform

The position fix of a mobile data collection platform 1400 is determined at the location of the antenna 1412. However, the position of an image is defined to be at the entrance pupil of the mobile data collection platform. The local gravity vector and the tilt angle are determined using the orientation system 1470. Information relating the geometric relationship between the entrance pupil and the antenna (also referred to as "antenna-to-entrance-pupil-center-geometric-information" or "known spatial relationship") can be used, according to various embodiments.

Figure 24:
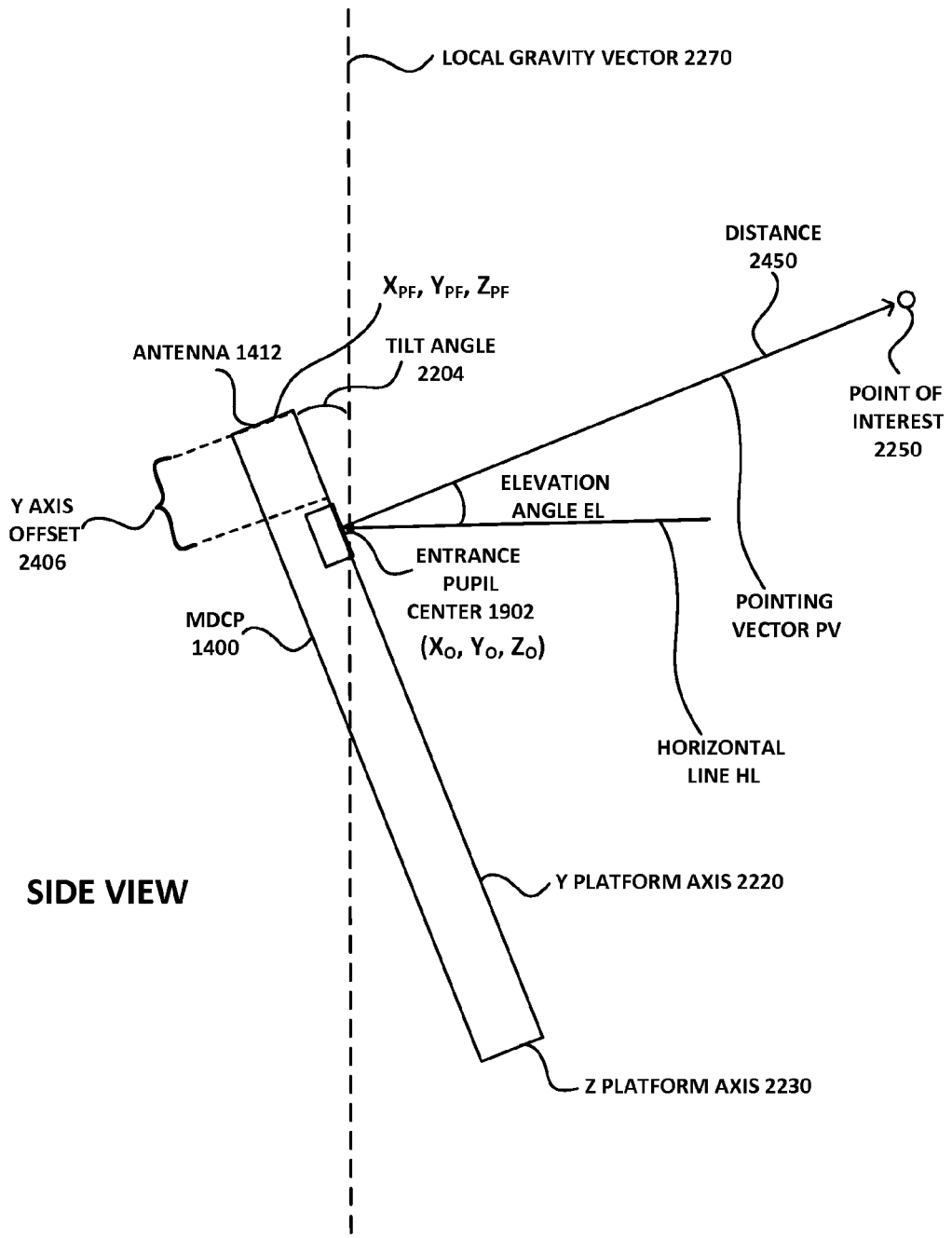
FIG. 24 depicts a side view of a mobile data collection platform, according to one embodiment.

FIG. 24 depicts a side view of a mobile data collection platform, according to one embodiment. The mobile data collection platform 1400 that includes an antenna 1412 and an entrance pupil with an entrance pupil center 1902. FIG. 24 also depicts the local gravity vector 2270, the pointing vector PV, the horizontal line HL, the three dimensional position Xpf, Ypf, Zpf, the three dimensional position X0, Y0, Z0, the tilt angle 2204, the elevation angle El, the y platform axis 2220, and the z platform axis 2230.

The y platform axis 2220 is oriented along the length of the mobile data collection platform 1400 and the z platform axis 2230 is oriented along the depth of the mobile data collection platform 1400. The horizontal line HL is horizontal with ground level and the entrance pupil center 1902 is one end of the horizontal line HL.

The pointing vector PV is from the entrance pupil center 1902 to the point of interest 2250 and the distance 2450 is between the entrance pupil center 1902 and the point of interest 2250. The pointing vector PV is perpendicular to the front face of the mobile data capturing platform 1400. For example, the pointing vector PV is at a right angle with both the y platform axis 2220 and the x platform axis 2240.

The line 2270 is an imaginary line that represents the local gravity vector 2270. The tilt angle 2204 and the tilt direction are used to place the imaginary line that represents the local gravity vector 2270 through the center 1902 of the entrance pupil. The imaginary line that represents the local gravity vector 2270 could be drawn other places besides through the entrance pupil center 1902 based on the tilt angle 2204 and tilt direction.

The elevation angle El is the angle between the horizontal line HL and the pointing vector PV. The tilt angle 2204 is the angle between the local gravity vector 2270 and the y platform axis 2220.

FIG. 24 depicts a y axis offset 2406 between the antenna 1412 and the entrance pupil center 1902. The GPS position fix coordinates Xpf, Ypf, Zpf are the three dimensional position of the antenna 1412 in the GNSS coordinate system. The coordinates X0, Y0, Z0 represent the three dimensional position of the entrance pupil center 1902 in the local coordinate system.

Figure 25:
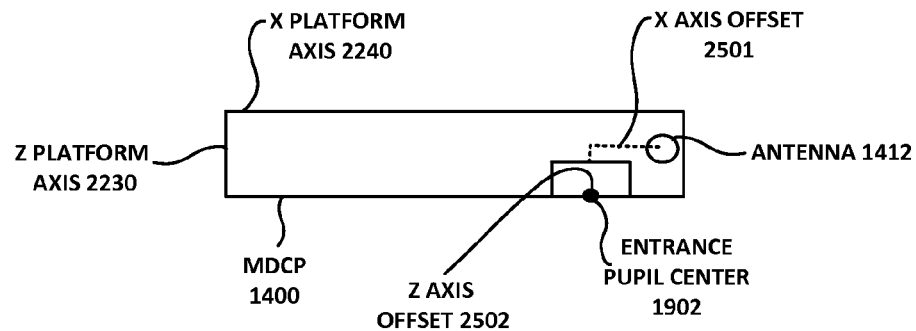
FIG. 25 depicts a top view of a mobile data collection platform (MDCP), according to one embodiment.

FIG. 25 depicts a top view of a mobile data collection platform (MDCP) 1400, according to one embodiment. FIG. 25 depicts the antenna 1412, the entrance pupil center 1902, the x axis offset 2501 between the antenna 1412 and the entrance pupil center 1902 and the z axis offset 2502 between the antenna 1412 and the entrance pupil center 1902. FIG. 25 also depicts the x platform axis 2240 and the z platform axis 2230. According to one embodiment, the x platform axis 2240 is the width of the MDCP 1400 and the z platform axis 2230 is the depth of the MDCP 1400.

Figure 26:
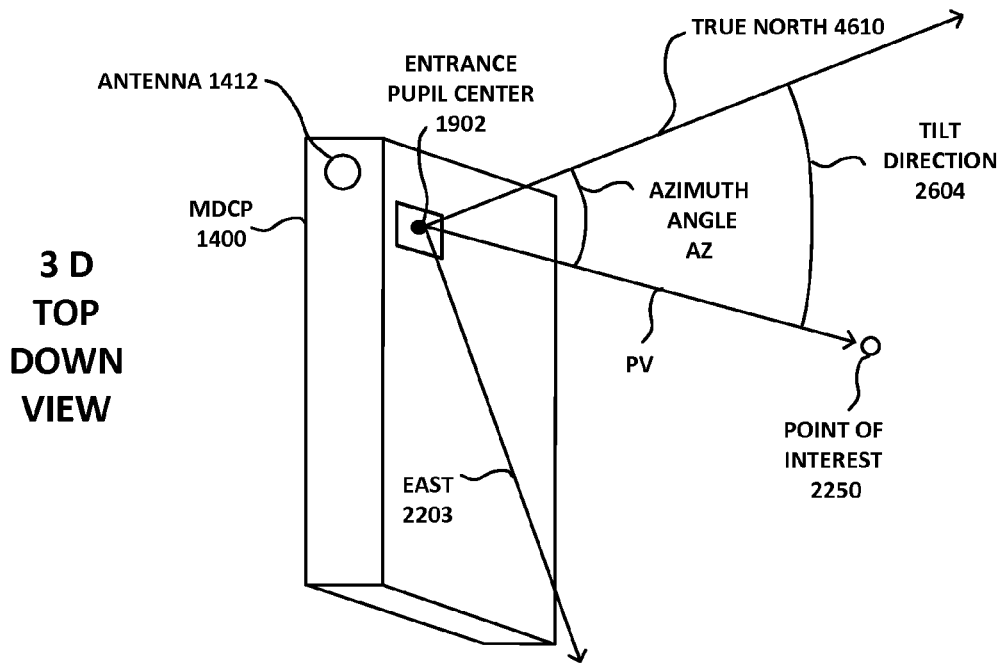
FIG. 26 depicts a three dimensional top view of a mobile data collection platform, according to one embodiment.

FIG. 26 depicts a three dimensional top view of a mobile data collection platform 1400, according to one embodiment. FIG. 26 also depicts the entrance pupil center 1902, true north 2610, east 2203, the pointing vector PV, and the point of interest 2250. The projection of the pointing vector PV onto the horizontal plane gives the azimuth angle AZ between the pointing vector PV and true north 2610. The azimuth angle AZ is used as the tilt direction 2604, according to one embodiment, as described herein.

According to one embodiment, z platform coordinate system is defined by x, y, z platform axes (or also referred to as "axes" of the "platform coordinate system") associated respectively with the three sides of a mobile data collection platform 1400. The mobile data collection platform 1400 can be tilted with respect to one or more of the x, y and z platform axes 2240, 2220, and 2230 of the platform coordinate system. The tilt angle 2204 and tilt direction 2604 reflect the tilt of the mobile data collection platform 1400 with respect to the one or more x, y and z platform axes 2240, 2220, 2230 of the platform coordinate system, according to one embodiment.

According to one embodiment, the image capturing device is in a known spatial relationship with the mobile data collection platform. For example, one or more of the offsets 2406, 2501, 2502 depicted in FIG. 24 and FIG. 26 or the offsets 2752 and 2751 in FIG. 27 can be used for defining the known spatial relationship between the image capturing device and the mobile data collection platform. According to one embodiment, the known spatial relationship is also a known physical relationship or a known physical spatial relationship.

The antenna-to-entrance-pupil-center-geometric-information may be used to translate the GNSS position fix Xpf, Ypf, Zpf from the antenna 1412 to the position of the entrance pupil center 1902 or vice versa. Any combination of the GNSS position fix Xpf, Ypf, Zpf and the position X0, Y0, Z0 of the entrance pupil center 1902 can be related to each other using one or more of y axis offset 2406, x axis offset 2501, and z axis offset 2502.

Referring to one or more of FIG. 24, FIG. 25 and FIG. 26, the GPS position fix is a three dimensional position of and obtained from the antenna 1412 in the GNSS coordinate system. As depicted, the GPS position fix is Xpf, Ypf, and Zpf respectively for latitude, longitude and altitude. The local gravity vector 2270, true north 2610, and east are respectively the Z local axis, the Y local axis and the X local axis of the local coordinate system. Note that the local coordinate frame, and the definition just given are not the same as the coordinate frame for the mobile data collection platform. However, data in one coordinate system may be translated into data in the other coordinate system, for example, using known spatial relationships, as discussed herein. X0, Y0, Z0 is the three dimensional position of the entrance pupil center 1902 in the local coordinate system. The known spatial relationship between the antenna 1412 and the entrance pupil center 1902 and the orientation information, which includes the tilt angle 2204 and tilt direction 2604, can be used to translate the GPS position fix Xpf, Ypf, Zpf into the three dimensional position X0, Y0, Z0 of the entrance pupil center 1902 in the local coordinate system. The known spatial relationship (also known as "antenna-to-entrance-pupil-center-geometric-information") between the antenna 1412 and the entrance pupil center 1902 include one or more of the y axis offset 2406, the x axis offset 2501, and the z axis offset 2502.

By way of clarification, the side view of the mobile data collection platform in FIG. 23 shows a reference coordinate system for the platform and for the local coordinate system. This is further exemplified in FIG. 22 where the platform coordinates are shown, and the world coordinates as defined by the local coordinate system are shown.

The Mobile Data Collection Platform is not Required to be Level

According to one embodiment, the mobile data collection platform is not required to be level as a part of capturing an image 1452, determining a position fix 1454 and determining orientation information 1456. The mobile data collection platform may be level if so desired. Leveling may be obtained by adjusting the mobile data collection platform's orientation using a support structure such as a tripod, and using the tilt information to determine a 90 degree platform angle relative to the gravity vector. For example, when both of the platform axes are 90 degrees relative to the local gravity vector, then the mobile data collection platform is level.

However, the mobile data collection platform is not required to be level to determine a tilt angle, as is necessary in a more conventional total station. Further, the tilt angle 2204 is obtained directly 1 regardless of any rotation of the mobile data collection platform with respect to the pointing vector. When making measurements of objects on the ground or below the user, it may be useful to actually level the platform. In this case, both sides of the mobile data collection platform must be perpendicular to the local gravity vector, then the mobile data collection platform is level. However, since the mobile data collection platform provides orientation information via the 2 or 3-axis accelerometer and orientation system, it is not required to be level.

Scale Information—Distance Between Point of Interest and Mobile Data Collection Platform Referring to FIG. 24, scale information that may be used as a part of determining a distance 2450 between the mobile data collection platform 1400 and the point of interest 2250 can also be obtained. The scale information may be the depiction of an object, which has a known dimension, in the captured image. Examples of a known dimension are length, width, and diameter that are known. For example, the dimensions of a ruler or a quarter are known. E.g., a US quarter is 24.3 mm in diameter. In another example, a feature that appears in the image may be measured and the measurement may be used as the scale information. More specifically, one side of a window, a door, or side of a building, for example, that appears in the image could be measured and used as scale information. To do this with a single image capture, the camera must be on a pointing vector line that is perpendicular to the midpoint of the scale object. As this is hard to do, a second image may be captured and processed photogrammetrically. In yet another example, a second image that also depicts the point of interest is captured with the image capturing device at a second location where the first location and the second location are separated by a known distance. In this case, the scale information can include one or more of the first and second images, the first and second locations, such as position fixes, and orientations of the mobile data collection platform when the first and second images were captured, and the known distance between the first and second locations where the two images were captured. The distance between the first and second locations may be determined from the position fixes obtained at those two locations.

According to one embodiment, the scale information is any information that can be used in determining the distance between the point of interest 2250 (FIG. 22 and FIG. 24) and the three dimensional location X0, Y0, Z0 (FIG. 24) of the entrance pupil center 1902. Scale information can also be referred to as "distance-between-point-of-interest-and-mobile-data-collection-platform-information."

According to one embodiment, scale information can be both the depiction of an object with at least one known dimension in an image 1452 and a distance between two positions P1, P2 that two images 1452 of a point of interest 2250 were captured from.

Aiming Aids: Crosshairs and a Bubble Level

Figure 28:
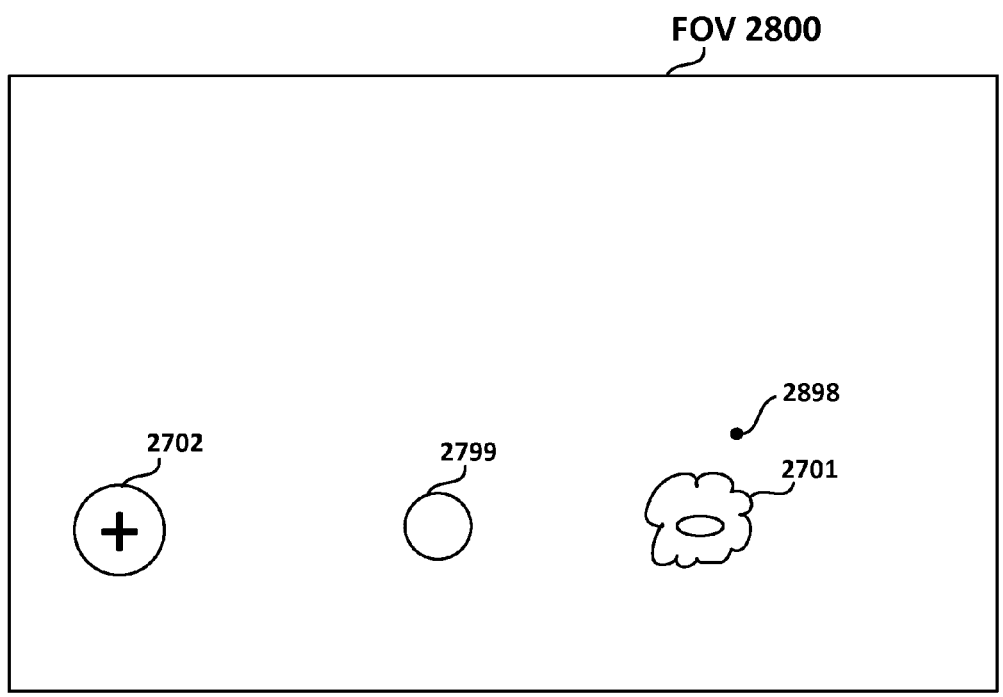
FIG. 28 depicts a top down view of a field of view, according to one embodiment.

FIG. 27 depicts a graphical user interface 2700 that can be displayed on the mobile data collection platform's display 1414, according to one embodiment. As depicted in FIG. 27 and FIG. 28, the user is standing directly over the point of interest 2701 and taking an image 1452 of the point of interest 2701 with their mobile data collection platform 1400. The entrance pupil 1942 is located on the front of the mobile data collection platform 1400. As depicted in FIG. 27, the mobile data collection platform 1400's front is pointing downwards at the ground. 2702, 2799 and 2701 are all within the field of view of the mobile data collection platform 1400 and can be captured in an image 1452.

According to one embodiment, a mobile data collection platform includes a user interface 2700 that can be displayed on the mobile data collection platform's display 1414. FIG. 27 depicts a user interface 2700, according to one embodiment.

2712 is the approximate location of where the GNSS antenna is inside of the mobile data collection platform (MDCP) 1400. The GNSS antenna is typically near the top of the body of the MDCP 1400 and may be located anywhere along the top side of the MDCP 1400.

The user interface 2700 includes a crosshair display overlay 2721 (also referred to as "crosshairs") and a graphical bubble level overlay 2720 (also referred to as "graphical bubble level" or "bubble level").

The crosshair display overlay 2721 depicts a photographic image 2740 of the point of interest 2701. As depicted in FIG. 27, the photographic image 2740 is not in the center 2750 of the intersection of the two crosshairs but instead is slightly down and to the left of the center 2750. If a photographic image of a point of interest is in the center 2750 of the crosshair display overlay 2721, then the optical axis 2760 from the entrance pupil center 1902 is in alignment with the point of interest 2701. The pointing vector PV is coaxial with the optical axis 2760, according to one embodiment. According to one embodiment, if the photographic image 2740 of a point of interest 2701 appears anywhere in the crosshair display overlay 2721 when the user presses the accept data button 2730, the point of interest 2701 is a user selected point of interest.

According to one embodiment, a mobile data collection platform 1400 includes a bubble level processing logic 1820 and an image capturing device 1430. The better the mobile data collection platform 1400 itself is aligned with a point of interest 2701, the better the accuracy of the determined position of the point of interest 2701 may be. In an embodiment, mobile data collection platforms that are equipped with both an image capturing device 1430 and a tilt sensor 1442 may be used to aid in positioning the image capturing device 1430 more precisely over a target point of interest 2701.

FIG. 27 shows the implementation of an aiming aid in a mobile data collection platform which implements improved accuracy using the user interface 2700 in accordance with one embodiment. Mobile data collection platform 1400 is depicted in a side view with a projection of the image capturing device 1430 to a top plan view. As can be seen from the plan view and the side view, the display side of mobile data collection platform 1400 is oriented upward and the opposite side of mobile data collection platform 1400, which includes an image capturing device 1430 with an entrance pupil center 1902, is oriented downward toward a point of interest 2701.

Referring now to FIG. 27, mobile data collection platform 1400 may be held so it is looking downward, over the point of interest 2701 as is shown in FIG. 27. The image 1452 captured depicts, according to one embodiment, the point of interest 2701, the object 2799 and the reference point 2702. In accordance with one embodiment, the bubble level processing logic 1820 provides an aiming/pointing aide such as a graphical bubble level overlay 2720 with a set of concentric circles or concentric squares or other such visual aide around the center 2771 of the graphical bubble level overlay 2720 which can be displayed on the display 1414 of mobile data collection platform 1400, when the image capturing device 1430 is activated and displaying an image 1452. According to one embodiment, the crosshair display overlay 2721 overlays the image 1452 displayed on the display 1414. Similarly, the tilt sensor 1442 may have its output conditioned to display the degree of alignment of the display 1414 with a horizontal plane, one that is perpendicular to a local gravity vector that represents 'vertical.' That is, tilt sensor 1442 may be used as an indicator of how level the body of mobile data collection platform 1400 is, by indicating the tilt angles from vertical in two dimensions, left-right and 'up-down' relative to the view screen of mobile data collection platform 1400 when it is held horizontally with the screen of display 1414 face up. The coordinates are North-South and East-West, in the coordinate space. Alternatively, bubble level processing logic 1820 can display a graphical version of a bubble level, such as the graphical bubble 2770 and the bubble level overlay 2720, in which a small circle representing a 'bubble' is constrained to move within a pair of concentric circles, emulating a mechanical bubble level. The graphical bubble position, as depicted by the bubble 2770, within the pair of circles, as depicted by the bubble level overlay 2720, is moved in proportion to the degree of tilt in the two orthogonal axes 2780, 2781 of the mobile data collection platform 1400.

In an embodiment, a single measurement of the degree of tilt from vertical, given in degrees either from vertical, or from a horizontal plane from the tilt sensor 1442 may be displayed. The direction of the tilt angle as projected on a horizontal plane may be determined from the compass heading, when the tilt of the body of the mobile data collection platform is aligned with the major axis of the body of the mobile data collection platform.

In an embodiment, better accuracy in locating a desired point of interest 2701 may be obtained by incorporating the offset distance (e.g., offset 2752 of FIG. 27) between the entrance pupil center 1902 of image capturing device 1430 and the location of the GNSS/GPS antenna 2711.

In the example depicted in FIG. 27, the photographic image 2740 of the point of interest 2701 is not yet in the exact center 2750 of the aiming crosshairs of the crosshair display overlay 2721. Embodiments are well suited to the photographic image 2740 of the point of interest being located in the center 2750 or not being located in the center 2750, as discussed herein. In FIG. 27, bubble level processing logic 1820 has generated a graphical bubble level overlay 2720 to facilitate a user in aligning the mobile data collection platform 1400 relative to the local gravity vector.

In accordance with one embodiment, bubble level processing logic 1820 can incorporate the offset distances 2751 and 2752 to more precisely determine the coordinates of the point of interest 2701, especially when the photographic image 2740 of the point of interest is in the center 2750 of the crosshair display overlay 2721.

In one embodiment, the position of reference point 2702, and of mobile data collection platform 1400 can be determined using photogrammetric processing of an image captured by mobile data collection platform 1400. For example, in accordance with one embodiment, mobile data collection platform 1400 can access a remotely located database of geo-tagged images, wherein an image of the reference point 2702 is captured by the image capturing device 1430 and delivered to the database of geo-tagged images for matching using photogrammetric processing. Therefore, according to one embodiment, the reference point 2702 is what is referred to as a "georeference point of interest" or a "georeference feature." A position fix for a location of a georeference point of interest is referred to as a "georeference position fix." For more information about georeference points of interest or georeference features and georeference position fix, refer to U.S. 2011/0064312 filed on Sep. 14, 2009 entitled "Image-Based Georeferencing" by Janky et al, and assigned to the assignee of the present application. Once the reference point 2702 has been identified in the database, the coordinates of reference point 2702 can be delivered from the database to mobile data collection platform 1400. The coordinates of the reference point 2702 may be three dimensional coordinates.

Object 2799 is an object of known width or dimensions that can be used for example as scale information. Since the object 2799 has a known width or dimension, it can provide a scale that can be used for determining the distance between the point of interest 2701 and the mobile data collection platform 1400.

Although FIG. 27 has been described in the context of mobile data collection platform 1400, embodiments that pertain to FIG. 27 are suitable for being used for other mobile data collection platforms, such as 1500, as described herein.

FIG. 28 depicts a top down view of a field of view, according to one embodiment. The field of view (FOV) 2800 correlates with the field of view in FIG. 27 and, thus, includes a top down view of the reference 2702, the object 2799, the real point of interest 2701 and a pseudo point of interest 2898. According to one embodiment, the pseudo point of interest is represented as a pixel or a group of pixels in the captured image 1452.

According to one embodiment, the entrance pupil center 1902 is one end of the pointing vector 2760 and the pseudo point of interest 2898 is located at the other end of the pointing vector 2760. Therefore, according to one embodiment, the pixel or group of pixels that represents the pseudo point of interest 2898 would be located at the crosshair display overlay 2721's center 2750.

The processing logic 1800 depicted in FIG. 18, shall now be discussed in the context of FIGS. 27 and 28.

The crosshairs processing logic 1810 receives and processes information with respect to the crosshair display overlay 2721. For example, the crosshairs processing logic 1810 can receive information indicating that a photographic image 2740 of a point of interest 2701 is inside of the crosshair display overlay 2721 and use the received information to mark the point of interest 2701 as a user specified point of interest. In another example, the crosshair display overlay 2721 can be used to measure how closely the axis 2760 with respect to being in alignment with the point of interest 2701. For example, if the photographic image 2740 is right in the center 2750, then the axis 060 is in alignment with the point of interest 2701. If the photographic image 2740 is inside of the crosshair display overlay 2721 but off center, the crosshairs processing logic 1810 can measure how far the photographic image 2740 is from the center 2750 and in what direction. The measurement may be a two dimensional measurement since the crosshair display overlay 2721 is two dimensional.

The bubble level processing logic 1820 can receive information from the tilt sensor 1442 and use the received information to display a graphical visual representation of a bubble 2770 inside of the electronic bubble level overlay 2720. According to one embodiment, the bubble level 2720, 2770 that is used, according to various embodiments, is not a physical or mechanical bubble level that has a physical or mechanical bubble but instead is a bubble level that is displayed in a graphical display (also referred to herein as a "graphical bubble level").

As depicted in FIG. 27, the mobile data collection platform 1400's front is pointing downwards at the ground. However, embodiments are well suited to using the mobile data collection platform 1400 when the mobile data collection platform 1400's front is facing forward and/or perpendicular to the ground, for example, as depicted in FIGS. 29-32. According to various embodiments, the bubble level 2720, 2770 can be used when the mobile data collection platform 1400 is facing downwards as depicted in FIG. 27 or facing forward and/or perpendicular to the ground as depicted in FIGS. 29-32. For example, a user can select between a downward facing mode or a forward facing mode using a graphical user interface displayed on the mobile data collection platform's display 1414. If the downward facing mode is selected, then the bubble level 2720, 2770 can be in a downward facing orientation as depicted in FIG. 27. If the forward facing mode is selected, then the bubble level 2720, 2770 can be used in a forward facing orientation as would be the case for FIGS. 29-32.

According to one embodiment, the distance between two positions processing logic 1840 obtains the position fixes associated with two locations that a mobile data collection platform took images of a point of interest and determines a distance between the two locations based on the position fixes.

Methods of Using the Mobile Data Collection Platform

Figure 29:
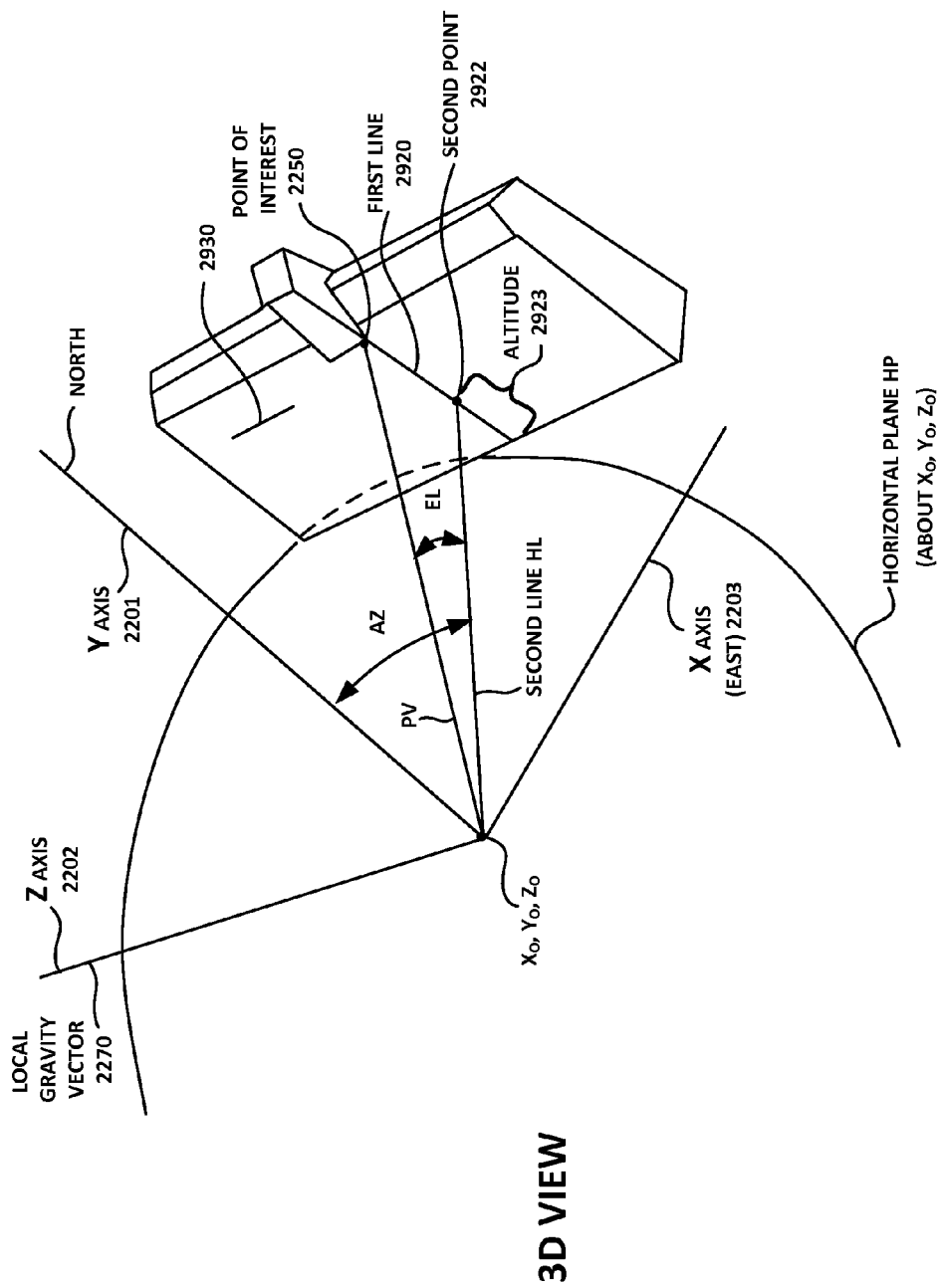
FIG. 29 depicts a three dimensional view of a mobile data collection platform that is being used to perform data collection, according to one embodiment.

FIG. 29 depicts a three dimensional view of a mobile data collection platform that is being used to perform data collection, according to one embodiment.

FIG. 29 depicts the altitude 2923 from the ground to the entrance pupil of the mobile data collection platform, a point of interest 2250 located, for example, on a building, the local gravity vector 2270, true north 2201, a horizontal plane HP, which is about the entrance pupil center's three dimensional coordinates X0, Y0, Z0, a pointing vector PV, an azimuth angle AZ, and an elevation angle EL. In this example, true north defines the Y local axis 2201, the local gravity vector 2270 defines the Z local axis 2202, and east defines the X local axis 2203. The three dimensional position X0, Y0, Z0 is in the local coordinate system, according to one embodiment. The horizontal plane HP is about the position X0, Y0, Z0. The altitude 2923 is the distance between ground level and the entrance pupil center 1902 of the mobile data collection platform. The altitude 2923 is the same as Z0 for the position associated with the mobile data collection platform. The pointing vector PV points from the mobile data collection platform's entrance pupil center to the point of interest 2250. The pointing vector PV is oriented along the image capturing device's axis 2760 (FIG. 27) from the entrance pupil of the mobile data collection platform.

FIG. 29 depicts a first line 2920 between the point of interest 2250 and a second point 2922 that is positioned at the altitude 2923 of the entrance pupil center above ground level. The first line 2920 is parallel to the local gravity vector 2270. FIG. 29 depicts a second line HL (also referred to herein as "horizontal line HL") that is horizontal from the entrance pupil center to the second point 2922. FIG. 29 depicts the azimuth angle AZ which is the angle between true north 2201 and the second line HL. FIG. 29 depicts the elevation angle EL is the angle between the second line HL and the pointing vector PV. The horizontal plane HP includes the second line HL, according to one embodiment.

Referring to FIG. 29, the image 1452 taken with a mobile data collection platform associated with the coordinates X0, Y0, Z0 (FIG. 24), according to one embodiment, includes the point of interest 2250 and the object 2930. The object 2930 is an object of a known dimension, such as one or more of width, diameter, length, that can be used, for example, as scale information, as described herein. For example, the object 2930 could be a yardstick. The object 2930 could be affixed to the wall by the operator of the Mobile Data Collection Platform 1400.

Figure 30:
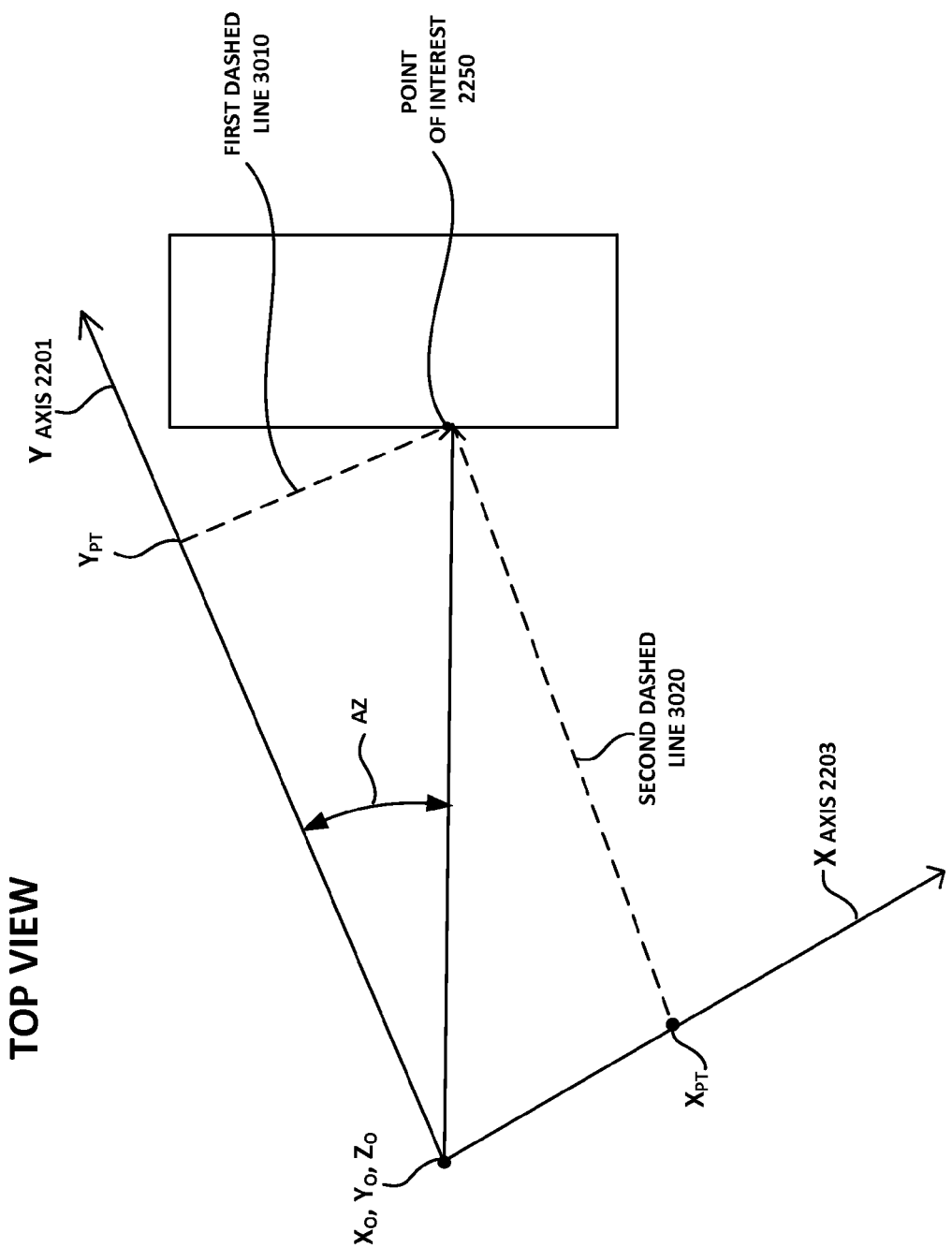
FIG. 30 depicts the same scene depicted in FIG. 29 from a top view, according to one embodiment.

FIG. 30 depicts the same scene depicted in FIG. 29 from a top view, according to one embodiment.

FIG. 30 depicts the azimuth angle AZ between the pointing vector PV and true north, which is used as the Y local axis 2201. The first dashed line 3010 represents the shortest distance between the point of interest 2250 and Y local axis 2201 representing true north. The second dashed line 3020 represents the shortest distance between the point of interest 2250 and X local axis 2203 representing east. Ypt is the point where the first dashed line 3010 intersects the Y local axis 2201. Xpt is the point where the second dashed line 3020 intersects the X local axis 2203. The first dashed line 3010 and the second dashed line 3020 form a right angle where they meet at the point of interest 2250. According to one embodiment, all four of the corners formed by the Y local axis 2201, the X local axis 2203 and the dashed lines 3010, 3020 form right angles. The first dashed line 3010 and the line between X0, Y0, Z0 and Xpt are the same length. The second dashed line 3020 and the line between X0, Y0, Z0 and Ypt are the same length. The intersections of the dotted line 3010 and 3020 with the two X and Y local coordinate axes 2203, 2201 give the coordinates Xpt, Ypt of the point of interest 2250. These coordinate positions Xpt, Ypt may be obtained by application of well-known trigonometric principles, once the radial distance between X0, Y0, Z0 and the point of interest 2250 along the pointing vector PV has been determined.

Figure 31:
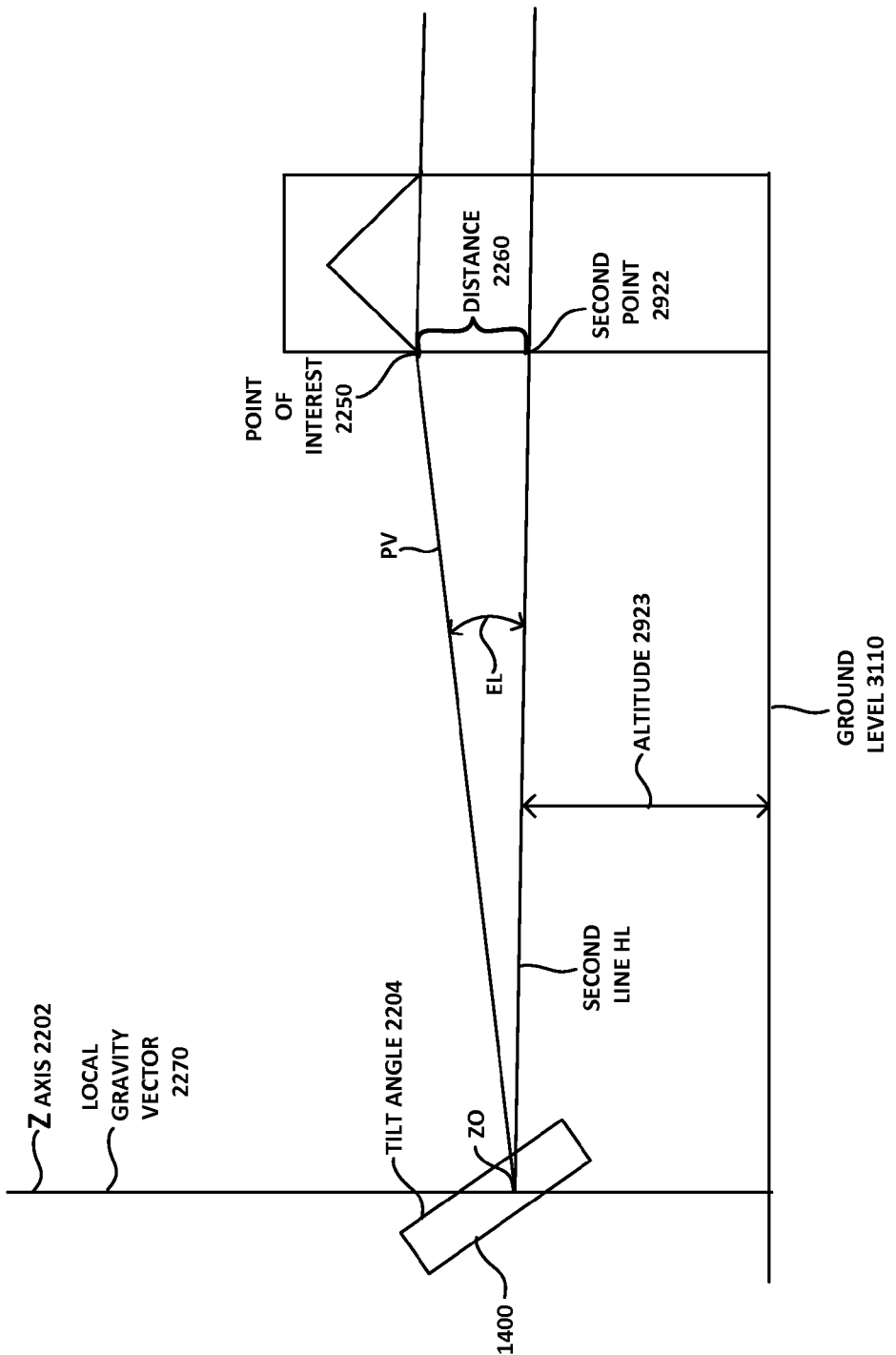
FIG. 31 depicts a side view of the same scene depicted in FIGS. 30 and 29 from a side view, according to one embodiment.

FIG. 31 depicts a side view of the same scene depicted in FIGS. 29-49 from a side view, according to one embodiment.

FIG. 31 depicts the mobile data collection platform 1400, the altitude 2923, the elevation angle EL, the pointing vector PV, the second line HL, the point of interest 2250, the building, the distance 2260, the tilt direction 2604, and the tilt angle 2204. The point of interest 2250 is located on the building. The coordinates of the point of interest 2250 in this example are Xpt, Ypt, and Zpt. The altitude 2923 is the distance between the ground level 3110 and the second line HL, also known as the horizontal line HL. The distance 2260 is the distance between the second point 2922 where the second line HL interests the building and the point of interest 2250. The altitude 2923 plus this distance 2260 is the altitude Zpt of the point of interest 2250 above the ground level 3110, which can be expressed as Zpt=Z0+PV·sin(EL). According to one embodiment, Zpt is equal to the altitude 2923 plus the distance 2260.

Z0 is the point where the pointing vector PV and the local gravity vector 2270, which represents the Z local axis 2202, intersect. The tilt angle 2204 is the angle between the entrance pupil center and the local gravity vector 2270 represented by the Z local axis 2202. The tilt direction 2604 indicates the direction the mobile data collection platform 1400 is tilted with respect to the local gravity vector 2270. In this example, the top of the mobile data collection platform 1400 is further back than the bottom of the mobile data collection platform 1400.

Figure 32:
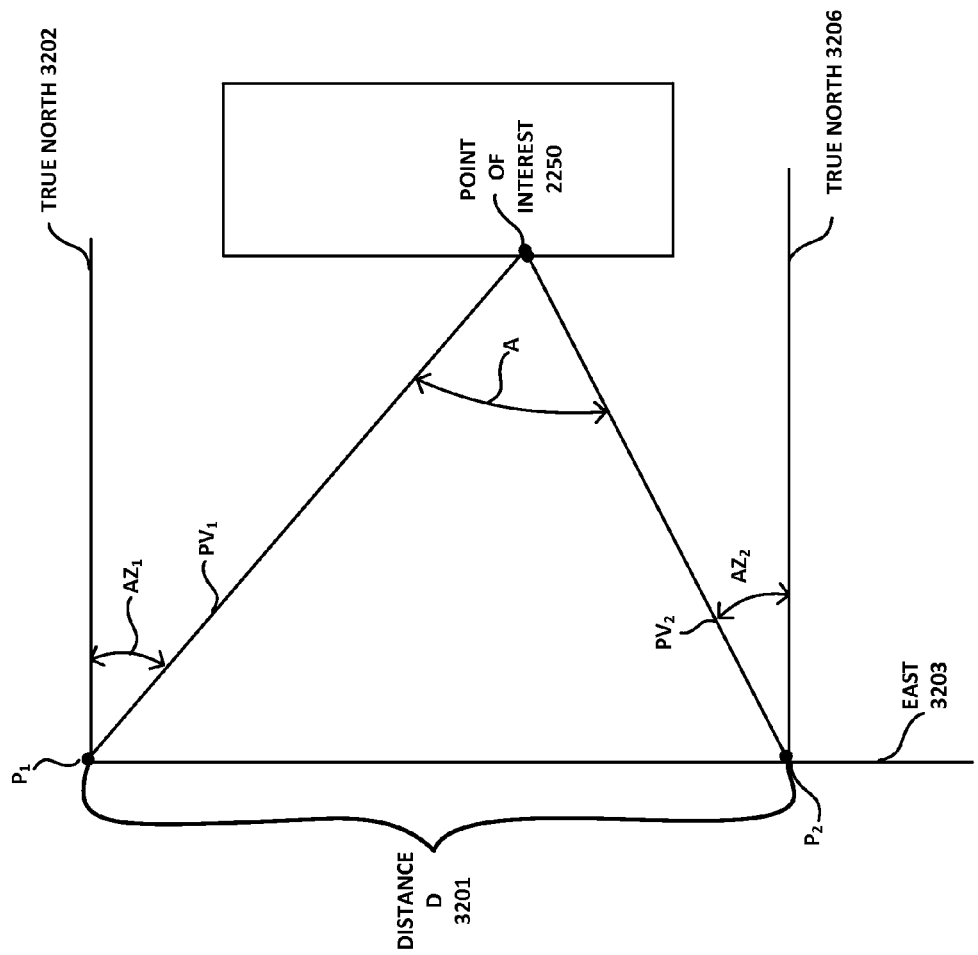
FIG. 32 depicts a top view of a scene where a mobile data collection platform is used to take two images of a point of interest, according to one embodiment.

FIG. 32 depicts a top view of a scene where a mobile data collection platform is used to take two images of a point of interest, according to one embodiment.

FIG. 32 depicts true north 3202, 3206 and east 3203, which can be obtained using the compass 1444. The user orients, according to one embodiment, the mobile data collection platform so that the compass 1444 display reads as close to 0 degrees as possible.

The radial distance between distance D 3201 and the point of interest 2250 may be determined once observations are taken at two spaced apart locations P1 and P2 for the mobile data collection platform. The principles are well known in the photogrammetric arts. As depicted in FIG. 32, a first image of the point of interest 2250 is taken at position P1 and a second image of the point of interest 2250 is taken at position P2. The two positions P1 and P2 are separated by a distance D 3201 (also referred to as the distance line D K01). According to one embodiment, the distance between two positions processing logic 1840 obtains the position fixes associated with two locations P1, P2 that a mobile data collection platform took images of a point of interest 2250 and determines the distance D 3201 between the two locations P1, P2 based on the position fixes. Respective first and second orientation information of the mobile data collection platform is associated with the positions P1 and P2. FIG. 32 depicts respective pointing vectors PV1 and PV2 from the entrance pupil center 1902 to the point of interest 2250 for the respective positions P1 and P2.

As depicted in FIG. 32, there is a first line 3202 from P1 in the direction of true north (also referred to as "first true north line") and a second line 3206 from P2 in the direction of true north (also referred to as "second true north line"). The two lines 3202 and 3206 are parallel to each other since they are both in the direction of true north. Both of the lines 3202 and 3206 are perpendicular to the line 3201 that represents the distance D. These are examples for the sake of explanation. The directions may be arbitrarily chosen.

FIG. 32 depicts several angles. The first azimuth angle AZ1 is between pointing vector PV1 and the first true north line 3202, a second azimuth angle AZ2 is between pointing vector PV2 and the second true north line 3206. Azimuth angle AZ1 is the compass 1444' angle from true north 3202 to the point of interest 2250 and Azimuth angle AZ2 is the compass 1444' angle from true north 3206 to the point of interest 2250. According to one embodiment, angle A is at least 20°. According to one embodiment, angle A ranges between 20° and 30° but can be any number of degrees.

The three dimensional coordinates of the positions P1 and P2 are GPS positions and are known. The GPS three dimensional coordinates for P1 are X1, Y1, Z1. The GPS three dimensional coordinates for P2 are X2, Y2, Z2. P1 and P2 are three dimensional positions in the GNSS coordinate system. Distance D 3201 can be calculated by subtracting the GPS position fixes X1, Y1, Z1 for P1 and X2, Y2, Z2 for P2 using the vector equation D=P1−P2.

Referring to FIG. 32, the scale information can include one or more of the first image taken from P1 and the second image taken from P2, the first coordinates X1, Y1, Z1 for the location P1, the second coordinates X2, Y2, Z2 for the location P2, the respective orientations of the mobile data collection platform when it captured images at P1 and P2, and the known distance D 3201 between the first location P1 and the second location P2.

According to one embodiment, scale information can be both the depiction of an object 2799, 2930 with at least one known dimension in an image 1452 and a distance D 3201 between two positions P1, P2 that two images 1452 of a point of interest 2250 were captured from.

The two images, position fixes of the MDCP when at positions P1 and P2, orientation information of the MDCP at positions P1 and P2, and the distance D 3201 can be stored in the hardware memory 1450.

Methods of Using a Graphical Bubble Level and Crosshairs

Figure 33:
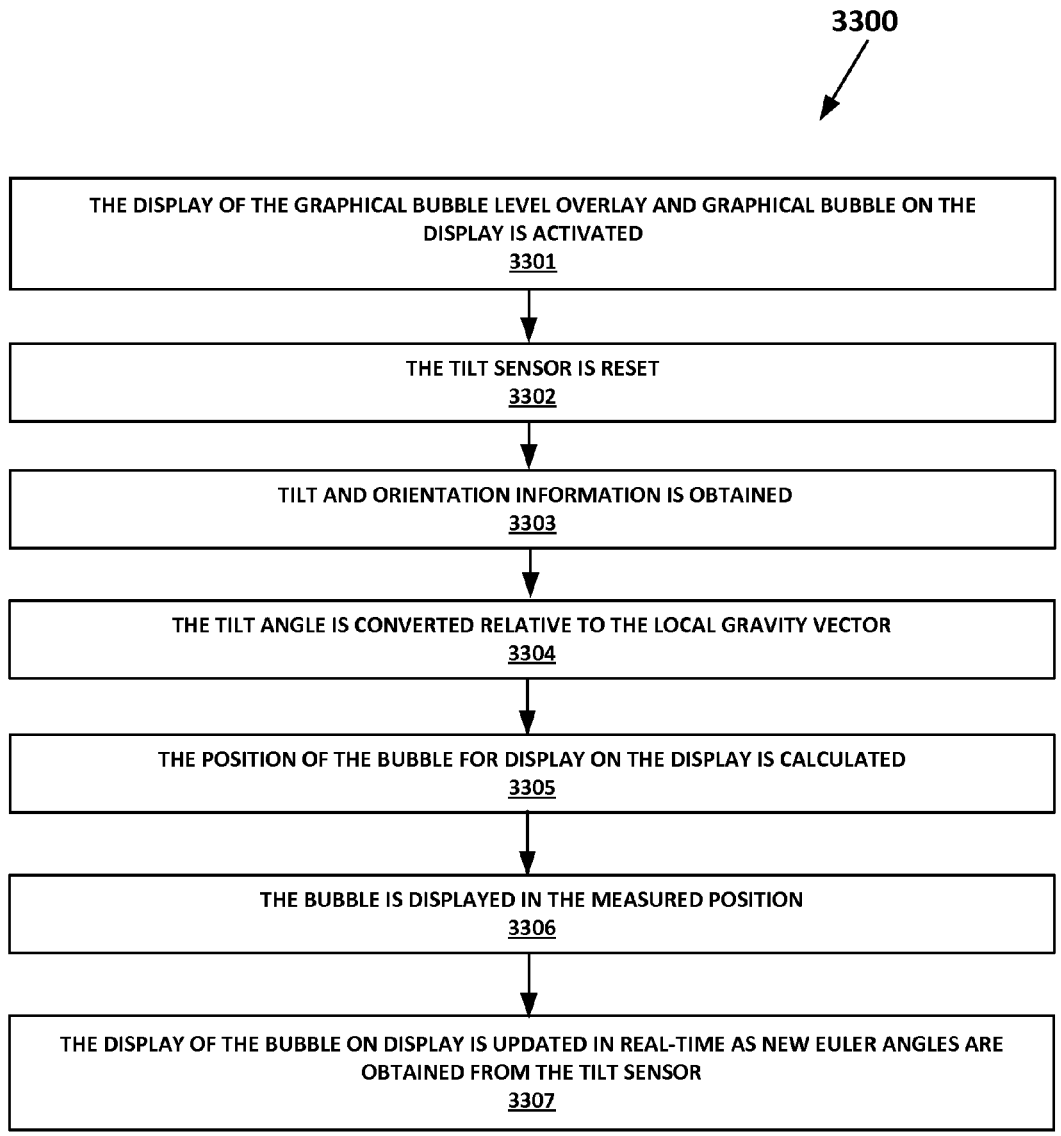
FIG. 33 is a flowchart of a method for generating a bubble level overlay on a display in accordance with one embodiment.
Figure 34:
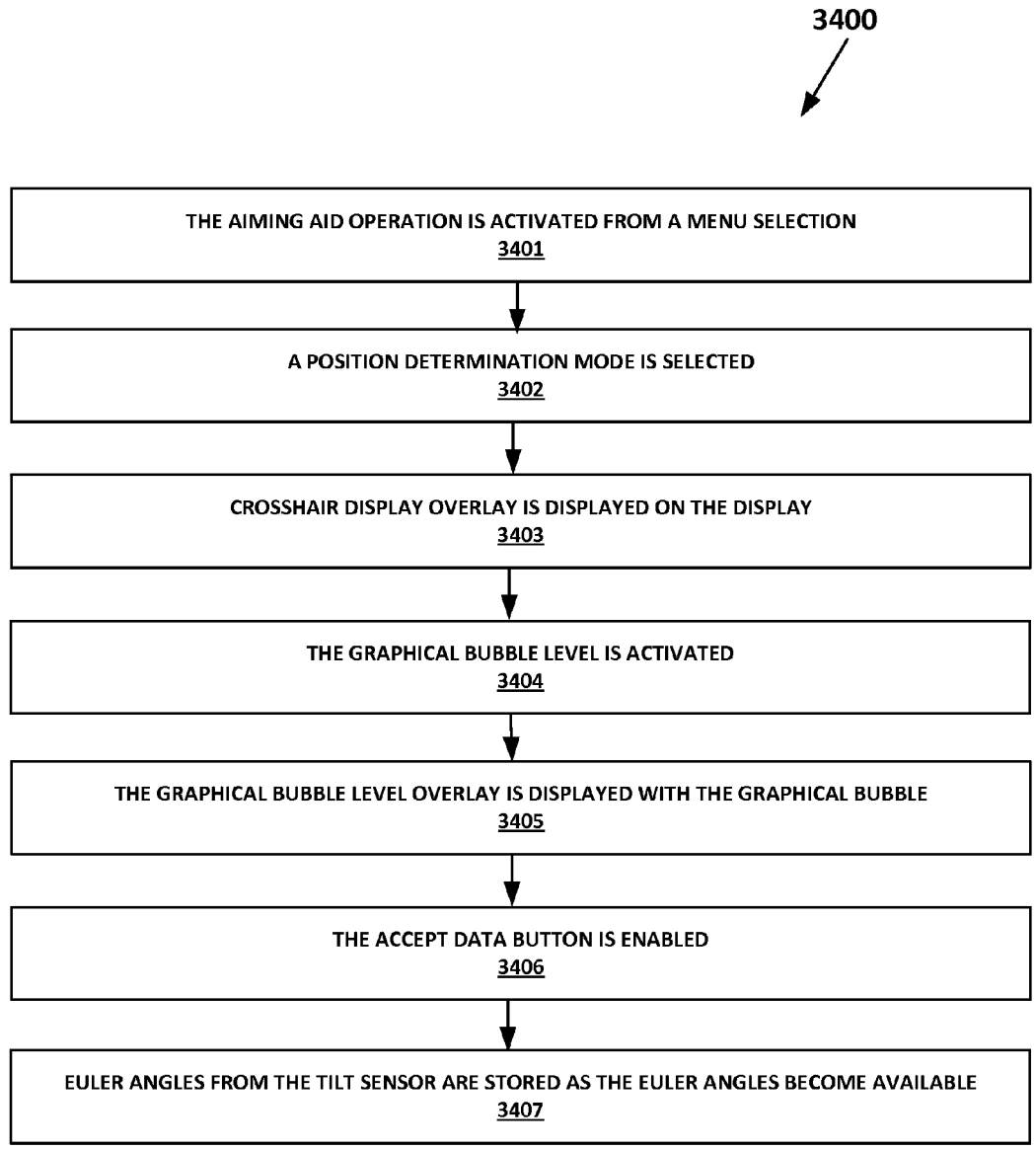
FIG. 34 is a flowchart of a method for implementing an aiming aid operation in accordance with one embodiment.

The following descriptions of FIG. 33 and FIG. 34 refer to FIG. 27.

FIG. 33 is a flowchart of a method 3300 for generating a bubble level overlay 2720 on a display in accordance with one embodiment. In accordance with various embodiments, the operations described in FIG. 33 are controlled using bubble level processing logic 1820.

At 3301, the display of the graphical bubble level overlay 2720 and graphical bubble 2770 on the display 1414 is activated.

At 3302 the tilt sensor 1442 is reset, for example, by zeroing the tilt sensor 1442 on a reference level surface.

At 3303 tilt and orientation information is obtained. For example, the tilt angle 2204 and tilt direction 2604 can be obtained respectively from the tilt sensor 1442 and the compass 1444.

At 3304 the tilt angle 2204 is converted relative to the local gravity vector 2270.

At 3305 the position of the bubble 2770 for display on the display 1414 is calculated.

At 3306 the bubble 2770 is displayed in the measured position, which was calculated at 3305, on display 1414.

At 3307 the display of the bubble 2770 on display 1414 is updated in real-time as new Euler angles are obtained from the tilt sensor 1442.

FIG. 34 is a flowchart of a method 3400 for implementing an aiming aid operation in accordance with one embodiment. According to one embodiment, the crosshair display overlay 2721 and bubble 2770 are controlled by the crosshairs processing logic 1810.

At 3401, the aiming aid operation is activated from a menu selection.

At 3402 a position determination mode is selected. In accordance with one embodiment, if no position determination mode is selected, the last operating position fix system is automatically selected.

At 3403 crosshair display overlay 2721 is displayed on the display 1414.

At 3404 the graphical bubble level is activated.

At 3405 the graphical bubble level overlay 2720 is displayed with the graphical bubble 2770.

At 3406 the accept data button 2730 is enabled.

At 3407 Euler angles from the tilt sensor 1442 are stored, for example, in hardware memory 1450 as the Euler angles become available.

Figure 35:
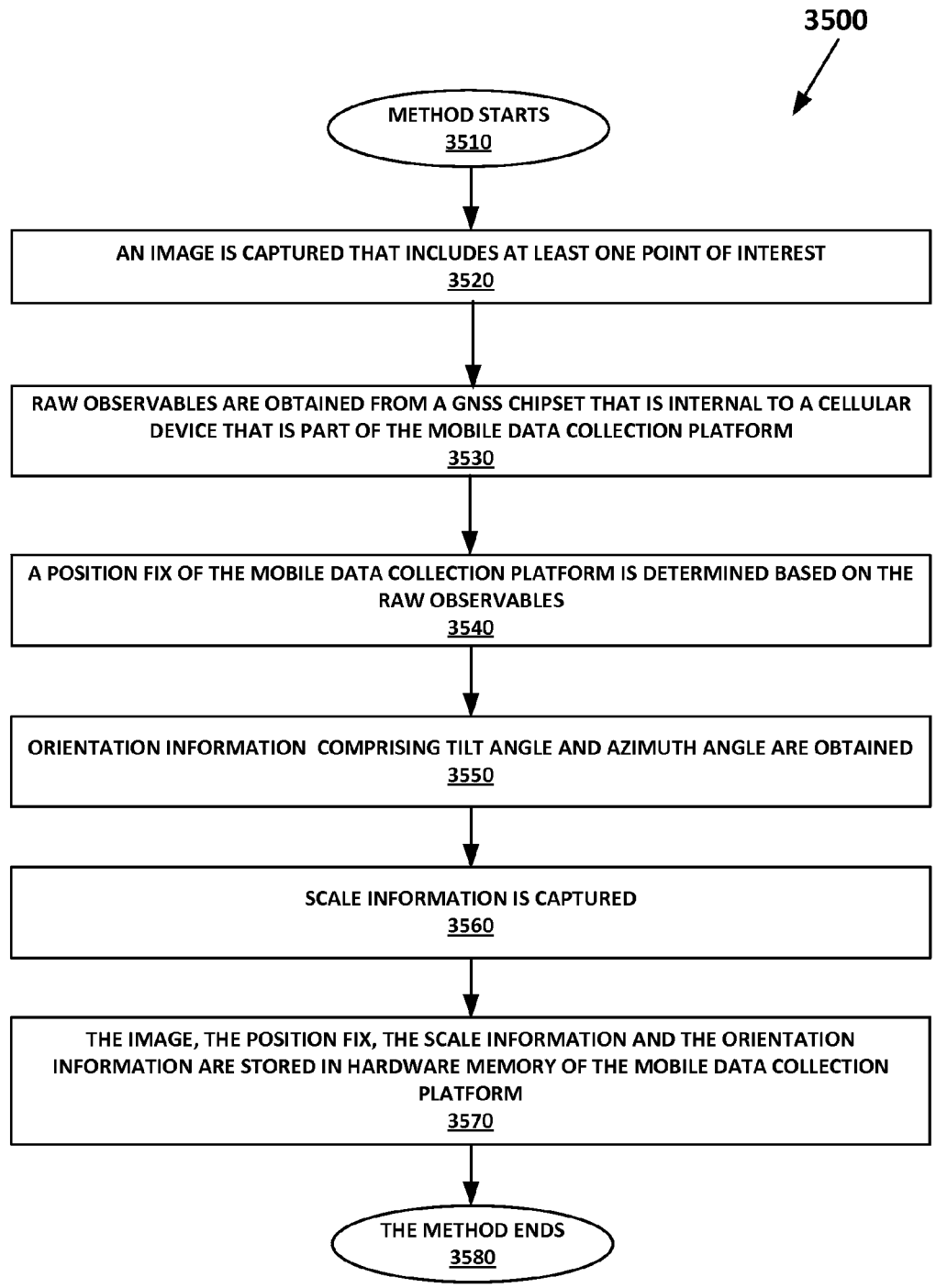
FIG. 35 depicts a flowchart of a method of performing data collection using a mobile data collection platform, according to one embodiment.

Methods of Performing Data Collection Using a Mobile Data Collection Platform FIG. 35 depicts a flowchart 3500 of a method of performing data collection using a mobile data collection platform, according to one embodiment.

At 3510, the method begins.

At 3520, an image 1452 that includes at least one point of interest 2250 is captured where an image capturing device 1430 that is part of the mobile data collection platform 1400 captures the image 1452.

Figure 37:
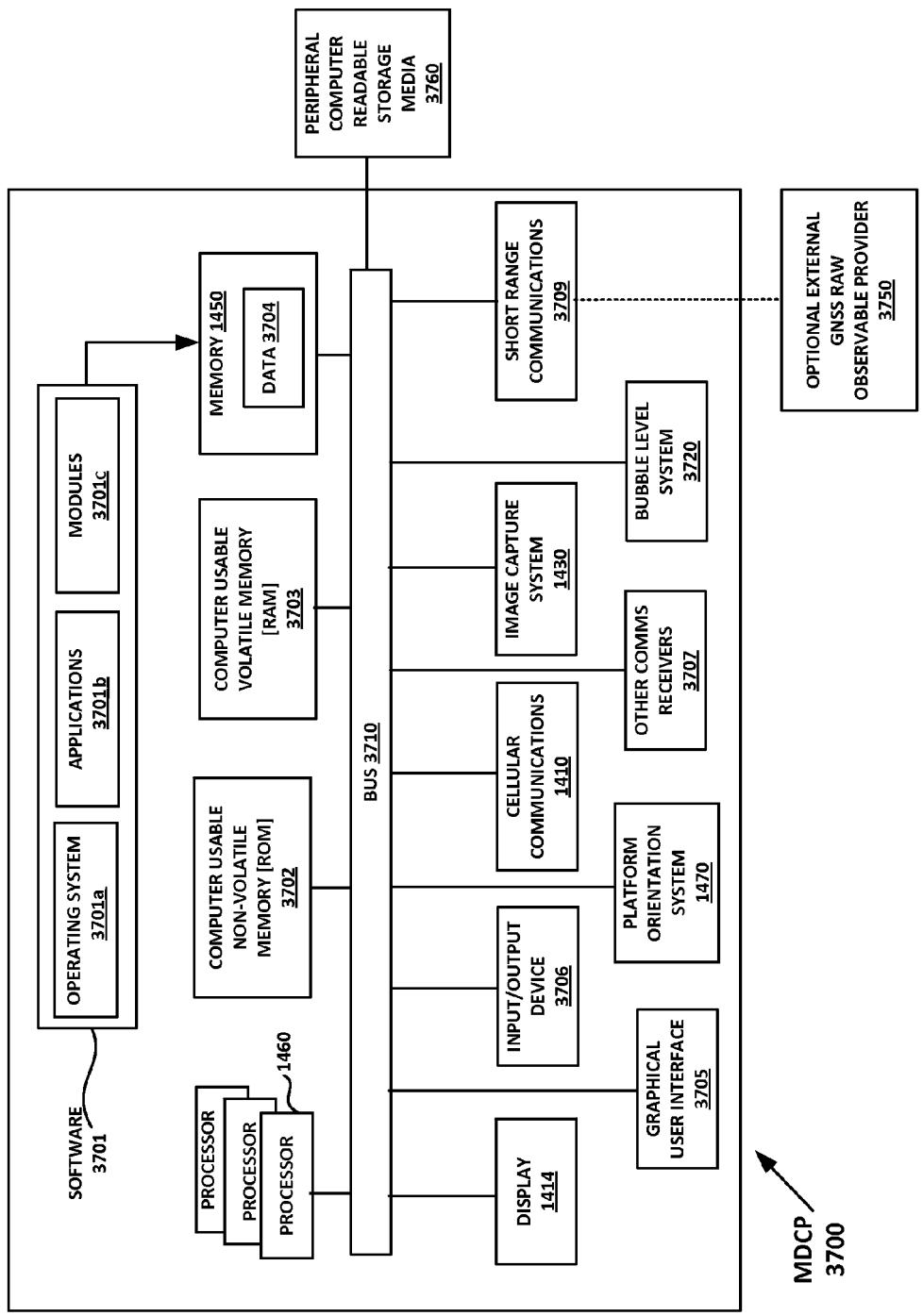
FIG. 37 depicts a block diagram of a mobile data collection platform system, according to one embodiment.

At 3530, raw observables for the mobile data collection platform 1400 are obtained. For example, a GNSS chipset 1413 of the mobile data collection platform 1400 is accessed and raw observables are extracted from the mobile data collection platform 1400's GNSS chipset 1413. In another example, the raw observables are received by the mobile data collection platform 1400 from an optional external GNSS raw observable provider 3750 (FIG. 37). A mobile data collection platform 1400 can use the raw observables received from the optional external GNSS raw observable provider even if the mobile data collection platform 1400 has an internal GNSS chipset 1413.

The raw observables, from either the internal GNSS chipset 1413 or the external GNSS raw observable provider 3750, are for use outside the GNSS chipset 1413 and elsewhere in the mobile data collection platform 1400, for example, in a supl client as discussed herein. Other examples of outside the GNSS chipset 1413 and elsewhere in the mobile data collection platform 1400 include processing logic 1480, 1570, and 1800. Examples of for use elsewhere include being executed by a hardware processor 1460 that is inside the mobile data collection platform 1400 and outside of the GNSS chipset 1413. According to one embodiment, the hardware processor 1460 executes the processing logic 1480, 1570, and 1800.

At 3540, a position fix Xpf, Ypf, Zpf (FIG. 24) of the mobile data collection platform 1400 is determined based on the raw observables. For example, the raw observables that are extracted from the GNSS chipset 1413 can be processed, according to various embodiments, described herein, to determine a position fix Xpf, Ypf, Zpf. The position fix Xpf, Ypf, Zpf, according to one embodiment, provides a location of the mobile data collection platform 1400 in a GNSS coordinate system.

Various embodiments described herein can be used for smoothing pseudoranges, correcting pseudoranges before determining the position fix Xpf, Ypf, Zpf, as described herein. Various embodiments can be used for applying locally measured movement information to a position fix of the antenna 1412 to determine a locally measured movement smoothed position fix. In this case, the position fix Xpf, Ypf, Zpf is a locally measured movement smoothed position fix. Examples of a locally measured movement smoothed position fix are 2665B, 2691D, and 2675F.

At 3550, orientation information comprising tilt angle and azimuth angle are determined.

For example, the orientation information can be obtained from one or more sensors 1442, 1444 that are part of the mobile data collection platform 1400. Orientation information can include tilt angle 2204 (FIG. 24), and azimuth angle AZ (FIG. 26), as discussed herein. According to one embodiment, Euler angles are obtained from the tilt sensor 1442 and translated into the tilt angle 2204. The azimuth angle AZ can be obtained based on information from the compass 1444.

The tilt angle 2204 and the azimuth angle AZ can be determined based on data from an accelerometer type tilt sensor 1442. An accelerometer type tilt sensor 1442 is able to determine the tilt angle 2204 of the sensor's X and Y axis relative to gravity, in addition to determining the tilt angle 2204. The tilt angle 2204 is often used to mean both of the sensor's X and Y axis. The magnetic sensor triad of the accelerometer type tilt sensor 1442 can then be used to determine the azimuth angle AZ. For more information, refer to "Tilt Measurement Using a Low-g 3-axis Accelerometer" published April 2010 document ID 17289 Rev 1 (also known as AN3461 from Freescale).

The tilt angle 2204 (FIG. 24) is between the mobile data collection platform 1400 and a local gravity vector 2270, and the azimuth angle AZ (FIG. 26) is between true north 2610 and a pointing vector PV of the mobile data collection platform. The position fix Xpf, Ypf, Zpf (FIG. 24) and the orientation information are associated with a three dimensional location X0, Y0, Z0 (FIG. 24) of the mobile data collection platform 1400 when the image 1452 was captured. According to one embodiment, the three dimensional location X0, Y0, Z0 is the three dimensional position of the entrance pupil center 1902 (FIG. 24).

The mobile data collection platform 1400 is not required to be leveled, as discussed herein.

The position fix Xpf, Ypf, Zpf (FIG. 24) and the orientation can be associated with the image 1452 by the mobile data collection platform 1400's user holding the mobile data collection platform 1400 in the same position during the capturing of the image 1452, the determining of the position fix Xpf, Ypf, Zpf and the determining of the orientation, according to one embodiment. Examples of orientation are the tilt angle 2204 (FIG. 24) and the tilt direction (also known as the "azimuth angle") 2604 (FIG. 26). In another example, the position fix 1454 and the orientation information 1456 can be associated with the image 1452 by simultaneously or nearly simultaneously capturing of the image 1452, determining of the position fix Xpf, Ypf, Zpf and determining of the orientation information 1456. An example of nearly simultaneously is performing the capturing of the image 1452, determining of the position fix Xpf, Ypf, Zpf and determining of the orientation information 1456 in a short period of time where user movement is small to non-existent. More specifically, modern electronics are capable of performing the capturing of the image 1452, the determining of the position fix Xpf, Ypf, Zpf and the determining of the orientation information 1456 within 0.25 second, for example, in response to a button of the mobile data collection platform 1400, 1500 being pressed. Alternatively, a timer can be used instead of the button to trigger performing the capturing of the image 1452, the determining of the position fix Xpf, Ypf, Zpf and the determining of the orientation information 1456 within 0.25 second, for example.

At 3560, scale information is captured.

One example of scale information is an object 2799 (FIG. 27), 2930 (FIG. 29) depicted in the image 1452 where the object 2799 has one or more known dimensions. The depiction of the scale information in the image is an example of capturing the scale information. Referring to FIG. 32, another example of scale information is the known distance D 3201 between two positions P1, P2 where two respective images 1452 were captured where both images 1452 depict of the point of interest 2250. For example, the first image 1452, which depicts the point of interest 2250, may be captured with an image capturing device 1430 from position P1 and the second image 1452, which also depicts the point of interest 2250, may be captured with the mobile data collection platform 1400 from position P2. Examples of capturing the known distance D 3201 are a person determining or measuring the distance D 3201 or determining the distance D 3201 by subtracting a first position fix of the mobile data collection platform 1400 for a the first position P1 from a second position fix of the MDCP 1400 for the second position P2.

At 3570, the image 1452, the position fix Xpf, Ypf, Zpf, the scale information, and the orientation information 1456 are stored in hardware memory 1450 of the mobile data collection platform. The position fix Xpf, Ypf, Zpf is stored as position fix 1454. The image, the position fix and the orientation information 1456 can be used to determine a location of a point of interest 2250 in the image 1452 using, for example, photogrammetry. Photogrammetry is well known in the arts. According to one embodiment, the image 1452, the position fix 1454 and the orientation information 1456 can be used to determine a three dimensional location Xpt, Ypt, Zpt of the point of interest 2250. According to one embodiment, the three dimensional location Xpt, Ypt, Zpt of the point of interest 2250 is determined in the local coordinate system.

At 3580, the method ends.

According to one embodiment, the method 3500 can be performed, for example, within a fraction of a second so that the mobile data collection platform is at the position fix Xpf, Ypf, Zpf and in the orientation described by orientation information 1456 at the time that the image 1452 is captured.

Various embodiments provide for capturing depiction an object 2799 (FIG. 27), 2930 (FIG. 29) with at least one known dimension, wherein the image 1452 depicts the object 2799 (FIG. 27), 2930 (FIG. 29) with the at least one known dimension.

Various embodiments provide for capturing a first image 1452 and a second image 1452 that both depict the point of interest 2250, wherein the first image 1452 is captured from a first position P1 and the second image 1452 is captured from a second position P2 and for calculating a distance D 3201 between the first position P1 and the second position P2.

Various embodiments provide for determining a first position P1, wherein the first position P1 is selected from a group consisting of a position of a georeference point of interest 2702, and a position fix Xpf, Ypf, Zpf of the mobile data collection platform 1400 where the point of interest 2701, 2250 is in a field of view 2800 of the image capturing device 1430; determining a second position P2, wherein the second position P2 is selected from the group consisting of the position of the georeference point of interest 2702, and the position fix Xpf, Ypf, Zpf of the mobile data collection platform 1400 where the point of interest 2701, 2250 in the field of view 2800; and determining a reference distance D 3201 between the first position P1 and the second position P2.

An embodiment provides for determining the orientation information comprising the tilt angle and the azimuth angle, wherein the tilt angle is between a y platform axis of the mobile data collection platform and a local gravity vector, and the azimuth angle is between a reference direction and a pointing vector of the mobile data collection platform. For example, the determined orientation information 1456 can include the tilt angle 2204 and the azimuth angle AZ, wherein the tilt angle 2204 is between a y platform axis 2220 of the mobile data collection platform 1400 and a local gravity vector 2270, and the azimuth angle AZ is between a reference direction, such as magnetic north or true north 2610, and a pointing vector PV of the mobile data collection platform 1400.

According to one embodiment, the pointing vector PV is in a known orientation relative to a compass heading, such as magnetic north. According to one embodiment, the pointing vector PV is aligned with the compass heading.

According to one embodiment, the pointing vector PV is aligned with the compass heading. For example, the user of the mobile data collection platform can hold the MDCP so that the pointing vector PV is aligned with the compass heading from the compass 1444.

Various embodiments provide for capturing angular displacement from a first point on a scalar reference to a second point on the scalar reference visible in a field of view as given by a pixel count from the first point to the second point. For example, the angular displacement from one end of a scalar reference 2799 (FIG. 27), 2930 (FIG. 29) to the other end of the scalar reference 2799 (FIG. 27), 2930 (FIG. 29) visible in the field of view of an image 1452 can be captured by counting the pixels from the one end to the other end of the scalar reference 2799 (FIG. 27), 2930 (FIG. 29).

Various embodiments provide for calibrating the mobile data collection platform by determining a pixel calibration datum providing the angular displacement of each pixel, in two dimensions, depicted in a calibration image taken with the image capturing device. For example, according to one embodiment, the mobile data collection platform 1400, 1500 can be calibrated by determining a pixel calibration datum 2050 (FIG. 20) providing the angular displacement of each pixel in a calibration image 2160 (FIG. 21) in two dimensions, where the calibration image 2160 is taken with an image capturing device 1430 (FIG. 14) of a pattern 2010 (FIG. 20).

Various embodiments provide for calibrating the mobile data collection platform by determining an acceptable region in a calibration image taken with the image capturing device, wherein the acceptable region includes a subset of pixels of the calibration image where the pixels do not exceed a specified level of distortion (also known as an "acceptable level of distortion"). For example, according to one embodiment, the mobile data collection platform 1400 is calibrated by determining an acceptable region 2140 in a calibration image 2160 taken with the image capturing device 1430 that includes a subset of the calibration image 2160's pixels that do not exceed an acceptable level of distortion. According to one embodiment, the acceptable region 2140 includes a subset of the calibration image 2160's pixels because the pixels in the unacceptable region 2190 that is between the boundary 2180 of the acceptable region 2140 and the periphery 2185 of the calibration image 2160 are not included in the subset.

Various embodiments provide for receiving outline information describing an outline of the point of interest; and designating the point of interest as a user specified point of interest based on the outline information. For example, according to one embodiment, outline information describing an outline of the point of interest 2250 is received and the point of interest 2250 is designated as a user specified point of interest based on the outline information.

Various embodiments provide for designating the point of interest as a user specified point of interest based on orientation information from crosshairs processing logic associated with the mobile data collection platform when crosshairs are aligned with the point of interest and an image capture button is pressed. For example, according to one embodiment, designating the point of interest 2250 as a user specified point of interest based on orientation information 1456 from the orientation system 1470 associated with the mobile data collection platform 1400 when the crosshairs of the crosshair display overlay 2721 are aligned with the point of interest 2250 and an image capture button is pressed to capture the image 1452.

Various embodiments provide for designating the point of interest as a user specified point of interest based on an annotation from an image editor associated with the mobile data collection platform. For example, according to one embodiment, the point of interest 2250 is designated as a user specified point of interest based on an annotation from an image editor 1778 associated with the mobile data collection platform 1400, 1500.

Various embodiments provide for receiving annotation information; and associating the annotation information with the image. For example, according to one embodiment, the annotation information is received and associated with the image 1452. The annotation information can be associated with the image using an EXIF file. The annotation information can be associated with the file using other techniques that are well known in the art, such as tables, pointers, identifiers.

Various embodiments provide for performing feature identification on at least a subset of the image. For example, according to one embodiment, feature identification 1774 is performed on at least a subset of the image 1452.

Various embodiments provide for performing pattern recognition on at least a subset of the image. For example, according to one embodiment, pattern recognition 1776 is performed on at least a subset of the image 1452.

Various embodiments provide for displaying crosshair display overlay on a display of the mobile data collection platform; displaying a photographic image of the point of interest in relation to the crosshair display overlay; and positioning the photographic image with respect to the crosshair display overlay based on an alignment of an entrance pupil of the mobile data collection platform with the point of interest. For example, according to one embodiment, crosshair display overlay 2721 is displayed on a display 1414 of the mobile data collection platform 1400; a photographic image 2740 of the point of interest 2701 positioned in relation to the crosshair display overlay 2721; and the photographic image 2740 is displayed with respect to the crosshair display overlay 2721 based on an alignment of an entrance pupil center 1902 of the mobile data collection platform 1400 with the point of interest 2701.

Various embodiments provide for displaying a bubble level overlay on a display of the mobile data collection platform; displaying a graphical bubble in relation to the bubble level overlay; and positioning the graphical bubble with respect to the bubble level overlay based on a degree of tilt of the mobile data collection platform. For example, according to one embodiment, a bubble level overlay 2720 is displayed on a display 1414 of the mobile data collection platform 1400; a graphical bubble 2770 is displayed in relation to the bubble level overlay 2720; and the graphical bubble 2770 is positioned with respect to the bubble level overlay 2720 based on a degree of tilt, for example of two orthogonal axes 2780, 2781, of the mobile data collection platform 1400.

According to various embodiments, determining a known spatial relationship between an entrance pupil of the image capturing device and an antenna of the mobile data collection platform based on one or more geometric offsets between the entrance pupil and the antenna. For example, according to one embodiment, a known spatial relationship between an entrance pupil center 1902 of the image capturing device 1430 and an antenna 1412 of the mobile data collection platform 1400 is determined based on one or more geometric offsets 2406 (FIG. 24), 2501, 2502 (FIG. 26) between the entrance pupil center 1902 and the antenna 1412 (FIG. 24 and FIG. 26).

Figure 36:
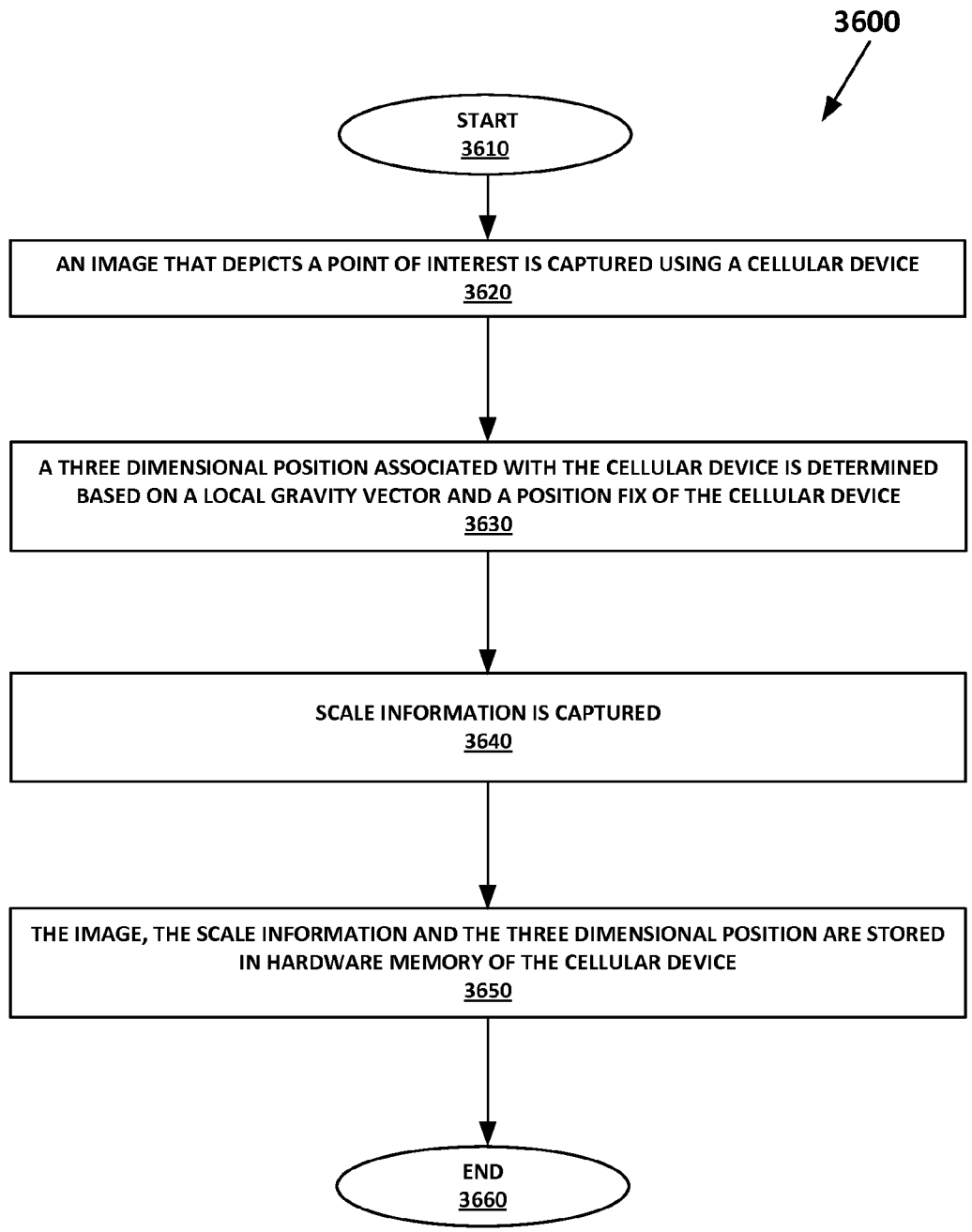
FIG. 36 depicts a flowchart of a method of performing data collection using a mobile data collection platform, according to one embodiment.

FIG. 36 depicts a flowchart of a method 3600 of performing data collection using a mobile data collection platform, according to one embodiment.

According to one embodiment, as described herein, a mobile data collection platform 1400 is a cellular device.

At 3610 the method starts.

At 3620, an image that depicts a point of interest is captured using a cellular device. For example, the image 1452 that depicts the point of interest 2250 may be captured using the image capturing device 1430.

At 3630, a three dimensional position associated with the cellular device is determined based on a local gravity vector and a position fix of the cellular device.

For example, the local gravity vector 2270 (FIG. 24) can be determined using the information from the tilt sensor 1442 (FIG. 14). The position fix Xpf, Ypf, Zpf, which is the location of the antenna 1412 according to one embodiment, can be determined and stored as position fix 1454 (FIG. 14) can be determined as described herein.

An example of a three dimensional position associated with the MDCP 1400 (FIG. 14) is the three dimensional position X0, Y0, Z0 (FIG. 24) of the entrance pupil center 1902 (FIG. 24) that is determined based on a local gravity vector 2270 and the position fix Xpf, Ypf, Zpf. The three dimensional position X0, Y0, Z0 is in the local coordinate system and the local gravity vector 2270 is one of the axes of the local coordinate system.

Referring to FIG. 24 and FIG. 25, the local gravity vector 2270, true north 2610 and east 2203 respectively are the Z local axis 2202 (also known as the local gravity vector 2270), the Y local axis 2201, 2610, and the X local axis 2203 for the local coordinate system. The GPS position fix Xpf, Ypf, Zpf is a three dimensional position of the antenna 1412 in the GNSS coordinate system. The entrance pupil center 1902 has a three dimensional position X0, Y0, Z0 in the local coordinate system. One or more of the antenna-to-entrance-pupil-center-geometric-information, the tilt angle 2204, the tilt direction 2604 and the local gravity vector 2270 can be used to translate the GPS position fix Xpf, Ypf, Zpf in the GNSS coordinate system into the entrance pupil center 1902's three dimensional location X0, Y0, Z0 in the local coordinate system.

In another example, a GPS position fix can be determined based on raw observables obtained from an optional external GNSS raw observable provider 3750 (FIG. 37). Known spatial relationship, as discussed herein, between an antenna 3810 of the optional external GNSS raw observable provider 3750 and the entrance pupil center 1902 of the MDCP 1400 can be used to determine the three dimension location X0, Y0, Z0 of the entrance pupil center 1902 in the local coordinate system.

At 3640, scale information is captured.

One example of scale information is an object 2799 (FIG. 27), 2930 (FIG. 29) depicted in the image 1452 where the object 2799 has one or more known dimensions. The depiction of the scale information in the image is an example of capturing the scale information. Referring to FIG. 32, another example of scale information is the known distance D 3201 between two positions P1, P2 where two respective images 1452 were captured where both images 1452 depict of the point of interest 2250. For example, the first image 1452, which depicts the point of interest 2250, may be captured with an image capturing device 1430 from position P1 and the second image 1452, which also depicts the point of interest 2250, may be captured with the image capturing device 1430 from position P2. Examples of capturing the known distance D 3201 are a person determining or measuring the distance D 3201 or determining the distance D 3201 by subtracting a first position fix of the MDCP 1400 for a the first position P1 from a second position fix of the MDCP 1400 for the second position P2.

At 3650, the image, the scale information and the three dimensional position are stored in hardware memory. For example, the image 1452, the scale information and the three dimensional position X0, Y0, Z0 can be stored in hardware memory 1450 of the mobile data collection platform 1400.

The local gravity vector 2270 is local with respect to the MDCP 1400, for example, as depicted in FIG. 24.

The MDCP 1400 is at the position fix when the image 1452 is captured. Therefore, the entrance pupil center 1902, the antenna 1412, or the antenna 3810 are at the three dimensional position when the image 1452 is captured.

The MDCP 1400 is not required to be perpendicular to the local gravity vector 2270 at the time of collecting of data. For example, none of the platform axis 2220, 2230, 2240 of cellular device z00 are required to be perpendicular to the local gravity vector 2270 at the time of the capturing of the image 1452 and the determining of the three dimensional position X0, Y0, Z0.

At 3660, the method ends.

According to one embodiment, the method 3600 can be performed, for example, within a fraction of a second so that the mobile data collection platform is at the position fix, which would be of either antenna 1412 or antenna 3810, and in the orientation described by orientation information 1456 at the time that the image 1452 is captured.

According to various embodiments, method 3600 is performed by a mobile data collection platform and outside of the internal GNSS chipset 1413. Although many embodiments are described herein in the context of a mobile data collection platform 1400, various embodiments are also well suited for mobile data collection platform 1500.

Either method 3500 or 3600 can be used with use cases depicted in FIGS. 29-32. Either method 3500 or 3600 can be used for performing data collection at position P1 and position P2 as depicted in FIG. 32. For example, method 3500 or 3600 could be used at position P1 to perform data collection and used at position P2 to perform data collection.

According to one embodiment, "capturing" an item, such as an image, scale information, distance, angular displacement and so on, includes "storing" the item, for example, in hardware memory, such as hardware memory 1450.

Referring to FIG. 24 and FIG. 26, according to one embodiment, the tilt angle 2204 is between the mobile data collection platform 1400 and a local gravity vector 2270, and the azimuth angle AZ is between a reference direction, such as true north 2610, and a pointing vector PV of the mobile data collection platform 1400.

Various embodiments provide for obtaining a tilt angle and a tilt direction of the cellular device; and determining the three dimensional position associated with the cellular device based at least in part on the tilt angle and the tilt direction in relation to the local gravity vector. For example, according to one embodiment, a tilt angle 2204 and a tilt direction 2604 of the MDCP 1400 are obtained and the three dimensional position X0, Y0, Z0 associated with the MDCP 1400 is determined based at least in part on the tilt angle 2204 and the tilt direction 2604 in relation to the local gravity vector 2270.

Various embodiments provide for determining the three dimensional position associated with the cellular device based at least in part on geometric information relating an antenna of the cellular device with an entrance pupil center of the cellular device. For example, according to one embodiment, the three dimensional position X0, Y0, Z0 associated with the MDCP 1400 is determined based at least in part on geometric information, such as 2406, 2501, 2502, relating an antenna 1412 of the MDCP 1400 with an entrance pupil center 1902 of the MDCP 1400, for example, as depicted in FIG. 24 and FIG. 25.

Various embodiments provide for designating the point of interest as a user specified point of interest based on information selected from a group consisting of annotation from an image editor, an outline of the point of interest, and a photographic image of the point of interest being visibly displayed within crosshair display overlay. For example, according to one embodiment, the point of interest 2250 is designated as a user specified point of interest based on information selected from a group consisting of annotation from an image editor 1778, an outline of the point of interest 2250, and a photographic image 2740 of the point of interest 2701 being visibly displayed within crosshair display overlay 2721.

Various embodiments provide for displaying crosshair display overlay on a display of the cellular device; displaying a photographic image of the point of interest in relation to the crosshair display overlay; and positioning the photographic image with respect to the crosshair display overlay based on an alignment of an entrance pupil of the cellular device with the point of interest. For example, according to one embodiment, crosshair display overlay 2721 is displayed on a display 1414 of the MDCP 1400; a photographic image 2740 of the point of interest 2701 is positioned in relation to the crosshair display overlay 2721; and the photographic image 2740 is displayed with respect to the crosshair display overlay 2721 based on an alignment of an entrance pupil center 1902 of the MDCP 1400 with the point of interest 2701.

Various embodiments provide for displaying a bubble level overlay on a display of the cellular device; displaying a graphical bubble in relation to the bubble level overlay; and positioning the graphical bubble with respect to the bubble level overlay based on a degree of tilt of the cellular device. For example, according to one embodiment, a bubble level overlay 2720 is displayed on a display 1414 of the mobile data collection platform 1400; a graphical bubble 2770 is displayed in relation to the bubble level overlay 2720; and the graphical bubble 2770 is positioned with respect to the bubble level overlay 2720 based on a degree of tilt, for example of two orthogonal axes 2780, 2781, of the MDCP 1400.

Various embodiments provide for determining a first position, wherein the first position is selected from a group consisting of a position of a georeference point of interest, and a position fix of the cellular device; determining a second position, wherein the second position fix is selected from the group consisting of the position of the georeference point of interest, and the position fix of the cellular device; and determining a distance between the first position and the second position. For example, according to one embodiment, a first position and a second position are determined where the first position and the second position are selected from a group consisting of a position of a georeference point of interest 2702, and a position fix Xpf, Ypf, Zpf of the mobile data collection platform 1400; and determining a distance between the first position and the second position.

Various embodiments provide for determining a known spatial relationship between an entrance pupil center of the cellular device and an antenna of the cellular device based on one or more geometric offsets between the entrance pupil center and the antenna. For example, according to one embodiment, a known spatial relationship between an entrance pupil of the image capturing device and an antenna of the cellular device is determined based on one or more geometric offsets 2406 (FIG. 24), 2501, 2502 (FIG. 26) between the entrance pupil center 1902 and the antenna 1412 (FIG. 24 and FIG. 26).

According to one embodiment, the MDCP 1400 is not required to be perpendicular to the local gravity vector 2270 at the time of the capturing and the determining of the three dimensional position X0, Y0, Z0.

Mobile Data Collection Platform

FIG. 37 depicts a block diagram of a mobile data collection platform system, according to one embodiment. The mobile data collection platform system includes a mobile data collection platform 3700 and an external GNSS raw observable provider 3750 that is outside of the mobile data collection platform 3700. The mobile data collection platform 3700 can include any one or more features of MDCP 1400, 1500.

The mobile data collection platform 3700 includes a bus 3710, various types of software 3701, one or more hardware processors 1460, computer usable non-volatile memory (ROM) 3702, computer usable volatile memory (RAM) 3703, hardware memory 1450 that includes data 3704, a display 1414, a graphical user interface (GUI) 3705, input/output device 3706, platform orientation system 1470, cellular communications 1510, other communications receivers 3707, image capturing device 1430, bubble level system 1820, and short range communications 3709.

The software 3701 is connected with the RAM 3703 and the memory 1450.

The bus 3710 is connected with the one or more processors 1460, the ROM 3702, the RAM 3703, the memory 1450, the display 1414, the GUI 3705, the input/output device 3706, the platform orientation system 1470, the cellular communications 1510, the other communications receivers 3707, the image capturing device 1430, the bubble level system 1820 and the short range communications 3709. The MDCP 3700 can communicate with an optional external GNSS raw observable provider 3750 and a peripheral computer readable storage media 3760.

Examples of software 3701 are an operating system 3701a, applications 3701b, and modules 3701c. Examples of an operating system 3701a, applications 3701b, modules 3701c include at least operating systems, applications and modules as discussed herein.

The memory 1450 stores data 3704. Examples of data 3704 include one or more images 1452, one or more position fixes 1454, orientation information 1456 and any other type of data that may be used by an MDCP 3700 or that is described herein, or a combination thereof The ROM 3702, RAM 3703 and the memory 1450 is for storing information and instructions for the one or more processors 1460.

The display 1414 may be a liquid crystal device, cathode ray tube, plasma display device or other display device suitable for creating graphic images and alphanumeric characters recognizable to a user.

The GUI 3705 includes the graphical user interface 2700 (FIG. 27). The GUI 3705 may include other types of GUIs that may be used with an MDCP 3700.

The input/output device 3706 is for coupling the MDCP 3700 with external entities. For example, in one embodiment, I/O device 3706 is a modem for enabling wired or wireless communications between an MDCP 3700 and an external network such as, but not limited to, the Internet.

Examples of other communications receivers 3707 are satellite radio, terrestrial radio, digital radio, analog radio, Wi-Fi, and Bluetooth protocol.

An example of a short range communications 3709 is Bluetooth communications 1520.

The peripheral computer readable storage media 3760 can be connected with the bus 3710. Examples of peripheral computer readable storage media 3760 are a disk, DVD, or CD.

External GNSS Raw Observable Provider

According to one embodiment, an external GNSS raw observable provider provides higher quality reception of GNSS satellite signals than the GNSS chipset that is internal the cellular device 1410 of a mobile data collection platform 1400, 1500, 3700. For example, in typical GNSS antennae currently used in cellular devices, the GNSS antennae are usually configured for linear polarization and not a circularly polarized design. This results in a significant loss of signal from orbiting GNSS satellites, at least 3 dB. However, according to one embodiment, the external GNSS raw observable provider 3750 utilizes a circularly polarized GNSS antenna, such as a patch antenna, quadrifilier helix antenna, and planar quadrifiler antenna. The circularly polarized GNSS antenna of the external GNSS raw observable provider has higher quality reception than linearly polarized antenna of an MDCP. Although many cellular devices' antennas, such as antenna 1412 are linearly polarized, embodiments are well suited for cellular devices with high quality antennas, such as antennas with a circularly polarized design.

The optional external GNSS raw observable provider 3750 can communicate with the MDCP 3700 via the short range communications 3709. The external GNSS raw observable provider 3750 can receive raw observables, communicate the raw observables to the MDCP 3700, and the MDCP 3700 can determine a position fix based on the raw observables from the external GNSS raw observable provider 3750. The raw observables from the external GNSS satellite system are also referred to herein as "external raw observables" since they are received from a GNSS raw observable provider 3750 that is external to the MDCP 3700. The raw observables obtained from the GNSS chipset that is internal to the MDCP 3700 shall be referred to as "internal raw observables."

The external raw observables from the external GNSS raw observable provider 3750 can include raw pseudoranges, and one or more of real carrier phase information and Doppler Shift Information. The raw pseudoranges, the real carrier phase information and the Doppler Shift Information from the external GNSS raw observable provider 3750 shall be called respectively "external raw pseudoranges," "external Doppler Shift Information," and "external real carrier phase information." The MDCP 3700 can process the external raw observables, according to various embodiments described herein, to provide a position fix 1454. The MDCP 3700 can use the external raw observables to determine a position fix 1454, for example, instead of the internal raw observables from the GNSS chipset 1413 that is part of the MDCP 3700. The external raw pseudoranges can be corrected or smoothed, or a combination thereof, as described herein. A position fix determined based on uncorrected unsmoothed external raw pseudoranges, corrected unsmoothed external raw pseudoranges, uncorrected smoothed external raw pseudoranges, corrected smoothed external raw pseudoranges can be smoothed using locally measured movement information as described herein. The external raw pseudoranges can be smoothed using either the external Doppler Shift Information or the external real carrier phase information according to various embodiments described herein. A position fix that is determined based on external raw observables can be stored as position fix 1454.

According to one embodiment, the external GNSS raw observable provider 3750 has the type of GNSS chipset that is used in cellular devices. Therefore, the GNSS chipset in the GNSS raw observable provider 3750 and the GNSS chipset 1413 in the mobile data collection platform 1400 may provide the same functionality. The GNSS chipset in the GNSS raw observable provider 3750 may provide more accuracy, as is known in the GNSS receiver art, than the GNSS chipset 1413 in the mobile data collection platform 1400. An example of an optional external GNSS raw observable provider 3750, according to one embodiment is a GNSS receiver positioning system described in U.S. patent application Ser. No. 14/134,437, by Large et al., entitled "GNSS Receiver Positioning System," filed Dec. 19, 2013.

Figure 39:
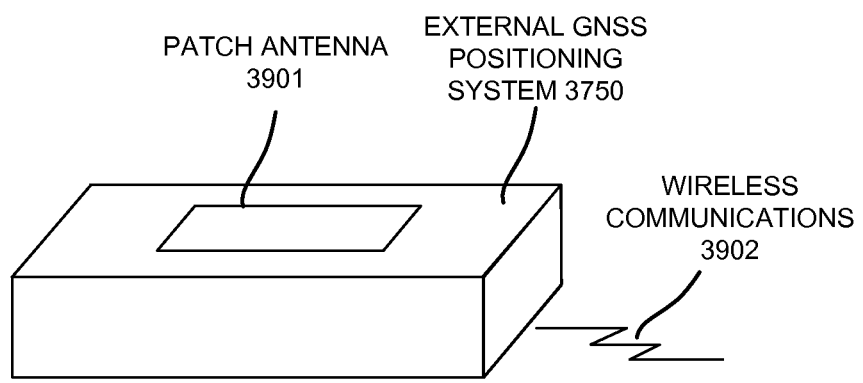
FIG. 39 depicts an outside view of an external GNSS raw observable provider, according to one embodiment.

FIG. 39 depicts an outside view of an external GNSS raw observable provider 3750, according to one embodiment. The outside view depicts a patch antenna 3901 for wireless communications 3902, for example, with an MDCP 1400, 1500, 3700. The wireless communications 2902 can be Bluetooth. For example, the external GNSS raw observable provider 3750 and the MDCP 1400, 1500, 3700 can communicate with their respective wireless communications 3902 and short range communications 3709.

Figure 38:
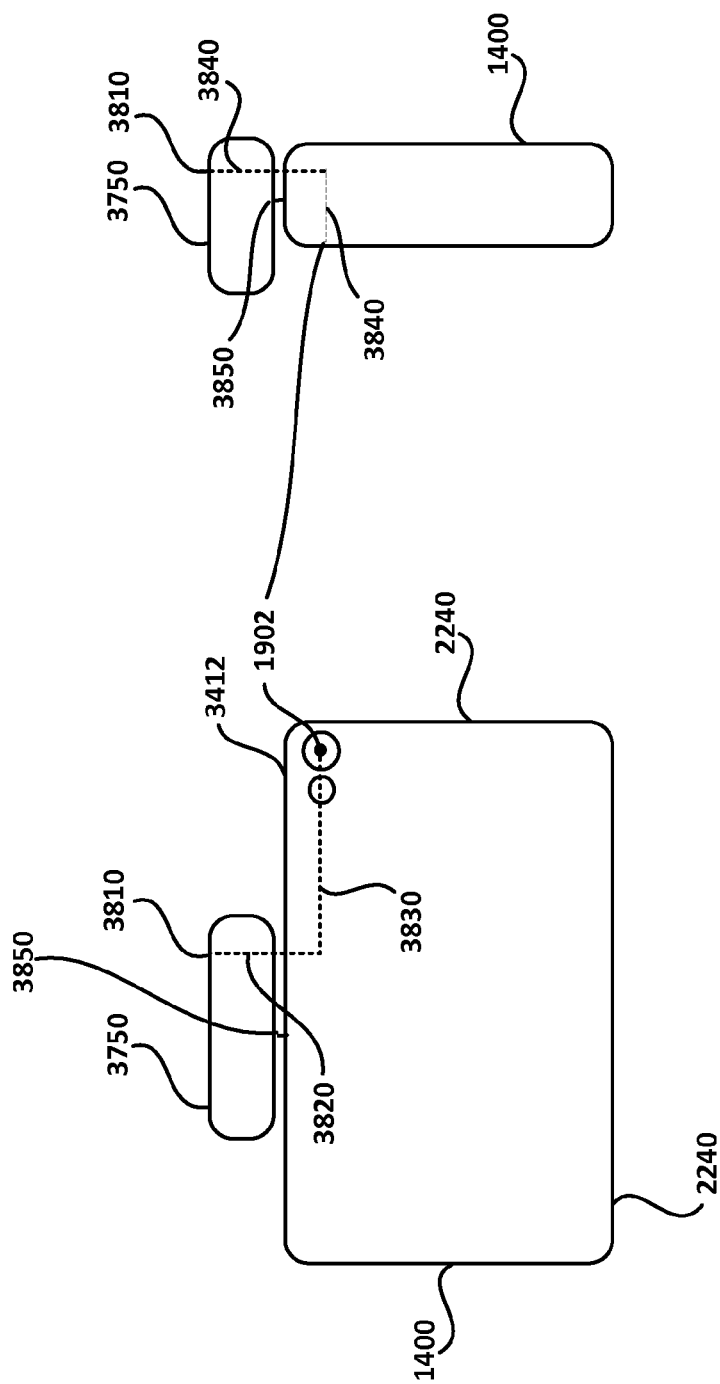
FIG. 38 depicts an external GNSS raw observable provider in a known spatial relationship with a mobile data collection platform, according to one embodiment.

Known Spatial Relationship Between External GNSS Raw Observable Provider and Mobile Data Collection Platform FIG. 38 depicts an external GNSS raw observable provider 3750 in a known spatial relationship with a mobile data collection platform 1400, according to one embodiment. The mobile data collection platform 1400 can be any mobile data collection platform 1400, 1500, 3700 described herein. According to one embodiment, the known spatial relationship between the GNSS raw observable provider 3750 and the mobile data collection platform 1400 is maintained while they are used for collecting data, such as an image 1452, position fix 1454, and orientation information 1456 as described herein. For example, a coupling mechanism 3850 such as a clip or a joint can be used to physically couple the mobile data collection platform 1400 and the GNSS raw observable provider 3750 together to provide and maintain a known spatial relationship between them.

The known spatial relationship can be one or more distances 3820, 3830, 3840 (also known as "offsets") between an antenna 3810 of the GNSS raw observable provider 3750 and the entrance pupil center 1902 of the MDCP 1400 along respective x platform axis 2240, y platform axis 2220, and z platform axis 2230. More specifically, there may be a first distance 3830 between the GNSS raw observable provider 3750 and the entrance pupil center 1902 of the MDCP 1400 along the x platform axis 2240, a second distance 3820 between the GNSS raw observable provider 3750 and the entrance pupil center 1902 of the MDCP 1400 along the y platform axis 2220 and a third distance 3840 between the GNSS raw observable provider 3750 and the entrance pupil center 1902 of the MDCP 1400 along the z platform axis 2230. One or more of these distances 3820, 3830, and 3840 can be used as a known spatial relationship between the GNSS raw observable provider 3750 and the MDCP 1400. Therefore, various embodiments provide for receiving external raw observables from an external GNSS raw observable provider 3750 that is external to the mobile data collection platform 1400, wherein an antenna 3810 of the external GNSS raw observable provider 3750 and an entrance pupil center 1902 of the mobile data collection platform 1400 are in a known spatial relationship 3820, 3830, and 3840. A position fix 1454 that is determined based on external raw observables, one or more of the distances 3820, 3830, 3840, the tilt angle and the tilt direction can be used to determine the three dimensional position X0, Y0, Z0 of the entrance pupil center 1902 in the local coordinate system according to various embodiments described herein.

Mobile Data Collection Platform Examples

Various embodiments provide a mobile data collection platform 1400, 1500, 3700 comprising: a cellular device 1410 having: a GNSS chipset 1413 that provides raw observables; an antenna 1412 for receiving GNSS positioning signals and defining a location Xpf, Ypf, Zpf of the mobile data collection platform 1400, 1500, 3700; and a display 1414; an image capturing device 1430 that captures an image 1452, wherein the image capturing device 1430 has a known spatial relationship 2406, 2501, 2502 with a position determination system reference point, provided for example by the antenna 1412, of the mobile data collection platform 1400, 1500, 3700; an orientation system 1470 that includes a tilt sensor 1442 and a compass 1444 and determines orientation information 1456 that includes tilt angle 2204 obtained from the tilt sensor 1442 and heading information AZ obtained from the compass 1444, wherein the tilt angle 2204 is between the mobile data collection platform 1400, 1500, 3700 and a local gravity vector 2270, and the heading information is an azimuth angle AZ between a pointing vector PV of the image capturing device 1430 and a reference direction; hardware memory 1450 that stores the image 1452, the position fix 1454 and the orientation information 1456; and one or more hardware processors 1460 located outside of the GNSS chipset 1413 that accesses the GNSS chipset 1413 and extracts the raw observables from the GNSS chipset 1413 for use outside of the GNSS chipset 1413 elsewhere in the mobile data collection platform 1400, 1500, 3700; captures an image 1452 with the image capturing device 1430, wherein the image 1452 depicts a point of interest; determines a position fix 1454 of the mobile data collection platform 1400, 1500, 3700 based on the raw observables, wherein the position fix 1454 provides a location of the mobile data collection platform 1400, 1500, 3700 in a GNSS coordinate system; accesses the orientation information from the orientation system 1470, 1440, wherein the orientation information 1456 and heading information AZ associated with a three dimensional location, such as the entrance pupil center's location X0, Y0, Z0 or the position fix Xpf, Ypf, Zpf, of the mobile data collection platform 1400, 1500, 3700 when the image z52 was captured; and storing the image 1452, the position fix 1454 and the orientation information 1456 and heading information AZ in the hardware memory 1450 of the mobile data collection platform 1400, 1500, 3700. Examples of a reference direction are true north 2201, magnetic north or a reference target at a known location, from which the direction vector can be determined, for example, using vector algebra.

According to one embodiment, the raw observables include raw pseudoranges and at least one of real carrier phase information and Doppler Shift Information. For example, according to one embodiment, the raw observables from the GNSS chipset 1413 include raw pseudoranges and at least one of real carrier phase information and Doppler Shift Information.

According to one embodiment, the image capturing device is embedded in the cellular device as an integrated subsystem in a known location relative to a GNSS antenna of the cellular device. For example, the image capturing device 1430 is embedded in the cellular device 1410 as an integrated subsystem in a known location relative to a GNSS antenna 1412 of the cellular device 1410. For example, offsets depicted in FIG. 27, FIG. 24, and FIG. 25 can be used for determining the known location.

According to one embodiment, the display emulates a pair of crosshairs indicative of an axial direction of an entrance pupil of the image capturing device when displaying the image. For example, the display 1414 emulates a pair of crosshairs of the crosshair display overlay 2721 indicative of an axial direction 2760 of an entrance pupil center 1902 of the image capturing device 1430 when displaying the image 1452.

According to one embodiment, the mobile data collection platform includes a graphical user interface, and wherein the mobile data collection platform further comprise a bubble level processing logic coupled with the orientation system that displays a virtual representation of a bubble level on the display. For example, the mobile data collection platform 1400 includes a graphical user interface 2720, 2770. The mobile data collection platform 1400 includes bubble level processing logic 1820 coupled with the orientation system 1470 that displays a virtual representation of a bubble level 2770 on the display 1414.

According to one embodiment, a position of a virtual representation of a bubble on the display is determined based on the orientation of the mobile data collection platform. For example, a position of a virtual representation of a bubble 2770 on the display 1414 is determined based on the orientation of the mobile data collection platform 1400. More specifically, if the mobile data collect platform 1400 is level, the virtual representation of the bubble 2770 will be in the center 2771 of the graphical bubble level overlay 2720. However, if the mobile data collect platform 1400 is tilting in one or more directions, then the virtual representation of the bubble 2770 will move in a direction that corresponds with the one or more directions that the mobile data collection platform 1400 is tilting. For example, the graphical user interface 2720, 2770 emulates a mechanical bubble level.

According to one embodiment, the virtual representation of the bubble is visible when a tilt angle from the orientation system is less than a selected number in the range from 1 to 10 degrees from a horizontal reference. For example, the virtual representation of the bubble 2770 is visible when a tilt angle 2204 from the inertial orientation system 1440 is less than a specified number in the range from 1 to 10 degrees from a horizontal reference. An example of a horizontal reference is a plane, such as horizontal plane HP (FIG. 24), or a line, such as second line HL (FIG. 24), that is perpendicular to the local gravity vector.

According to one embodiment, the hardware processor 1460 executes instructions that provide smoothed pseudoranges by smoothing (1130, FIG. 11) raw pseudoranges based on carrier phase information, wherein the raw observables include the raw pseudoranges, provide corrected smoothed pseudoranges by correcting (1140, FIG. 11) the smoothed pseudoranges based on external corrections, and determine the position fix Xpf, Ypf, Zpf based on the corrected smoothed pseudoranges.

According to one embodiment, the hardware processor 1460 (FIG. 14) executes instructions that receive tilt angle information, such as information about tilt angle 2204 (FIG. 24), from an at least one tilt sensor 1442 (FIG. 14) associated with the inertial orientation system 1440 (FIG. 14), receive azimuth angle information, such as information about azimuth angle AZ (FIG. 26), from an azimuth sensor, such as compass 1444 (FIG. 14); and determine a direction of a pointing vector PV (FIG. 24) emanating from an entrance pupil 1902 (FIG. 24) of the image capturing device 1430 (FIG. 14). The tilt angle information and the azimuth angle information can be used to define the orientation of the mobile data collection platform 1400 (FIG. 14) relative to a local gravity vector 2270 (FIG. 24).

According to one embodiment, the image 1452 (FIG. 14) depicts an object 2799 (FIG. 27), 2930 (FIG. 3) with a known dimension. The object may be a coin, a ruler, or a yardstick, for example, which was placed in the field of view. The object may be a feature in the field of view that was not purposely placed there. For example, the object may be the side of a window or a door where the length of the side is known and, therefore, be used as scale information.

According to one embodiment, the hardware processor 1460 executes instructions, for example in response to a user pressing a button of the MDCP 1400, to capture a first image and at a subsequent time, a second image with the image capturing device 1430 (FIG. 14) where both the first image and the second image depict the point of interest 2250 (FIG. 24), determines a first position fix and a second position fix of the mobile data collection platform that correlate with respective first location P1 (FIG. 32) and second location P2 (FIG. 32) of the mobile data collection platform 1400 (FIG. 14) in the GNSS coordinate system, accesses the first and second inertial orientation information from the inertial orientation system 1440, where the first inertial orientation information pertains to a first orientation of the mobile data collection platform 1400 (FIG. 14) for capturing the first image at the first location P1 and the second inertial orientation information pertains to a second orientation of the mobile data collection platform 1400 (FIG. 14) for capturing the second image at the second location P2, and stores the second image, the second position fix, and the second inertial orientation information in the hardware memory 1450 (FIG. 14). The button that the user presses may be a button of the MDCP 1400 for capturing an image.

According to one embodiment, the hardware processor 1460 executes instructions that calculates a distance D 3201 (FIG. 32) between the first location P1 (FIG. 32) and the second location P2 (FIG. 32) by calculating a difference between the first position fix for location P1 and the second position fix for location P2, wherein the distance D 3201 is scale information, and stores the distance D 3201 in the hardware memory 1450 (FIG. 14).

According to one embodiment, the mobile data collection platform includes a tilt sensor 1442 (FIG. 14) and a compass 1444 (FIG. 14), the tilt sensor 1442 (FIG. 14) determines a tilt angle 2204 (FIG. 24) and the compass 1444 (FIG. 14) determines an azimuth angle AZ (FIG. 26).

According to one embodiment, the mobile data collection platform 1400 receives external raw observables from an external GNSS raw observable provider 3750 that is external to the mobile data collection platform 1400, wherein an antenna of the external GNSS raw observable provider 3750 and an entrance pupil center 1902 of the mobile data collection platform 1400 are in a known spatial relationship.

According to one embodiment, the hardware processor further executes instructions that determine a location of the entrance pupil center 1902 based on the known spatial relationship, such as one or more of distances 3820, 3830, 3840, between the antenna 3810 and the entrance pupil center 1902.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor of the computer system. When executed, the instructions cause a computer system to implement the functionality of various embodiments of the present invention. For example, the instructions can be executed by a central processing unit associated with the computer system. According to one embodiment, the non-transitory computer readable storage medium is tangible.

Unless otherwise specified, one or more of the various embodiments described in the context of FIGS. 1A-39 can be implemented as hardware, such as circuitry, firmware, or computer readable instructions that are stored on non-transitory computer readable storage medium. The computer readable instructions of the various embodiments described in the context of FIGS. 1A-39 can be executed by a hardware processor, such as central processing unit, to cause a computer system to implement the functionality of various embodiments. For example, according to one embodiment, various embodiments described herein are implemented with computer readable instructions that are stored on computer readable storage medium that can be tangible or non-transitory or a combination thereof Conclusion The blocks that represent features in FIGS. 1A-39 can be arranged differently than as illustrated, and can implement additional or fewer features than what are described herein. Further, the features represented by the blocks in FIGS. 1A-39 can be combined in various ways. The mobile data collection platform 1400, 1500, and 3700 can be implemented using hardware, hardware and software, hardware and firmware, or a combination thereof. Further, unless specified otherwise, various embodiments that are described as being a part of the mobile data collection platform 1400, 1500, 3700, whether depicted as a part of the mobile data collection platform 1400, 1500, 3700 or not, can be implemented using hardware, hardware and software, hardware and firmware, or a combination thereof.

The above illustration is only provided by way of example and not by way of limitation. There are other ways of performing the method described by the flowchart depicted herein.

Although specific operations are disclosed in various flowcharts depicted herein, such operations are exemplary. That is, embodiments of the present invention are well suited to performing various other operations or variations of the operations recited in the flowcharts. It is appreciated that the operations in the flowcharts may be performed in an order different than presented, and that not all of the operations in the flowcharts may be performed.

The operations depicted in depicted in the flowcharts herein can be implemented as computer readable instructions, hardware or firmware. According to one embodiment, a mobile data collection platform 1400, 1500, and 3700 can perform one or more of the operations depicted in flowcharts herein.

The embodiments described herein transform data or modify data to transform the state of a mobile data collection platform 1400, 1500, 3700 for at least the reason that by extracting pseudorange information from a GNSS chipset for use elsewhere, the state of the mobile data collection platform 1400, 1500, 3700 is transformed from an entity that is not capable of determining a position fix itself into a mobile data collection platform 1400, 1500, 3700 that is capable of determining a position fix itself. In another example, embodiments described herein transform the state of a mobile data collection platform 1400, 1500, and 3700 from not being capable of providing an improved accuracy position fix to being capable of providing an improved accuracy position fix.

III. Collecting External Accessory Data at a Mobile Data Collection Platform that Obtains Raw Observables from an Internal Chipset Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "providing," "collecting," "capturing," "obtaining," "accessing," "determining," "measuring," "receiving," "storing," "illuminating," "monitoring," "activating,"

"requesting," "coupling," "associating," "maintaining," "transmitting," "communicating," "altering," "detecting," "focusing," "integrating," "executing," "performing," "extracting," "using," "correcting," "smoothing," "reconstructing," "modeling," "improving," "adjusting," "filtering, " "discarding," "removing," "selecting," "locating," "positioning," "increasing," "differentiating," "bridging," "displaying," "calculating," "notifying," "matching," "creating," "generating," "deactivating," "initiating," "terminating," "interpolating," "changing," "replacing," "causing," "transforming data," "modifying data to transform the state of a computer system," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview of Discussion

An external accessory can be used in conjunction with a mobile data collection platform (MDCP) that provides additional information to the mobile data collection platform. Examples of an external accessory are an external GNSS raw observable provider, an external electronic distance measurement (EDM) accessory, and an external image capturing device (ICD) accessory. The external image capturing device accessory may or may not be an infrared image capturing device (also known as an "external infrared image capturing device accessory"). The external accessory can provide the additional data to the mobile data collection platform, for example, using a communication method, such as wireless communication or wired communication. The external accessory may be a legacy device.

Another type of external accessory provides an aid to improve the quality of the data collected by the mobile data collection platform. Examples of this second type of external accessory are a monopod, a tripod, a physical tape measurer, what is commonly known as a "surveyors' rod," and an external laser pointer accessory.

Mobile Data Collection Platform

Figure 40:
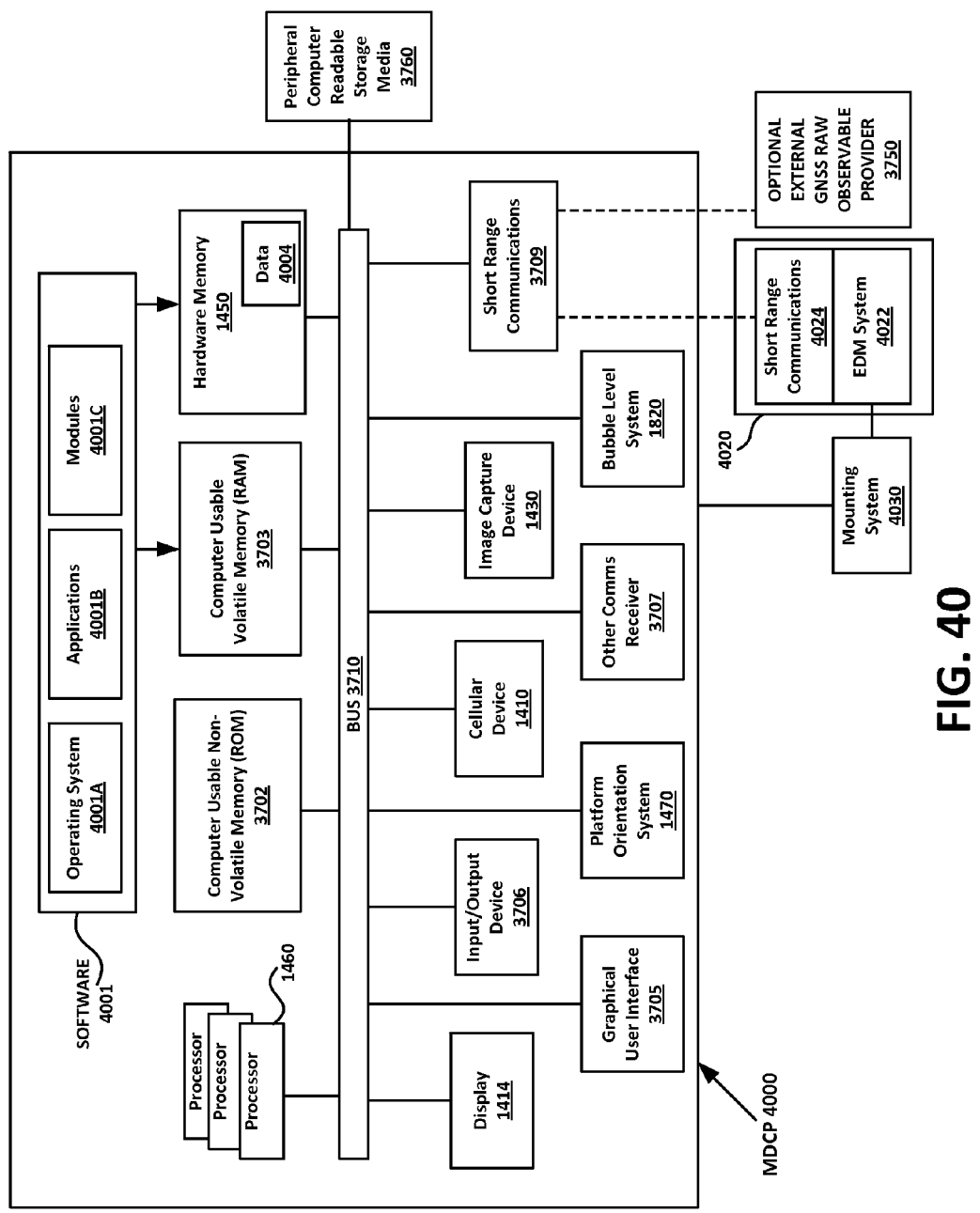
FIG. 40 depicts a block diagram of a mobile data collection platform, according to one embodiment.

FIG. 40 depicts a block diagram of a mobile data collection platform, according to one embodiment. The mobile data collection platform 4000 can include any one or more features of MDCP 1400, 1500.

Examples of a mobile data collection platform 4000 are a cell phone, a non-voice enabled cellular device, a tablet computer, a phablet, and a mobile hand-held GNSS receiver. The mobile data collection platform 4000 may be used while moving or stationary, since it may be operated in a hand-held position or secured, for example, on a monopod or tripod or a mobile platform attached to a vehicle. Examples of a tablet computer are the Microsoft Surface, Apple iPads, Apple iPad mini, iPad tablet, Nexus 7, Samsung Galaxy Tab families, and the Samsung Galaxy Note. According to one embodiment, a mobile data collection platform 4000 is a mobile communication device (MCD) with cellular communications capabilities (also referred to as a "cellular communication enabled mobile communication device").

The mobile data collection platform 4000 includes a bus 3710, various types of software 4001, one or more hardware processors 1460, computer usable non-volatile memory (ROM) 3702, computer usable volatile memory (RAM) 3703, hardware memory 1450 that includes data 4004, a display 1414 (also referred to as a "display screen" or "screen"), a graphical user interface (GUI) 3705, input/output device 3706, platform orientation system 1470, cellular device 1410, other communications receivers 3707, image capturing device 1430, bubble level system 3820, and short range communication device 3709.

The software 4001 is connected with the ROM 3702, RAM 3703 and the memory 1450. The bus 3710 is connected with the one or more hardware processors 1460, the ROM 3702, the RAM 3703, the memory 1450, the display 1414, the GUI 3705, the input/output device 3706, the platform orientation system 1470, the cellular device 1410, the other communications receivers 3707, the image capturing device 1430, the bubble level system 3820 and the short range communication device 4024. The MDCP 4000 can communicate with an optional external GNSS raw observable provider 3750 and a peripheral computer readable storage media 3760.

Examples of software 4001 are an operating system 4001A, applications 4001B, and modules 4001C. Examples of an operating system 4001A, applications 4001B, modules 4001C include at least operating systems, applications and modules as discussed herein.

The memory 1450 stores data 4004. Examples of data 4004 include one or more images 1452, 4152, one or more position fixes 1454, 4154, orientation information 1456, any one or more known spatial relationships discussed herein, and any other type of data that may be used by an MDCP 4000 or that is described herein, or a combination thereof.

The GNSS raw observable provider 3750 and external EDM accessory 4020 can communicate with the MDCP 3700 via the short range communication device 3709. The external EDM accessory 4020 includes short range communication device 4024 and an EDM system 4022. The MDCP 4000 and the external EDM accessory 4020 can communicate with each other with their respective short range communication devices 3709 and 4024.

A mounting system 4030 is used to physically couple the external EDM accessory 4020 and the MDCP 4000 together.

Various other features are depicted in FIG. 40 that have already been discussed herein, for example, at least in the context of FIG. 37.

Figure 41:
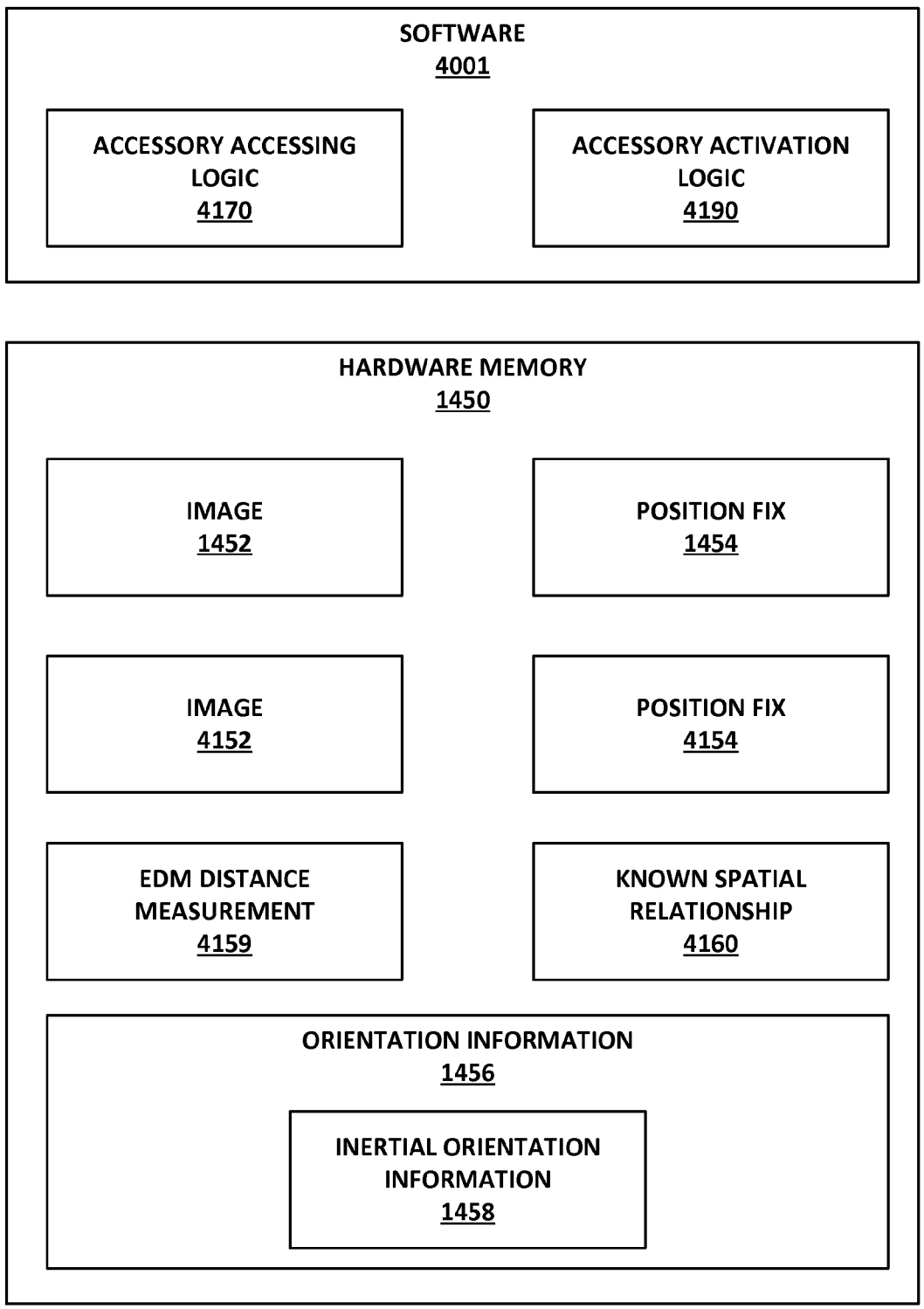
FIG. 41 depicts software and hardware memory of a mobile data collection platform, according to various embodiments.

FIG. 41 depicts software 4001 and hardware memory 1450 of a mobile data collection platform 4000, according to various embodiments.

The software 4001 can include accessory activation logic 4190 and accessory accessing logic 4170. The accessory activation logic 4190 and the accessory accessing logic 4170 can reside in either applications 4001B or modules 4001C, for example. A mobile data collection platform 4000 can be coupled and used with an external accessory, according to one embodiment. The accessory activation logic 4190 detects that an image capture button, such as accept data button 2730, has been pressed and requests information, in response to the button 2730 being pressed, from an external accessory that is attached to the mobile data collection platform 4000. Alternatively, the accessory activation logic 4190 can detect that a timer expired and request information from an external accessory in response. The accessory accessing logic 4170 receives various types of external accessory data and stores various types of external accessory data. According to various embodiments, the hardware processor 1460 executes the logics 4190 and 4170.

Hardware memory 1450 includes internal image 1452, internal position fix 1454, external IR image 4152, external position fix 4154, EDM distance measurement 4159, any one or more known spatial relationships 4160 discussed herein, and orientation information 1456. The antenna 1412, the display 1414, the logic 4190, 4170, the hardware 1420 are part of the mobile data collection platform 4000 and outside of the GNSS chipset 1413, which is internal to the mobile data collection platform 4000. Therefore, the GNSS chipset 1413 is also referred to as an "internal GNSS chipset." An external IR image 4152, the external position fix 4154 that is determined based on external raw observables, an EDM distance measurement 4159, and optionally one or more known spatial relationships 4160 are stored in hardware memory 1450.

The mobile data collection platform 4000 is not required to be leveled as a part of capturing the image 1452, determining the internal position fix 1454, determining the external position fix 4154, determining the orientation information 1456 or receiving external accessory data, such as external raw observables that can be used for determining the external position fix 4154, external IR image 4152, EDM distance measurement 4159, or using an external laser pointer accessory (refer to 4412 in FIGS. 44 and 4412 in FIG. 46B) to illuminate a point of interest. The orientation information 1456 is associated directly and automatically with a three dimensional location, such as the position fix Xpf, Ypf, Zpf (stored as position fix 1454) or the three dimensional location X0, Y0, Z0 of an entrance pupil center of the mobile data collection platform 4000 when an image 1452, 4152 is captured. The mobile data collection platform 4000 is not required to be leveled at the time that the position fix Xpf, Zpf, Ypf and the orientation information 1456 are determined as is common with other optical measurement devices such as theodolites or total stations.

Any one or more of the entities, such as hardware 1420, image capturing device 1430, inertial orientation system 1440, compass 1444, hardware memory 1450, hardware processor 1460, that are part of the mobile data collection platform 4000 and outside of the cellular device 1410 can instead be inside of the cellular device 1410. According to one embodiment, the mobile data collection platform 4000 is a cellular device. For example, a tablet type MDCP may contain all the recited hardware, plus a separate cellphone module, which itself can contain some of the hardware items, including a GNSS chipset. Conversely, the tablet type MDCP may contain a GNSS chipset whose raw observables may be made available to any of the hard processors associated with the tablet.

Various types of information can be stored, for example, in an EXIF file associated with the image 1452, 4152. Examples of information that can be written into the EXIF file are the GPS position fix 1454, 4154 orientation information 1456, the tilt angle, the direction of an azimuth angle (also referred to as an "azimuth direction" or "tilt direction"), scale information, EDM distance measurement 4159, and antenna-to-entrance-pupil-center-geometric-information, one or more known spatial relationships. Any type of information that can be used, for example, for determining one or more of a three dimensional position of the MDCP's entrance pupil center, a three dimensional position of the center of the IR entrance pupil 4630B, a distance from the entrance pupil center to a point of interest and a location of a point of interest, as will become more evident, can be stored in the EXIF file. Alternatively, any or more of the same information can be stored as reference information in a suitable reference file associated with the particular mobile data collection platform.

According to one embodiment, the mobile data collection platform 4000 includes a SUPL client, as described herein. The SUPL client can be inside of the cellular device 1410 or can be in the mobile data collection platform 4000 and outside of the cellular device 1410. According to various embodiments, the mobile data collection platform 4000 can include any one or more of features described herein. For example, the mobile data collection platform 4000 can include at least any one or more features or operations depicted in or described in the context of FIGS. 1A-39.

Figure 42:
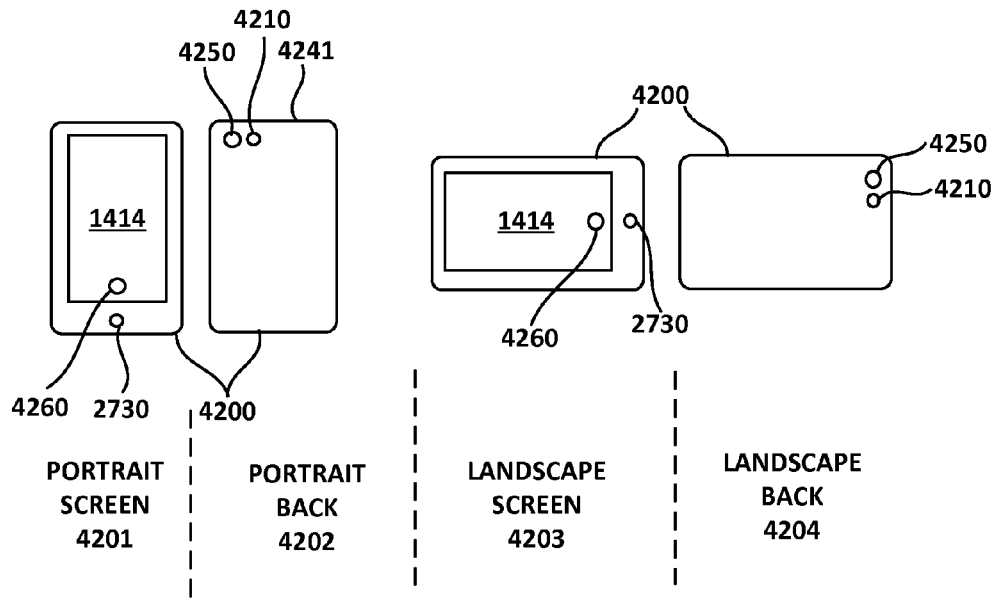
FIG. 42 depicts a smart phone/mobile digital device (e.g., iPhone®) type mobile data collection platform with an entrance pupil and flash oriented in a side position, according to one embodiment.

FIG. 42 depicts a smart phone/mobile digital device (e.g., iPhone®) type mobile data collection platform 4200 with an entrance pupil 4250 and flash 4210 oriented in a side position 4241, according to one embodiment. From left to right, the MDCP 4200 is depicted in a portrait screen view 4201, a portrait back view 4202, a landscape screen view 4203, and a landscape back view 4204. The accept data button 2730 (FIG. 42, FIG. 43) is oriented on the same side as the display 1414 (FIG. 42, FIG. 43), as discussed herein, as depicted in the screen views. The EDM distance button 4260 (FIG. 42) is also oriented on the same side as the display 1414. Either the accept data button 2730 or the EDM distance button 4260 or both may be a mechanical button or a graphical button that is displayed on the display 1414. However, various embodiments are well suited for button 4260 and/or button 2730 to be in other positions on either an MDCP or an external accessory.

Figure 43:
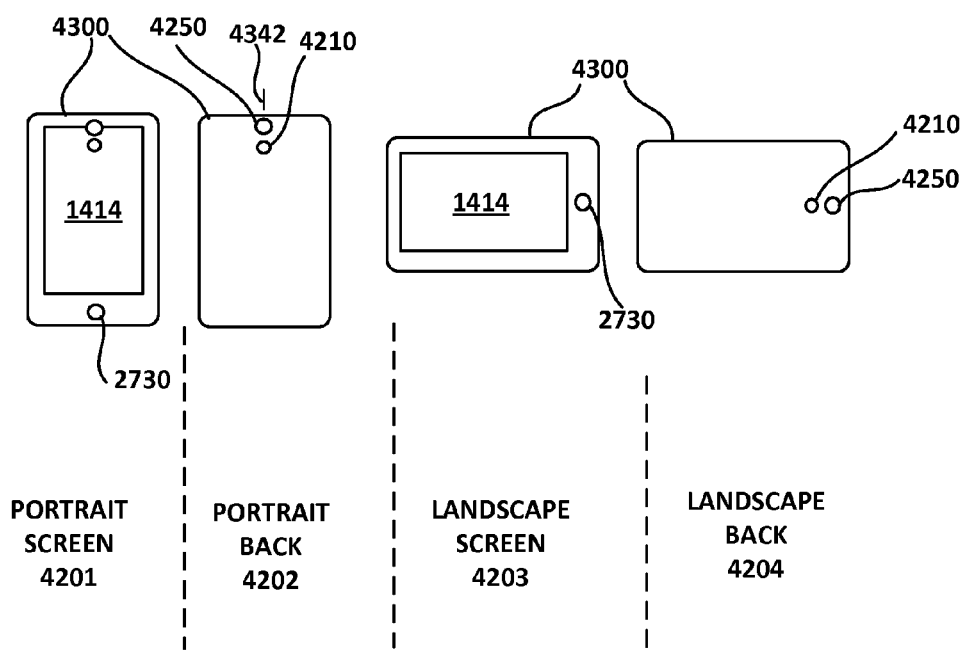
FIG. 43 depicts a smart phone/mobile digital device (e.g., iPhone®) type mobile data collection platform with an entrance pupil and flash oriented in a center position, according to one embodiment.

FIG. 43 depicts a smart phone/mobile digital device (e.g., iPhone®) type mobile data collection platform 4300 with an entrance pupil 4250 and flash 4210 oriented in a center position 4342, according to one embodiment. From left to right, the MDCP 4300 is depicted in a portrait screen view 4201, a portrait back view 4202, a landscape screen view 4203, and a landscape back view 4204. The accept data button 2730 is oriented on the same side as the display 1414 as depicted in the screen views. The accept data button 2730 may be a mechanical button or a graphical button that is displayed on the display 1414.

The entrance pupil 4250 and the flash 4210 are exposed on the portrait back view 4202 and landscape back view 4204 in FIG. 42 and FIG. 43. The positions of the entrance pupil 4250 and the flash 4210 are marked in the portrait screen 4201 and landscape screen 4203 views, however they are not exposed in the portrait screen 4201 and landscape screen 4203 views. The accept data button 2730 is exposed and accessible in the portrait screen 4201 and landscape screen 4203 views.

External Accessory Overview

Figure 44:
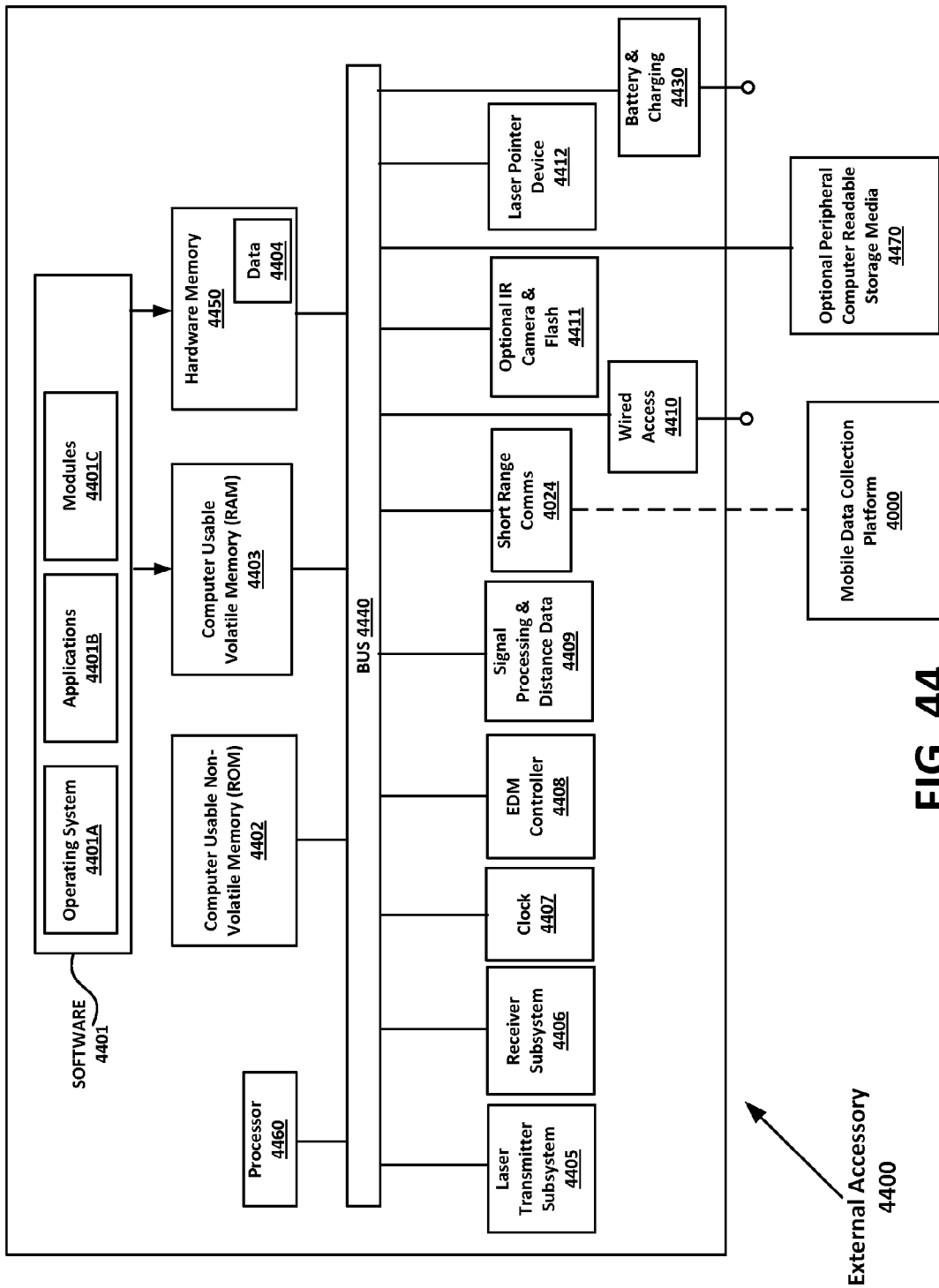
FIG. 44 depicts a block diagram of an external accessory, according to one embodiment.

FIG. 44 depicts a block diagram of an external accessory, according to one embodiment.

The external accessory 4400, as depicted in FIG. 44, includes software 4401, computer usable non-volatile memory (ROM) 4402, computer usable volatile memory (RAM) 4403, hardware memory 4450, one or more hardware processors 4460, a bus 4440, a laser transmitter subsystem 4405, a receiver subsystem 4406, a clock 4407, an EDM controller 4408, a signal processing and distance data 4409, short range communication device 4024, optional wired access 4410, optional infrared (IR) image capturing device (ICD) and flash 4411, optional visible laser pointer device 4412, and a rechargeable battery 4430.

The software 4401, one or more hardware processors 4460, ROM 4402, RAM 4403, hardware memory 4450, laser transmitter subsystem 4405, receiver subsystem 4406, clock 4407, EDM controller 4408, signal processing and distance data 4409, short range communication device 4024, wired access 4410, optional IR image capturing device and flash 4411, optional peripheral computer readable storage media 4470, optional visible laser pointer device 4412 and battery 4430, which may be rechargeable or non-rechargeable, are connected with the bus 4440.

FIG. 44 also depicts a mobile data collection platform 4000 (MDCP) that can communicate with the external accessory 4400's short range communication device 4024. The MDCP 4000 and the external accessory 4400 can communicate with each other through their respective communication devices 3709 and 4024.

The software 4401 includes an operating system 4401A, applications 4401B, and modules 4401C. As will become more evident, the time of flight distance calculator 4509A, interface to MDCP logic 4512A, and the data storage and data transfer logic 4510A (FIG. 45A), the requested information obtaining logic 5920 (FIG. 59), and the requested information providing logic 5930 (FIG. 59) can reside in software, such as applications 4401B or modules 4401C.

Hardware memory 4450 includes data 4404, for example, that the software 4401 uses or stores. The data 4404 may be input to the software 4401, an intermediate result of computations performed by the software 4401 or a final result of computations performed by the software 4401, or a combination thereof.

The external accessory 4400 can communicate with another entity using either wireless communications via short range communication device 4024 or wired communications using wired access 4410. The signal processing and distance data 4409 can include, for example, input, intermediate result, or final result of calculating an estimated distance measurement. The external accessory 4400 may include an optional supplemental flash. The flash devices that are typically associated with a camera tend to be weak. Therefore, a supplemental flash that has more photons can be used to provide a more powerful photo flash.

As discussed herein, examples of an external accessory are an external electronic distance measurement (EDM) accessory, an external image capturing device accessory, an external laser pointer accessory, and an external GNSS raw observable provider 3750. As depicted in FIG. 44, the external accessory 4400 is a combination accessory that includes an external electronic distance measurement (EDM) accessory with features 4405, 4406, 4407, 4408, 4409, an external image capturing device accessory with feature 4411, and an external laser pointer accessory with feature 4412. According to various embodiments, the external image capturing device accessory and the external laser pointer accessory are optional.

External Electronic Distance Measurement Accessory

Electronic distance measurement (EDM) devices are well known in the art. EDM devices can be used to measure distances. An EDM device computes a distance measurement from the EDM device to a point of interest on an object. For example, the EDM device can transmit light from an EDM transmitter. The transmitted light can bounce off of an object. The reflected light can then be received by the EDM receiver. The EDM device can determine the distance between the object and the MDCP, for example, based on a difference between the time that the light was transmitted and the time that the reflected light was received (also known as "time of flight"). According to one embodiment, an electronic distance measurement accessory is used to measure a distance between a mobile distance collection platform and a point of interest, a pseudo point of interest, or any point on an object of interest.

The distance measurement, according to one embodiment, provides scale information that can be used for locating the point of interest, and for enabling photogrammetric methods (also known as "photogrammetric data processing") for determination of other points of interest in the image captured by the image capturing device of the MDCP. The distance measured is a scalar quantity but the direction is based on the orientation of the EDM device. When an external EDM accessory is connected to the MDCP in a known spatial relationship, the orientation of the MCDP provides the vector direction of the distance measurement. Using an EDM minimizes the need for a two-position data capture process normally needed for photogrammetry when a distance measurement is not possible. One example of a two-position data capture process is depicted in FIG. 32.

Figure 45A:
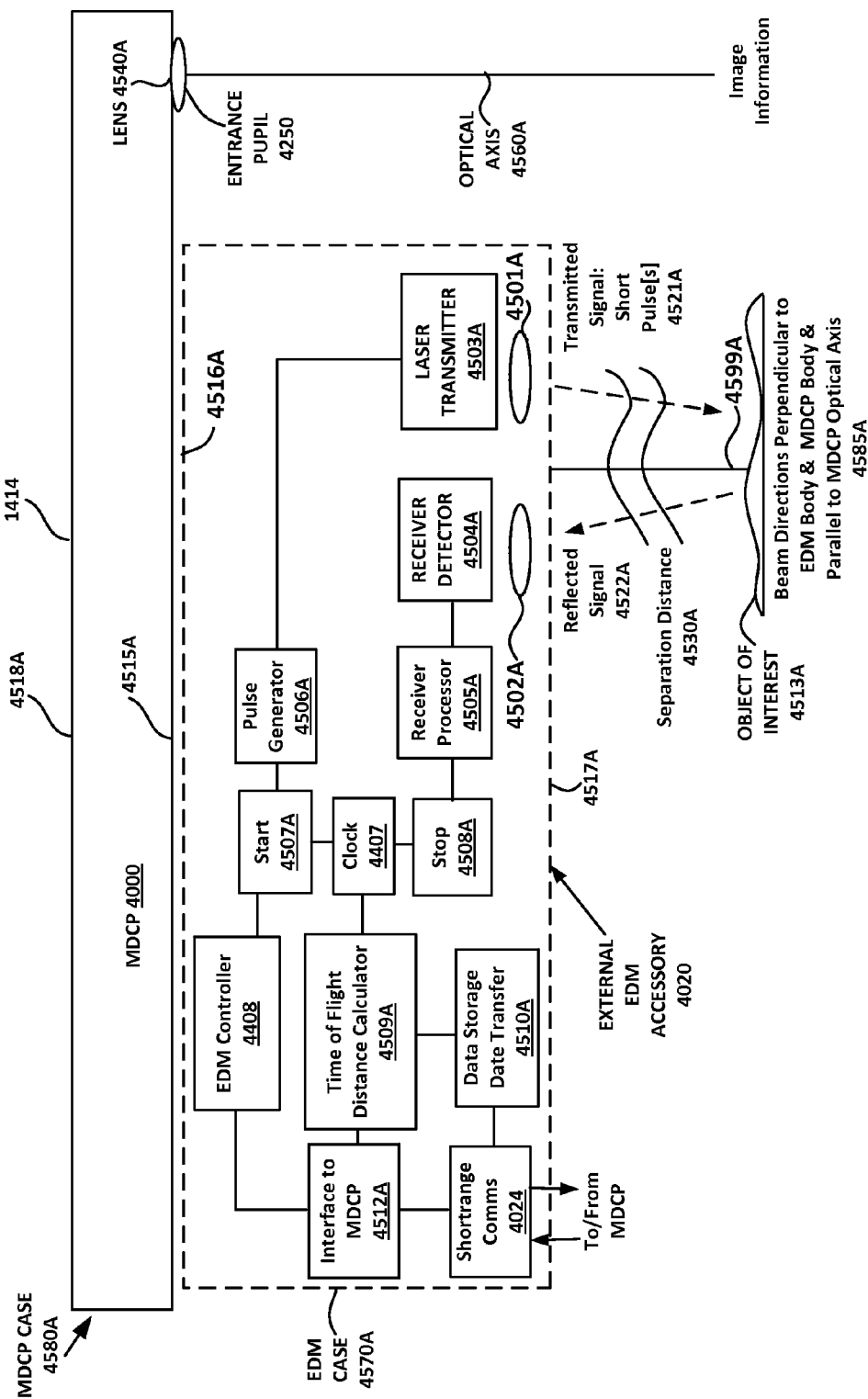
FIG. 45A depicts a block diagram of features of an external electronic distance measurement accessory, according to one embodiment.

FIG. 45A depicts a block diagram of features of an external EDM accessory 4020, according to one embodiment.

The external EDM accessory 4020 includes an EDM case 4570A, two lenses 4501A and 4502A, a laser transmitter 4503A, a receiver detector 4504A, a receiver processor 4505A, a pulse generator 4506A, a clock 4407, start logic 4507A, stop logic 4508A, an EDM controller 4408, time of flight distance calculator 4509A, data storage and data transfer logic 4510A, interface to MDCP logic 4512A, and short range communication device 4024. EDM: The EDM case 4570A has a front side 4517A (also referred to as a "front surface") and a back side 4516A (also referred to as a "back surface"). The electronic distance measurement accessory 4020's lenses 4502A and 4501A are located on the front side 4517A of the accessory 4020.

Lens 4501A is associated with the laser transmitter 4503A. Lens 4502A is associated with the receiver detector 4504A. The laser transmitter 4503A and the pulse generator 4506A are coupled. The pulse generator 4506A and the start logic 4507A are coupled. The receiver detector 4504A and the receiver processor 4505A are coupled and the receiver processor 4505A and stop logic 4508A are coupled. Start logic 4507A and stop logic 4508A are both coupled with the clock 4407. Start logic 4507A and EDM controller 4408 are coupled. The EDM controller 4408 and the interface to MDCP logic 4512A are coupled. The interface to MDCP logic 4512A and the short range communication device 4024 are coupled. The clock 4407 and the time of flight distance calculator 4509A are coupled. The time of flight distance calculator 4509A and the interface to MDCP logic 4512A are coupled. The time of flight distance calculator 4509A and the data storage and data transfer logic 4510A are coupled. The data storage and data transfer logic 4510A and the short range communication device 4024 are coupled.

The EDM case 4570A is depicted as being parallel to the case 4580A of the MDCP 4000. The MDCP 4000's case 4580A has a front side 4515A (also known as a "front surface") and a back side 4518A (also known as a "back surface"). The MDCP 4000's back side 4518A (also known as a "back surface") is the display view side where a user can view the MDCP's display 1414. The MDCP 4000's lens 4540A is located on the MDCP 4900's front side 4515A. The lens 4540A defines the entrance pupil 4250 of the MDCP 4000. The optical axis 4560A is from the entrance pupil 4250. The optical axis 4560A is perpendicular to the MDCP's case 4580A. The EDM case 4570A does not cover the lens 4540A of the MDCP 4000.

The laser transmitter subsystem 4405 (FIG. 44), according to one embodiment, includes one or more of the receiver detector 4504A, the receiver processor 4505A, and the stop logic 4508A. The receiver subsystem 4406 (FIG. 44), according to one embodiment, includes one or more of the laser transmitter 4503A, the pulse generator 4506A, and the start logic 4507A.

The external EDM accessory 4020 can include a pulse generator 4506A for use in triggering a laser 4503A to emit a short burst of light 4521A; a laser 4503A designed to emit light 4521A in the infrared spectrum; a clock 4407 that is started by the laser trigger event; an optical receiver 4504A that detects a return of the light pulse 4522A from a distant object of interest 4513A and upon detection stops the clock 4407; a time of flight distance calculator 4509A for calculating the time from start to stop, for determining a round trip "time of flight" of the pulse; a communication device 4024, such as Bluetooth, for interacting with the MDCP 4000; a battery 4430 that is rechargeable or non-rechargeable; applications software 4401B for managing the entire process, including sending of multiple pulses and averaging the results, and formatting estimated distance measurement for use by the MDCP; and a USB port for software downloading and power supply.

The external EDM accessory 4020 measures the time of flight for a laser pulse to travel to and be reflected from an object of interest 4513A that a point of interest is on. Upon initiating a measurement epoch, a pulse or a series of pulses are transmitted from a laser diode source and a clock is started. Upon receipt of the return reflection laser pulse, a detector system is actuated, which then in turn stops the clock. The distance 4599A to the object of interest 4513A is given by multiplying half the time interval measured by the clock by the speed of light.

As is well known in the art, the pulse generator 4506A generates a pulse that is communicated to the laser transmitter 4503A causing the laser transmitter 4503A to transmit a transmitted signal 4521A that passes through the lens 4501A. The start logic 4507A is in communication with the pulse generator 4506A and uses the clock 4407 to note the time that the pulse generator 4506A generated the pulse. The transmitted signal 4521A contacts the object of interest 4513A, such as a wall, a door, or a window, that includes a point of interest, as discussed herein. The transmitted signal 4521A is reflected by the object of interest 4513A resulting in a reflected signal 4522A that passes through the lens 4502A and is detected by the receiver detector 4504A. The transmitted signal 4521A and the reflected signal 4522A are separated by a separation distance 4530A. The external EDM accessory 4020 measures the distance 4599A from the external EDM accessory 4020 to the object of interest 4513A within a maximum separation distance 4530A. The receiver processor 4505A communicates with the stop logic 4508A. The stop logic 4508A obtains the time from the clock 4407 and notes the time that the reflected signal 4522A was received. According to one embodiment, the transmitted signal 4521A and the reflected signal 4522A travel along a light beam axis 4585A that is parallel to the optical axis 4560A of the entrance pupil 4250 of the mobile data collection platform 4000.

The time of flight distance calculator 4509A determines the difference between the start time and the stop time (also commonly known as "time of flight"), which can be used to measure the distance 4599A (also known as "EDM distance measurement") between the external EDM accessory 4020 and the object of interest 4513A. The data storage and data transfer logic 4510A can store various data associated with the processing of the time of flight distance calculator 4509A, such as the time of flight or the distance 4599A, or a combination thereof, into memory. The EDM controller 4408 can communicate with the interface to MDCP logic 4512A to transmit the "time of flight" or the distance 4599A to the MDCP 4000 using the short range communication device 4024 of the external EDM accessory 4020. In another embodiment, the external EDM accessory 4020 can communicate with the MDCP 4000 using wired communications instead of short range communication device 4024.

EDM devices are well known in the art. For more information regarding EDM devices, refer to "DS00 Laser range finder" product manual revision 0 by Lightware optoelectronics (Pty) LTD dated 2012, which is incorporated herein by reference.

Figure 45B:
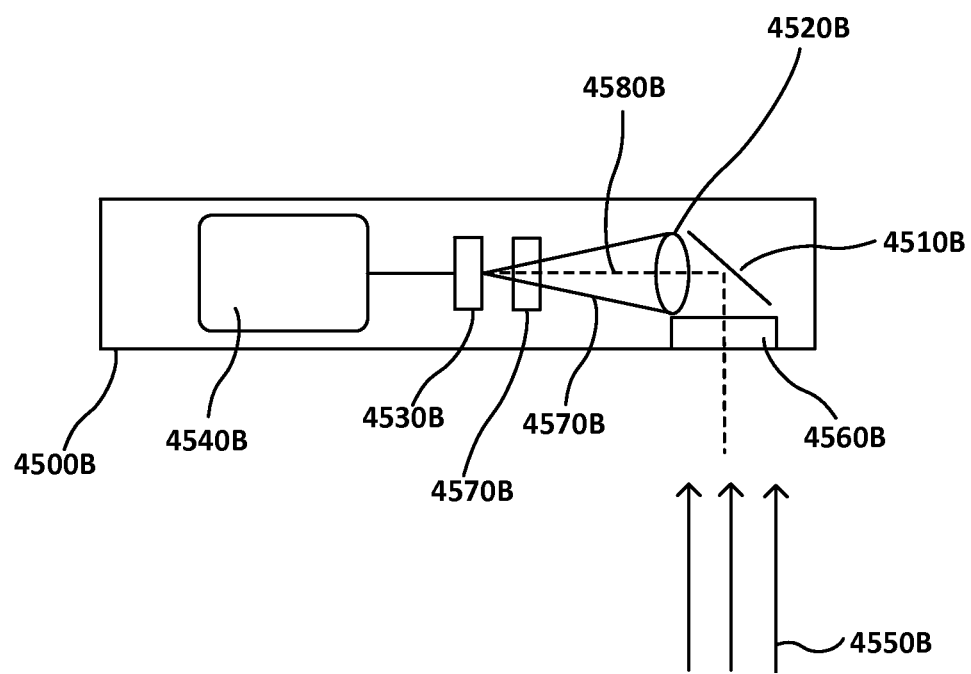
FIG. 45B depicts, a compact external electronic distance measurement accessory, according to one embodiment.

FIG. 45B depicts, a compact external EDM accessory, according to one embodiment. FIG. 45B depicts a top view of a compact EDM accessory 4500B that bends reflected light 4550B (also known as a reflected signal 4522A) that the EDM receiver 4560B receives, according to one embodiment. By reflecting the reflected light 4550B, for example with a mirror 4510B, a more compact EDM accessory 4500B can be provided, according to one embodiment. The EDM accessory 4500B depicted in FIG. 45B includes an EDM receiver 4560B, a mirror 4510B, a lens 4520B, optical filter 4590B, a light sensor 4530B and EDM logic 4540B.

The EDM receiver 4560B receives the reflected light 4550B. The mirror 4510B reflects a subset of the reflected light 4550B and the reflected subset is focused through the lens 4520B. The cone 4570B represents the shape of the path of the reflected subset 4580B between the lens 4520B and the light sensor 4530B. The mirror 4510B alters the path of the reflected light 4550B into focused reflected subset 4580B inside of the external EDM accessory 4500B, according to one embodiment. The focused reflected subset 4580B passes through an optical filter 4590B as it travels to the light sensor 4530B. The light sensor 4530B detects the focused reflected subset 4580B coming from the lens 4520B and sends a signal to the EDM logic 4540B. The EDM logic 4540B can measures the distance (also referred to as "EDM distance measurement") between the external EDM accessory 4500B and the object of interest based on the time that the light was transmitted by the EDM transmitter and the time that the light sensor 4530B detects the focused reflected subset 4580B.

According to one embodiment, an external EDM accessory 4500B has a form factor that integrates with a mobile data collection platform by redirecting the light path. For example, the EDM accessory 4500B that includes a mirror 4510B that reflects light provides a compact EDM where the back side of the EDM accessory 4500B can be adjacent to and oriented along the front side of the MDCP 4000 as depicted in FIG. 45A, according to one embodiment. Therefore, largest faces of both the EDM accessory 4500B and the MDCP 4000 are parallel with each other, according to one embodiment. A mounting system 4030 can also be used as a part of integrating the EDM accessory 4500B with the MDCP 4000.

By design, the EDM laser 4521A is not coaxial with the ICD's optical axis. As one of ordinary skill in the art understands, the EDM laser beam is transmitted along the light beam axis 4585A as depicted, for example, at least in FIG. 45A. By offsetting the EDM laser beam from the lens/pupil, parts, weight can be saved and complexity reduced. The EDM laser beam, according to one embodiment, is in close proximity of the ICD's entrance pupil 4250 on the MDCP. Since different MDCP's have their internal ICD's in different positions, a compromise can be made. This can be accomplished by arranging the EDM laser beam to be located between the two different positions 4241 and 4342 (refer to FIG. 42 and FIG. 43).

Figure 45C:
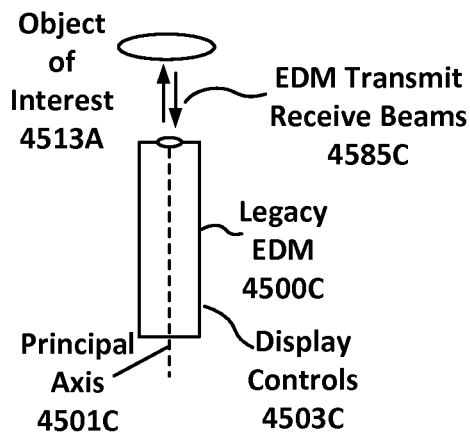
FIG. 45C depicts a block diagram of a legacy electronic distance measurement (also known as an off-the-shelf EDM or conventional EDM), according to one embodiment.

FIG. 45C depicts a block diagram of a legacy EDM (also known as an off-the-shelf EDM or conventional EDM), according to one embodiment. FIG. 45C depicts a legacy EDM 4500C with a principal axis 4501, display controls 4503C, and an EDM transmit receive beams 4585C between the legacy EDM's lens and the object of interest 4513A. Most off-the-shelf EDMs 4500C have a similar form factor to that of a handheld cellphone, and most have a similar display on one face of the EDM body. In normal and typical operation, the user holds an off-the-shelf EDM 4500C so that the display controls 4503C (also referred to as a screen) is facing upwards, and the EDM beam 4585C (also known as the "light beam") emanates from the EDM body, outward away from the user and toward the object of interest 4513A, as shown in FIG. 45C.

Of course an off-the-shelf EDM may be aimed upwards or downwards or in any direction as well. But the salient feature of the off-the-shelf EDM is that the beam pointing vector 4585C lies in a plane parallel to the display plane of the display controls 4503C. However, in the case where the EDM accessory 4020 is integrated with an MDCP 4000, an EDM beam pointing vector, such as light beam axis 4585A, now lies in a plane perpendicular to the display 1414, as shown in the second FIG. 45A.

Figure 45D:
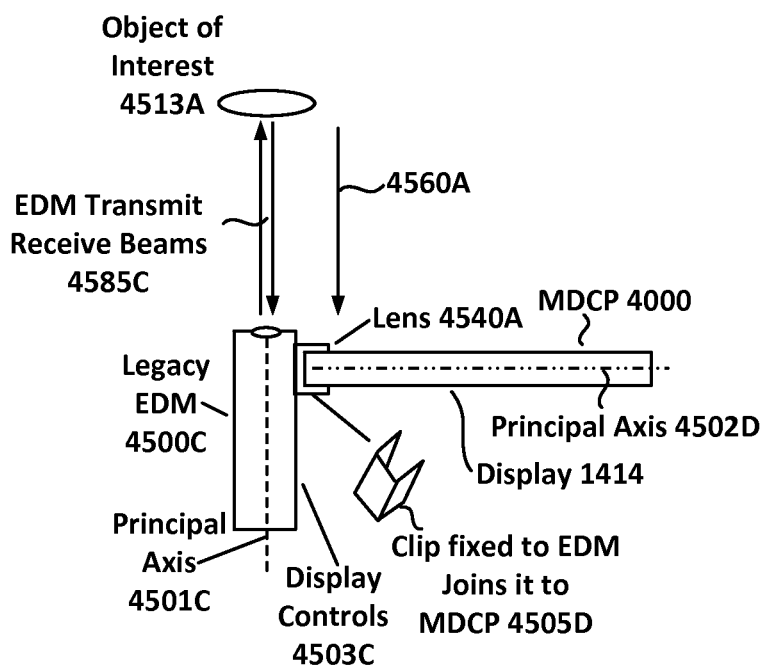
FIGS. 45D and 45E display respective legacy EDMs that are mounted perpendicularly with an MDCP so that the legacy EDM's principal axis and the MDCP's principal axis are perpendicular to each other, according to various embodiments.
Figure 45E:
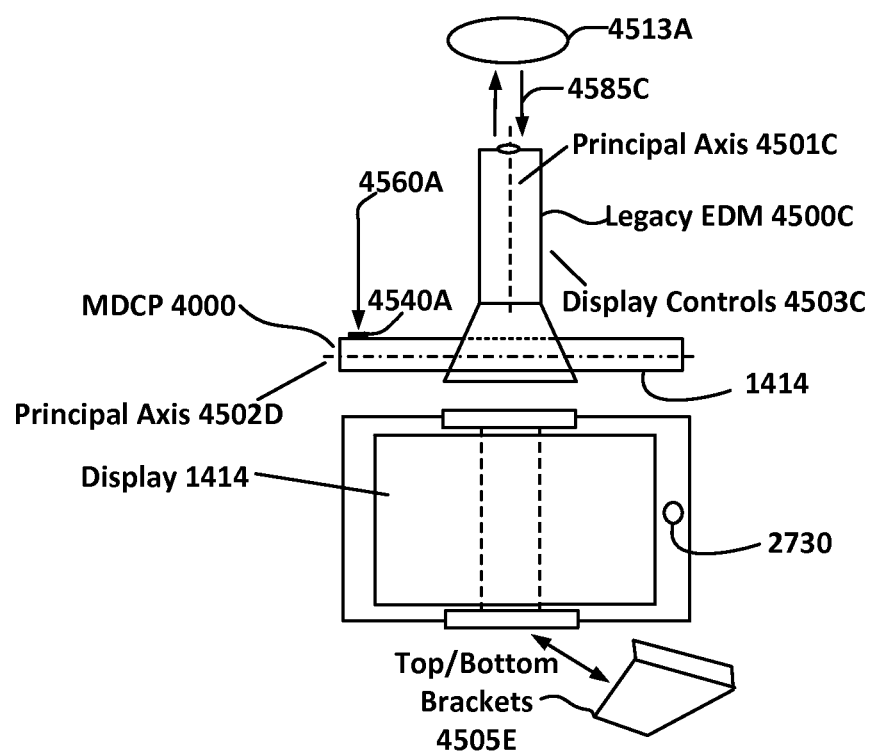

In an embodiment, a legacy EDM 4500C can be mounted to the MDCP 4000 so that the case of the conventional EDM is perpendicular to the MDCP case 4580A, as shown in FIG. 45D and FIG. 45E. FIGS. 45D and 45E display respective legacy EDMs 4500C that are mounted perpendicularly with an MDCP 4000 so that the legacy EDM 4500C's principal axis 4502D and the MDCP's principal axis 4501C are perpendicular to each other, according to various embodiments.

In FIG. 45D a clip 4505D is used to couple the legacy EDM 4500C to the MDCP 4000's side that is closest to the MDCP 4000's lens 4540A forming an L shape where the MDCP 4000 represents the longer leg of the L and the legacy EDM 4500C represents the shorter leg of the L shape. A user standing inside the 90 degree angle formed by the two legs of the L shape can see both the MDCP's display 1414 and the legacy EDM's display controls 4503C while at the same time viewing an object of interest that the MDCP's optical axis 4560A is directed toward.

In FIG. 45E, a top/bottom bracket 4505E is used to couple the legacy EDM 4500C to approximately the center location of the MDCP 4000 forming a T shape. A user facing the top of the T shape can see the MDCP's display 1414. A user facing one side of the perpendicular line of the T shape can see the legacy EDM 4500C's display controls 4503C.

In FIGS. 45D and 45E, the EDM transmit receive beams 4585C are aligned and parallel with the EDM's principal axis 4502D. The EDM's principal axis 4501C, EDM transmit receive beams 4585C are parallel with the MDCP's optical axis 4560A.

Figure 45F:
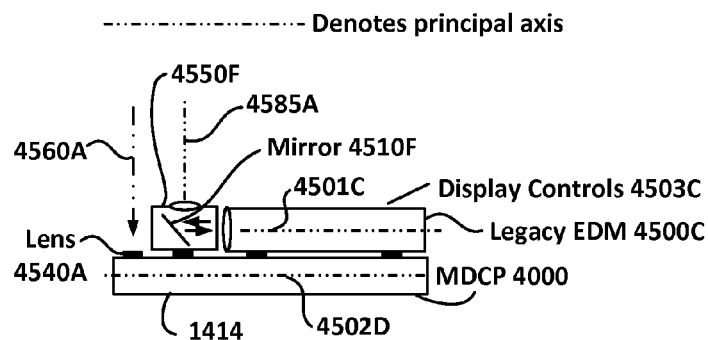
FIGS. 45F-45H depict an MDCP coupled with an EDM includes a mirror to bend received light and with respective principal axis that are parallel, according to one embodiment.

FIG. 45F depicts an MDCP 4000 coupled with a legacy EDM 4500C using a separate box 4550F that includes a mirror 4510F to that reflects received light, such as reflected light 4522A, according to one embodiment. According to one embodiment, the mirror reflects the received light at a 90 degree angle.

Figure 45G:
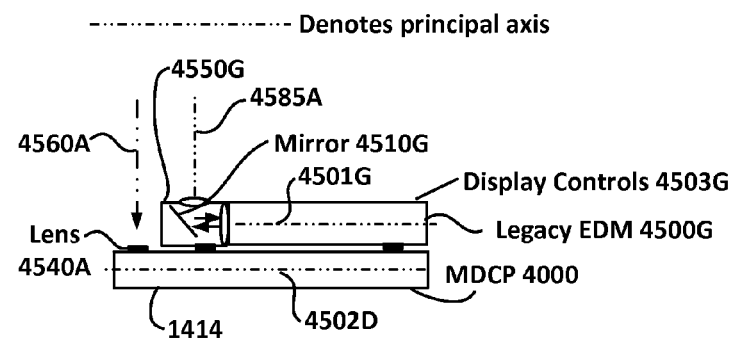

FIG. 45G depicts an MDCP 4000 coupled with a legacy EDM 4500G using a bend joined box 4550G that includes a mirror 4510G to reflects received light, for example, at a 90 degree angle, according to one embodiment.

Figure 45H:
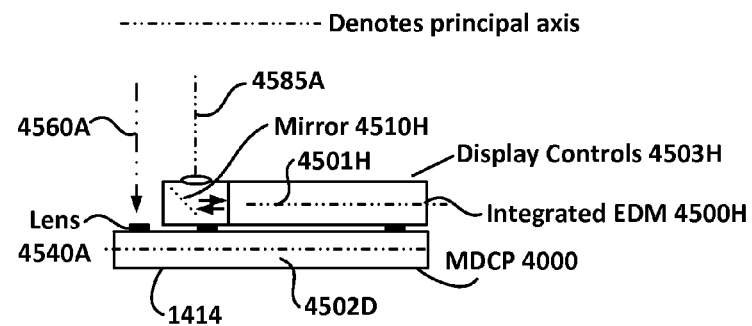

FIG. 45H depicts an MDCP 4000 coupled with an integrated external EDM accessory 4500H that includes a mirror 4510H that reflects the received light at a 90 degree angle, according to one embodiment. The external EDM accessory 4500H is integrated, for example, because there mirror 4510H is a part of the external EDM accessory 4500H, according to one embodiment. With an integrated external EDM accessory 4500H, the MDCP's display 1414 can be used to display information for the EDM 4500H.

In an embodiment, a suitable frame, case or mounting system can hold both the MDCP and the legacy EDM in the right-angle orientation needed to meet the parallel beam requirement, as can be seen in FIGS. 45F-45H.

The display controls 4503C, 4503G, 4503H of the respective EDM 4500C, 4500G, 4500H depicted in FIGS. 45F-45H are on the same side of the EDM 4500C, 4500G, 4500H as the EDM's lenses 4501A and 4502A. The EDM's display controls 4503C, 4503G, 4503H and the MDCP's display 1414 are on the opposite sides of the EDM MDCP combination as depicted in FIGS. 45F-45H, according to one embodiment.

Referring to FIGS. 45A, 45B, 45F-45H the MDCP 4000's principal axis 4502D and the EDM 4500C, 4500G, 4500H's principal axis 4501C, 4501G, 4501H are parallel with each other. As will become evident, the MDCP principal axis and the external EDM accessories' principal axis are also parallel with each other as depicted at least in FIGS. 47-53, FIG. 55, and FIG. 56. Therefore, in various embodiments, the EDM beam along a light beam axis 4585A, 4585C (FIG. 45A, 45B, 45F, 45G, 45H), can be configured to emanate perpendicular to the EDM case 4570A, thus allowing a closer integration of EDM case 4570A and MDCP case 4580A, as shown in FIG. 45A, 45B, 45F, 45G, 45H, FIGS. 47-53, FIG. 55, and FIG. 56.

In contrast, in a conventional handheld EDM, the receiver components are longer than the thickness of most cellphones or tablet computers, making it less desirable to locate the EDM detector so that its components are coaxial and parallel to the optical axis of the camera lens as depicted in FIGS. 45D and 45E. In an embodiment, the reflected beam may be reflected through a 90 degree angle and directed along the case of the EDM, as shown in FIGS. 45A, 45B, 45F, 45G, 45H. A mirror 4510B may be used to perform the right angle reflection. Referring to FIG. 45A, 45B, 45F, 45G, 45H the laser transmitter beam 4521A can be provided by a small laser diode, and may be easily fitted so its beam along light beam axis 4585A, 4560A is also parallel to the optical axis 4560A from the lens 4540A of the image capturing device 1430.

Figure 46A:
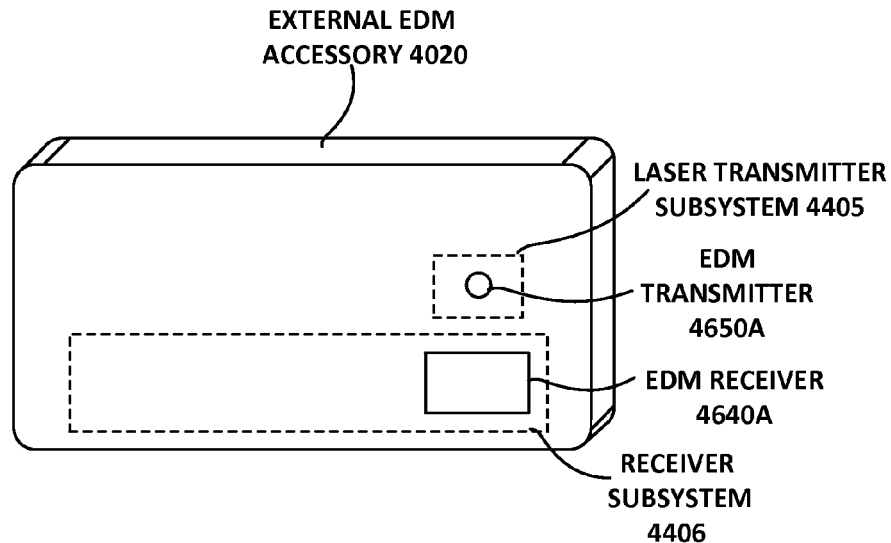
FIGS. 46A-46C depict views of the outsides of various external accessories, according to various embodiments.
Figure 46B:
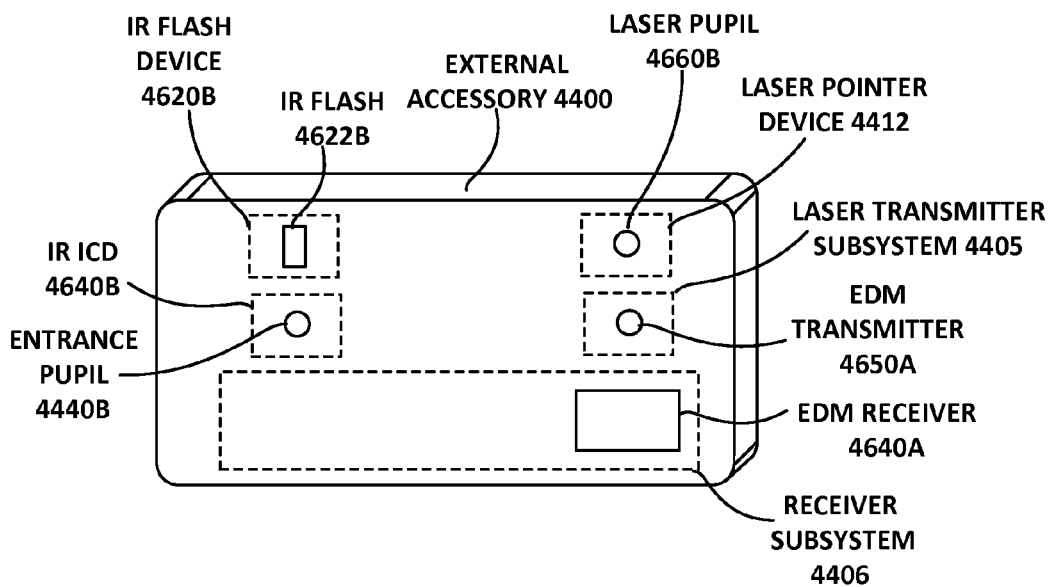
Figure 46C:
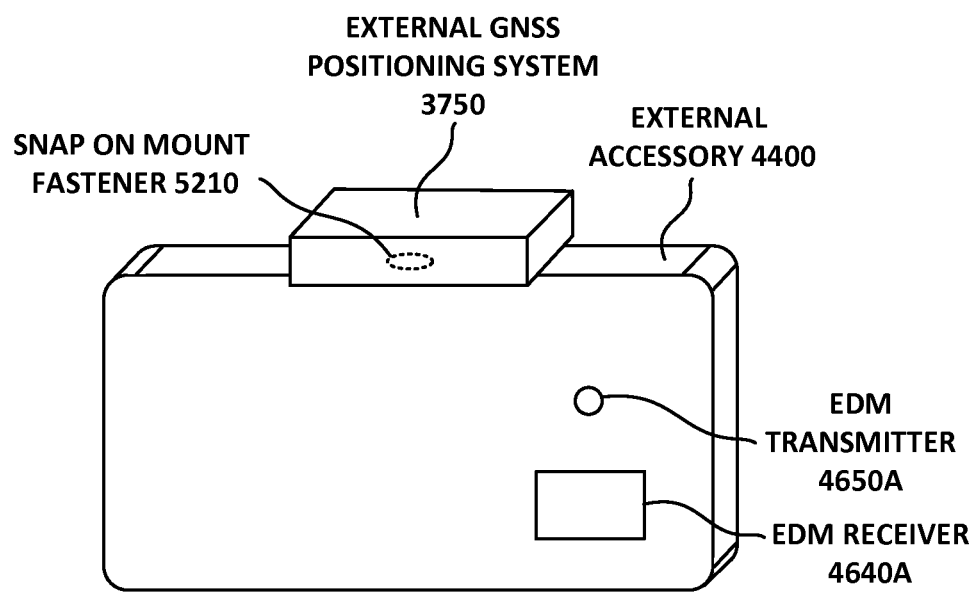

FIGS. 46A, 46B, and 46C depict views of the outsides of various external accessories, according to various embodiments.

FIG. 46A depicts a view of the outside of an external EDM accessory 4020, according to one embodiment. The external EDM accessory 4020 includes an EDM transmitter 4650A and an EDM receiver 4640A. The EDM transmitter 4650A and the EDM receiver 4640A are apertures. Transmitted signals 4521A can be transmitted out of the external EDM accessory 4020 through the EDM transmitter 4650A. Reflected signals 4522A, 4550B can be received by the external EDM accessory 4020 through the EDM receiver 4640A. The EDM transmitter 4650A is part of the receiver subsystem 4406 represented by the dashed box. The EDM receiver 4640A is part of the laser transmitter subsystem 4405 represented by a dashed box.

FIG. 46B depicts a view of the outside of an external accessory 4400, according to one embodiment. The external accessory 4400 includes an external EDM accessory, an external laser pointer accessory, and an external image capturing device accessory. For example, laser transmitter subsystem 4405 and receiver subsystem 4406 with their respective associated EDM transmitter 4650A and EDM receiver 4640A are part of the EDM accessory. The laser pointer device 4412 and laser pupil 4660B are associated with the laser pointer accessory. The IR flash device 4620B, IR flash 4622B, infrared (IR) image capturing device (ICD) 4640B, and entrance pupil 4630B are associated with the external image capturing device accessory, which may be an external infrared image capturing device accessory or an external non-infrared image capturing device accessory.

FIG. 46C depicts a view of the outside of an external accessory 4400 and the outside of an external GNSS raw observable provider 3750 that are coupled with each other, according to one embodiment. The external GNSS raw observable provider 3750 is located so that it will not obscure the MDCP's entrance pupil or the MDCP's antenna. For example, as depicted in FIG. 46C, the external GNSS raw observable provider 3750 is located midway on the top of the secondary accessory 4400 so that when the combination accessory, which includes the external accessory 4400 and the external GNSS raw observable provider 3750, is coupled with the MDCP 4000, the external GNSS raw observable provider 3750 will be on top of the MDCP 4000 and between the MDCP's entrance pupil 4250 and the MDCP's antenna 1412, as will be discussed in more detail hereinafter.

Packaging Considerations

According to various embodiments, FIGS. 45A, 45F-45H, 48-53, 56 depict a fully integrated data capture system. To facilitate a fully integrated data capture system using the image capturing device 1430, a location system, such as the internal GNSS chipset 1413 and/or the external GNSS raw observable provider 3750, an orientation system 1470, and an electronic distance measurement system 4022, the EDM case 4570A of the external EDM accessory 4020 is coupled in a known spatial relationship to the MDCP case 4580A of the MDCP. The form factor for the MDCP case 4580A is that of a rectangular body with a display 1414 showing both visual data and operational controls in a graphical user interface. The display 1414 also transforms into a visual display of the image captured by the image capturing device 1430 where the entrance pupil 4250 and the display 1414 are located on opposite sides of the MDCP 4000. This image capturing device 1430 may be referred to as the "forward-looking" camera, as shown at least in FIG. 45A. The user typically will hold the MDCP such that the forward looking camera is aimed at a scene containing an object of interest 4513A. The scene may be located in any direction from the user: horizontal, vertical-upward or vertical-downward, or any direction as chosen by the user and the user may or may not be able to see the display 1414 clearly.

The MDCP 4000 is able, according to various embodiment, to capture/collect data, as described herein, by pressing accept data button 2730 (FIG. 42) usually displayed at one end of the display 1414, and often just above the home button at the bottom of the display 1414. Expiration of a timer can be used for capturing or collecting data as described herein. To support timer expiration or single button push data capture activity, two functions are performed, according to various embodiments. The single button press or the expiration of a timer that actuates the image capturing device 1430 to capture an image is also used to activate the EDM accessory 4020, calculate the distance measurement of the distance 4599A, and return the distance measurement to the MDCP 4000 for compilation with the other data, such as one or more images, one or more position fixes, and/or orientation information, taken by the MDCP 4000 itself, as discussed herein. The second function is that of aligning the EDM beam, which travels along light beam axis 4585A, with the direction of the optical axis 4560A of the image capturing device 1430, which is usually in a center position 4342 of the display 1414 as depicted at least in FIG. 42 and FIG. 43. For example, the optical axis 4560A pointing vector PV is incident on some object of interest 4513A, and an image of the object of interest 4513A is displayed at the center of the display 1414, often at the center 2750 (see FIG. 27) of the crosshair display overlay 2721 (see FIG. 27), if crosshair display overlay 2721 is displayed. The MDCP 4000's lens 4540A and the external EDM accessory 4020's lens 4501A and 4502A are on the respective front sides 4517A, 4515A of the external EDM accessory 4020 and the MDCP 4000.

According to one embodiment, an external EDM accessory 4500B integrates with a mobile data collection platform. FIGS. 45A, 45B, 45D-45H all depict examples of EDM accessories that can be integrated with a mobile data collection platform, for example, by providing a light beam axis 4585C that is parallel with the optical axis 4560A of the mobile data collection platform. In another example, the EDM accessory 4500B that includes a mirror 4510B that reflects received light provides a compact EDM where the back side of the EDM accessory 4500B can be adjacent to and oriented along the front side of the MDCP 4000 as depicted in FIG. 45A, according to one embodiment. Therefore, largest faces of both the EDM accessory 4500B and the MDCP 4000 are parallel with each other, according to one embodiment. In another example of the EDM accessory integrating with the mobile data collection platform, the EDM accessory does not obscure or cover up the lens 4540A and the entrance pupil 4250 of the MDCP. Further, the mounting system 4030 and/or fastener systems 4505D, 4505E can also be used as a part of integrating the EDM accessory 4500B with the MDCP 4000. A legacy EDM accessory can integrate with an MDCP in an L shape as depicted in FIG. 45D or a T shape as depicted in FIG. 45E. An EDM accessory, according to various embodiments, can integrate with an MDCP where the principal axes are parallel as depicted in FIGS. 45F-45H. Other examples of the EDM accessory integrating with a mobile data collection platform include the known spatial relationship between the EDM accessory and the mobile data collection platform, the user's ability to clearly see the MDCP's display while operating the combination of the MDCP and the EDM accessory while viewing a scene, the MDCP controlling the operation of the EDM accessory and the EDM accessory providing output, such as the EDM distance measurement, in response to the MDCP's controls. These are at least a few examples of the EDM accessory 4500B integrating with a mobile data collection platform, as discussed herein.

By design, the EDM laser 4521A is not coaxial with the ICD's optical axis 4560A. The EDM laser beam travels along the light beam axis 4585A. By offsetting the EDM laser beam from the lens/pupil, parts, weight can be saved and complexity reduced. The EDM laser beam, according to one embodiment, is in close proximity of the ICD's entrance pupil 4250 on the MDCP. Since different MDCP's have their internal ICD's in different positions, a compromise can be made. This can be accomplished by arranging the EDM laser beam to be located between the two different positions 4241 and 4342 (FIG. 42 and FIG. 43).

According to one embodiment, an electronic distance measurement device used with an MDCP is fitted to the MDCP in a convenient way for the user. Off-the-shelf EDMs have a package aspect that is similar to that of a cellphone: rectangular cross-section with dimensions on the order of approximately 3 inches wide by 4-6 inches in length, with a comparatively shallow depth, on the order of less than 1 inch, and with a display screen on the large face with user controls. Off-the-shelf EDMs have their laser transmitter and optical return reflection receiver located at one narrow end of the package, parallel to the long axis of the package, referred to as the top of the device, as depicted in FIG. 45C. This is convenient for hand-held operation in which the user aims the EDM as if it were a flashlight, towards the object of interest. While such a device could be joined to a cellphone or tablet/phablet, its use would be awkward as it would form a T-shape as depicted in FIG. 45E or an L shape as depicted in FIG. 45D. A further consideration derives from the fact that the image capturing device 1430 is on the face opposite the user interface, so the MDCP's user is used to seeing the image displayed on a large display, such as for example the MDCP's display 1414, while holding the MDCP so its largest face (front side 4515A), that includes the lens 4540A, is directed towards the object of interest. Thus a more useful package configuration for joining an EDM to a cellphone type MDCP or tablet type MDCP is to mimic or extend the current shape of the cellphone type MDCP or tablet type MDCP, as if the depth of the MDCP were being increased, to accommodate the EDM components.

Such an embodiment is shown at least in FIGS. 45A, 45F, 45G, 45H, 48-53 in which an EDM package is joined to the front side 4515A of the MDCP. The laser transmitter 4503A and receiver detector 4504A are configured to emanate from the largest face, such as the front side 4517A, of the EDM package. Thus the EDM transmitter and receiver functions are re-oriented, according to one embodiment, from what is commonly available in off-the-shelf EDMs. According to various embodiments, a laser transmitter is re-packaged, a mirror may be used and improved optics may be used to accommodate the laser receiver, as discussed herein.

Specifications for Using an External Electronic Distance Measurement Accessory with a Mobile Data Collection Platform The following are a choice of technical parameters that would be suitable for using an external electronic distance measurement accessory with a mobile data collection platform.

The electronic distance measurement accessory is pulsed by a control circuit, such as the EDM controller 4408. The pulse width can be on the order of 2 to 4 nanoseconds.

According to one embodiment, the wavelength is in the infrared region in the range of 870 to 930 nm. The pulse power is less than the specified limit for acceptable eye safety.

The working range for the electronic distance measurement accessory is up to 50 meters (m), according to one embodiment. The range may vary according to the available reflectivity of the objects of interest. If a suitable laser EDM target is placed in the scene and oriented so that it is perpendicular to the axis 4585A of the laser beam, the 50 m range is achievable.

The diameter of the beam of the exit lens 4501A of the laser is approximately 5 mm, according to one embodiment and the spot diameter at 50 meters is approximately 12 to 15 mm, or less, according to one embodiment.

The receiver detector 4504A is an avalanche photodiode [APD] or equivalent, according to one embodiment.

An optical bandpass filter is inserted between the receiver detector 4504A and the lens 4502A to reduce the effects of noise due to ambient light. The filter bandwidth is the same as preferred range of wavelength: 870 to 930 nm, according to one embodiment.

Signal to noise improvements are accomplished by averaging the results from thousands of pulses. A typical pulse rate is on the order 20,000 pulses per second. The external electronic distance measurement accessory is operated at 300 to 3000 pulses for a measurement epoch.

The accuracy of the distance measurement via the averaging methods is on the order of 3 mm. The number of measurements that can be made is on the order 100 per minute, so there is no limitation on the user's ability to capture data.

Data on each measurement epoch is stored and transmitted to the mobile data collection platform via the communication device 4024, and is stored and associated with the image captured at the same time in the EXIF file for the image, or in another suitable file with a link to the image.

The laser transmitter 4503A is offset from the image capturing device 1430 by less than 3 centimeters (cm). The axis 4585A of the EDM beam may be aligned to be parallel with the optical axis 4560A of the image capturing device 1430, or may be positioned so that its EDM beam crosses the optical axis 4560A at some distance, in the range of 10-30 m.

The transmit laser 4503A is positioned on the EDM case 4570A so that it is approximately midway between the available locations on cellphone and tablet type MDCPs. For small cellphone type MDCPs, that is approximately 0.75-1 in [2-2.5 cm] from a top side of the electronic distance measurement accessory.

The electronic distance measurement accessory can have an infrared flash to aid in data capture when visible light is low, or it is after sunset and dark. According to one embodiment, it is basically regular visible light flash tube with an infrared bandpass filter in front of the output that filters out visible light.

The electronic distance measurement accessory is powered by a rechargeable battery and an external power converter, well-known n the cellphone arts. The power port may be part of a USB connector, or may be a separate connector.

External Image Capturing Device Accessory

Image capturing devices (ICDs) that are a part of cellular devices (also referred to as "internal image capturing devices") typically have poor quality lenses where the image is distorted by a variety of lens aberrations, so that what is a uniform distance metric in an image, such as a checkerboard square pattern, becomes less uniform, particular near the edges of the field of view, as depicted in FIG. 21 herein. Therefore, according to one embodiment, an external image capturing device accessory that provides higher quality images than the internal image capturing device can be used in conjunction with a mobile data collection platform (MDCP). An image that is captured with the external image capturing device accessory shall be referred to as an "external image" and an image captured with the internal image capturing device that is part of the MDCP shall be referred to as an "internal image."

Many of the examples described herein refer to an external image capturing device accessory that is infrared (also referred to as an "external infrared image capturing device accessory"). However, various embodiments are well suited for an external image capturing device accessory that is not infrared (also referred to as an "external non-infrared image capturing device accessory"). An infrared image capturing device accessory permits operation in poor visible lighting conditions and at night.

Referring to FIG. 46B, an external IR image capturing accessory includes an IR flash device 4620B and an IR image capturing device 4640B with their respective IR flash 4622B and entrance pupil 4630B. The external image capturing device is not required to be infrared. According to one embodiment, the optical axis of the external IR image capturing device accessory and the optical axis of the MDCP 4000's image capturing device 1430 are aligned with each other. The external IR image capturing device accessory and the MDCP 4000 can communicate using wired or wireless communications. For example, the external infrared image capturing device accessory and the MDCP 4000 can communicate, for example, using respective communication devices 4024, 3709. The external infrared image capturing device accessory could capture an image that depicts, for example, a real point of interest or a pseudo point of interest, or both and communicate the image to the MDCP 4000 using their respective communication devices 4024, 3709. An image captured by an external capturing device accessory, whether infrared or non-infrared, can be stored in hardware memory 1450.

According to one embodiment, reflective material may be placed on or near a point of interest. The reflective material does not need to be on or near a real point of interest but instead located anywhere in the field of view. If the reflective material is not on a point of interest, the location that the reflective material is on can be treated as a pseudo point of interest. The infrared image captured with the external IR image capturing device accessory will depict the area covered by the reflective material more brightly than if the reflective material were not on that area.

As discussed herein, the external image capturing device accessory is not required to be infrared. In the event that the external image capturing device is not an infrared device, various features 4620B, 4622B, 4640B would not be infrared.

External Laser Pointer Accessory

A laser pointer (also known as a "laser pen") can emit a narrow beam of light that illuminates a real point of interest or a pseudo point of interest with a bright spot, according to one embodiment.

Referring to FIG. 46B, an external laser pointer accessory can include a laser pointer device 4412 and a laser pupil 4660B, according to one embodiment.

The laser pointer device 4412 can emit a narrow beam of light through the laser pupil 4660B. According to one embodiment, the laser pupil 4660B is aligned with the optical axis 4560A of the image capturing device that is part of the MDCP 4000. According to one embodiment, the laser pupil 4660B is within 4 centimeters of the MDCP 4000's entrance pupil 4250. The user of the mobile data collection platform 4000 can illuminate a point of interest with the narrow beam of light, for example, prior to pressing a button of the MDCP 4000 to capture an image that depicts the point of interest. An example of a button that is pressed to capture the image is an accept data button 2730, as discussed herein.

External GNSS Raw Observable Provider

Another example of an external accessory is an external GNSS raw observable provider. Referring to FIG. 46C, the external GNSS raw observable provider 3750 is located so that it will not obscure the MDCP's entrance pupil or the MDCP's antenna. For example, as depicted in FIG. 46C, the external GNSS raw observable provider 3750 is located midway on the top of the secondary accessory 4020 so that when the combination accessory, which includes the external EDM accessory 4020 and the external GNSS raw observable provider 3750, is coupled, for example with a fastener 5210, with the MDCP 4000, the external GNSS raw observable provider 3750 will be on top of the MDCP 4000 and between the MDCP's entrance pupil 4250 and the MDCP's antenna 1412, as will be discussed in more detail hereinafter.

The external GNSS raw observable provider 3750 can receive raw observables, communicate the raw observables to the MDCP 4000, and the MDCP 4000 can determine a position fix based on the raw observables from the external GNSS raw observable provider 3750. The raw observables from the external GNSS satellite system are also referred to herein as "external raw observables" since they are received from a GNSS raw observable provider 3750 that is external to the MDCP 4000. The raw observables obtained from the GNSS chipset that is internal to the MDCP 4000 shall be referred to as "internal raw observables."

The internal raw observables can include internal raw pseudoranges, and one or more of internal real carrier phase information and internal Doppler Shift Information. As discussed herein, the external raw observables from the external GNSS raw observable provider 3750 can include raw pseudoranges, and one or more of real carrier phase information and Doppler Shift Information. The raw pseudoranges, the real carrier phase information and the Doppler Shift Information from the external GNSS raw observable provider 3750 shall be called respectively "external raw pseudoranges," "external Doppler Shift Information," and "external real carrier phase information." The MDCP 4000 can process the external raw observables, according to various embodiments described herein, to provide a position fix.

The MDCP 4000 can use the external raw observables to determine a position fix, for example, instead of the internal raw observables in a manner that the internal raw observables are used to determine a position fix. For example, an uncorrected unsmoothed position fix can be determined based on the external raw pseudoranges, a corrected unsmoothed position fix can be determined based on the external raw pseudoranges and external corrections obtained from correction sources that are external to a mobile data collection platform, an uncorrected smoothed position fix can be determined based on external raw pseudoranges and external real carrier phase information or external Doppler Shift Information, or a corrected smoothed position fix can be determined based on external raw pseudoranges, external corrections obtained from correction sources that are external to a mobile data collection platform, and external real carrier phase information or external Doppler Shift Information using various embodiments discussed herein.

Known Spatial Relationships

According to various embodiments, there are known spatial relationships between various entities discussed herein. For example, there is a known spatial relationship between the respective entrance pupils of the mobile data collection platform (MDCP) and the external IR image capturing device (ICD) accessory. In a second example, there is a known spatial relationship between the entrance pupil of the external IR image capturing device accessory and the antenna of the MDCP. In a third example, there is a known spatial relationship between the MDCP's entrance pupil and the antenna of an external GNSS raw observable provider. In a fourth example, there is a known spatial relationship between the laser pupil and the MDCP's antenna. In a fifth example, there is a known spatial relationship between the laser pupil and the antenna of an external GNSS raw observable provider.

Therefore, various embodiments are well suited for determining and using known spatial relationships and combinations of known spatial relationships between any two or more entities, such as (1) antenna of an external GNSS raw observable provider, (2) antenna of an internal GNSS chipset, (3) entrance pupil of an internal image capturing device, (4) entrance pupil of an external IR image capturing accessory, (5) laser pupil of a laser pointer accessory, (6) EDM receiver, and (7) EDM transmitter. Referring to FIG. 38, distances 3820, 3830, and 3840 are examples of known spatial relationships.

A known spatial relationship between two entities is a known fixed relationship, for example, because the known spatial relationship is maintained, for example, with a physical coupling. A known spatial relationship is an distance between two entities. A known spatial relationship is defined as a geometric offset (also referred to as an "offset") from one entity to another entity, according to one embodiment. Therefore, according to one embodiment, a mobile data collection platform is disposed in a known fixed relationship with a known geometric offset from the external accessory to the mobile data collection platform, or vice versa. Examples of known spatial relationships, known fixed relationships, known geometric offsets, known fixed offsets are 3820, 3830, 3840, 2406, 2501, 2502. However, embodiments are well suited for other known spatial relationships between other entities as discussed herein.

One or more known spatial relationships can be used for determining a three dimensional position of the center of the IR entrance pupil 4630B, or the entrance pupil 4250 of the image capturing device 1430. The three dimensional position can be determined in the platform coordinate system or in the local coordinate system defined by the X local axis 2203, Y local axis 2201 and Z local axis 2202 (as depicted at least in FIG. 22), for example, in a manner that the three dimensional position of the MDCP's entrance pupil center can be determined as discussed herein.

According to various embodiments, one or more of the known spatial relationships may be one dimensional, two dimensional or three dimensional.

The one or more known spatial relationships, as described herein, can also be stored in the hardware memory 1450, as discussed herein, as known spatial relationships 4160. A user interface can be used for entering known spatial relationships. For example, a user of the MDCP can measure one or more spatial relationships or the one or more spatial relationships can be obtained from the MDCP's manufacturer specification. A list of types of external accessories and a list of types of MDCPs can be displayed. One of the types of accessories and one of the types of MDCPs can be selected. The one or more known spatial relationships can be determined based on the two selected types. In another example, the external accessory can communicate its type to the MDCP and the MDCP can use its type in combination with the external accessory's type to determine the one or more spatial relationships.

The relationships are "known," for example, because they are maintained in a fixed manner and because they can be obtained, determined and/or accessed, as discussed herein.

Monpods and Tripods

Various monopods or tripods may be used to support the mobile data collection platform. A monopod or tripod can be used with the mobile data collection platform that is alone or with a mobile data collection platform that is coupled with an external accessory (also referred to herein as an "MDCP/external accessory combination"). Monopods and tripods are support mechanisms that allow the user to assure minimum camera movement during image capture. They may allow the user to use an image capturing device 1430 or an image capturing device accessory, at a fixed distance above, or in measureable relationship to, a geographically known reference point that may be on the ground of the scene to be measured. Monopods and tripods are commercially available and well known to photographers and surveying professionals. The support mechanism can be coupled with a mounting system, for example, by means of a standard ¼-20 screw mechanism that is built into the external accessory. There are numerous suitable monopods and tripods that are commercially available. By example a monopod such as Benro A35FBR1 may be used. It has a coupling mechanism that includes a ball head that enables the user to orient the MDCP to any angle that is appropriate to capturing the information in the scene. A suitable tripod is the Benro model BRA2970F.

Coupling Mechanisms

According to various embodiments, a mobile data collection platform and an accessory can be coupled with each other using various types of coupling mechanisms. One or more coupling mechanisms can be used to securely couple one or more accessories with the MDCP, to maintain the known spatial relationship between the one or more accessories and the MDCP. Coupling mechanisms can also be used for coupling accessories with each other.

Examples of coupling mechanisms include hook and loop, strips, adhesive, Velcro, strap, L shaped brackets, U shaped brackets, T shaped brackets, mechanical fasteners, snap fit, receptacles, screws, clothing snaps such as common found on western style shirts, rotate and lock systems that can be cinched tightly, or the like. Examples of mechanical fasteners are mechanical clamps, mechanical brackets or the like.

The coupling mechanism can be a screw mount that is inside of the accessory's case and is screwed into the back side of the accessory. The coupling mechanism can include a bracket that is either attached to the backside of the accessory, for example, using a screw mount, or the bracket is a part of the accessory's case where the MDCP can slide into the bracket. The length of the bracket can be adjusted to accommodate a variety of shapes and sizes of MDCP cases.

The adjustments may be done by joining two pieces of the bracket, such as a top piece and a bottom piece, held together by, for example, a screw. The same screw can also fasten the bracket pieces to the back of the accessory.

FIGS. 47-57 and FIG. 46C depict various types of coupling mechanisms for coupling a mobile data collection platform with one or more external accessories, according to various embodiments.

Figure 47:
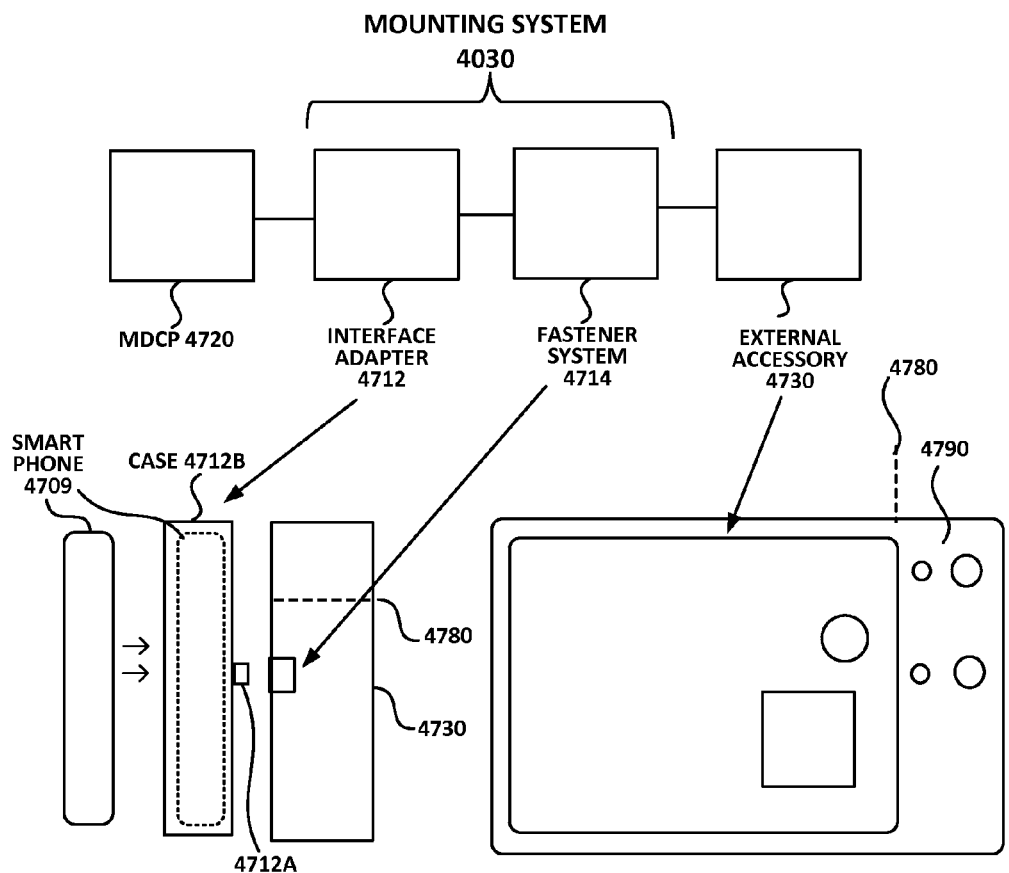
FIGS. 47-56 depict various types of coupling mechanisms for coupling a mobile data collection platform with one or more external accessories, according to various embodiments.

FIG. 47 depicts a mounting system 4030 for coupling a mobile data collection platform 4720 with an external accessory 4730, according to one embodiment.

The mounting system 4030 includes an interface adapter 4712 and a fastener system 4714. Examples of an MDCP 4720 include a smart phone/mobile digital device (e.g., iPhone®) 4709, among other things as discussed herein.

The mounting system 4030 can be used to join the mobile data collection platform 4720, such as a smart phone/mobile digital device (e.g., iPhone®) type mobile data collection platform 4709, with an external accessory 4730. According to one embodiment, the fastening system 4714 is a standard mounting or fastening system for the external accessory 4730 that accepts a variety of types, shapes and sizes of interface adapters 4712 for the variety of cellphones, such as smart phone/mobile digital device (e.g., iPhone®) 4709, that may be used as mobile data collection platforms 4720, according to various embodiments.

The interface adapter 4712 includes a case 4712B and a knob 4712A, according to one embodiment. The fastener system 4714, according to one embodiment, is a hole.

The MDCP 4720 and the external accessory 4730 can be snap fitted into or clicked into the case 4712B of the mounting system 4030.

The external accessory 4730 does not covered up (does not obscure) the area 4790 of the MDCP 4720, which includes the entrance pupil and flash, as indicated by the lines 4780. Further, as can be seen in FIG. 47, when an external GNSS raw observable positioning system 3750 (FIG. 46C) is mounted on top of another external accessory 4730, the area 4790 is not covered up. As depicted in FIG. 47, the line 4780 is a straight vertical line. However, various embodiments are well suited for the line 4780 to form an L shape that provides a cut out portion of the accessory so that none of the accessory covers up the entrance pupil or flash. For example, the lower portion of the accessory's side designed by line 4780 could extend below the entrance pupil and the flash while the upper portion of line 4780 remains to the side of the entrance pupil and/or flash forming an L shape to provide the cut out portion. According to one embodiment, the cut out portion is relatively small. For example, the cut out portion is only big enough so that the entrance pupil and/or the flash are not covered up. According to one embodiment, the mounting system 4030 is a mechanical clamp that surrounds an external accessory 4730 and an MDCP 4720 without obscuring the area 4790 as discussed herein.

Figure 48:
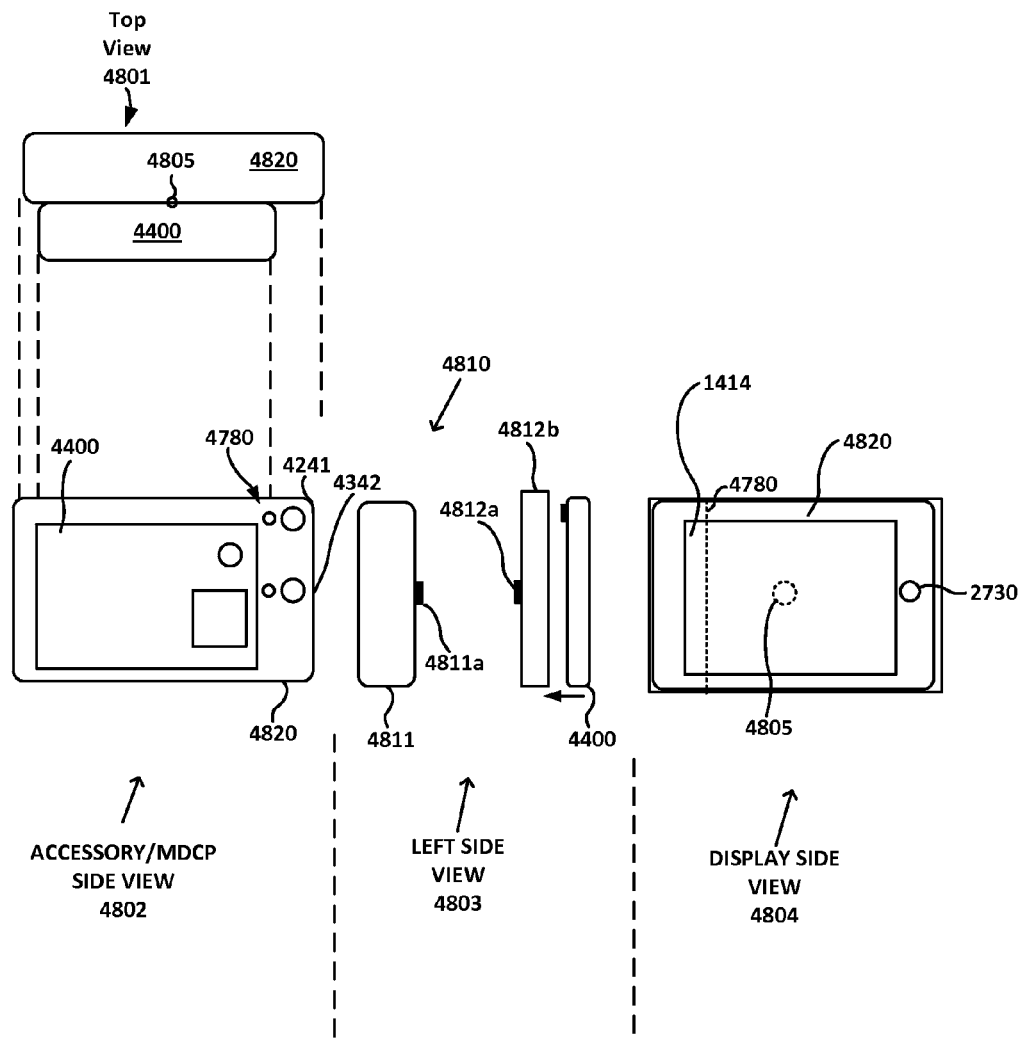

FIG. 48 depicts a smart phone/mobile digital device (e.g., iPhone®) type mobile data collection platform 4820 coupled with an external accessory 4400 using a single mounting system 4810 from various views, according to one embodiment. Various views are depicted in FIG. 48 to facilitate discussion of coupling an MDCP with an external accessory 4400. For example, at the top of FIG. 48, the external accessory 4400 coupled at location 4805 with the mobile data collection platform 4820 is depicted in a top view 4801. To the left and below, the external accessory 4400 and the mobile data collection platform 4820 are depicted from the accessory/MDCP side view 4802. To the right, the external accessory 4400 and the mobile data collection platform 4820 are depicted from the display side view 4804. In the middle, the MDCP 4820 and the external accessory 4400 are depicted in a side view 4803.

The mobile data collection platform 4820 has a case 4811 that an interface adapter 4811A is a part of or coupled to. FIG. 48 depicts a fastening system 4812 that that includes a case 4812B (also called a "sleeve") and a fastener 4812A. The external accessory 4400 can be slide into the case 4812B as depicted by the arrow. The mounting system 4810 includes the interface adapter 4811A, the case 4812B and the fastener 4812A. Location 4805 is the position where the interface adapter 4811A and the fastener 4812A couple.

FIG. 48 depicts a smart phone/mobile digital device (e.g., iPhone®) type mobile data collection platform 4820 with an entrance pupil and a flash that could be at either a side position 4241 or a center position 4342.

Figure 49:
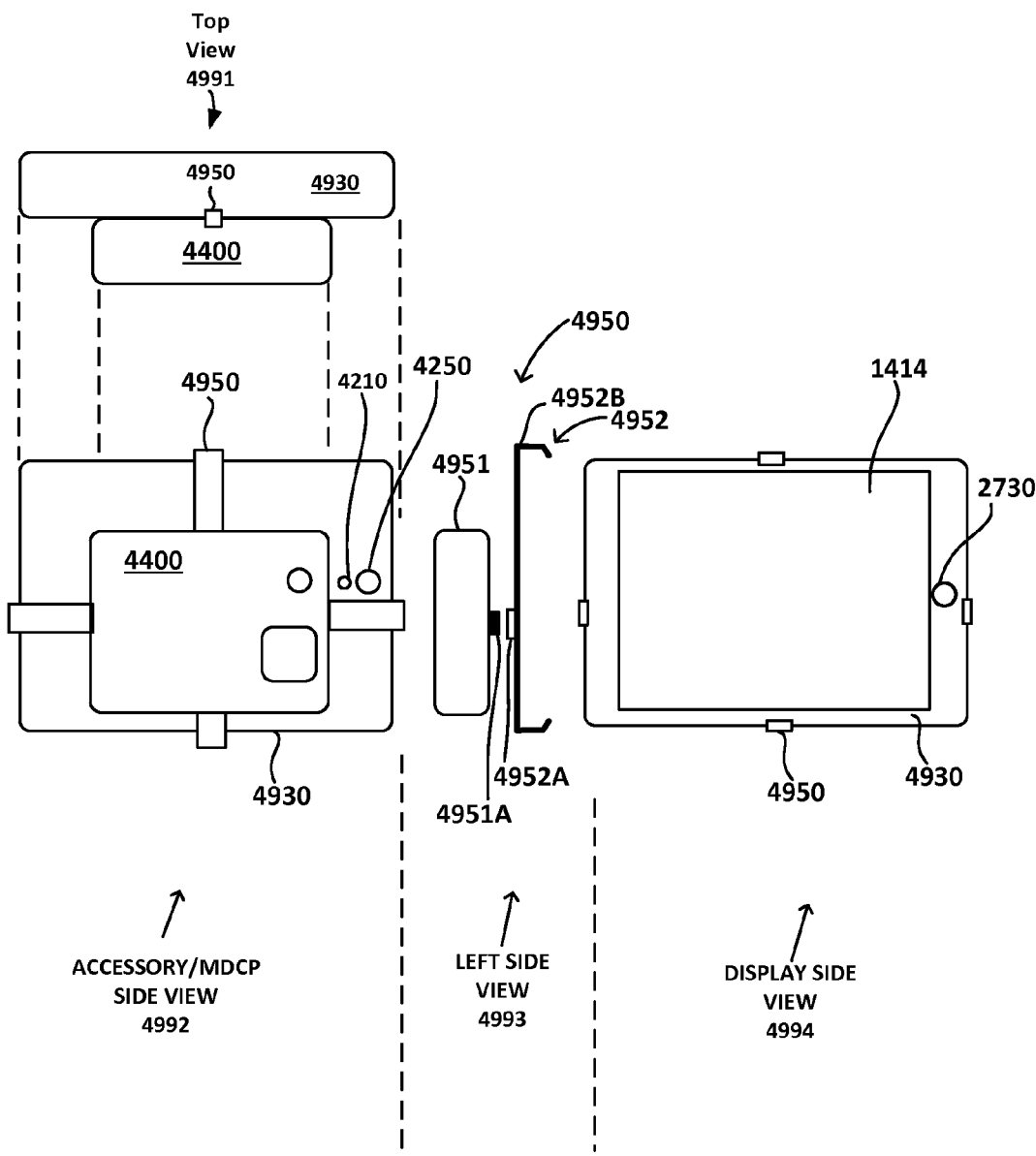

FIG. 49 depicts a tablet type mobile data collection platform 4930 coupled with an external accessory 4400 using a single interface adapter 4951A and fastener 4952A pair type of mounting system 4950 from various views, according to one embodiment. Various views are depicted in FIG. 49 to facilitate discussion of coupling an MDCP 4930 with an external accessory 4400. At the top of FIG. 49, the top view 4991 depicts the external accessory 4400 coupled with the mobile data collection platform 4930 using a mounting system 4950. To the left and below, the accessory/MDCP side view 4992 depicts the external accessory 4400 coupled with the mobile data collection platform 4930. To the right and below, the external accessory 4400 and the mobile data collection platform 4930 are depicted from the display view 4994. In the middle and below, the MDCP 4930 and the external accessory 4400 are depicted in a left side view 4993.

In the accessory/MDCP side view 4992, the tablet type MDCP 4930 depicts the entrance pupil 4250 and the flash 4210 in the center position 4342. The tablet type MDCP 4930 has a case 4951 with an interface adapter 4951A that is part of or coupled to the case 4951. The fastening system 4952 includes a bracket 4952B and a fastener 4952A. The mounting system 4950 includes the interface adapter 4951A, the bracket 4952B and the fastener 4952A.

Figure 50:
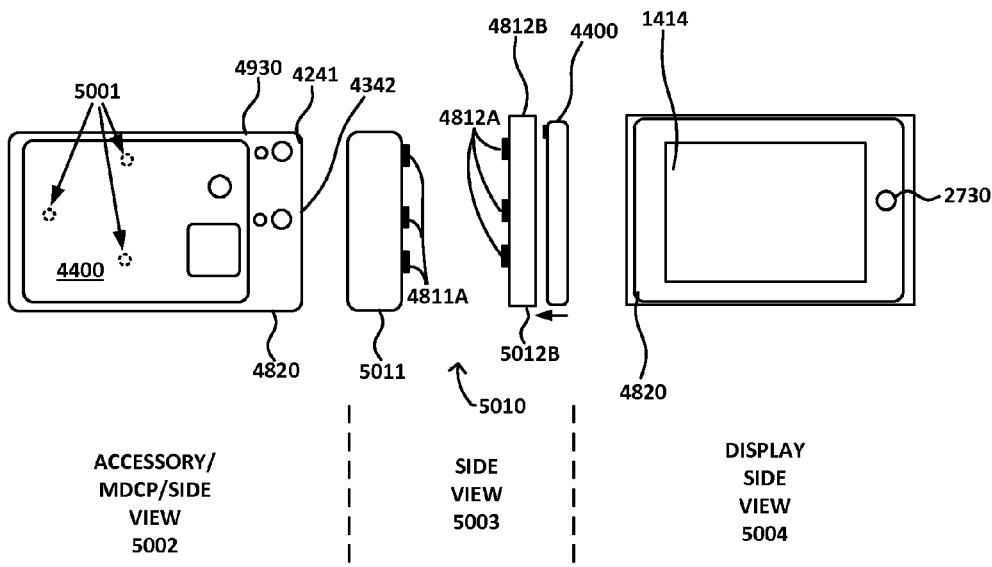

FIG. 50 depicts a mounting system 5010 that includes three pairs of interface adapters 4811A and fasteners 4812A from various views, according to one embodiment. FIG. 50 depicts the mounting system 5010 from an accessory/MDCP side view 5002, a side view 5003, and a display side view 5004, according to one embodiment. FIG. 50 depicts three interface adapter/fastener pairs used with both a smart phone/mobile digital device (e.g., iPhone®) type MDCP 4820 from accessory/MDCP side view, side view, and display side view. A tablet type MDCP could be fastened in the same manner.

More specifically, the smart phone/mobile digital device (e.g., iPhone®) type mobile data collection platform 4820 has a case 5011 that three interface adapters 4811A are a part of or coupled to. FIG. 50 depicts a fastening system that includes a case 5012B (also called a "sleeve") and three fasteners 4812A. The external accessory 4400 can be slide into the case 5012B as depicted by the arrow. The mounting system 5010 includes the interface adapters 4811A, the case 5012B and the fasteners 4812A. The three positions 5001 are the locations where the interface adapters 4811A and the respective fasteners 4812A couple with each other.

Figure 51:
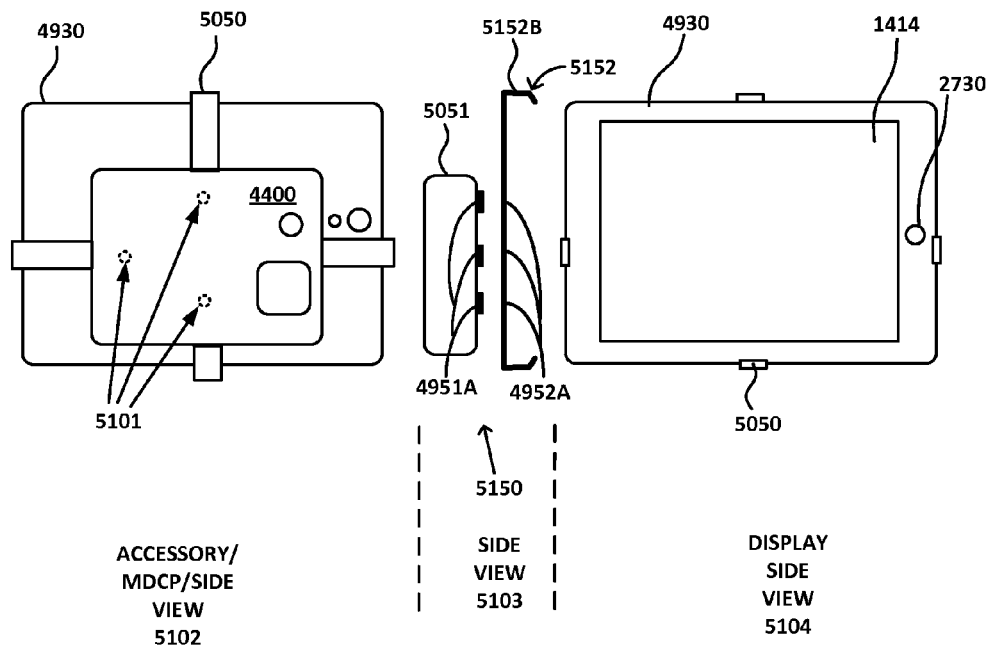

FIG. 51 depicts a mounting system 5150 that includes three interface adapters 4951A, three fasteners 4952A and a bracket 5152B, according to one embodiment. FIG. 51 depicts the mounting system 5150 from an accessory/MDCP side view 5102, a side view 5103, and a display side view 5104. The tablet type mobile data collection platform 4930 has a case 5051 with three interface adapter 4951A that are part of or coupled to the case 5051. The fastening system 5152 includes a bracket 5152B and three fasteners 4952A that are coupled or part of the bracket 5152B. The mounting system 5150 includes the interface adapters 4951A, the bracket 5152 and the fasteners 4952A. The three interface adapters 4951A couple with the respective three fasteners 4952A at the respective positions 5101.

Figure 52:
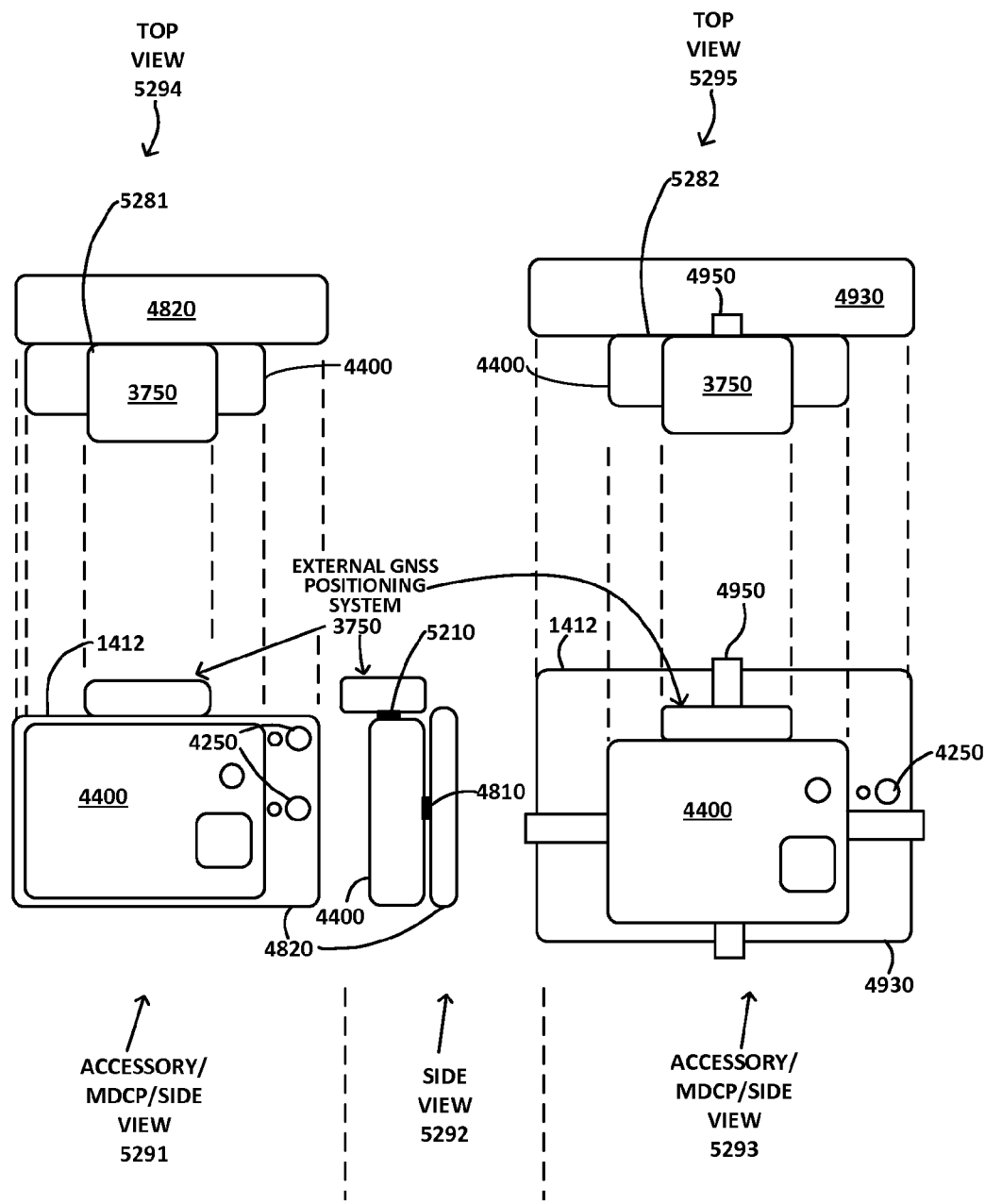

FIG. 52 depicts an external combination accessory coupled with two different types of MDCPs from various views, according to various embodiments. The external combination accessory includes an external GNSS raw observable provider 3750 coupled with a second external accessory 4400, for example, using a snap on mount fastener 5210. A smart phone/mobile digital device (e.g., iPhone®) type MDCP 4820 can be coupled with the external combination accessory using a snap on mounting system 4810, as depicted in the accessory MDCP side view 5291, the side view 5292 and the top view 5294. A tablet type MDCP 4930 can be coupled with an external combination accessory using a mounting system 4950, as depicted in the accessory/MDCP side view 5293 and the top view 5295.

Figure 53:
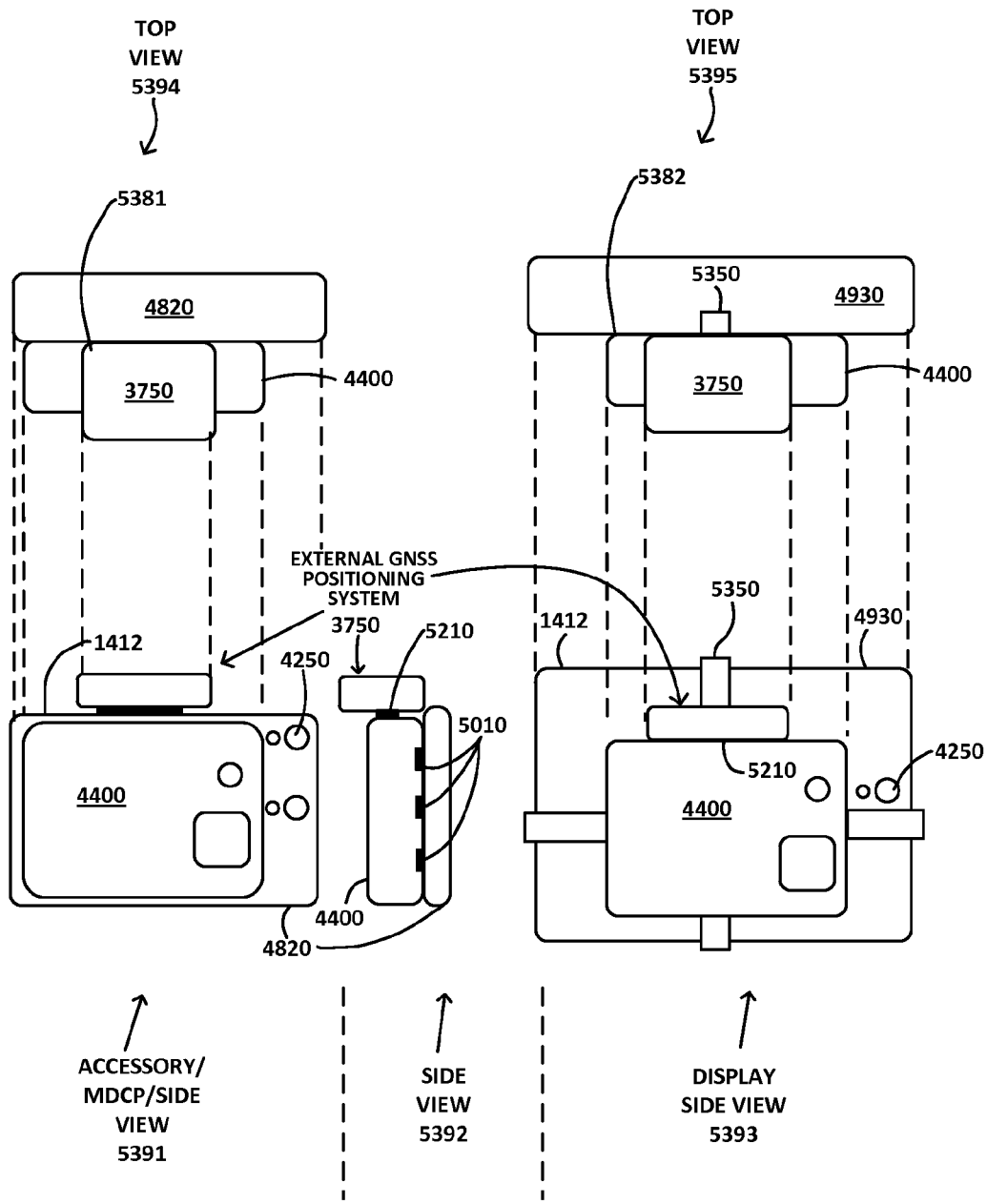

FIG. 53 depicts an external combination accessory coupled with two different types of MDCPs from various views, according to various embodiments. The external combination accessory includes an external GNSS raw observable provider 3750 coupled with a second external accessory 4400, for example, using a snap on mount fastener 5210. The smart phone/mobile digital device (e.g., iPhone®) type MDCP 4820 is coupled with the external combination accessory using a mounting system 5010, as depicted in the accessory MDCP side view 5391, the side view 5392 and the top view 5394. The tablet type MDCP 4930 is coupled with the external combination accessory using a mounting system 5150, as depicted in the accessory/MDCP side view 5393 and the top view 5395.

As can be seen in FIG. 52 and FIG. 53, the external GNSS raw observable provider 3750 is positioned approximately in the middle of the top of the secondary external accessory 4400 between the MDCP's entrance pupil 4250 and the MDCP's antenna 1412 to prevent obscuring the entrance pupil 4250 and the antenna 1412. The respective back surfaces of the secondary external accessory 4400 and the external GNSS raw observable provider 3750 are flush as indicated respectively at positions 5281, 5282 (FIG. 52) of top views 5294, 5295 (FIG. 52) and positions 5381, and 5382 (FIG. 53) of top views 5394 and 5395 (FIG. 53). Further, as can be seen in the top views 5294, 5295 (FIG. 52), 5394 and 5395 (FIG. 53), the back surfaces of the external combination accessory is adjacent to the MDCP front surface as indicated respectively at positions 5281, 5282 (FIG. 52), 5394, and 5395 (FIG. 53).

Referring to FIGS. 48-53, each of the one or more adapters 4811A, 4951A couple with one of the respective fasteners 4812A, 4952A. Various embodiments are well suited for one or more pairs of adapters 4811A, 4951A and fasteners 4812A, 4952A.

Figure 54:
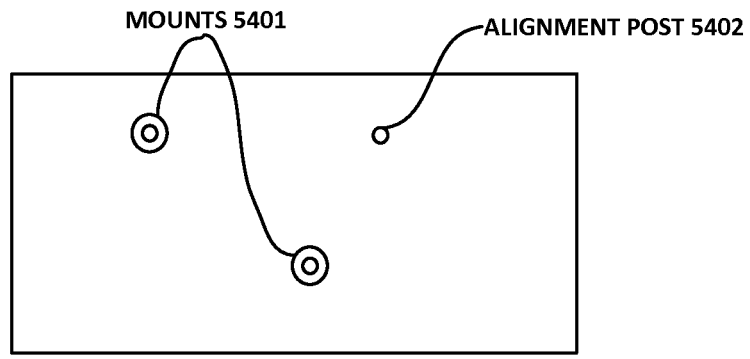

FIG. 54 depicts a technique for ensuring alignment of coupling of an external accessory and MDCP, according to one embodiment. Two mounts 5401 and an alignment post 5402 can be used to ensure the alignment, thus, guaranteeing that the external accessory and the MDCP mate in only one orientation. Various embodiments are well suited to one or more mounts 5401.

Figure 55:
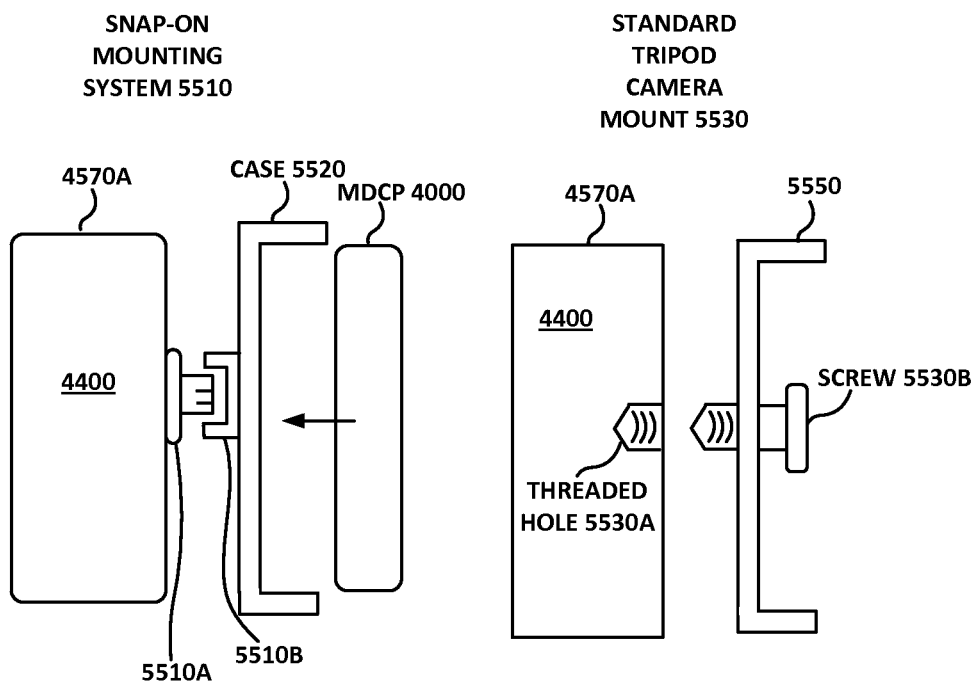

FIG. 55 depicts two different types of mounting systems, according to various embodiments. The two types of mounting systems are a snap-on mounting system 5510 and a standard tripod camera mount 5530. The snap-on mounting system 5510 includes a male portion 5510A and a female portion 5510B where the female portion 5510B snaps on the outside of the male portion 5510A. The female portion 5510B is a part of or coupled to a case 5520 that an MDCP 4000 can be snapped into or slid into as indicated by the arrow. The male portion 5510A is a part of or coupled to the case of an external accessory 4400. 5510A is an example of an adapter 4712 and 5510B is an example of a fastener system 4714. The standard tripod camera mount 5530 includes a threaded hole 5530A in the case 4570A of the external accessory 4400 and a screw 5530B that screws into the threaded hole 5530A. The screw 5530B is part of or coupled to a part 5550 that may be a bracket for or a case of an MDCP. In the event that the part 5550 is a bracket, an MDCP 4000 can be slide into or be snapped into the part 5550. Various embodiments are well suited to use one or more snap-on mounting system 5510 or one or more standard tripod camera mounts 5530, or a combination thereof, for coupling an MDCP with an external accessory.

Figure 56:
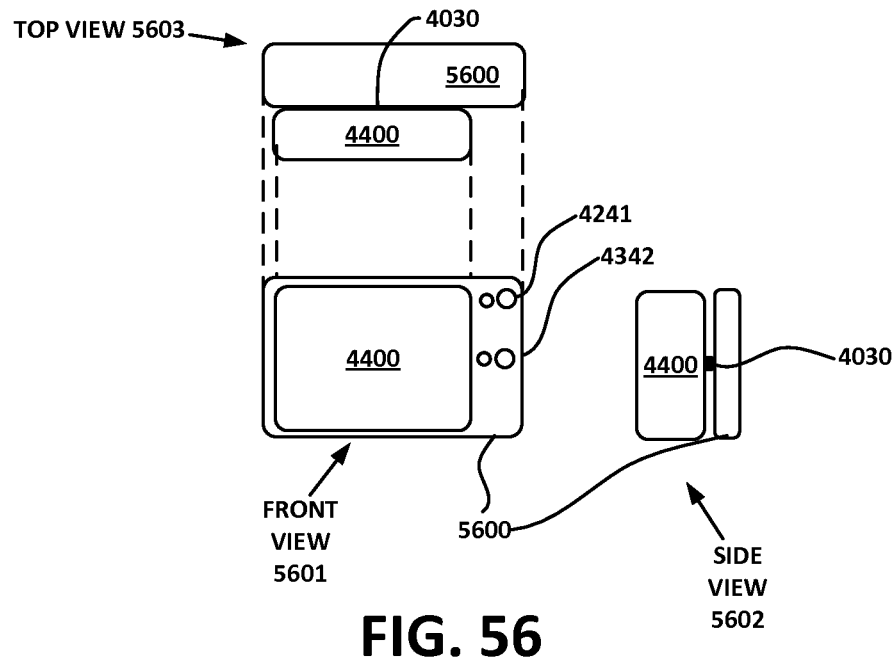

FIG. 56 depicts a smart phone/mobile digital device (e.g., iPhone®) type mobile data collection platform 5600 that is coupled with an external accessory 4400 using a mounting system 4030, according to one embodiment. The MDCP 5600 and the external accessory 4400 are depicted in a front view 5601, a side view 5602 and a top view 5603. The mobile data collection platform 5600 could have the entrance pupil 4250 and flash 4210 in a side position 4241 or a center position 4342.

Figure 57:
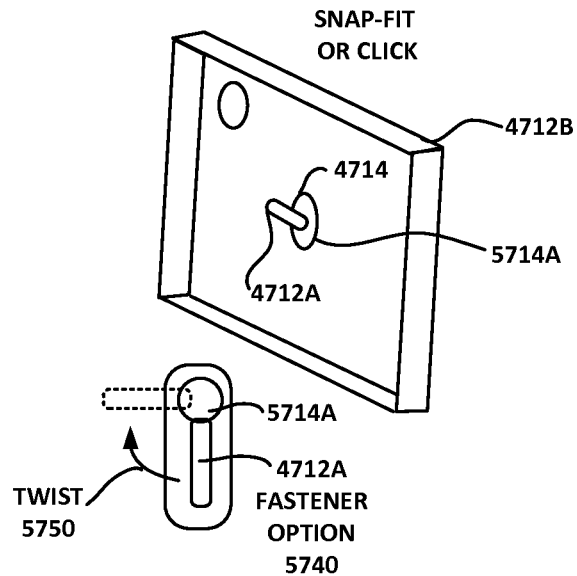
FIG. 57 depicts a case with a fastener option, according to one or more embodiments.

FIG. 57 depicts a case 4712B with a fastener option 5740, according to one embodiment. The fastener option 5740 according to one embodiment, is part of a mounting system 4030 (FIG. 47). As depicted in FIG. 57, the fastener option 5740 includes a fastener system 4714 that is a hole 5714A and interface adapter 4712's knob 4712A that can be inserted into the hole 5714A and twisted 5750 to securely couple the MDCP 4720 and external accessory 4730 together.

Referring back to FIG. 46C, a snap-on mount fastener 5210 is used to couple an external EDM accessory 4020 with an external GNSS raw observable provider 3750, according to one embodiment.

Legacy External Accessories

According to various embodiments, an external accessory may be a legacy device. For example, the accessory may be a legacy GNSS raw observable provider, a legacy IR image capturing device, a legacy image capturing device that is not IR, a legacy laser pointing device or a legacy electronic distance measurement device. The legacy external accessory may be coupled to the MDCP using Velcro, or some other type of coupling mechanisms that is discussed herein or is well known in the art. FIGS. 45D, 45E, 45F, 45G depict examples of legacy EDM devices that are used as external electronic distance measurement accessories.

Shapes, Sizes, Configurations

An external accessory can have various physical configurations, with different shapes and sizes so long as the external accessory does not cover the entrance pupil of the mobile data collection platform. According to one embodiment, the external accessory 4400 has a configuration that allows the flash 4210 and the entrance pupil 4250 of the MDCP's internal image capturing device 1430 to be exposed, as depicted at least in FIG. 42, FIG. 43, 45A, 45D-45H, 47-53, 56. For example, although many of the external accessories depicted in the figures and discussed herein, have a rectangular shape, embodiments can be practiced using other configurations. For example, the configuration of the external accessory could wrap around a mobile data collection platform or allow a mobile data collection platform to slide into the external accessory or vice versa. In another example, an "L" configuration that provides a cut out portion, as discussed herein, could be used for external accessories so that none of the entrance pupil 4250 and flash 4210 are covered up.

Collected External Accessory Data and Collected Internal Data

According to various embodiments, various types of information are collected for determining the distance between a mobile data collection platform and a real point of interest or a pseudo point of interest, as discussed herein. For example, as discussed herein, the tilt angle, the azimuth angle, a position fix and an image are collected in a manner that they are associated with each other. More specifically, the tilt angle, the azimuth angle, the position fix and the image can all be collected during a period that the MDCP is held still. In another example, in response to the user pressing a button on the MDCP, the tilt angle, the azimuth angle, the position fix, and the image are collected and associated with each other. The raw observables that are extracted from the internal GNSS chipset are referred to as "internal raw observables." Raw observables that are received by the MDCP from an external GNSS raw observable provider are referred to as "external raw observables." The image that is obtained with the image capturing device that is inside the MDCP is referred to as an "internal image" and an image that is obtained from an external IR image capturing device accessory is referred to as an "external IR image" or "external IR image."

The tilt angle, the azimuth angle, the position fix determined based on raw observables that are extracted from an internal GNSS chipset and the internal image are referred to herein as "collected internal data." External raw observables, a position fix that is determined based on external raw observables, an external image, and an EDM distance measurement are referred to as "external accessory data" or "additional data." The external accessory data can be stored in the MDCP's hardware memory 1450. The external accessory data that is stored in the hardware memory 1450 is referred to as "collected external accessory data" or "collected additional data."

According to various embodiments, the additional data from an accessory is also collected and associated with one or more of the tilt angle, the azimuth angle, the internal position fix determined based on internal raw observables and the internal image. For example, an external image be associated with the tilt angle, the azimuth angle and an internal or external position fix instead of or in addition to the internal image. In yet another example, external raw observables may be used to determine the position fix instead of or in addition to determining a position fix based on internal raw observables.

The techniques for associating tilt angle, the azimuth angle, the position fix and the internal image can be used for associating the external accessory data with the collected internal data. The external accessory data can be associated with the collected internal data so that the internal position fix 1454 and/or the external position fix 4154 are the position (also referred to as "particular position") of the MDCP at the time that one or more of the EDM distance measurement 4159, the tilt angle, the azimuth angle, and the internal image 1452 and/or external image 4152 are captured. For example, the MDCP can be held still while two or more of the tilt angle, the azimuth angle, internal position fix, external position fix, internal image, external image, EDM distance measurement, and highlighting of a real or pseudo point of interest using the laser pointer accessory are collected. In another example, one or more of the tilt angle, the azimuth angle, internal position fix, external position fix, internal image, external image, EDM distance measurement, and highlighting of a real or pseudo point of interest using the laser pointer accessory can be collected automatically and instantaneously in response to a timer expiring or a user pressing a button associated with either the MDCP or a button associated respective accessory that the additional data is from. The button that is pressed may be the accept data button 2730. An identifier can be associated with each of the pieces of external accessory data and collected internal data for a particular position of the MDCP.

Mobile Data Collection Platform's Processing Logic

Figure 58:
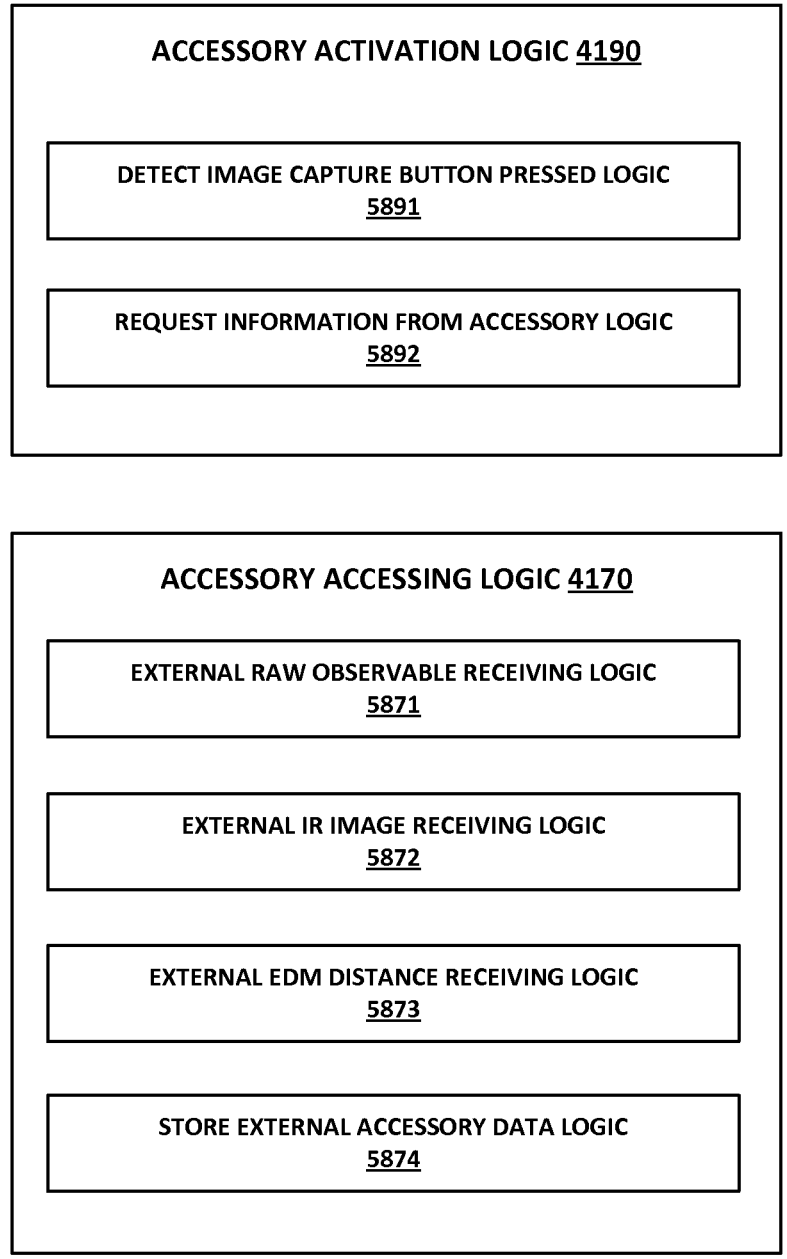
FIG. 58 depicts block diagrams of accessory activation logic and accessory accessing logic, according to various embodiments.

FIG. 58 depicts block diagrams of accessory activation logic 4190 and accessory accessing logic 4170, according to various embodiments. The accessory activation logic 4190 includes detect image capture button pressed logic 5891 and request information from accessory logic 5892.

The detect image capture button pressed logic 5891 detects that the user of the MDCP 4000 pressed a button, such as the accept data button 2730 (also referred to as image capture button 2730) to capture an image. For example, the detect image capture button pressed logic 5891 can monitor that the accept data button 2730 was pressed and communicate, for example, with wireless communication device 3709 such as Bluetooth, with the request information from accessory logic 5892 to activate the external accessory 4400 and to request external accessory data from the external accessory 4400. The button that is pressed may be a mechanical button or a graphical button that is displayed on the display 1414. Alternatively or in addition, the external accessory 4400 can include a flash sensor that detects a flash from the MDCP's flash 4210 (FIG. 42 and FIG. 43). Flash sensors are well known in the art of photography. One or more timers can be used instead of the one or more buttons discussed herein. For example, a timer can be used instead of the accept data button 2730. Another timer can be used instead of the EDM distance button 4260.

The accessory accessing logic 4170 receives external accessory data from the external accessory 4400. For example, if the external accessory 4400 is an external GNSS raw observable provider 3750 (FIG. 46C), then the external raw observables receiving logic 5871 receives external GNSS observables from the external GNSS raw observable provider. The received external raw observables can be processed according to various embodiments described herein to determine a position fix. For example, the external raw observables can include external raw pseudoranges. The external raw observables may also include either Doppler Shift Information or real carrier phase information. The external raw pseudoranges can be corrected based on external corrections or smoothed, as discussed herein. The external Doppler shift information or the external real carrier phase information can be applied to the external raw pseudoranges as discussed herein. Therefore, the external raw observables can be used to provide corrected unsmoothed pseudoranges, uncorrected unsmoothed pseudoranges, corrected smoothed pseudoranges, or corrected unsmoothed pseudoranges. Then the corrected unsmoothed pseudoranges, uncorrected unsmoothed pseudoranges, corrected smoothed pseudoranges, or corrected unsmoothed pseudoranges can be used to determine a position fix. The position fix can be smoothed based on locally measured movement information as discussed herein. The store external accessory data logic 5874 can store the position fix, which results from processing the external raw observables, as position fix 4154.

If the external accessory 4400 is an external IR image capturing device accessory, then the external IR image receiving logic 5872 receives an external IR image from the external IR image capturing device accessory. The store external accessory data logic 5874 can store the external IR image as the external IR image 4152. If the external accessory 4400 is an external EDM accessory, the external EDM distance receiving logic 5873 can receive the EDM distance measurement from the external EDM accessory. The store external accessory data logic 5874 can store the EDM distance measurement as EDM distance measurement 4159. If the external accessory 4400 is an external combination accessory, then the appropriate one or more logics 4170, 5871, 5872, and 5873 can receive one or more of external raw observables, external IR image, and EDM distance measurement depending on the capabilities of the external combination accessory. The store external accessory data logic 5874 can store one or more of external IR image 4152, EDM distance measurement 4159, and position fix 4154 that is determined based on the external raw observables, depending which external accessory data the external combination accessory provides.

External Accessory's Processing Logic

Figure 59:
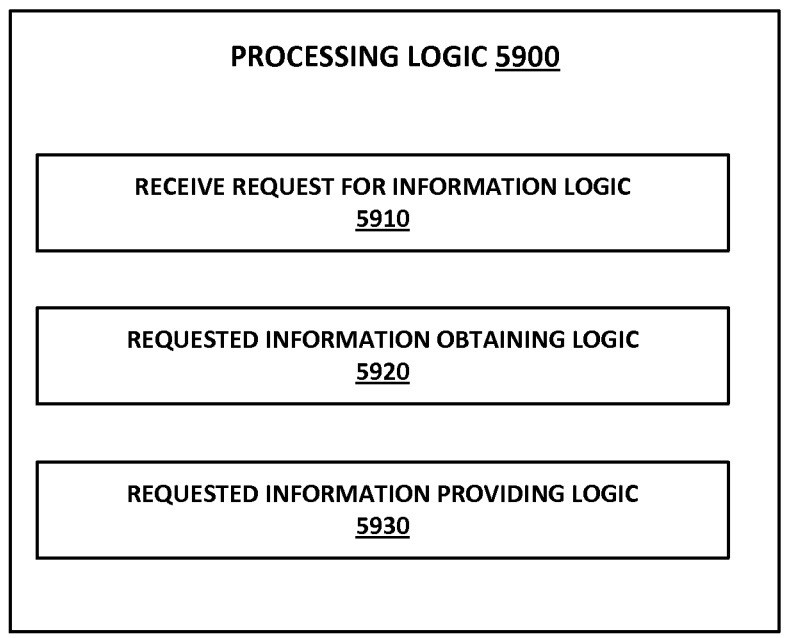
FIG. 59 depicts processing logic of an external accessory, according to one embodiment.

FIG. 59 depicts processing logic 5900 of an external accessory 4400, according to one embodiment. An external accessory 4400 can include the processing logic 5900 in software 4401, such as applications 4401B or modules 4401C. The processing logic 5900 includes requested information obtaining logic 5920, requested information providing logic 5930.

The processing logic 5900 is executed in response to principal control instructions, as discussed herein, received from a MDCP. For example, the wireless communication device 4024 can receive the request for information from MDCP 4000's request information from accessory logic 5892 and provide the request for information to the receive request for information logic 5910. The request (also known as a "principal control instruction") can be communicated to the requested information obtaining logic 5920. The requested information obtaining logic 5920 can obtain, depending on the type of external accessory that the external accessory 4400 is, one or more of the external raw observables, an external IR image, and an EDM distance measurement. If the external accessory 4400 is a combination accessory, the requested information obtaining logic 5920 can coordinate obtaining the various types of external accessory data that the combination accessory is capable of providing. For example, the requested information obtaining logic 5920 can automatically and instantaneously obtain two or more of external raw observables, EDM distance measurement, and external IR image depending on what features are associated with the external combination accessory. The requested information providing logic 5930 can use the wireless communication device 4024 to communicate the one or more of the external raw observables, an external IR image, and an EDM distance measurement back to the MDCP 4000's wireless communication device 3709.

According to one embodiment, the external accessory 4400 was not built in a manufacturing facility. For example, the external accessory 4400 may be built by a user of the MDCP 4000.

Discussion of Methods

Figure 60:
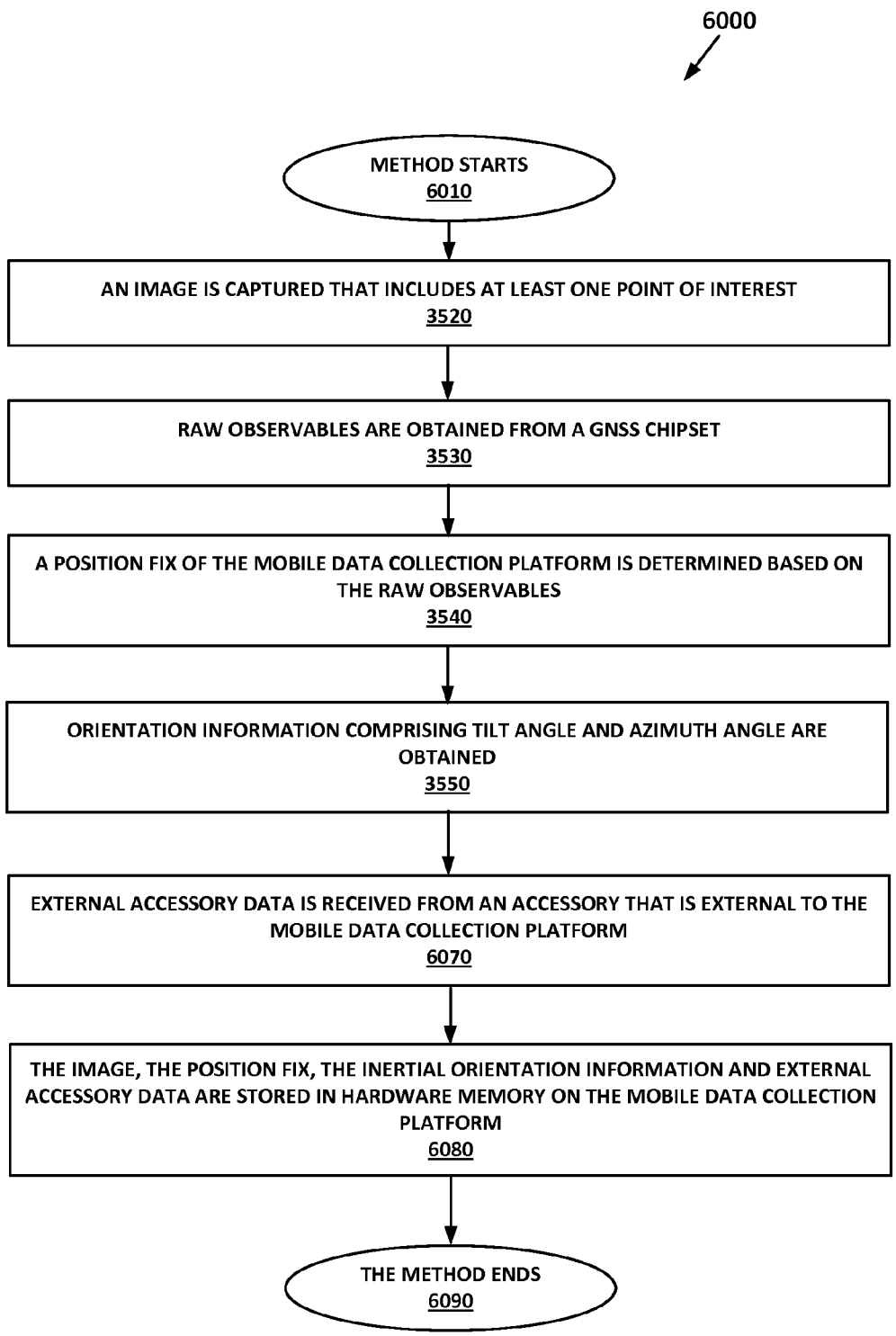
FIG. 60 depicts a flowchart of a method for collecting external accessory data at a mobile data collection platform provided by an external accessory of the mobile data collection platform, according to one embodiment.

FIG. 60 depicts a flowchart 6000 of a method for collecting external accessory data at a mobile data collection platform provided by an external accessory of the mobile data collection platform, according to one embodiment.

At 6010, the method begins.

Operations 3520-3550 are performed. The GNSS chipset in operation 3530 may be internal to the MDCP or external to the MDCP. For example, raw observables can be obtained from an internal GNSS chipset 1413 or an external GNSS chipset that is part of an external GNSS raw observable provider 3750. In operation 3540, the position fix can be determined based on either internal raw observables or external raw observables or both, as discussed herein. The position fix defines a location of an antenna, as discussed herein. The raw observables from either the internal GNSS chipset 1413 or the eternal GNSS raw observable provider 3750 can include raw pseudoranges and one of carrier phase information and Doppler Shift Information.

At 6070, external accessory data is received from an accessory that is external to the mobile data collection platform. The external accessory may be any one or more of an external EDM accessory, an external image capturing device accessory, which may be infrared or non-infrared, and an external GNSS raw observable provider accessory. The external accessory can be a combination accessory. The external accessory data may be one or more of external raw observables, an EDM distance measurement 4159, and an external image 4152. A position fix 4154 can be determined based on the external raw observables as discussed herein.

At 6080, the image 1452, the position fix Xpf, Ypf, Zpf, the orientation information 1456 and external accessory data, such as a position fix 4154, an external image 4152, and/or an EDM distance measurement 4159, are stored in hardware memory 1450 of the mobile data collection platform. The position fix Xpf, Ypf, Zpf is stored as position fix 1454. One or more of the image 1452, the position fix 1454, the orientation information 1456, the external image 4152, position fix 4154, and EDM distance measurement 4159 can be used to determine a location of a point of interest in the image 1452, 4152 using, for example, photogrammetry. Photogrammetry is well known in the arts. According to one embodiment, the image 1452, the position fix 1454, the orientation information 1456, the external image 4152, position fix 4154, EDM distance measurement 4159 can be used to determine a three dimensional location Xpt, Ypt, Zpt of the point of interest. According to one embodiment, the three dimensional location Xpt, Ypt, Zpt of the point of interest is determined in the local coordinate system.

At 6090, the method ends.

Figure 61:
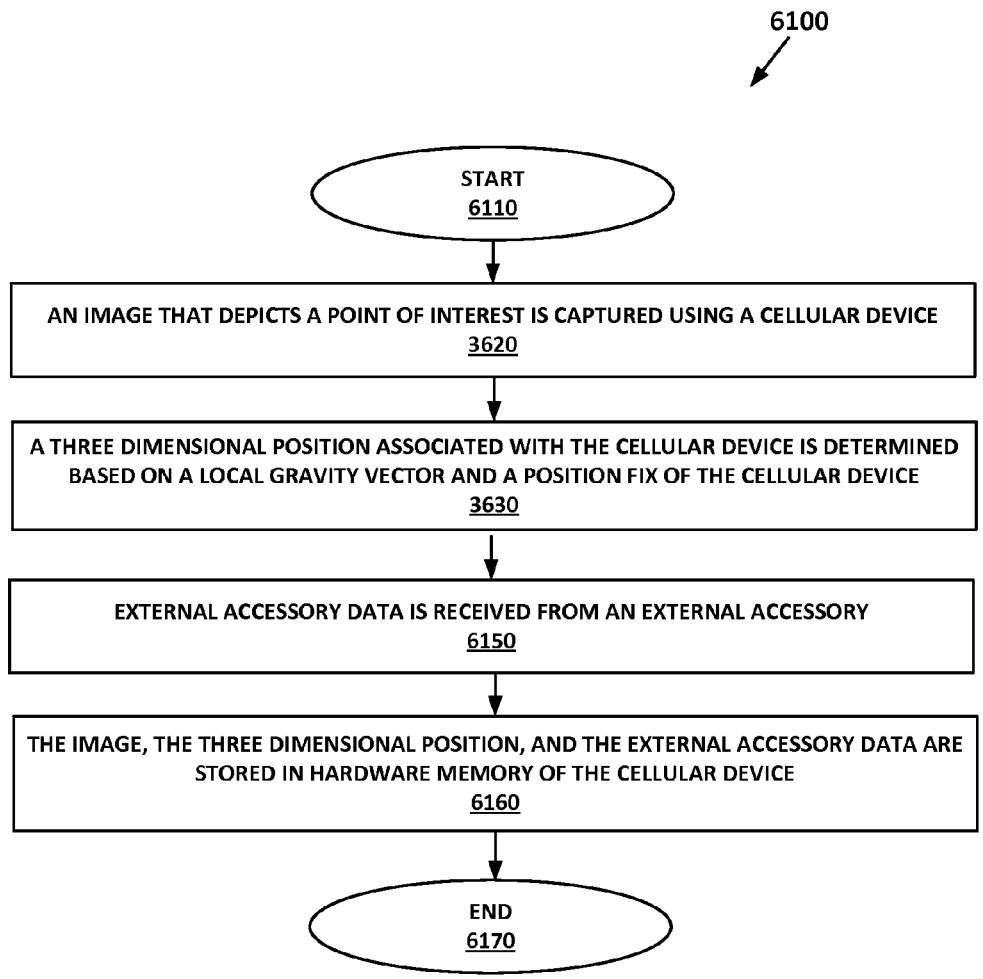
FIG. 61 depicts a flowchart of a method for collecting external accessory data at a mobile data collection platform provided by an external accessory of the mobile data collection platform, according to another embodiment.

FIG. 61 depicts a flowchart 6100 of a method for collecting external accessory data at a mobile data collection platform provided by an external accessory of the mobile data collection platform, according to another embodiment.

At 6110, the method begins.

Operations 3620-3630 are performed. The GNSS chipset may be internal to the MDCP or external to the MDCP. For example, raw observables that are used to determine the position fix of the cellular device can be obtained from an internal GNSS chipset 1413 or an external GNSS chipset of an external GNSS raw observable provider 3750. The raw observables from either the internal GNSS chipset 1413 or the eternal GNSS raw observable provider 3750 can include raw pseudoranges and one of carrier phase information and Doppler Shift Information.

At 6150 external accessory data is received from an accessory that is external to the mobile data collection platform. The external accessory may be any one or more of an external EDM accessory, an external image capturing device accessory, and an external GNSS raw observable provider accessory. The external accessory can be a combination accessory. The external accessory data may be one or more of external raw observables, an EDM distance measurement 4159, and an external image 4152. A position fix 4154 can be determined based on the external raw observables as discussed herein.

The external accessory and the mobile data collection platform are physically coupled together, according to one embodiment, thus, maintaining a known fixed relationship between the external accessory and the mobile data collection platform. The known fixed relationship provides one or more known geometric offsets between the external accessory and the mobile data collection platform. For example, if the external accessory is a GNSS raw observables provider, then the one or more known geometric offsets may be one or more distances 3820, 3830, 3840 (FIG. 38). However, embodiments are well suited for other geometric offsets, for example, for other types of external accessories.

At 6160, the image, the three dimensional position and external accessory data are stored in hardware memory. For example, the image 1452, the three dimensional position X0, Y0, Z0, and the external accessory data can be stored in hardware memory 1450 of the mobile data collection platform 4000. The external accessory data can include one or more of the external image 4152, position fix 4154, and EDM distance measurement 4159.

The local gravity vector 4170 is local with respect to the cellular device 4000, for example, as discussed herein, at the time that the one or more images 1452, 4152 is captured.

According to one embodiment, the antenna is located at the position fix when the image is captured. For example, if the position fix is determined based on raw observables obtained from an internal chipset, then the position fix Xpf, Ypf, Zpf defines the location of the antenna 1412 (FIG. 14). If the position fix 3860 (FIG. 38) is determined based on external raw observables from an external GNSS raw observables provider, then the position fix defines the location of the antenna 3810 (FIG. 38).

The three dimensional position X0, Y0, Z0 is associated with the cellular device 4000 when one or more images 1452, 4152 is captured. The three dimensional position X0, Y0, Z0 is the location of the MDCP's entrance pupil center at the time that the one or more images 1452, 4152 is captured. Instead or in addition, the three dimensional position of the cellular device 4000 may be the three dimensional position of the entrance pupil center of the external image capturing device accessory or some other three dimensional position of the combination of the cellular device and the external accessory when the one or more images 1452, 4152 is captured.

The cellular device 4000 is not required to be perpendicular to the local gravity vector 2270 at the time of collecting of data, as described herein. For example, the cellular device z00 is not required to be perpendicular at the time of the capturing of the one or more the images 1452, 4152 and the determining of the three dimensional position X0, Y0, Z0.

At 6170, the method ends.

The detect image capture button pressed logic 5891 detects that the user of the MDCP 4000 pressed a button, such as the accept data button 2730, or a timer expired to capture one or more images 1452, 4152, as discussed herein. Alternatively or in addition, the external accessory 4400 can include a flash sensor that detects a flash from the MDCP's flash 4210 (FIG. 42 and FIG. 43). The methods depicted in FIGS. 60 and 61 are initiated, according to various embodiments, in response to the detect image capture button pressed logic 5891 detecting that the user of the MDCP 4000 pressed a button or in response to the flash sensor detecting the flash.

Figure 62:
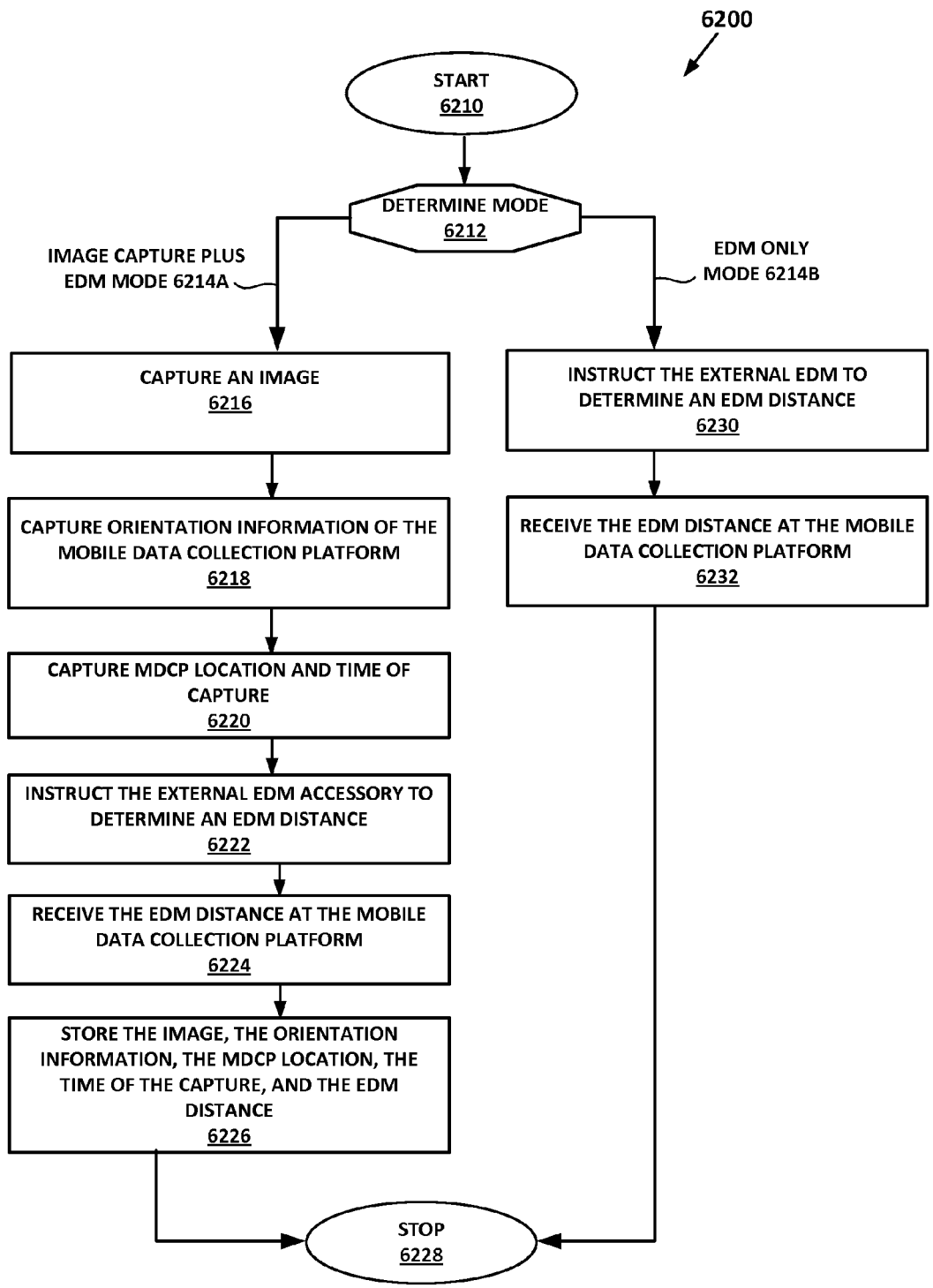
FIG. 62 depicts a flowchart of a method for collecting external accessory data at a mobile data collection platform provided by an external accessory of the mobile data collection platform, according to yet another embodiment.

FIG. 62 depicts a flowchart 6200 of a method for collecting external accessory data at a mobile data collection platform provided by an external accessory of the mobile data collection platform, according to yet another embodiment.

At 6210, the method begins.

At 6212, a determination is made as to what mode the mobile data collection platform is in. For example, the mobile data collection platform can go into an image capture plus EDM mode 6214A in response to the user selecting a camera icon from the home page displayed on the display 1414 and subsequently pressing the image capture button 2730. Alternatively a timer can be used instead of pressing the image capture button 2730. The mobile data collection platform can go into an EDM only mode 6214B in response to the user pressing the EDM distance button 4260 (also referred to as "take a sample distance measurement button"). Alternatively, a timer can be used instead of pressing the EDM distance button 4260.

If the mobile data collection platform is in an EDM only mode 6214B, processing proceeds to 6230. If the mobile data collection platform is in an image capture plus EDM mode 6214A, processing proceeds to 6216. According to one embodiment, the EDM accessory operates at peak efficiency, for example, at 300 points per second while in image capture plus EDM mode 6214A and performs in less than peak efficiency when in the EDM only mode 6214B.

At 6230, the mobile data collection platform instructs the external EDM accessory to determine an EDM distance measurement. For example, the request information from accessory logic 5892 can instruct the external EDM accessory to determine the EDM distance measurement, for example, by transmitting a principal control instruction via short range communication device 3709 or using wire access 4410, as discussed herein. The external EDM accessory can determine the EDM distance measurement as described herein. The measurement that is used as the EDM distance measurement can be to a point that is displayed nearby, in and around, the center 2750 of the crosshairs display overlay 2721 (refer to FIG. 27) in the image plane 1950, on the object of interest 4513A. The EDM distance measurement is determined in response to the EDM accessory receiving the control instruction from the MDCP's request information from accessory logic 5892.

At 6232, the mobile data collection platform receives the EDM distance measurement. For example, the external EDM accessory can transmit the EDM distance measurement to the mobile data collection platform and the external EDM distance receiving logic 5873 can receive the EDM distance measurement. The EDM distance measurement is transmitted to the mobile data collection platform in response to the EDM accessory receiving the control instruction from the MDCP's request information from accessory logic 5892. The EDM distance measurement can be displayed, for example, on the MDCP's display 1414. Store external accessory data logic 5874 can optionally store the received EDM distance measurement in the hardware memory 1450 of the MDCP as EDM distance measurement 4159. Processing proceeds to 6216.

At 6216, an image is captured. 1452 and 4152 are examples of captured images. Images can be captured from a single location or from more than one location, as discussed herein. A distance D 3201 can be determined between two positions P1, P2 that two respective images were captured that both depict a point of interest 2250, as depicted in FIG. 32.

At 6218 orientation information of the mobile data collection platform is captured. For example, a tilt angle and tilt direction as provided by the compass heading can be captured. 3550 is an example of capturing orientation information.

At 6220, the location of the MDCP is captured and the time of that the location was captured (also referred to as "time of location capture") is also captured. The MDCP location may be (1) a position fix as determined in 3540, (2) latitude, longitude and altitude, and/or (3) a three dimensional position as determined in 3630. The time may be a Greenwich Mean Time (GMT) or local time.

At 6222, the mobile data collection platform instructs the external EDM accessory to determine an EDM distance measurement. 6222 is performed in a similar manner to 6230.

At 6224, the EDM distance measurement is received at the mobile data collection platform. Operation 6224 is performed in a similar manner to operation 6232.

At 6226, the image, the orientation information, the MDCP location, the time of capture and the EDM distance measurement are stored. For example, store external accessory data logic 5874 can store the image captured at 6216, the orientation information captured at 6218, the MDCP location captured at 6220, the time of location capture captured at 6220, and the EDM distance measurement received at 6224 into a file. The file may be in hardware memory 1450 of the mobile data collection platform.

At 6228, the method stops.

Figure 63:
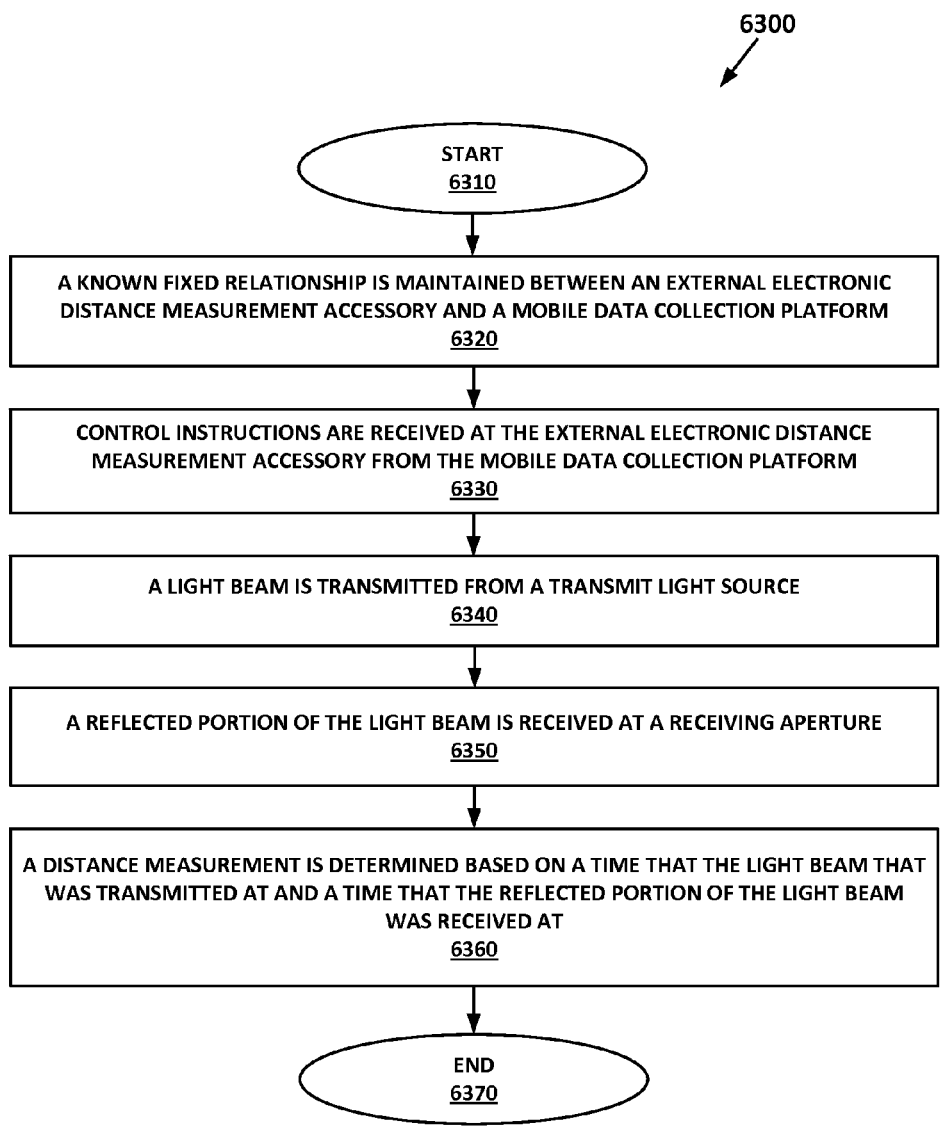
FIG. 63 depicts a flowchart of a method for determining a distance, according to one embodiment.

FIG. 63 depicts a flowchart 6300 of a method for determining a distance, according to one embodiment.

At 6310, the method begins.

At 6320, a known fixed relationship between an external electronic distance measurement accessory in a first package and a mobile data collection platform in a second package is maintained where the first package and the second package are separate packages that are physically coupled together. For example, the MDCP's case 4580A and the external EDM accessory's case 4570A are the respective separate packages. The first package and the second package are physically coupled together. For example, the external electronic distance measurement accessory's case can include a fastening system 4714 that couples with an interface adapter 4712 that maintains a known fixed relationship between the respective cases 4580A and 4570A of the respective mobile data collection platform and the external electronic distance measurement accessory. One or more of distances 3820, 3830, and 3840 is an example of a known fixed relationship. The one or more distances 3820, 3830, and 3840 can be stored in known spatial relationship 4160, as discussed herein.

At 6330, control instructions are received at the external electronic distance measurement accessory from the mobile data collection platform. The EDM accessory's receive request for information logic 5910 receives a request for information from the MDCP's request information from accessory logic 5892, the requested information obtaining logic 5920 obtains the requested information in response to the received request for information, and the requested information providing logic 5930 provides the requested information to the MDCP's external EDM distance receiving logic 5873. In another example, the MDCP activates the EDM accessory, for example, in response to detecting that a button has been pressed or a timer has expired.

The light beam axis of the external electronic distance measurement accessory is parallel with an optical axis from an entrance pupil of the mobile data collection platform, according to various embodiments. FIGS. 45A, 45B, 45D-45H depict examples of the light beam axis 4585A and 4585C that is parallel with an optical axis 4560A from an entrance pupil of a mobile data collection platform.

The EDM accessory may be activated by the MDCP, according to one embodiment. For example, a user may push a button or slide a slide bar of the EDM accessory to turn the EDM accessory's communication device 4024 while putting the EDM accessory in a quiescent mode (also known as a sleep mode) that does not consume much power. The button or slide bar only turns the EDM accessory's communication device 4024. Turning the EDM accessory's communication device 4024 on allows the MDCP to control the EDM accessory. The EDM only mode 6214B or the image capture plus EDM mode 6214A can be entered as discussed herein.

In another embodiment, the EDM accessory may activate itself. For example, the EDM accessory may be fully activated when the user pushes the button or slides the slide bar of the EDM accessory.

At 6340, a light beam 4521A is transmitted from a transmit light source 4503A, where the transmit light source 4503A is part of the external electronic distance measurement accessory 4020 and wherein an axis 4585A, 4585C of the light beam 4521A is parallel with an optical axis 4560A of an entrance pupil 4250 of the mobile data collection platform 4000. The optical axis 4560A is pointing perpendicularly from the entrance pupil 4250, according to one embodiment.

At 6350, a reflected portion 4522A, 4550B, of the light beam 4521A is received at a receiving aperture 4560A, 4640A, where the receiving aperture 4560A, 4640A is part of the external electronic distance measurement accessory 4020.

At 6360, a measurement of a distance (e.g., "distance measurement) is determined based on a time that the light beam 4521A that was transmitted at 6340 and a time that the reflected portion 4522A, 4550B of the light beam was received at 6350.

At 6370, the method ends.

According to various embodiments, the methods depicted in FIG. 60, FIG. 61, FIG. 62 and FIG. 63 can be performed automatically and almost instantaneously, for example, in approximately 0.25 second or less. For example, approximately 0.25 second or less pass from the time of a data collection triggering event, such as a button being pressed or a timer expiring, until all of the external accessory data from one or more accessories 4400, 3750 and all of the collected internal data from a mobile data collection platform 4000 is stored in the hardware memory 1450. Examples of the collected internal data are the tilt angle, the azimuth angle, the position fix determined based on raw observables that are extracted from an internal GNSS chipset and the internal image from the internal ICD and examples of external accessory data are a position fix that is determined based on external raw observables, an external image from an external ICD accessory, and an EDM distance measurement.

Additional Illustrations

An embodiments provides for receiving the principal control instructions that include at least one of an instruction that controls an external electronic distance measurement accessory, an instruction that controls an external image capturing device accessory, an instruction that controls an external laser pointer accessory, an instruction that controls an external Global Navigation Satellite Systems (GNSS) raw observable provider, an instruction requesting that the external Global Navigation Satellite Systems (GNSS) raw observable provider transmit external raw observables to the mobile data collection platform, and an instruction requesting that the external electronic distance measurement accessory transmit data to the mobile data collection platform. For example, an external accessory, such as an external electronic distance measurement accessory, an external image capturing device accessory, an external laser pointer accessory and an external Global Navigation Satellite Systems (GNSS) raw observable provider are not designed to be operated on their own. Instead, they are designed to be controlled by a mobile data collection platform using one or more control instructions, as described herein.

An example of a principal control instruction for any type of accessory is a control instruction that MDCP's request information from accessory logic 5892 transmits to the accessory's receive request for information logic 5910 or that causes the external accessory to perform some function. For an external electronic distance measurement accessory, the principal control instruction may be a request for EDM distance measurement from the external EDM accessory. For an external image capturing device accessory, the principal control instruction may be a request for an external image from the external image capturing device accessory. For an external laser pointer accessory the principal control instruction may be an instruction to transmit a beam of light from the external laser pointer accessory. For an external GNSS raw observable provider, the principal control instruction may be a request for external raw observables. Examples of requested data include an EDM distance measurement 4159 from an external EDM accessory, an external image 4152 from an external image capturing device accessory, and external raw observables from an external GNSS raw observable provider that can be used to determine a position fix 4154.

According to one embodiment, turning an external accessory on or off are not examples of principal control instructions. For example, an external accessory can be turned on or off by pressing a button or sliding a slide bar on the external accessory. According to one embodiment, waking an external accessory up from a sleep mode is an example of a principal control instruction. For example, the external accessory can be turned on or off by pressing a button on the external accessory. The external accessory can go into a sleep mode that saves power while at the same time enables it to communicate with the mobile data collection platform. Subsequently, the external accessory can be woken up from the sleep mode by receiving a principal control instruction from a mobile data collection platform that instructs the external accessory to wake up.

An embodiment provides for altering the path of the reflected portion of the light beam inside of the external electronic distance measurement accessory with a mirror 4510B that is part of the electronic distance measurement accessory 4400, 4500B. For example, referring to FIGS. 45A, 45B, 45F-45H, the path of the reflected portion is bent at a 90 degree angle, for example, by a mirror. Examples of reflected portion are 4550B and 4522A. Referring to FIGS. 45D and 45E, the path of the reflected portion is not altered. The reflected portion includes a first reflected subset that travels the path prior to the reflecting with the mirror and a second reflected subset that travels the path after the reflecting with the mirror. Referring to FIG. 45B, an example of a first reflected subset is the portion of the reflected light 4550B between an object of interest and the mirror 4510B an example of a second reflected subset is the portion the reflected light 4550B between the mirror 4510B and the light sensor 4530B.

An embodiment provides for providing a focused second reflected subset by focusing the second reflected subset with a lens of the external electronic distance measurement accessory; and detecting the focused second reflected subset with a light sensor of the external electronic distance measurement accessory. An example of an external electronic distance measurement accessory is 4500B. An example of reflected portion is reflected portion 4522A, 4550B (FIGS. 45A, 45B). An example of a lens is 4520B. An example of a light sensor is 4530B. An example of focused second reflected subset is 4580B.

An embodiment provides for receiving, at the external electronic distance measurement accessory 4020, a request, from the mobile data collection platform 4000, for a distance measurement, for example, of a distance 4599A between the object of interest 4513A and the external electronic distance measurement accessory 4020; and communicating the distance measurement from the external electronic distance measurement accessory 4020 to the mobile data collection platform 4000, wherein the determining of the distance measurement and the communicating of the distance measurement are performed in response to the receiving of the request.

An embodiment provides for the receiving of the request and the communicating of the distance measurement of the distance 4599A are performed by a communication device 4024 that is part of the external electronic distance measurement accessory 4020, wherein the communication device 4024 is selected from a group consisting of a wireless communication device and a wired access communication device 4024.

An embodiments is provided for coupling the external electronic distance measurement accessory 4020 with the mobile data collection platform 4000 where the external electronic distance measurement accessory 4020 has a form factor that integrates with the mobile data collection platform 4000 where a light beam axis 4585A of the external electronic distance measurement accessory 4020 is parallel with an optical axis 4560A from an entrance pupil 4250 of the mobile data collection platform 4000. For example, a form factor can provide a size and shape of the EDM case 4570A that integrates with the MDCP case 4580A in a manner described herein.

Various embodiments provide for an external electronic distance measurement accessory 4400, 4020, 4500B for providing data to a mobile data collection platform 4000, wherein the external electronic distance measurement accessory 4400, 4020, 4500B comprises: a front side 4517A of the external electronic distance measurement accessory 4400, 4020, 4500B includes a transmit light source 4503A and a receiving aperture 4560A, 4640A; a back side 4516A of the external electronic distance measurement accessory 4400, 4020, 4500B is on an opposite side of the front side 4517A and the back side 4516A is parallel to the front side 4517A of the external electronic distance measurement accessory 4400, 4020, 4500B; a fastener system 4714 that couples the back side of the external electronic distance measurement accessory 4400, 4020, 4500B to a front side of the mobile data collection platform 4000, wherein the front side of the mobile data collection platform includes an entrance pupil 4250 and the fastener system maintains a known fixed relationship, such as one or more of distances 3820, 3830, and 3840, between the external electronic distance measurement accessory 4400, 4020, 4500B in a first package and the mobile data collection platform 4000 in a second package, where the first and second package are separate packages that are physically coupled together using the fastener system; receive-request-for-information-logic 5910 that receives a request, from the mobile data collection platform 4000, for a distance measurement; a transmit light source 4503A that transmits a light beam, such as 4521A, wherein an axis 4585A of the light beam is parallel with an optical axis 4560A of the entrance pupil 4250 of the mobile data collection platform 4000; the receiving aperture 4560A, 4640A that receives a reflected portion, such as 4522A or 4550B, of the light beam; a time-of-flight-distance-calculator 4509A that determines the distance measurement of the distance 4599A based on a time that the light beam, such as 4521A, was transmitted by the transmit light source 4503A and a time that the reflected portion, such as 4522A, was received by the receiving aperture; and requested-information-providing-logic 5930 that communicates the distance measurement to the mobile data collection platform 4000.

Various embodiments provide for the external electronic distance measurement accessory to further comprises a lens 4520B that focuses the reflected portion; and a light sensor 4530B that detects the focused reflected portion.

Various embodiments provide for the external electronic distance measurement accessory 4400, 4020, 4500B to further comprise a communication device 4024 that communicates with the mobile data collection platform 4000, wherein the communication device is selected from a group consisting of a wireless communication device and a wired access communication device.

Various embodiments provide for the electronic distance measurement accessory 4400, 4020, 4500B to have that integrates with the mobile data collection platform by providing a light beam axis 4585A that is parallel with the optical axis 4560A. FIGS. 45A, 45B, 45D-45H depict EDM accessories that have form factors that can be integrated with a mobile data collection platform by providing a light beam axis 4585A that is parallel with the optical axis 4560A. For example, the EDM accessories can be integrated with a mobile data collection platform in an L shape (FIG. 45D), a T shape (FIG. 45E) where the principal axis of the EDM accessory and the MDCP are perpendicular to each other using mounting systems that include fastener systems, such as 4505D and 4505E. In another example, an EDM accessory can be integrated with a mobile data collection platform so that the respective principal axis of the EDM accessory and the mobile data collection platform are parallel with each other as depicted in FIGS. 45A, 45F-45H, using various mounting systems as discussed herein. Various embodiments provide for altering the path of the reflected portion with the mirror 4510B. Various embodiments provide for a light beam axis 4585A of the external electronic distance measurement accessory 4400, 4020, 4500B is parallel with an optical axis 4560A from the entrance pupil 4250 of the mobile data collection platform 4000. Various embodiments provide for the back side 4516A of the external electronic distance measurement accessory 4400, 4020, 4500B to be a largest face of the external electronic distance measurement accessory 4400, 4020, 4500B and the front side 4515A of the mobile data collection platform 4000 to be a largest face of the mobile data collection platform 4000. Various embodiments provide for a largest face, such as 4516B, of the external electronic distance measurement accessory 4400, 4020, 4500B is parallel with a largest face, such as 4515A, of the mobile data collection platform 4000. Various embodiments provide for a largest face, such as 4516A, of the external electronic distance measurement accessory 4400, 4020, 4500B to be smaller than a largest face, such as 4515A, of the mobile data collection platform 4000 where the entrance pupil 4250 is located on the front side 4515A of the mobile data collection platform.

Various embodiments provide for no portion of the external electronic distance measurement accessory 4400, 4020, 4500B to cover any portion an entrance pupil 4250 of the mobile data collection platform 4000 when the external electronic distance measurement accessory 4400, 4020, 4500B is coupled with the mobile data collection platform 4000. FIG. 47 depicts an area 4790 that includes an entrance pupil and a flash in either a center position or a side position that are not covered up by an external accessory 4730 that is coupled with the MDCP 4720, according to various embodiments.

According to one embodiment, the external electronic distance measurement accessory has a cut out portion that exposes the entrance pupil of the mobile data collection platform when the external electronic distance measurement accessory and the mobile data collection platform are coupled with each other. For example, as depicted in FIG. 47, the line 4780 is a straight vertical line. However, various embodiments are well suited for the line 4780 to be L shaped to provide a cut out portion of the accessory so that none of the accessory covers up the entrance pupil or flash. For example, the lower portion of the accessory's side designed by line 4780 could extend below the entrance pupil and the flash in an L shape to provide the cut out portion.

According to one embodiment, the external electronic distance measurement accessory includes a mirror 4510B, 4510F, 4510G, 4510H that alters a path of the reflected portion, such as 4522A, 4550B (FIGS. 45A, 45B). Various embodiments provide for the reflected portion to include a first reflected subset and a second reflected subset, the first reflected subset travels the path prior to the reflected portion being reflected by the mirror 4510B, 4510F, 4510G, 4510H and the second reflected subset travels the path after the reflected portion is reflected by the mirror 4510B, 4510F, 4510G, 4510H and the first reflected subset is at a 90 degree angle with respect to the second reflected subset. Referring to FIG. 45B, an example of a first reflected subset is the portion of the reflected light 4550B between an object of interest and the mirror 4510B an example of a second reflected subset is the portion the reflected light 4550B between the mirror 4510B and the light sensor 4530B.

Various embodiments provide for the first reflected subset, as discussed herein, being parallel to an optical axis 4560A from the entrance pupil 4250 of the mobile data collection platform and the second reflected subset, as discussed herein, being parallel with the front side 4517A of the external electronic distance measurement accessory 4400, 4020, 4500B, the back side 4516A of the external electronic distance measurement accessory 4400, 4020, 4500B, and the front side 4515A of the mobile data collection platform 4000. Various embodiments provide for a light beam axis 4585A of the external electronic distance measurement accessory 4400, 4020, 4500B is parallel with an optical axis 4560A from the entrance pupil 4250 of the mobile data collection platform 4000.

Various embodiments provide for a principal axis of the mobile data collection platform 4000 is parallel with a principal axis of the external electronic distance measurement accessory 4400, 4020, 4500B, for example, as depicted in FIGS. 45A, 45B, 45F, 45G, and 45H.

Various embodiments provide for an external electronic distance measurement accessory 4400, 4020, 4500B for providing data to a mobile data collection platform 4000, wherein the external electronic distance measurement accessory 4400, 4020, 4500B comprises: maintaining means that maintains a known fixed relationship, such as one or more distances 3820, 3830, and 3840, between the external electronic distance measurement accessory 4400, 4020, 4500B and the mobile data collection platform 4000, where the electronic distance measurement accessory 4400, 4020 and 4500B and the mobile data collection platform 400 are in separate packages that are physically coupled together, as discussed herein; integrating means that provides a light beam axis 4585A of the external electronic distance measurement accessory 4400, 4020, 4500B that is parallel with an optical axis 4560A of an entrance pupil 4250 of the mobile data collection platform 4000, as depicted in FIGS. 45A, and 45D-45H; controlling means, such as 5910 that receives control instructions from the mobile data collection platform 4000, where the control instructions control the external electronic distance measurement accessory 4400, 4020, 4500B, for example, by causing logics 5920 and 5930 to be performed; transmitting means, laser transmitter 4503A, that transmits a light beam, such as transmitted light 4521A, from a transmit light source along the light beam axis 4585A; receiving means, such as receiver detector 4504A, that receives a reflected portion, such as 4522A, of the light beam; and determining means, such as time of flight distance calculator 4509A, that determines a distance measurement, for example of a distance 4599A, based on a time that the light beam was transmitted by the transmitting means and a time that the reflected portion was received by the receiving means.

Various embodiments provide for the external electronic distance measurement accessory 4400, 4020, 4500B comprises integrating means that integrates the external electronic distance measurement accessory 4400, 4020, 4500B with the mobile data collection platform 4000. Examples of an integrating means include at least one or more of a form factor as discussed herein, shapes and sizes of the external electronic distance measurement accessory and the mobile data collection platform, fastener system 4714, orientations of the external electronic distance measurement accessory and the mobile data collection platform when they are coupled together as depicted, for example, at least in FIGS. 47-53, not covering up area 4790, as discussed herein, when the accessory and the MDCP are coupled together, and providing a light beam axis 4585A of the external electronic distance measurement accessory that is parallel with an optical axis 4160A of an entrance pupil 4250 of the mobile data collection platform 4000, at least as depicted in FIGS. 45A, 45D-45H.

Various embodiments provide for the external electronic distance measurement accessory 4400, 4020, 4500B further comprising: focusing means, such as lens 4520B, that focuses the reflected portion; and detecting means, such as light sensor 4530B, that detects the focused reflected portion.

Various embodiments provide for the external electronic distance measurement accessory 4400, 4020, 4500B further comprises: receiving means, such as receive request for information logic 5910, that receives, at the external electronic distance measurement accessory 4400, 4020, 4500B, a request, from the mobile data collection platform 4000, for the distance measurement, for example of the distance 4599A; and communicating means, such as communication device 4024, that communicates the distance 4599A from the external electronic distance measurement accessory 4400, 4020, 4500B to the mobile data collection platform 4000.

Various embodiments provide for the receiving means and the communicating means being a part of the external electronic distance measurement accessory 4400, 4020, 4500B, wherein the receiving means and the communicating means are selected from a group consisting of a wireless communication means and a wired access communication means. Examples of a receiving means is receive request for information logic 5910 and communications device 4024 and examples of communicating means is requested information providing logic 5930 and communications device 4024.

According to various embodiments, the external electronic distance measurement accessory 4400, 4020, and 4500B further comprises a positioning means that positions the external electronic distance measurement accessory with respect to the mobile data collection platform in a manner that the light beam axis of the external electronic distance measurement accessory is parallel with the optical axis from an entrance pupil of the mobile data collection platform. Examples of a positioning means include at least the mirror that bends the reflected portion, the fastener system 4714, 4505D, 4505E, the orientation of the EDM accessory with respect to the MDCP, which could be an L shape as depicted in FIG. 45D, a T shape as depicted in FIG. 45E, or parallel principal axis as depicted in FIGS. 45F-45H, not covering any portion of the MDCP's lens 4540A, the user's ability to clearly and easily see the MDCP's display 1414 as depicted in FIGS. 45A, 45D-45H.

According to one embodiment, the external electronic distance measurement accessory 4400, 4020, 4500B further comprises altering means, such as a mirror that alters a path of the reflected portion inside the external electronic distance measurement accessory by reflecting the reflected portion, where the altering means is part of the external electronic distance measurement accessory. Examples of an altering means are mirrors 4510B, 4510F, 4510G, 4510H. Examples of a reflected portion is reflected portion 4522A, 4550B (FIGS. 45A, 45B).

According to one embodiment, the external electronic distance measurement accessory 4400, 4020, 4500B further comprises coupling means that couples the external electronic distance measurement accessory with the mobile data collection platform. An example of a coupling means is fastener system 4714. Other examples of a coupling means are a bracket, a screw, a screw hole, a male portion or female portion of a snap-on mounting system, a hole or a knob that can be inserted into a hole and twisted.

An embodiment provides for receiving of the external accessory data, as described herein, from the accessory 4400, 4020, 4500B that is external to the mobile data collection platform 4000, wherein there is a known spatial relationship, as discussed herein, between the mobile data collection platform 4000 and the external accessory 4400, 4020, 4500B.

An embodiment provides for receiving the external accessory data from an external electronic distance measurement accessory 4400, 4020, 4500B. An embodiment provides for receiving the external accessory data from an external image capturing device accessory that is selected from a group consisting of an external infrared (IR) image capturing device and an external non-infrared image capturing device. An example of an external infrared (IR) image capturing device accessory includes features 4620B, 4622B, 4640B 4630B as depicted in FIG. 46B. However, embodiments are well are also well suited to an external non-infrared image capturing device, as discussed herein. An embodiment provides for receiving a distance measurement from an external electronic distance measurement accessory 4400, 4020, 4500B. An example of a distance measurement is a measurement of the distance 4599A. An embodiment provides for receiving the distance measurement that provides a scale factor used in photogrammetric data processing. For example, the distance measurement can be used as a scale factor by photogrammetric data processing.

An embodiment provides for illuminating the point of interest with a beam of light from a laser pointer accessory. An example of a laser pointer accessory is an accessory that includes a laser pointer device 4412 and laser pupil 4660B.

An embodiment provides for monitoring when a user of the mobile data collection platform presses a button, such as accept data button 2730, capturing the image 1452 or 4152; activating the external accessory 4400, 4020, 4500B in response to detecting that the button was pressed; and requesting the external accessory data from the external accessory in response to the detecting that the button was pressed.

Various embodiments provide a mobile data collection system for collecting data, the mobile data collection system comprising: an external accessory 4400, 4020, 4500B, for providing external accessory data to a mobile data collection platform 4000; the mobile data collection platform 4000 comprising a cellular device 1410, an image capturing device 1430, an orientation system 1470, hardware memory 1450, and one or more hardware processors 1460, wherein the cellular device has a display 1414 and wherein the image capturing device includes an entrance pupil 3902, 4250; a GNSS raw observable provider 3750 that is located external to and physically coupled with the mobile data collection platform, wherein the GNSS raw observable provider 3750 includes an antenna 3810, the antenna 3810 and the entrance pupil 3902, 4250 are in a known spatial relationship 3820, 3830, and/or 3840 and the antenna 3810 receives GNSS positioning signals that defines a location of the antenna 3810; the image capturing device 1430 that captures an image 1452, 4152, wherein the image capturing device 1430 is an integral part of the mobile data collection platform 400 and has a known spatial relationship with the antenna 3810; the orientation system 1470 includes a tilt sensor and a compass and determines orientation information 1456 that includes tilt angle obtained from the tilt sensor and tilt direction obtained from the compass; the hardware memory 1450 that stores the image 1452, 4152, the position fix 1454, 4154, external accessory data, and the orientation information 1456; wherein the one or more hardware processors 1460: receives external raw observables from a GNSS raw observable positioning provider 3750 that is outside of the mobile data collection platform 4000; captures an image 1452, 4152 with the image capturing device 1430, wherein the image depicts a point of interest; determines the position fix 1454, 4154 of the mobile data collection platform based on the raw observables, wherein the position fix defines a location of an antenna in a GNSS coordinate system; accesses the orientation information from the orientation system, wherein the orientation information, which includes the tilt angle and the tilt direction, is associated with a three dimensional location, such as for example X0, Y0, Z0, of the mobile data collection platform when the image was captured; and stores the image, the position fix, the orientation information, and the external accessory data in the hardware memory of the mobile data collection platform.

According to one embodiment, the antenna 3810 is a circularly polarized GNSS antenna. According to one embodiment, the raw observables include raw pseudoranges and one of carrier phase information and Doppler Shift Information. According to various embodiments, the mobile data collection platform is disposed in a known fixed relationship with a known geometric offset from the external accessory, as discussed herein.

According to various embodiments, the external accessory 4400, 4020, 4500B is an external electronic distance measurement accessory, such as 4020, 4400, 4500B. According to various embodiments, the external accessory is an external image capturing device accessory, such as an accessory that includes one or more of 4620B, 4622B, 4640B, 4630B (FIG. 46B). According to various embodiments, the mobile data collection platform 4000 includes an internal GNSS chipset 1413 and the one or more hardware processors 1460 are located outside of the internal GNSS chipset 1413.

According to one embodiment, the mobile data collection platform further comprises detect image capture button pressed logic 5891 that monitors when a user of the mobile data collection platform presses a button that initiates capture of the image; and request information from accessory logic 5892 that activates the external accessory and requests the external accessory data from the external accessory in response to detecting that the button was pressed, wherein the one or more hardware processors executes the detect image capture button pressed logic 5891 and the request information from accessory logic 5892.

Various embodiments provide for receiving the external accessory data from the external accessory; receiving collected internal data from the mobile data collection platform, wherein the position fix of the mobile data collection platform is the position of the mobile data collection platform at a time of the receiving of the external accessory data and the receiving of the collected internal data; and storing the external accessory data with the collected internal data in the hardware memory. For example, the receiving of the external accessory data, the receiving of the collected internal data, and the storing of the external accessory data and the collected internal data can be performed in 0.25 of a second or less.

In one embodiment, a mounting system 4030 couples the external accessory and the mobile data collection platform together. According to one embodiment, the mounting system 4030 is selected from a group consisting of a snap-on mounting system 5510 and a screw mount 5530.

Various embodiments provide for a method of performing data collection using a cellular device, the method comprising: capturing an image 1452, 4152 that depicts a point of interest using a cellular device 4000; obtaining raw observables from a GNSS raw observable positioning provider 3750 that is outside of the cellular device, wherein the raw observables include raw pseudoranges and one of carrier phase information and Doppler Shift Information; determining a position fix 1454, 4154 of an antenna 3810 of the GNSS raw observable positioning provider 3750 based on raw observables from the GNSS raw observable positioning provider 3750, wherein the GNSS raw observable positioning provider is outside of the cellular device 4000 and wherein the antenna 3810 is in a known spatial relationship with an entrance pupil center 3902, 4250 of the cellular device 4000; determining a three dimensional position, such as X0, Y0, Z0, of the cellular device based on a local gravity vector and the position fix; receiving external accessory data from an accessory 4020, 4400, 4500B that is external to the cellular device; and storing the image, the three dimensional position, and the external accessory data in hardware memory 1450 of the cellular device, wherein the local gravity vector is local with respect to the cellular device, wherein the antenna 3810 is at the position fix when the image is captured.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a computer system and are executed by the hardware processor of the computer system. When executed, the instructions cause a computer system to implement the functionality of various embodiments of the present invention. For example, the instructions can be executed by a central processing unit associated with the computer system. According to one embodiment, the non-transitory computer readable storage medium is tangible.

Unless otherwise specified, one or more of the various embodiments described in the context of FIGS. 1A-63 can be implemented as hardware, such as circuitry, firmware, or computer readable instructions that are stored on non-transitory computer readable storage medium. The computer readable instructions of the various embodiments described in the context of FIGS. 1A-63 can be executed by a hardware processor, such as central processing unit, to cause a computer system to implement the functionality of various embodiments. For example, according to one embodiment, various embodiments described herein are implemented with computer readable instructions that are stored on computer readable storage medium that can be tangible or non-transitory or a combination thereof.

CONCLUSION

Although many embodiments have been descried with reference to mobile data collection platform 4000, embodiments are well suited for any of the other mobile data collection platforms described herein.

The blocks that represent features in FIGS. 1A-63 can be arranged differently than as illustrated, and can implement additional or fewer features than what are described herein. Further, the features represented by the blocks in FIGS. 1A-63 can be combined in various ways. A mobile data collection platform can be implemented using hardware, hardware and software, hardware and firmware, or a combination thereof. Further, unless specified otherwise, various embodiments that are described as being a part of the mobile data collection platform, whether depicted as a part of the mobile data collection platform or not, can be implemented using hardware, hardware and software, hardware and firmware, or a combination thereof.

The above illustration is only provided by way of example and not by way of limitation. There are other ways of performing the method described by the flowchart depicted herein.

Although specific operations are disclosed in various flowcharts depicted herein, such operations are exemplary. That is, embodiments of the present invention are well suited to performing various other operations or variations of the operations recited in the flowcharts. It is appreciated that the operations in the flowcharts may be performed in an order different than presented, and that not all of the operations in the flowcharts may be performed.

The operations depicted in depicted in the flowcharts herein can be implemented as computer readable instructions, hardware or firmware. According to one embodiment, a mobile data collection platform can perform one or more of the operations depicted in flowcharts herein.

The embodiments described herein transform data or modify data to transform the state of a mobile data collection platform for at least the reason that by extracting pseudorange information from a GNSS chipset for use elsewhere, the state of the mobile data collection platform is transformed from an entity that is not capable of determining a position fix itself into a mobile data collection platform that is capable of determining a position fix itself. In another example, embodiments described herein transform the state of a mobile data collection platform from not being capable of providing an improved accuracy position fix to being capable of providing an improved accuracy position fix.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined or separated in any suitable manner with one or more other features, structures, or characteristics.

What is claimed is:

1. A method of determining a distance, wherein the method comprises:

maintaining a known fixed relationship between an external electronic distance measurement accessory in a first package and a mobile data collection platform in a second package, wherein the first package and the second package are separate packages that are physically coupled together;

receiving, at the external electronic distance measurement accessory, principal control instructions from the mobile data collection platform;

transmitting a light beam from a transmit light source, wherein the transmit light source is part of the external electronic distance measurement accessory and wherein an axis of the light beam is parallel with an optical axis of an entrance pupil of the mobile data collection platform;

receiving a reflected portion of the light beam at a receiving aperture, wherein the receiving aperture is part of the external electronic distance measurement accessory; and determining a distance measurement based on a time that the light beam that was transmitted and a time that the reflected portion of the light beam was received.

2. The method as recited by claim 1, wherein the receiving, at the external electronic distance measurement accessory, of the principal control instructions from the mobile data collection platform further comprises:

receiving the principal control instructions that include at least one of an instruction that controls the external electronic distance measurement accessory, an instruction that controls an external image capturing device accessory, an instruction that controls an external laser pointer accessory, an instruction that controls an external Global Navigation Satellite Systems (GNSS) raw observable provider, an instruction requesting that the external GNSS raw observable provider transmit external raw observables to the mobile data collection platform, and an instruction requesting that the external electronic distance measurement accessory transmits data to the mobile data collection platform.

3. The method as recited by claim 1 further comprises:

altering a path of the reflected portion of the light beam inside the external electronic distance measurement accessory by reflecting the reflected portion of the light beam with a mirror that is part of the external electronic distance measurement accessory, wherein the reflected portion includes a first reflected subset that travels the path prior to the reflecting with the mirror and a second reflected subset that travels the path after the reflecting with the mirror.

4. The method as recited by claim 3 further comprises:

providing a focused second reflected subset by focusing the second reflected subset with a lens of the external electronic distance measurement accessory; and detecting the focused second reflected subset with a light sensor of the external electronic distance measurement accessory.

5. The method as recited by claim 1:

wherein the receiving, at the external electronic distance measurement accessory, of the control instructions from the mobile data collection platform, further comprises receiving, at the external electronic distance measurement accessory, a request, from the mobile data collection platform, for the distance measurement; and wherein the method further comprises communicating the distance measurement from the external electronic distance measurement accessory to the mobile data collection platform, wherein the determining of the distance measurement and the communicating of the distance measurement are performed in response to the receiving of the request.

6. The method as recited by claim 5, wherein the receiving of the request and the communicating of the distance measurement further comprise:

receiving the request and communicating of the distance measurement performed by a communication device that is part of the external electronic distance measurement accessory, wherein the communication device is selected from a group consisting of a wireless communication device and a wired access communication device.

7. An external electronic distance measurement accessory for providing data to a mobile data collection platform, wherein the external electronic distance measurement accessory comprises:

a front side of the external electronic distance measurement accessory includes a transmit light source and a receiving aperture;

a back side of the external electronic distance measurement accessory is on an opposite side of the front side and the back side is parallel to the front side of the external electronic distance measurement accessory;

a fastener system that couples the back side of the external electronic distance measurement accessory to a front side of the mobile data collection platform, wherein the front side of the mobile data collection platform includes an entrance pupil and the fastener system maintains a known fixed relationship between the external electronic distance measurement accessory in a first package and the mobile data collection platform in a second package, wherein the first package and the second package are separate packages that are physically coupled together;

receive-request-for-information-logic that receives a request, from the mobile data collection platform, for a distance measurement;

a transmit light source that transmits a light beam, wherein an axis of the light beam is parallel with an optical axis of the entrance pupil of the mobile data collection platform;

the receiving aperture that receives a reflected portion of the light beam;

a time-of-flight-distance-calculator that determines the distance measurement based on a time that the light beam was transmitted by the transmit light source and a time that the reflected portion was received by the receiving aperture; and requested-information-providing-logic that communicates the distance measurement to the mobile data collection platform.

8. The external electronic distance measurement accessory of claim 7, wherein the external electronic distance measurement accessory further comprises:

a lens that focuses the reflected portion; and a light sensor that detects the focused reflected portion.

9. The external electronic distance measurement accessory of claim 7, wherein the external electronic distance measurement accessory further comprises:

a communication device that communicates with the mobile data collection platform, wherein the communication device is selected from a group consisting of a wireless communication device and a wired access communication device.

10. The external electronic distance measurement accessory of claim 7, wherein a principal axis of the mobile data collection platform is parallel with a principal axis of the external electronic distance measurement accessory.

11. The external electronic distance measurement accessory of claim 7, wherein the external electronic distance measurement accessory does not cover any portion the entrance pupil of the mobile data collection platform when the external electronic distance measurement accessory is coupled with the mobile data collection platform.

12. The external electronic distance measurement accessory of claim 11, wherein the external electronic distance measurement accessory has a cut out portion that exposes the entrance pupil of the mobile data collection platform when the external electronic distance measurement accessory and the mobile data collection platform are coupled with each other.

13. The external electronic distance measurement accessory of claim 7, wherein the back side of the external electronic distance measurement accessory is a largest face of the external electronic distance measurement accessory and a front side of the mobile data collection platform is a largest face of the mobile data collection platform, wherein the entrance pupil is located on the front side of the mobile data collection platform.

14. The external electronic distance measurement accessory of claim 13, wherein the largest face of the external electronic distance measurement accessory is smaller than the largest face of the mobile data collection platform.

15. The external electronic distance measurement accessory of claim 7, wherein the external electronic distance measurement accessory includes a mirror that alters a path of the reflected portion.

16. The external electronic distance measurement accessory of claim 15, wherein the reflected portion includes a first reflected subset and a second reflected subset, the first reflected subset travels the path prior to the reflected portion being reflected by the mirror and the second reflected subset travels the path after the reflected portion is reflected by the mirror and the first reflected subset is at a 90 degree angle with respect to the second reflected subset.

17. An external electronic distance measurement accessory for providing data to a mobile data collection platform, wherein the external electronic distance measurement accessory comprises:
    maintaining means that maintains a known fixed relationship between the external electronic distance measurement accessory in a first package and the mobile data collection platform in a second package, wherein the first package and the second package are separate packages that are physically coupled together;
    integrating means that provides a light beam axis of the external electronic distance measurement accessory that is parallel with an optical axis of an entrance pupil of the mobile data collection platform;
    controlling means that receives control instructions from the mobile data collection platform;
    transmitting means that transmits a light beam from a transmit light source along the light beam axis;
    receiving means that receives a reflected portion of the light beam; and
    determining means that determines a distance measurement based on a time that the light beam was transmitted by the transmitting means and a time that the reflected portion was received by the receiving means.

18. The external electronic distance measurement accessory as recited by claim 17, wherein the external electronic distance measurement accessory further comprises:
    focusing means that focuses the reflected portion; and
    detecting means that detects the focused reflected portion.

19. The external electronic distance measurement accessory as recited by claim 17, wherein the external electronic distance measurement accessory further comprises:
    receiving means that receives, at the external electronic distance measurement accessory, a request, from the mobile data collection platform, for the distance measurement; and
    communicating means that communicates the distance measurement from the external electronic distance measurement accessory to the mobile data collection platform.

20. The external electronic distance measurement accessory as recited by claim 19, wherein the receiving means and the communicating means are part of the external electronic distance measurement accessory, wherein the receiving means and the communicating means are selected from a group consisting of a wireless communication means and a wired access communication means.

21. The external electronic distance measurement accessory as recited by claim 17, wherein the integrating means further comprises:
    positioning means that positions the external electronic distance measurement accessory with respect to the mobile data collection platform in a manner that the light beam axis of the external electronic distance measurement accessory is parallel with the optical axis of the entrance pupil of the mobile data collection platform.

22. The external electronic distance measurement accessory as recited by claim 17, the external electronic distance measurement accessory further comprises:
    altering means that alters a path of the reflected portion inside the external electronic distance measurement accessory by reflecting the reflected portion, wherein the altering means is part of the external electronic distance measurement accessory.

23. The external electronic distance measurement accessory as recited by claim 17, wherein the integrating means further comprises:
    coupling means that couples the external electronic distance measurement accessory with the mobile data collection platform.

24. The external electronic distance measurement accessory as recited by claim 23, wherein the coupling means is a bracket.

* * * * *